United States Patent
Akutsu et al.

(10) Patent No.: US 8,430,782 B2
(45) Date of Patent: *Apr. 30, 2013

(54) POWER PLANT

(75) Inventors: Shigemitsu Akutsu, Saitama-ken (JP);
Satoyoshi Oya, Saitama-ken (JP); Kota Kasaoka, Saitama-ken (JP); Noriyuki Abe, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 13/002,386

(22) PCT Filed: Jun. 12, 2009

(86) PCT No.: PCT/JP2009/060786
§ 371 (c)(1),
(2), (4) Date: Jan. 3, 2011

(87) PCT Pub. No.: WO2010/004831
PCT Pub. Date: Jan. 14, 2010

(65) Prior Publication Data
US 2011/0109179 A1    May 12, 2011

(30) Foreign Application Priority Data

Jul. 9, 2008  (JP) .................. 2008-178760

(51) Int. Cl.
*F16H 3/44* (2006.01)
(52) U.S. Cl.
USPC ........................................................ 475/269
(58) Field of Classification Search ....... 475/5; 310/114
See application file for complete search history.

(56) References Cited

U.S. PATENT DOCUMENTS 6,114,784 A * 9/2000 Nakano .......................... 310/59
6,380,653 B1 * 4/2002 Seguchi ........................ 310/112
(Continued)

FOREIGN PATENT DOCUMENTS

| JP | 8-111963 A | 10/1994 |
| JP | 2001-157304 | 6/2001 |
| JP | 2002-17004 | 1/2002 |

(Continued)

OTHER PUBLICATIONS

European Search Report application No. 09794278.3 dated Jul. 4, 2011.

*Primary Examiner* — Dirk Wright
(74) *Attorney, Agent, or Firm* — Squire Sanders (US) LLP

(57) ABSTRACT

A power plant which is capable of reducing the size and costs thereof and attaining high driving efficiency. In the power plant 1, the ratio between the number of first armature magnetic poles that form a first rotating magnetic field generated by a first stator 23 of a first rotating machine 21, the number of first magnetic poles 24a of a first rotor 24, and the number of first soft magnetic material elements 25a of a second rotor 25 disposed between the two 23 and 24 is set to 1:m:(1+m)/2 (m≠1.0), and the ratio between the number of second armature magnetic poles that form a second rotating magnetic field generated by a second stator 33 of a second rotating machine 31, the number of second magnetic poles 34a of a third rotor 34, and the number of second soft magnetic material elements 35a of a fourth rotor 35 disposed between the two 33 and 34 is set to 1:n:(1+n)/2 (n≠1.0). The two stators 23 and 33 are connected to each other. The first and fourth rotors 24 and 35 are connected to driven parts DW and DW, and the second and third rotors 25 and 34 are connected to an output portion 3a of a heat engine 3.

20 Claims, 86 Drawing Sheets

U.S. PATENT DOCUMENTS

| | | |
|---|---|---|
| 6,478,705 B1 | 11/2002 | Holmes et al. |
| 6,579,201 B2 * | 6/2003 | Bowen ............................... 475/5 |
| 6,852,053 B2 * | 2/2005 | Nakano et al. ..................... 475/5 |
| 6,910,981 B2 * | 6/2005 | Minagawa et al. ................ 475/5 |
| 7,117,965 B2 * | 10/2006 | Yatabe et al. ............ 180/65.235 |
| 7,204,776 B2 * | 4/2007 | Minagawa et al. ................ 475/5 |
| 7,259,493 B2 * | 8/2007 | Oshidari et al. ........ 310/216.114 |
| 7,545,056 B2 * | 6/2009 | Dooley et al. .................... 307/84 |
| 7,548,005 B2 * | 6/2009 | Kaizuka et al. ............... 310/114 |
| 7,609,011 B2 * | 10/2009 | Yatabe et al. .................. 318/140 |
| 7,622,875 B2 * | 11/2009 | Atarashi et al. .......... 318/400.41 |
| 8,113,976 B2 * | 2/2012 | Abe et al. .......................... 475/5 |
| 8,167,063 B2 * | 5/2012 | Abe et al. ..................... 180/65.24 |
| 8,183,802 B2 * | 5/2012 | Quere ......................... 318/269 |
| 8,197,373 B2 * | 6/2012 | Akutsu et al. ..................... 475/5 |
| 8,226,513 B2 * | 7/2012 | Abe et al. .......................... 475/5 |
| 2005/0085975 A1 | 4/2005 | Villata et al. |
| 2006/0284500 A1 | 12/2006 | Han et al. |
| 2007/0090707 A1 | 4/2007 | Moriya et al. |
| 2007/0096574 A1 | 5/2007 | Romagny et al. |
| 2008/0211335 A1 | 9/2008 | Abe et al. |
| 2011/0034282 A1 * | 2/2011 | Akutsu et al. ..................... 475/5 |

FOREIGN PATENT DOCUMENTS

| | | |
|---|---|---|
| JP | 2006-353090 | 12/2006 |
| JP | 2007-116837 | 5/2007 |
| WO | 2008/018376 | 2/2008 |
| WO | 2008/050827 | 5/2008 |
| WO | 2008/078817 | 7/2008 |

* cited by examiner

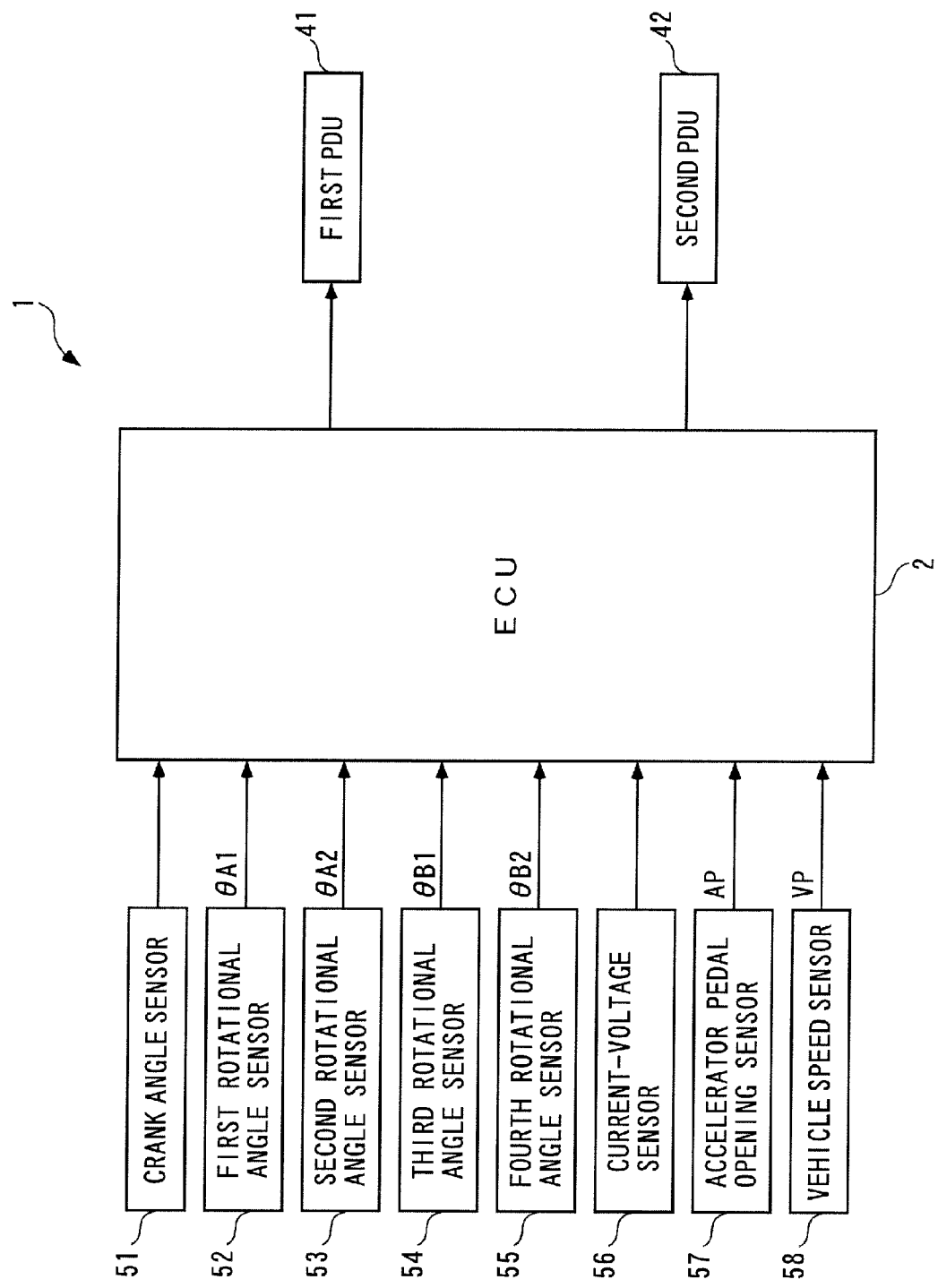

F I G. 1 5
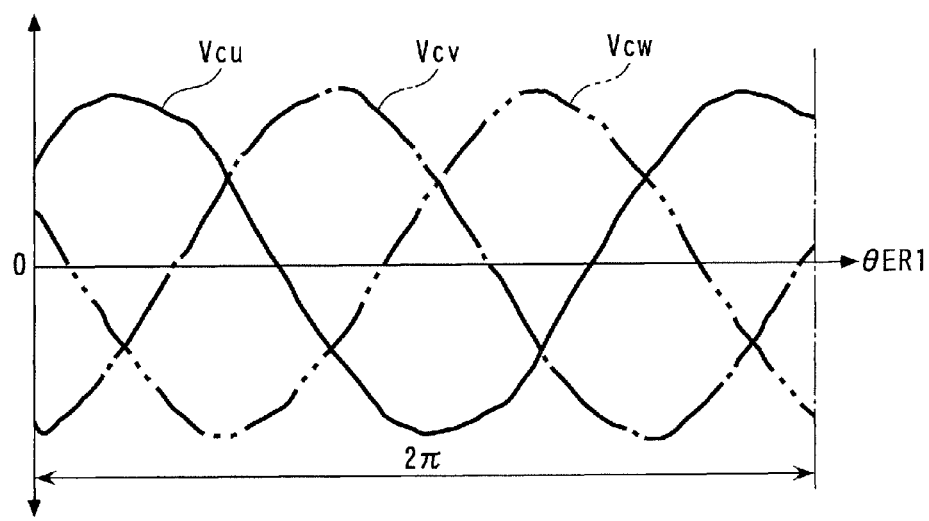
F I G. 1 6
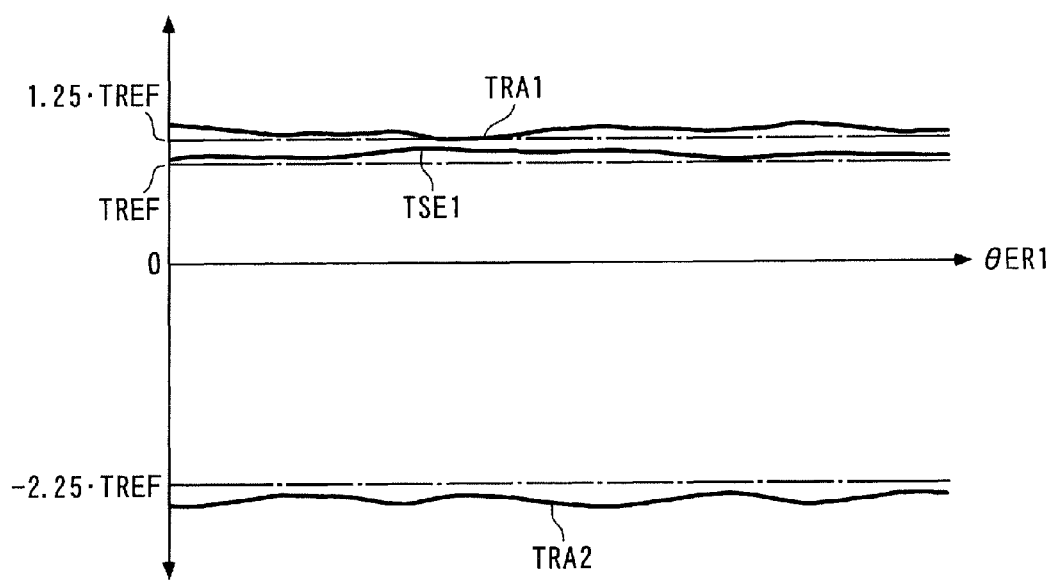

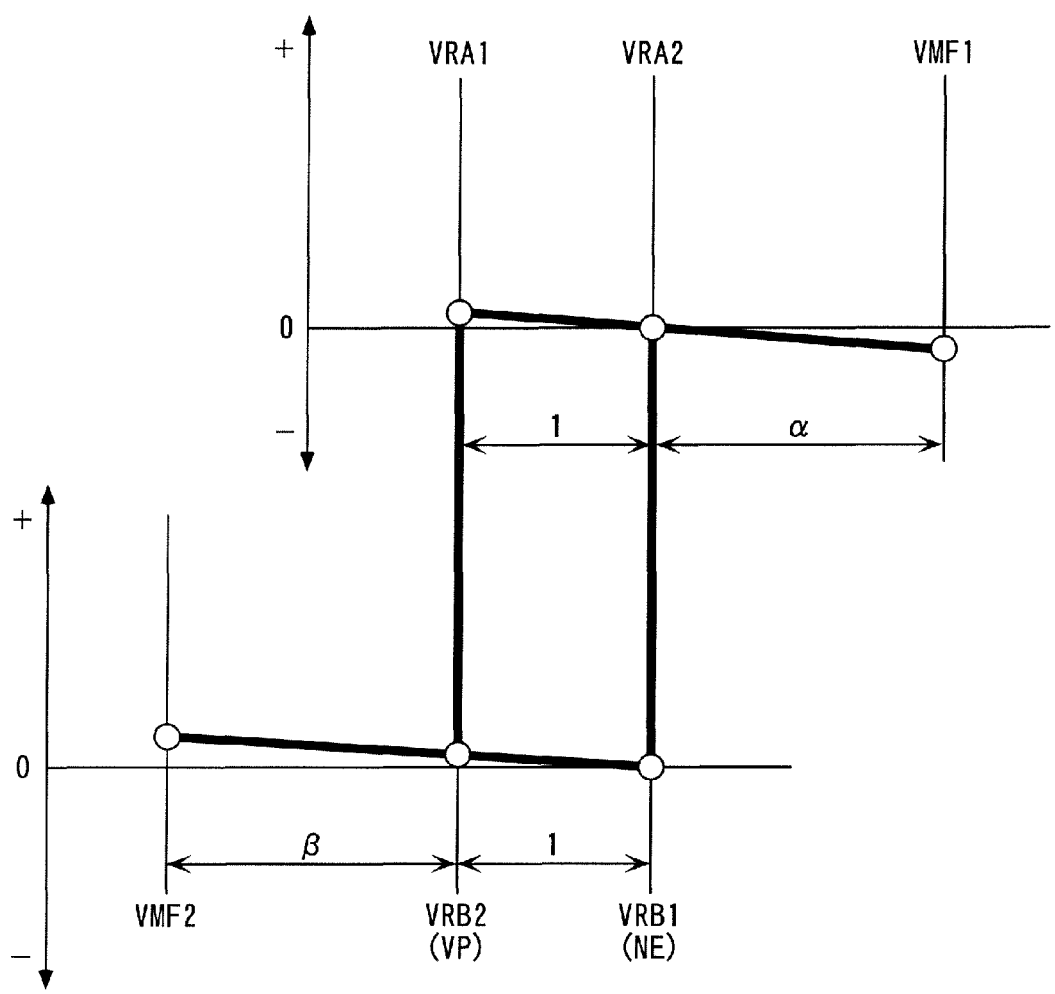
F I G. 1 9

F I G. 2 2
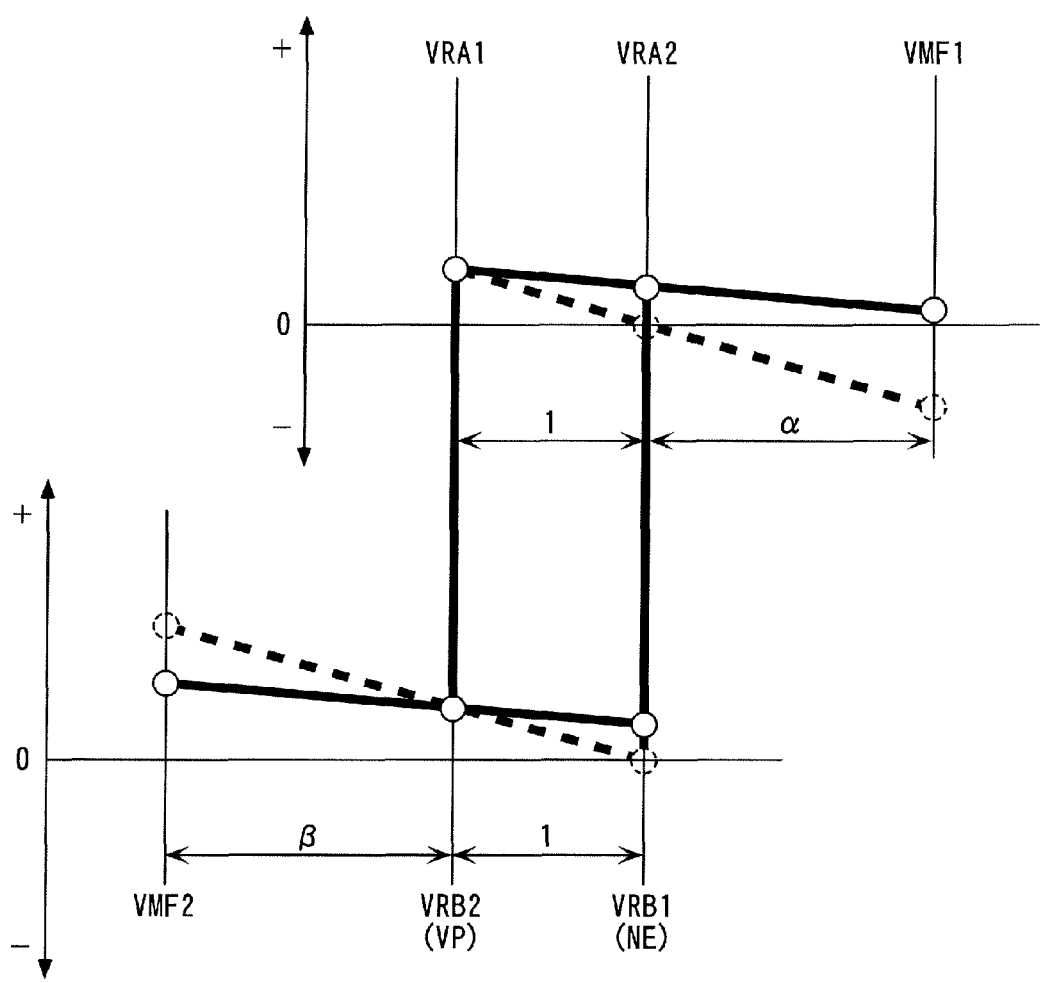

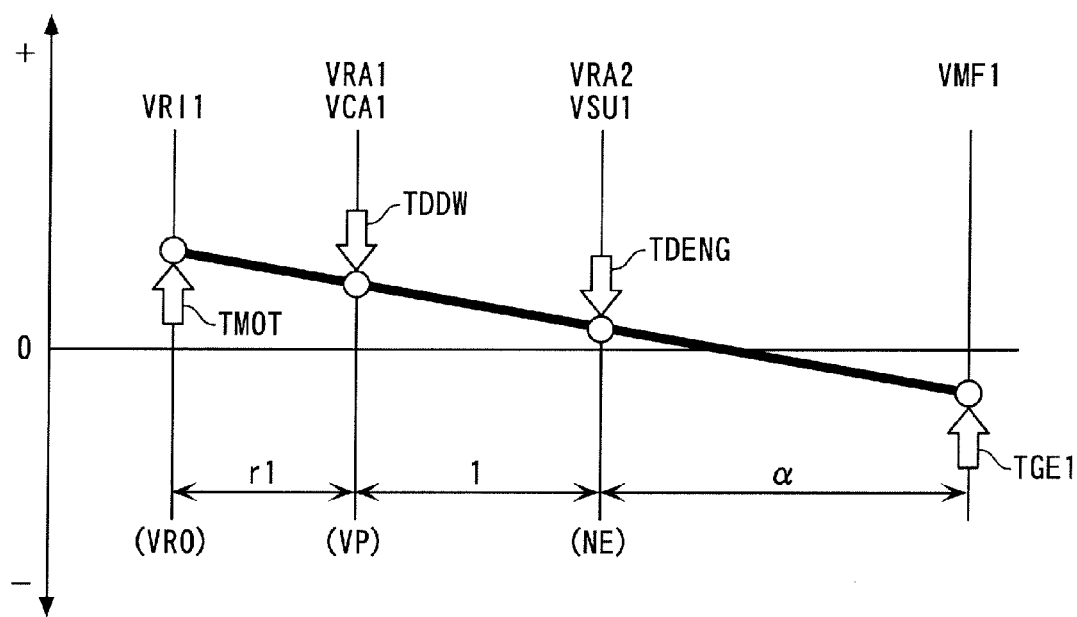
F I G. 4 2

F I G. 4 3
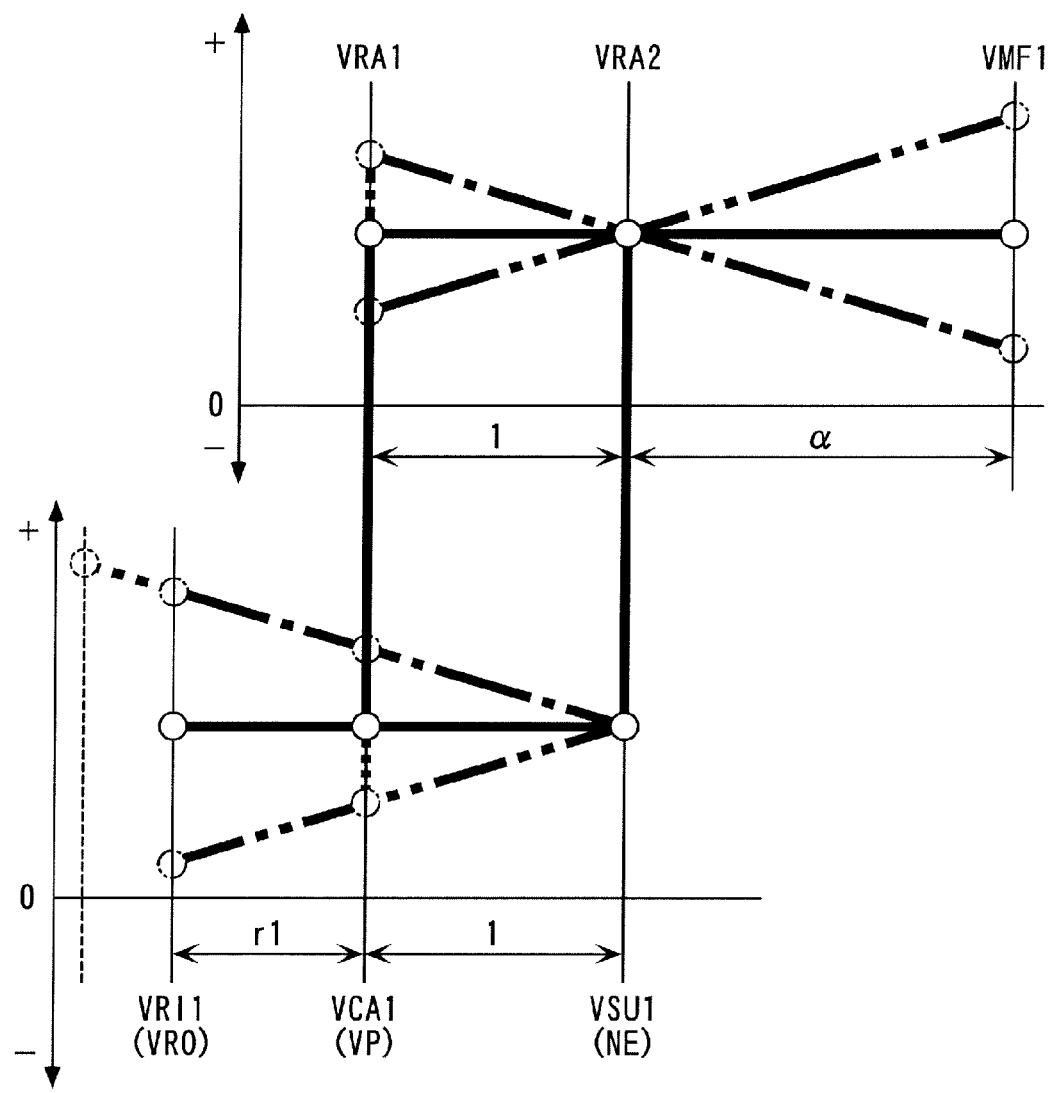

F I G. 5 1
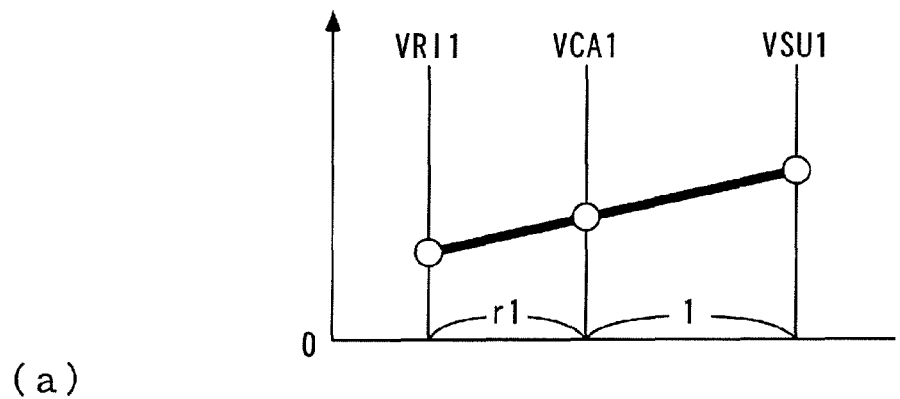
(a)
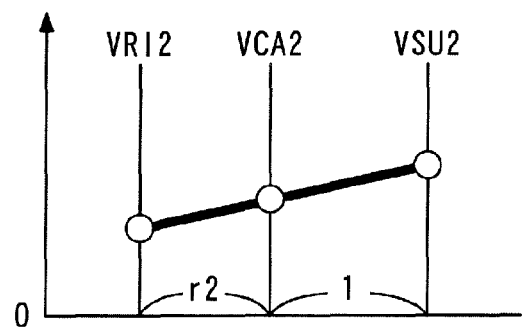
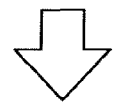
(b)
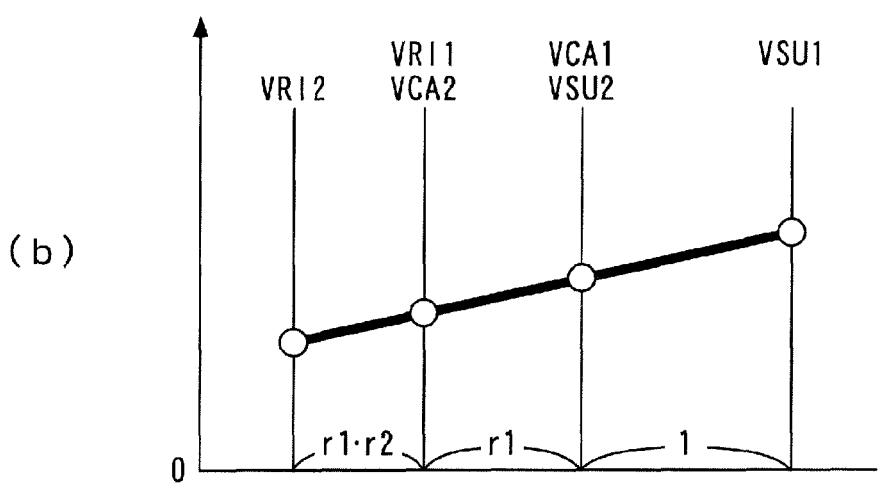

FIG. 53
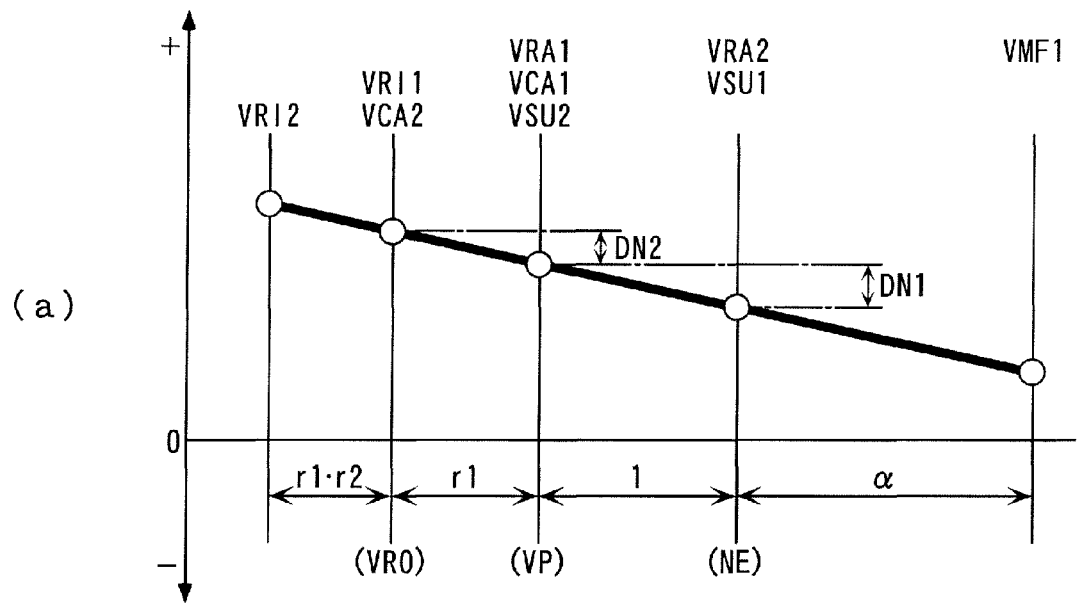
(a)
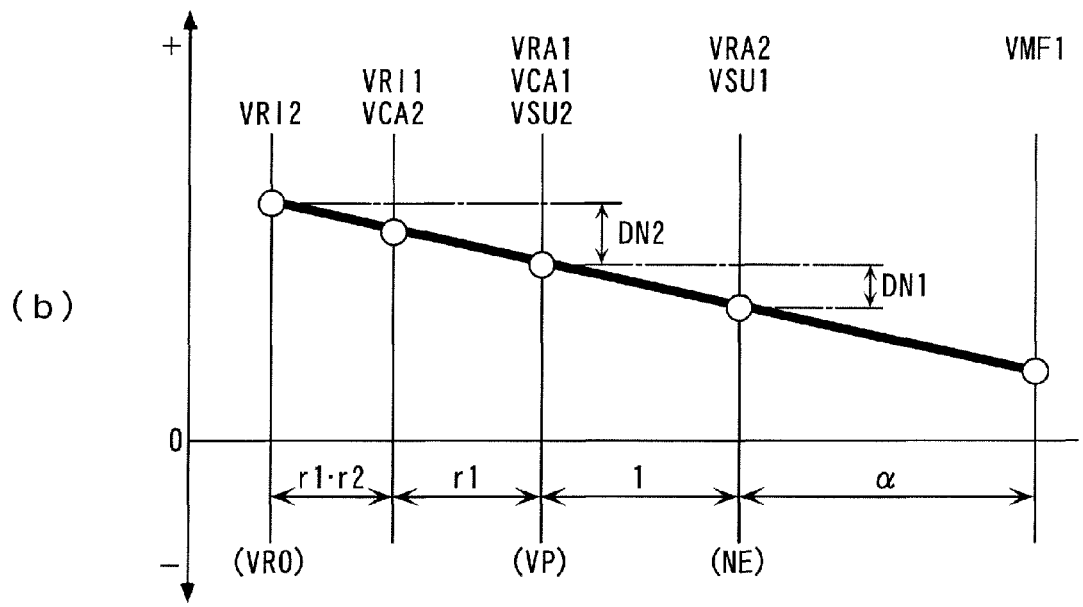
(b)

FIG. 54
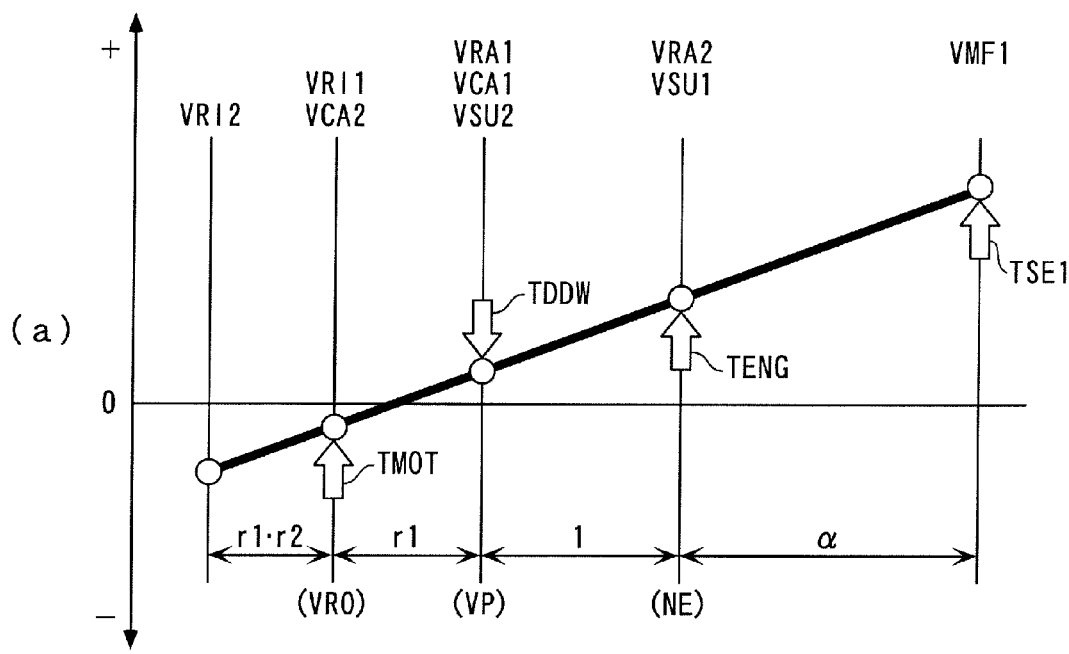
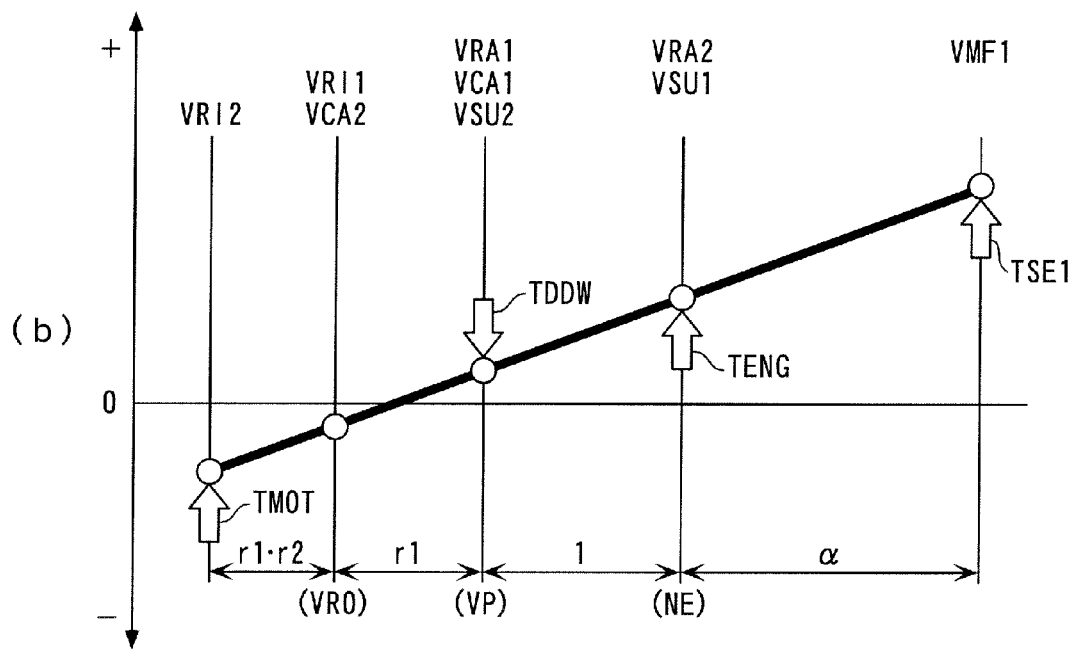

FIG. 67
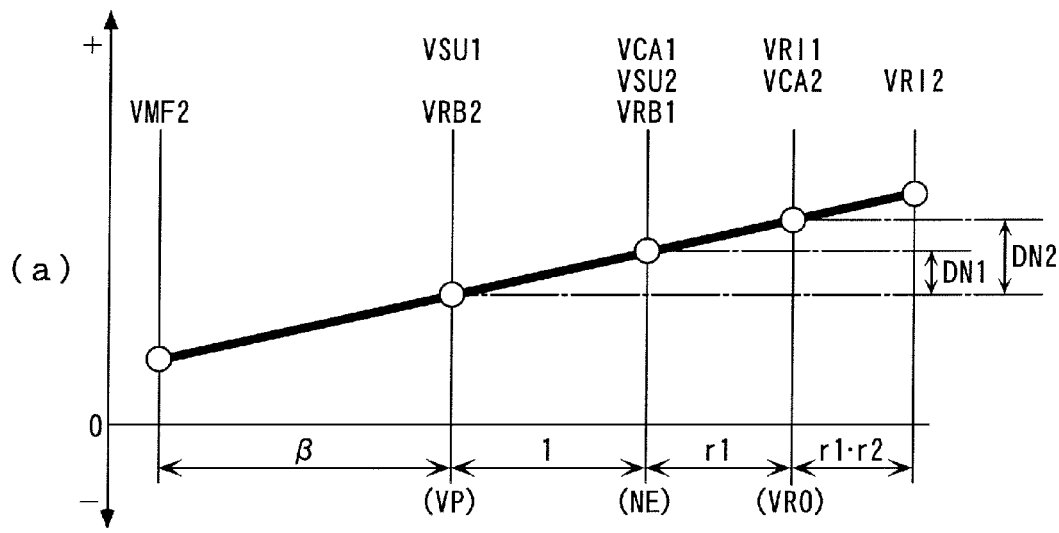
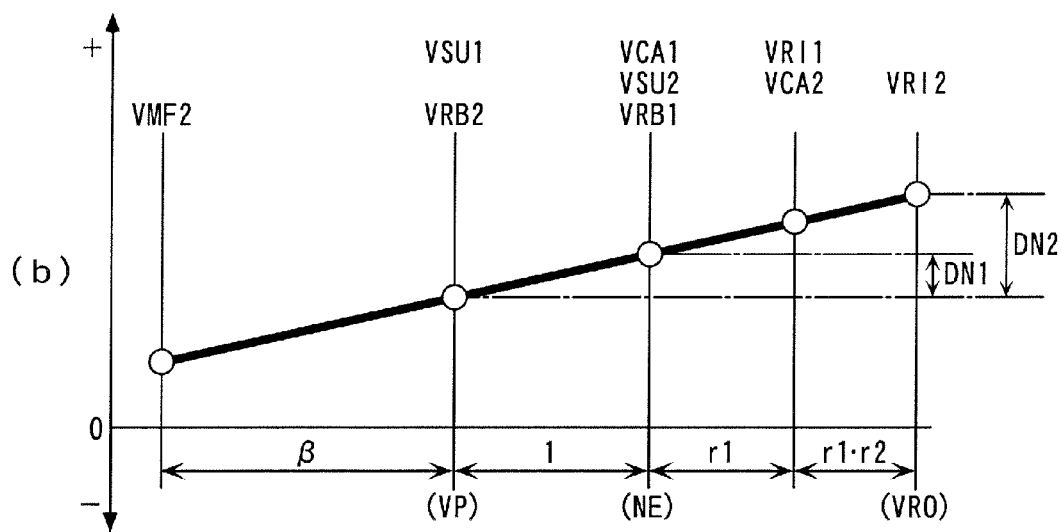

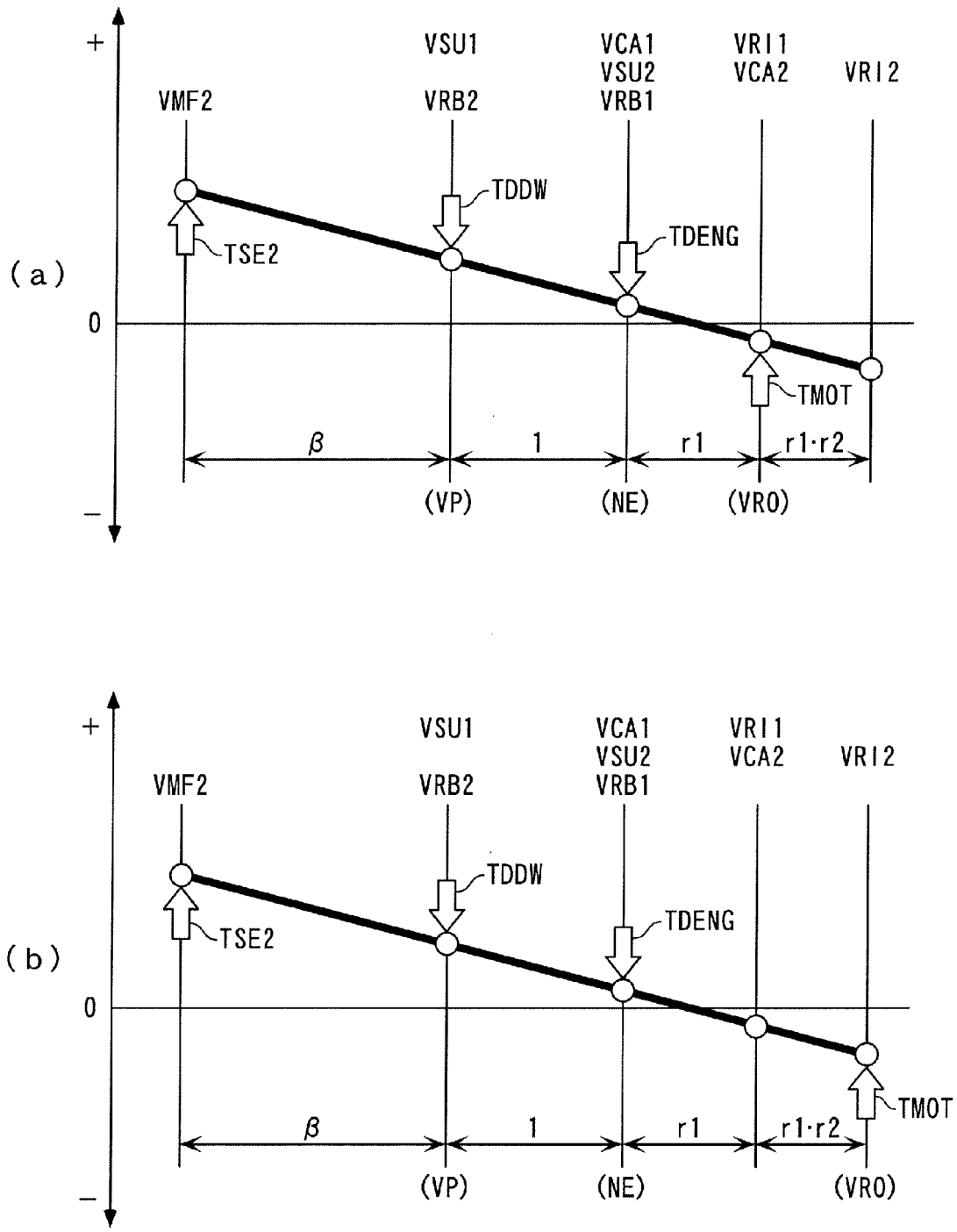
F I G. 6 8

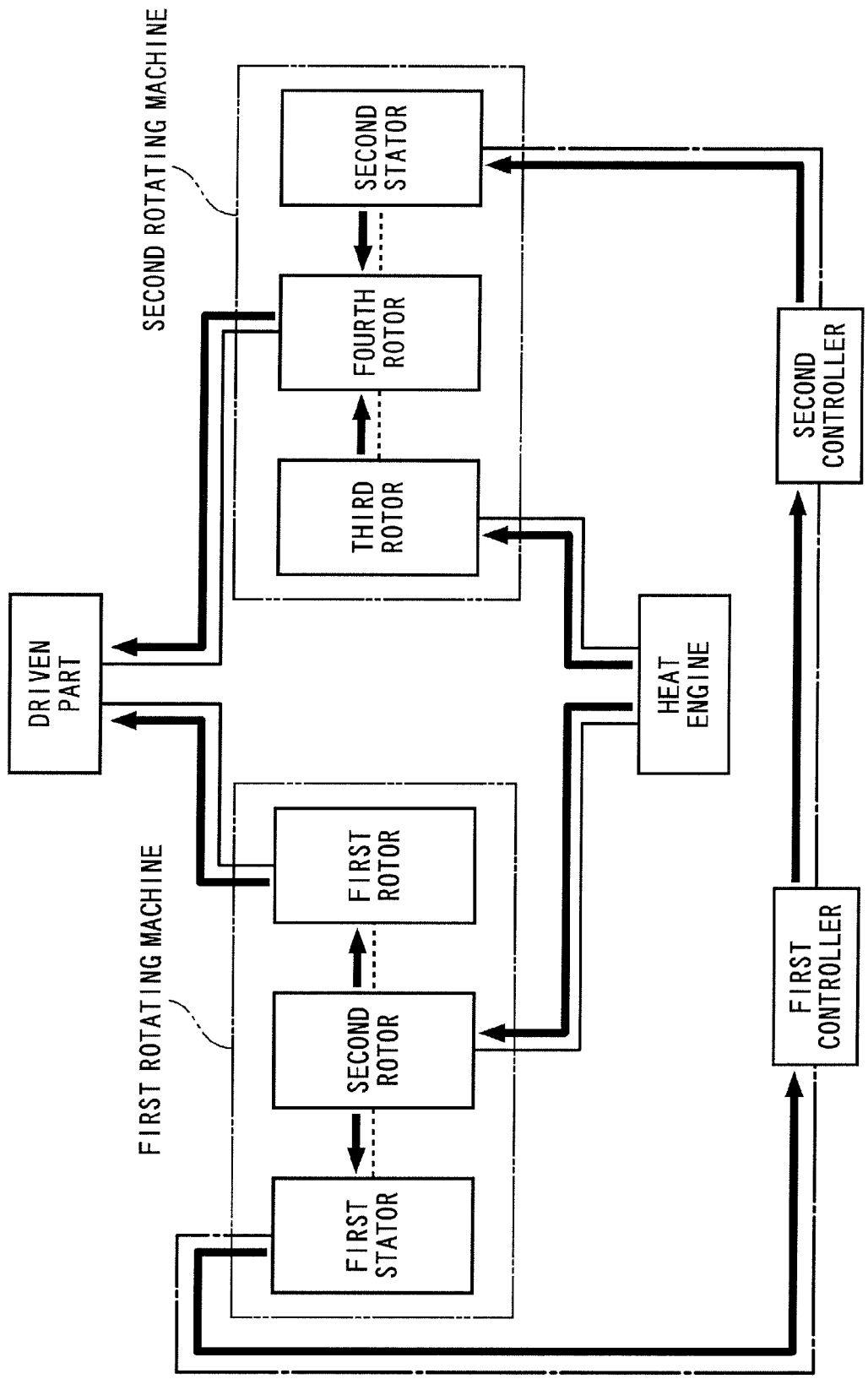
F I G. 73

FIG. 88
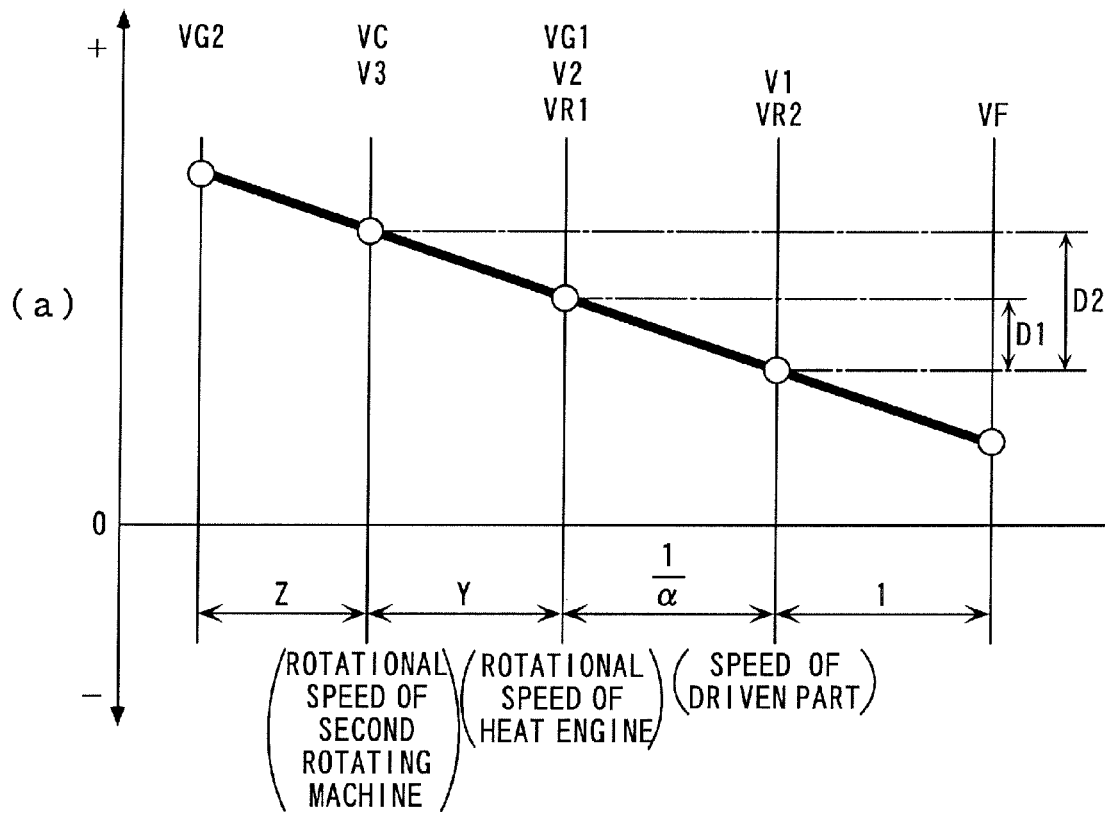
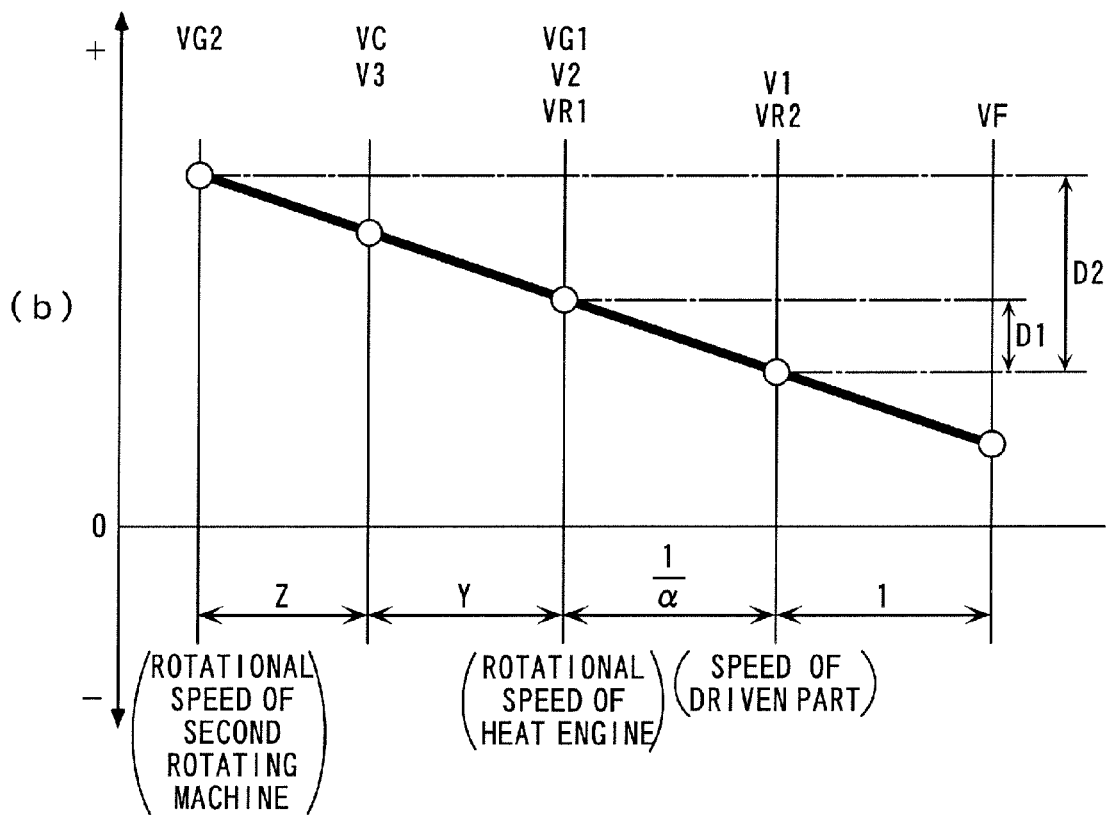

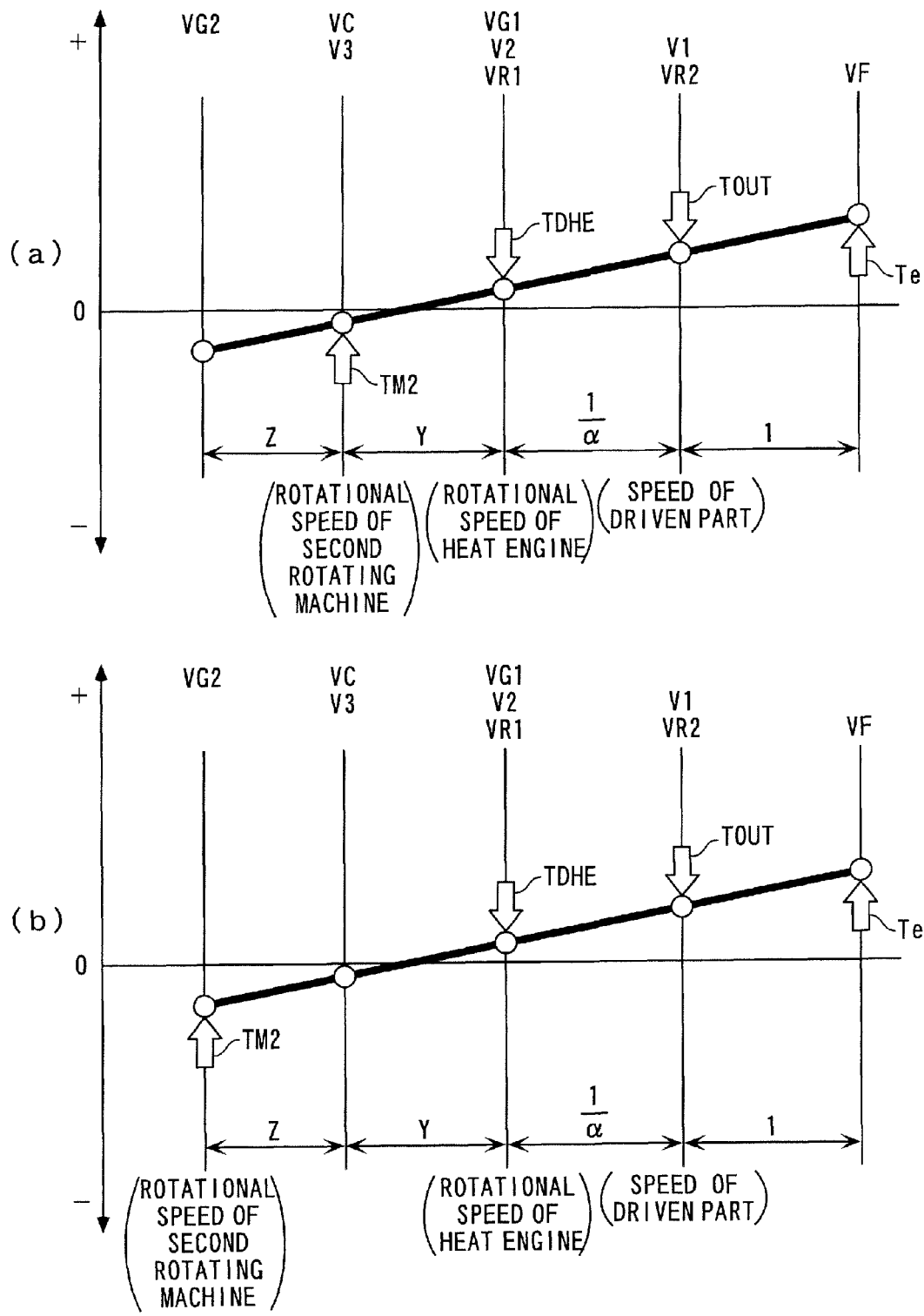

POWER PLANT

TECHNICAL FIELD

The present invention relates to a power plant for driving driven parts.

BACKGROUND ART

Conventionally, as the power plant of this kind, one disclosed in Patent Literature 1 is known. This power plant is for driving left and right drive wheels of a vehicle, and is equipped with an internal combustion engine as a motive power source, and a transmission connected to the engine and the drive wheels. The transmission includes first and second planetary gear units of a general single pinion type, and first and second rotating machines each having a rotor and a stator.

As shown in FIG. 71, the first planetary gear unit has a first ring gear, a first carrier and a first sun gear mechanically connected to the engine, a second carrier of the second planetary gear unit, and the first rotating machine, respectively. The second planetary gear unit has a second sun gear, a second carrier and a second ring gear mechanically connected to the second rotating machine, the drive wheels, and the first rotating machine, respectively. Further, the first and second rotating machines are electrically connected to each other via a controller. It should be noted that in FIG. 71, mechanical connections between elements are indicated by solid lines, and electrical connections therebetween are indicated by one-dot chain lines. Further, flows of motive power and electric power are indicated by thick lines with arrows.

In the conventional power plant configured as above, during traveling of the vehicle, the motive power from the engine is transmitted to the drive wheels, e.g. in the following manner: As shown in FIG. 71, the motive power from the engine is transmitted to the first ring gear, and is then combined with motive power transmitted to the first sun gear, as described hereinafter. This combined motive power is transmitted to the second carrier via the first carrier. Further, in this case, electric power is generated by the second rotating machine, and the generated electric power is supplied to the first rotating machine via the controller. In accordance with the electric power generation, part of the combined motive power transmitted to the second carrier is distributed to the second sun gear and the second ring gear, and the remainder of the combined motive power is transmitted to the drive wheels. The motive power distributed to the second sun gear is transmitted to the second rotating machine, and the motive power distributed to the second ring gear is transmitted to the first sun gear via the first rotating machine. Furthermore, the motive power of the first rotating machine, generated along with the above-mentioned supply of the electric power, is transmitted to the first sun gear.

In this conventional power plant, not only the first and second rotating machines but also at least two planetary gear units for distributing and combining motive power are indispensable for the construction thereof, and this increases the size of the power plant by the corresponding extent. Further, as described above, in the conventional power plant, motive power is recirculated via a path formed by the first carrier→the second carrier→the second ring gear→the first rotating machine→the first sun gear→the first carrier, and a path formed by the first carrier→the second carrier→the second sun gear→the second rotating machine→the first rotating machine→the first sun gear→the first carrier. This recirculation of the motive power causes very large combined motive power from the first ring gear and the first sun gear to pass through the first carrier and then pass through the second carrier as it is, so that to withstand the above large combined motive power, it is inevitable to increase the size of the first and second planetary gear units, which results in the further increased size and costs of the power plant. Further, in accordance with the increases in the size of the above power plant and the motive power passing through the power plant, losses generated in the power plant are also increased to decrease the driving efficiency of the power plant.

The present invention has been made to provide a solution to the above-described problems, and an object thereof is to provide a power plant which is capable of attaining reduction of the size and costs of the power plant and enhance the driving efficiency thereof.

CITATION LIST

Patent Literature

[PLT 1] U.S. Pat. No. 6,478,705

SUMMARY OF INVENTION

Solution to Problem

To attain the object, the invention as claimed in claim 1 provides a power plant 1, 1A to 1E for driving driven parts (drive wheels DW and DW in the embodiment (the same applies hereinafter in this section)), comprising a heat engine (engine 3) having an output portion (crankshaft 3a) for outputting motive power, a first rotating machine 21, and a second rotating machine 31, the first rotating machine 21 comprising a first rotor (A1 rotor 24) having a first magnetic pole row that is formed by a predetermined plurality of first magnetic poles (permanent magnets 24a) arranged in a first circumferential direction, and has each two adjacent first magnetic poles so disposed as to have polarities different from each other, the first rotor being rotatable in the first circumferential direction, an unmovable first stator (stator 23) having a first armature row that is formed by a plurality of first armatures (iron cores 23a, U-phase to W-phase coils 23c to 23e) arranged in the first circumferential direction, and is disposed in a manner opposed to the first magnetic pole row, for generating a first rotating magnetic field rotating in the first circumferential direction between the first armature row and the first magnetic pole row, by a predetermined plurality of first armature magnetic poles generated at the plurality of first armatures, and a second rotor (A2 rotor 25) having a first soft magnetic material element row that is formed by a predetermined plurality of first soft magnetic material elements (cores 25a) arranged in the first circumferential direction in a manner spaced from each other, and is disposed between the first magnetic pole row and the first armature row, the second rotor being rotatable in the first circumferential direction, wherein a ratio between the number of the first armature magnetic poles, the number of the first magnetic poles, and the number of the first soft magnetic material elements is set to $1:m:(1+m)/2$ ($m \neq 1.0$), the second rotating machine 31 comprising a third rotor (B1 rotor 34) having a second magnetic pole row that is formed by a predetermined plurality of second magnetic poles (permanent magnets 34a) arranged in a second circumferential direction, and has each two adjacent second magnetic poles so disposed as to have polarities different from each other, the third rotor being rotatable in the second circumferential direction, an unmovable second stator (stator 33) having a second armature row that is formed by a plurality of second armatures (iron cores 33a, U-phase to W-phase coils 33*b*) arranged in the second circumferential direction, and is disposed in a manner opposed to the second magnetic pole row, for generating a second rotating magnetic field rotating in the second circumferential direction between the second armature row and the second magnetic pole row, by a predetermined plurality of second armature magnetic poles generated at the plurality of second armatures, and a fourth rotor (B2 rotor 35) having a second soft magnetic material element row that is formed by a predetermined plurality of second soft magnetic material elements (cores 35*a*) arranged in the second circumferential direction in a manner spaced from each other, and is disposed between the second magnetic pole row and the second armature row, the fourth rotor being rotatable in the second circumferential direction, wherein a ratio between the number of the second armature magnetic poles, the number of the second magnetic poles, and the number of the second soft magnetic material elements is set to 1:n:(1+n)/2 (n≠1.0), the power plant further comprising a first controller (first PDU 41, ECU 2) electrically connected to the first stator, for controlling electric power generated by the first stator and electric power supplied to the first stator, and a second controller (second PDU 42, ECU 2) electrically connected to the second stator, for controlling electric power generated by the second stator and electric power supplied to the second stator, wherein the first and second stators are electrically connected to each other via the first and second controllers, the first and fourth rotors being mechanically connected to the driven parts, and the second and third rotors being mechanically connected to the output portion of the heat engine.

According to the first rotating machine of the power plant, the first magnetic pole row of the first rotor rotatable in the first circumferential direction, and the first armature row of the unmovable first stator are opposed to each other, and the first soft magnetic material element row of the second rotor rotatable in the first circumferential direction is disposed between the first magnetic pole row and the first armature row. Further, the first magnetic poles forming the first magnetic pole row, the first armatures forming the first armature row, and the first soft magnetic material elements forming the first soft magnetic material element row are arranged in the first circumferential direction. Further, the first armature row of the first stator is capable of generating a first rotating magnetic field that rotates in the first circumferential direction between the first armature row and the first magnetic pole row, by the predetermined plurality of first armature magnetic poles that are generated at the first armatures. Further, each two adjacent first magnetic poles have different polarities from each other, and a gap is provided between each two adjacent first soft magnetic material elements. As described above, between the first magnetic pole row and the first armature row, the first rotating magnetic field is generated by the plurality of first armature magnetic poles, and further the first soft magnetic material element row is disposed, so that the first soft magnetic material elements are magnetized by the first armature magnetic poles and the first magnetic poles. With this and the fact that the gap is provided between each adjacent two first soft magnetic material elements, there are generated magnetic force lines in a manner connecting the first magnetic poles, the first soft magnetic material elements, and the first armature magnetic poles. Therefore, when the first rotating magnetic field is generated by the supply of electric power to the first armatures, the action of magnetism of the magnetic force lines converts the electric power supplied to the first armatures to motive power, and the motive power is output from the first rotor or the second rotor.

Now, a torque equivalent to the electric power supplied to the first armatures and the electrical angular velocity ωmf of the first rotating magnetic field is referred to as "first driving equivalent torque Te1". Hereafter, a description will be given of a relationship between the first driving equivalent torque Te1, torques transmitted to the first and second rotors (hereinafter referred to as the "first rotor-transmitted torque T1", and the "second rotor-transmitted torque T2", respectively), and a relationship between the first rotating magnetic field, and the electrical angular velocities of the first and second rotors.

When the first rotating machine according to the present invention is configured under the following conditions (A) and (B), an equivalent circuit corresponding to the first rotating machine is expressed as shown in FIG. 72.

(A) The first armatures have three-phase coils of U-phase, V-phase, and W-phase.

(B) The number of the first armature magnetic poles is 2, and the number of the first magnetic poles is 4, that is, a pole pair number of the first armature magnetic poles, each pair being formed by an N pole and an S pole of first armature magnetic poles, has a value of 1, a pole pair number of the first magnetic poles, each pair being formed by an N pole and an S pole of first magnetic poles, has a value of 2, and the first soft magnetic material elements are formed by three soft magnetic material elements formed by a first core, a second core and a third core, respectively.

It should be noted that as described above, throughout the description, the term "pole pair" is intended to mean a pair of an N pole and an S pole.

In this case, a magnetic flux Ψk1 of a first magnetic pole passing through the first core of the first soft magnetic material elements is expressed by the following equation (1):

$$\Psi k1 = \phi f \cdot \cos[2(\theta 2 - \theta 1)] \quad (1)$$

wherein φf represents the maximum value of the magnetic flux of the first magnetic pole, and θ1 and θ2 represent a rotational angle position of the first magnetic pole and a rotational angle position of the first core, with respect to the U-phase coil, respectively. Further, in this case, since the ratio of the pole pair number of the first magnetic poles to the pole pair number of the first armature magnetic poles is 2.0, the magnetic flux of the first magnetic pole rotates (changes) at a repetition period of the twofold of the repetition period of the first rotating magnetic field, so that in the aforementioned equation (1), to indicate this fact, (θ2−θ1) is multiplied by 2.0.

Therefore, a magnetic flux Ψu1 of the first magnetic pole passing through the U-phase coil via the first core is expressed by the following equation (2) obtained by multiplying the equation (1) by cos θ2.

$$\Psi u1 = \phi f \cdot \cos[2(\theta 2 - \theta 1)] \cos \theta 2 \quad (2)$$

Similarly, a magnetic flux Ψk2 of the first magnetic pole passing through the second core of the first soft magnetic material elements is expressed by the following equation (3):

$$\Psi k2 = \psi f \cdot \cos\left[2\left(\theta 2 + \frac{2\pi}{3} - \theta 1\right)\right] \quad (3)$$

The rotational angle position of the second core with respect to the first armature leads that of the first core by 2π/3, so that in the aforementioned equation (3), to indicate this fact, 2π/3 is added to θ2.

Therefore, a magnetic flux Ψu2 of the first magnetic pole passing through the U-phase coil via the second core is expressed by the following equation (4) obtained by multiplying the equation (3) by cos (θ2+2π/3).

$$\Psi u2 = \psi f \cdot \cos\left[2\left(\theta 2 + \frac{2\pi}{3} - \theta 1\right)\right] \cos\left(\theta 2 + \frac{2\pi}{3}\right) \quad (4)$$

Similarly, a magnetic flux Ψu3 of the first magnetic pole passing through the U-phase coil via the third core of the first soft magnetic material elements is expressed by the following equation (5):

$$\Psi u3 = \psi f \cdot \cos\left[2\left(\theta 2 + \frac{4\pi}{3} - \theta 1\right)\right] \cos\left(\theta 2 + \frac{4\pi}{3}\right) \quad (5)$$

In the first rotating machine as shown in FIG. 72, a magnetic flux Ψu of the first magnetic pole passing through the U-phase coil via the first soft magnetic material elements is obtained by adding the magnetic fluxes Ψu1 to Ψu3 expressed by the above-described equations (2), (4) and (5), and hence the magnetic flux Ψu is expressed by the following equation (6):

$$\Psi u = \quad (6)$$
$$\psi f \cdot \cos[2(\theta 2 - \theta 1)]\cos\theta 2 + \psi f \cdot \cos\left[2\left(\theta 2 + \frac{2\pi}{3} - \theta 1\right)\right]\cos\left(\theta 2 + \frac{2\pi}{3}\right) + $$
$$\psi f \cdot \cos\left[2\left(\theta 2 + \frac{4\pi}{3} - \theta 1\right)\right]\cos\left(\theta 2 + \frac{4\pi}{3}\right)$$

Further, when this equation (6) is generalized, the magnetic flux Ψu of the first magnetic pole passing through the U-phase coil via the first soft magnetic material elements is expressed by the following equation (7):

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \quad (7)$$

wherein a, b and c represent the pole pair number of first magnetic poles, the number of first soft magnetic material elements, and the pole pair number of first armature magnetic poles. Further, when the above equation (7) is changed based on the formula of the sum and product of the trigonometric function, there is obtained the following equation (8):

$$\Psi u = \sum_{i=1}^{b} \frac{1}{2} \cdot \psi f \left\{ \cos\left[(a+c)\theta 2 - a \cdot \theta 1 + (a+c)(i-1)\frac{2\pi}{b}\right] + \cos\left[(a-c)\theta 2 - a \cdot \theta 1 + (a-c)(i-1)\frac{2\pi}{b}\right] \right\} \quad (8)$$

When b=a+c is set in this equation (8), and the rearrangement is performed based on cos(θ+2π)=cos θ, there is obtained the following equation (9):

$$\Psi u = \frac{b}{2} \cdot \psi f \cdot \cos[(a+c)\theta 2 - a \cdot \theta 1] + \quad (9)$$
$$\sum_{i=1}^{b} \frac{1}{2} \cdot \psi f \left\{ \cos\left[(a-c)\theta 2 - a \cdot \theta 1 + (a-c)(i-1)\frac{2\pi}{b}\right] \right\}$$

When this equation (9) is rearranged based on the addition theorem of the trigonometric function, there is obtained the following equation (10):

$$\Psi u = \frac{b}{2} \cdot \psi f \cdot \cos[(a+c)\theta 2 - a \cdot \theta 1] + \quad (10)$$
$$\frac{1}{2} \cdot \psi f \cdot \cos[(a-c)\theta 2 - a \cdot \theta 1] \sum_{i=1}^{b} \cos\left[(a-c)(i-1)\frac{2\pi}{b}\right] - $$
$$\frac{1}{2} \cdot \psi f \cdot \sin[(a-c)\theta 2 - a \cdot \theta 1] \sum_{i=1}^{b} \sin\left[(a-c)(i-1)\frac{2\pi}{b}\right]$$

The second term on the right side of the equation (10) is, when rearranged based on the sum total of the series and the Euler's formula on condition that a−c≠0, equal to 0, as is apparent from the following equation (11):

$$\sum_{i=1}^{b} \cos\left[(a-c)(i-1)\frac{2\pi}{b}\right] = \sum_{i=1}^{b-1} \frac{1}{2}\left\{e^{j\left[(a-c)\frac{2\pi}{b}i\right]} + e^{-j\left[(a-c)\frac{2\pi}{b}i\right]}\right\} \quad (11)$$
$$= \frac{1}{2}\left\{\frac{e^{j\left[(a-c)\frac{2\pi}{b}b\right]} - 1}{e^{j\left[(a-c)\frac{2\pi}{b}\right]} - 1} + \frac{e^{-j\left[(a-c)\frac{2\pi}{b}b\right]} - 1}{e^{-j\left[(a-c)\frac{2\pi}{b}\right]} - 1}\right\}$$
$$= \frac{1}{2}\left\{\frac{e^{j[(a-c)2\pi]} - 1}{e^{j\left[(a-c)\frac{2\pi}{b}\right]} - 1} + \frac{e^{-j[(a-c)2\pi]} - 1}{e^{-j\left[(a-c)\frac{2\pi}{b}\right]} - 1}\right\}$$
$$= \frac{1}{2}\left\{\frac{0}{e^{j\left[(a-c)\frac{2\pi}{b}\right]} - 1} + \frac{0}{e^{-j\left[(a-c)\frac{2\pi}{b}\right]} - 1}\right\}$$
$$= 0$$

Further, the third term on the right side of the above-described equation (10) is also, when rearranged based on the sum total of the series and the Euler's formula on condition that a−c≠0, equal to 0, as is apparent from the following equation (12):

$$\sum_{i=1}^{b} \sin\left[(a-c)(i-1)\frac{2\pi}{b}\right] = \sum_{i=0}^{b-1} \frac{1}{2}\left\{e^{j\left[(a-c)\frac{2\pi}{b}i\right]} - e^{-j\left[(a-c)\frac{2\pi}{b}i\right]}\right\} \quad (12)$$
$$= \frac{1}{2}\left\{\frac{e^{j\left[(a-c)\frac{2\pi}{b}b\right]} - 1}{e^{j\left[(a-c)\frac{2\pi}{b}\right]} - 1} - \frac{e^{-j\left[(a-c)\frac{2\pi}{b}b\right]} - 1}{e^{-j\left[(a-c)\frac{2\pi}{b}\right]} - 1}\right\}$$
$$= \frac{1}{2}\left\{\frac{e^{j[(a-c)2\pi]} - 1}{e^{j\left[(a-c)\frac{2\pi}{b}\right]} - 1} - \frac{e^{-j[(a-c)2\pi]} - 1}{e^{-j\left[(a-c)\frac{2\pi}{b}\right]} - 1}\right\}$$
$$= \frac{1}{2}\left\{\frac{0}{e^{j\left[(a-c)\frac{2\pi}{b}\right]} - 1} - \frac{0}{e^{-j\left[(a-c)\frac{2\pi}{b}\right]} - 1}\right\}$$
$$= 0$$

From the above, when a−c≠0 holds, the magnetic flux Ψu of the first magnetic pole passing through the U-phase coil via the first soft magnetic material elements is expressed by the following equation (13):

$$\Psi u = \frac{b}{2} \cdot \psi f \cdot \cos[(a+c)\theta 2 - a \cdot \theta 1] \quad (13)$$

Further, in this equation (13), if a/c=α, there is obtained the following equation (14):

$$\Psi u = \frac{b}{2} \cdot \psi f \cdot \cos[(\alpha+1)c \cdot \theta 2 - \alpha \cdot c \cdot \theta 1] \quad (14)$$

Furthermore, in this equation (14), if c·θ2=θe2 and c·θ1=θe1, there is obtained the following equation (15):

$$\Psi u = \frac{b}{2} \cdot \psi f \cdot \cos[(\alpha+1)\theta e2 - \alpha \cdot \theta e1] \quad (15)$$

In this equation, as is clear from the fact that θe2 is obtained by multiplying the rotational angle position θ2 of the first core with respect to the U-phase coil by the pole pair number c of the first armature magnetic poles, θe2 represents the electrical angular position of the first core with respect to the U-phase coil. Further, as is clear from the fact that θe1 is obtained by multiplying the rotational angle position θ1 of the first magnetic pole with respect to the U-phase coil by the pole pair number c of the first armature magnetic poles, θe1 represents the electrical angular position of the first magnetic pole with respect to the U-phase coil.

Similarly, since the electrical angular position of the V-phase coil leads that of the U-phase coil by the electrical angle 2π/3, the magnetic flux Ψv of the first magnetic pole passing through the V-phase coil via the first soft magnetic material elements is expressed by the following equation (16). Further, since the electrical angular position of the W-phase coil is delayed from that of the U-phase coil by the electrical angle 2π/3, the magnetic flux Ψw of the first magnetic pole passing through the W-phase coil via the first soft magnetic material elements is expressed by the following equation (17):

$$\Psi v = \frac{b}{2} \cdot \psi f \cdot \cos\left[(\alpha+1)\theta e2 - \alpha \cdot \theta e1 - \frac{2\pi}{3}\right] \quad (16)$$

$$\Psi w = \frac{b}{2} \cdot \psi f \cdot \cos\left[(\alpha+1)\theta e2 - \alpha \cdot \theta e1 + \frac{2\pi}{3}\right] \quad (17)$$

Further, when the magnetic fluxes Ψu to Ψw expressed by the aforementioned equations (15) to (17), respectively, is differentiated with respect to time, the following equations (18) to (20) are obtained:

$$\frac{d\Psi u}{dt} = -\frac{b}{2} \cdot \psi f \{[(\alpha+1)\omega e2 - \alpha \cdot \omega e1]\sin[(\alpha+1)\theta e2 - \alpha \cdot \theta e1]\} \quad (18)$$

$$\frac{d\Psi v}{dt} = -\frac{b}{2} \cdot \psi f \left\{[(\alpha+1)\omega e2 - \alpha \cdot \omega e1]\sin\left[(\alpha+1)\theta e2 - \alpha \cdot \theta e1 - \frac{2\pi}{3}\right]\right\} \quad (19)$$

$$\frac{d\Psi w}{dt} = \quad (20)$$
$$-\frac{b}{2} \cdot \psi f \left\{[(\alpha+1)\omega e2 - \alpha \cdot \omega e1]\sin\left[(\alpha+1)\theta e2 - \alpha \cdot \theta e1 + \frac{2\pi}{3}\right]\right\}$$

wherein ωe1 represents a value obtained by differentiating θe1 with respect to time, i.e. a value obtained by converting an angular velocity of the first rotor with respect to the first stator to an electrical angular velocity (hereinafter referred to as the "first rotor electrical angular velocity"). Furthermore, ωe2 represents a value obtained by differentiating θe2 with respect to time, i.e. a value obtained by converting an angular velocity of the second rotor with respect to the first stator to an electrical angular velocity (hereinafter referred to as the "second rotor electrical angular velocity").

Further, magnetic fluxes of the first magnetic poles that directly pass through the U-phase to W-phase coils without via the first soft magnetic material elements are very small, and hence influence thereof is negligible. Therefore, dΨu/dt to dΨw/dt (equations (18) to (20)), which are values obtained by differentiating with respect to time the magnetic fluxes Ψu to Ψw of the first magnetic poles, which pass through the U-phase to W-phase coils via the first soft magnetic material elements, respectively, represent counter-electromotive force voltages (induced electromotive voltages), which are generated in the U-phase to W-phase coils as the first magnetic poles and the first soft magnetic material elements rotate with respect to the first armature row.

From the above, electric currents Iu, Iv and Iw, flowing through the U-phase, V-phase and W-phase coils, respectively, are expressed by the following equations (21), (22) and (23):

$$Iu = I \cdot \sin[(\alpha+1)\theta e2 - \alpha \cdot \theta e1] \quad (21)$$

$$Iv = I \cdot \sin\left[(\alpha+1)\theta e2 - \alpha \cdot \theta e1 - \frac{2\pi}{3}\right] \quad (22)$$

$$Iw = I \cdot \sin\left[(\alpha+1)\theta e2 - \alpha \cdot \theta e1 + \frac{2\pi}{3}\right] \quad (23)$$

wherein I represents the amplitude (maximum value) of electric currents Iu to Iw flowing through the U-phase to W-phase coils, respectively.

Further, from the above equations (21) to (23), the electrical angular position θmf of the vector of the first rotating magnetic field with respect to the U-phase coil is expressed by the following equation (24), and the electrical angular velocity ωmf of the first rotating magnetic field with respect to the U-phase coil (hereinafter referred to as the "magnetic field electrical angular velocity") is expressed by the following equation (25):

$$\theta mf = (\alpha+1)\theta e2 - \alpha \cdot \theta e1 \quad (24)$$

$$\omega mf = (\alpha+1)\omega e2 - \alpha \cdot \omega e1 \quad (25)$$

Further, the mechanical output (motive power) W, which is output to the first and second rotors by the flowing of the respective electric currents Iu to Iw through the U-phase to W-phase coils, is represented, provided that an reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the above equations (18) to (23) are substituted into this equation (26) for rearrangement, there is obtained the following equation (27):

$$W = -\frac{3 \cdot b}{4} \cdot \psi f \cdot I[(\alpha+1)\omega e2 - \alpha \cdot \omega e1] \quad (27)$$

Furthermore, the relationship between this mechanical output W, the aforementioned first and second rotor-transmitted torques T1 and T2, and the first and second rotor electrical angular velocities ωe1 and ωe2 is expressed by the following equation (28):

$$W = T1 \cdot \omega e1 + T2 \cdot \omega e2 \tag{28}$$

As is clear from the above equations (27) and (28), the first and second rotor-transmitted torques T1 and T2 are expressed by the following equations (29) and (30), respectively:

$$T1 = \alpha \cdot \frac{3 \cdot b}{4} \cdot \psi f \cdot I \tag{29}$$

$$T2 = -(\alpha + 1) \cdot \frac{3 \cdot b}{4} \cdot \psi f \cdot I \tag{30}$$

Further, due to the fact that the electric power supplied to the first armature row and the mechanical output W are equal to each other (provided that losses are ignored), and from the aforementioned equations (25) and (27), the above-described first driving equivalent torque Te1 is expressed by the following equation (31):

$$Te1 = \frac{3 \cdot b}{4} \cdot \psi f \cdot I \tag{31}$$

Further, by using the above equations (29) to (31), there is obtained the following equation (32):

$$Te1 = \frac{T1}{\alpha} = \frac{-T2}{(\alpha + 1)} \tag{32}$$

The relationship between the torques, expressed by the equation (32), and the relationship between the electrical angular velocities, expressed by the equation (25), are quite the same as the relationship between the torques and the relationship between the rotational speeds of the sun gear, ring gear and carrier of a planetary gear unit.

Further, as described above, on condition that b=a+c and a−c≠0, the relationship between the electrical angular velocities, expressed by the equation (25), and the relationship between the torques, expressed by the equation (32), hold. The above condition b=a+c is expressed by b=(p+q)/2, i.e. b/q=(1+p/q)/2, assuming that the number of the first magnetic poles is p and that of the first armature magnetic poles is q. Here, as is clear from the fact that if p/q=m, b/q=(1+m)/2 is obtained, the satisfaction of the above condition of b=a+c represents that the ratio between the number of the first armature magnetic poles, the number of the first magnetic poles, and the number of the first soft magnetic material elements is 1:m:(1+m)/2. Further, the satisfaction of the above condition of a−c≠0 represents that m≠1.0 holds. According to the rotating machine of the present invention, since the ratio between the number of the first armature magnetic poles, the number of the first magnetic poles, and the number of the first soft magnetic material elements is set to 1:m:(1+m)/2 (m≠1.0), the electrical angular velocity relationship expressed by the equation (25) and the torque relationship expressed by the equation (32) hold. From this, it is understood that the first rotating machine properly operates.

Further, as is apparent from the equations (25) and (32), by setting α=a/c, i.e. the ratio of the pole pair number of the first magnetic poles to the pole pair number of the first armature magnetic poles (hereinafter referred to as the "first pole pair number ratio"), it is possible to freely set the relationship between the magnetic field electrical angular velocity ωmf, and the first and second rotor electrical angular velocities ωe1 and ωe2, and the relationship between the first driving equivalent torque Te1, and the first and second rotor-transmitted torques T1 and T2, and hence it is possible to enhance the degree of freedom in design of the first rotating machine. The same advantageous effects can be obtained also when the number of phases of coils of the plurality of first armatures is other than the aforementioned value of 3.

As described above, in the first rotating machine, when the first rotating magnetic field is generated by supplying electric power to the first armatures, i.e. the first stator, magnetic force lines are generated in a manner connecting between the aforementioned first magnetic poles, first soft magnetic material elements, and first armature magnetic poles, and the action of the magnetism of the magnetic force lines converts the electric power supplied to the first stator to motive power. The motive power is output from the first rotor or the second rotor, and the aforementioned electrical angular velocity and torque hold. Therefore, by inputting motive power to at least one of the first and second rotors in a state where electric power is not being supplied to the first stator, to thereby cause the same to rotate with respect to the first stator, electric power is generated in the first stator, and the first rotating magnetic field is generated. In this case as well, such magnetic force lines that connect between the first magnetic poles, the first soft magnetic material elements, and the first armature magnetic poles are generated, and the action of the magnetism of the magnetic force lines causes the electrical angular velocity relationship shown in the equation (25) and the torque relationship shown in the equation (32), mentioned above, to hold.

That is, assuming that torque equivalent to the generated electric power and the magnetic field electrical angular velocity ωmf is referred to as the "first electric power-generating equivalent torque", a relationship shown in the equation (32) also holds between the first electric power-generating equivalent torque and the first and second rotor-transmitted torques T1 and T2. As is clear from the above, the first rotating machine according to the present invention has the same functions as those of an apparatus formed by combining a planetary gear unit and a general one-rotor-type rotating machine.

Further, as is clear from the above-described construction, the second rotating machine is configured similarly to the first rotating machine, and hence it has the same functions as those of an apparatus formed by combining a planetary gear unit and a general one-rotor-type rotating machine. More specifically, during supply of electric power to the second stator and during generation of electric power by the second stator, a relationship shown in the equation (25) holds between the electrical angular velocity of the second rotating magnetic field and the electrical angular velocities of the third and fourth rotors. Further, assuming that torque equivalent to the electric power supplied to the second stator and the electrical angular velocity of the second rotating magnetic field is referred to as the "second driving equivalent torque", such a torque relationship as expressed by the equation (32) holds between the second driving equivalent torque and torques transmitted to the third and fourth rotors. Furthermore, assuming that torque equivalent to the electric power generated by the second stator and the electrical angular velocity of the second rotating magnetic field is referred to as the "second electric power-generating equivalent torque", such a torque relationship as expressed by the equation (32) holds between the second electric power-generating equivalent torque and the torques transmitted to the third and fourth rotors.

Further, according to the above-described construction, as shown in FIG. 73, the second rotor of the first rotating machine and the third rotor of the second rotating machine are mechanically connected to the output portion of the heat engine, and the first rotor of the first rotating machine and the fourth rotor of the second rotating machine are mechanically connected to the driven parts. Further, electrically connected to the first stator of the first rotating machine is the first controller for controlling electric power generated by the first stator and electric power supplied to the first stator, and electrically connected to the second stator of the second rotating machine is the second controller for controlling electric power generated by the second stator and electric power supplied to the second stator. The first and second stators are electrically connected to each other via the first and second controllers. It should be noted that in FIG. 73, the mechanical connections between the elements are indicated by solid lines, the electrical connections therebetween are indicated by one-dot chain lines, and magnetic connections therebetween are indicated by broken lines. Further, flows of motive power and electric power are indicated by thick lines with arrows.

With the arrangement described above, in the power plant, the motive power from the heat engine is transmitted to the driven parts e.g. in the following manner: When the motive power from the heat engine is transmitted to the driven parts, electric power is generated by the first stator of the first rotating machine using part of the motive power from the heat engine under the control of the first and second controllers, and the generated electric power is supplied to the second stator of the second rotating machine. During the electric power generation by the first rotating machine, as shown in FIG. 73, as part of the motive power from the heat engine is transmitted to the second rotor connected to the output portion of the heat engine, and is further transmitted to the first stator as electric power by the above-described magnetism of magnetic force lines, the part of the motive power from the heat engine is also transmitted to the first rotor by the magnetism of magnetic force lines. That is, the motive power from the heat engine transmitted to the second rotor is distributed to the first stator and the first rotor. Furthermore, the motive power distributed to the first rotor is transmitted to the driven parts, while the electric power distributed to the first stator is supplied to the second stator.

Furthermore, when the electric power generated by the first stator is supplied to the second stator as described above, this electric power is converted to motive power, and is then transmitted to the fourth rotor by the magnetism of magnetic force lines. In accordance therewith, the remainder of the motive power from the heat engine is transmitted to the third rotor, and is further transmitted to the fourth rotor by the magnetism of magnetic force lines. Further, the motive power transmitted to the fourth rotor is transmitted to the driven parts. As a result, motive power equal in magnitude to the motive power from the heat engine is transmitted to the driven parts.

As described above, in the power plant according to the present invention, the first and second rotating machines have the same functions as those of an apparatus formed by combining a planetary gear unit and a general one-rotor-type rotating machine, so that differently from the above-described conventional power plant, it is possible to dispense with the planetary gear unit for distributing and combining motive power for transmission, which makes it possible to reduce the size of the power plant by the corresponding extent. Further, differently from the aforementioned conventional case, the motive power from the heat engine is transmitted to the driven parts without being recirculated, and hence it is possible to reduce motive power passing through the first and second rotating machines. This makes it possible to reduce the sizes and costs of the first and second rotating machines, thereby making it possible to attain further reduction of the size and costs of the power plant. Further, the first and second rotating machines having torque capacity corresponding to reduced motive power, as described above, are used, whereby it is possible to suppress the loss of motive power to improve the driving efficiency of the power plant.

Further, the motive power from the heat engine is transmitted to the driven parts in a divided state via a total of three paths, i.e. a first transmission path formed by the second rotor, the magnetism of magnetic force lines and the first rotor, a second transmission path formed by the second rotor, the magnetism of magnetic force lines, the first stator, the first controller, the second controller, the second stator, the magnetism of magnetic force lines and the fourth rotor, and a third transmission path formed by the third rotor, the magnetism of magnetic force lines and the fourth rotor. This makes it possible to reduce electric power (energy) passing through the first and second controllers via the second transmission path, so that it is possible to reduce the sizes and costs of the first and second controllers, thereby making it possible to attain further reduction of the size and costs of the power plant. Further, although in the third transmission path, the motive power from the heat engine is once converted to electric power, and is then converted back to motive power to be transmitted to the driven parts via a so-called electrical path, whereas in the first and second paths, the motive power is transmitted to the driven parts without being converted to electric power, in a non-contacting manner by the magnetism of magnetic force lines, via a so-called magnetic path, so that the first and second transmission paths are higher in transmission efficiency than the third transmission path.

Furthermore, when motive power is transmitted to the driven parts, as described above, by controlling the rotational speeds of the first and second rotating magnetic fields using the first and second controllers, respectively, it is possible to transmit the motive power from the heat engine to the driven parts while changing the speed thereof. Hereinafter, a description will be given of this point. In the first rotating machine, as is clear from the above-described functions, during distributing and combining energy between the first stator and the first and second rotors, the first rotating magnetic field and the first and second rotors rotate while holding a collinear relationship with respect to the rotational speed, as shown in the equation (25). Further, in the second rotating machine, as is clear from the above-described functions, during distributing and combining energy between the second stator and the third and fourth rotors, the second rotating magnetic field and the third and fourth rotors rotate while holding the collinear relationship with respect to the rotational speed, as shown in the equation (25).

Further, in the above-mentioned connection relationship, when both the second and third rotors are directly connected to the output portion of the heat engine without via a transmission, such as a gear, the rotational speeds of the second and third rotors are both equal to the rotational speed of the output portion of the heat engine (hereinafter referred to as the "rotational speed of the heat engine". Further, when both the first and fourth rotors are directly connected to the driven parts, the rotational speeds of the first and fourth rotors are both equal to the speed of the driven parts.

Now, let it be assumed that the rotational speeds of the first to fourth rotors are the "first to fourth rotor rotational speeds VR1, VR2, VR3, and VR4", respectively, and the rotational speeds of the first and second rotating magnetic fields are the "first and second magnetic field rotational speeds VMF1 and VMF2", respectively. From the above-described relationship between the rotational speeds of the respective rotary elements, the relationship between these rotational speeds VR1 to VR4, VMF1 and VMF2 are indicated e.g. by thick solid lines in FIG. 74.

It should be noted that in FIG. 74, actually, vertical lines intersecting horizontal lines indicative of a value of 0 are for representing the rotational speeds of the various rotary elements, and the distance between each white circle shown on the vertical lines and an associated one of the horizontal lines corresponds to the rotational speed of each rotary element, the reference numeral indicative of the rotational speed of each rotary element is shown at one end of each vertical line for convenience. Further, in FIG. 74, the direction of normal rotation and the direction of reverse rotation are represented by "+" and "−". Furthermore, in FIG. 74, β represents the ratio of the number of pole pairs of the second magnetic poles to the number of pole pairs of the second armature magnetic poles of the second rotating machine (hereinafter referred to as the "second pole pair number ratio β"). These also apply to other velocity nomographs, referred to hereinafter.

Therefore, as indicated by two-dot chain lines in FIG. 74, e.g. by increasing the first magnetic field rotational speed VMF1 and decreasing the second magnetic field rotational speed VMF2 with respect to the second and third rotor rotational speeds VR2 and VR3, it is possible to transmit the motive power from the heat engine to the driven parts while steplessly reducing the speed thereof. Inversely, as indicated by one-dot chain lines in FIG. 74, by decreasing the first magnetic field rotational speed VMF1 and increasing the second magnetic field rotational speed VMF2 with respect to the second and third rotor rotational speeds VR2 and VR3, it is possible to transmit the motive power from the heat engine to the driven parts while steplessly increasing the speed thereof.

Further, when the first pole pair number ratio α of the first rotating machine is relatively large, if the rotational speed of the heat engine is higher than the speed of the driven parts (see the two-dot chain lines in FIG. 74), the first magnetic field rotational speed VMF1 becomes higher than the rotational speed of the heat engine and sometimes becomes too high. Therefore, by setting the first pole pair number ratio α to a smaller value, as is apparent from a comparison between the broken lines and the two-dot chain lines in the velocity nomograph in FIG. 74, the first magnetic field rotational speed VMF1 can be reduced, whereby it is possible to prevent the driving efficiency from being lowered by occurrence of loss caused by the first magnetic field rotational speed VMF1 becoming too high. Furthermore, when the second pole pair number ratio β of the second rotating machine is relatively large, if the speed of the driven parts is higher than the rotational speed of the heat engine (see the one-dot chain lines in FIG. 74), the second magnetic field rotational speed VMF2 becomes higher than the speed of the driven parts and sometimes becomes too high. Therefore, by setting the second pole pair number ratio β to a smaller value, as is apparent from a comparison between the broken lines and the one-dot chain lines in the velocity nomograph in FIG. 74, the second magnetic field rotational speed VMF2 can be reduced, whereby it is possible to prevent the driving efficiency from being lowered by occurrence of loss caused by the second magnetic field rotational speed VMF2 becoming too high.

Further, in the power plant, for example, by supplying electric power to the second stator of the second rotating machine and generating electric power by the first stator of the first rotating machine, it is possible to transmit the above-mentioned second driving equivalent torque of the second rotating machine to the driven parts in a state where the output portion of the heat engine is stopped, using the first electric power-generating equivalent torque of the first rotating machine as a reaction force, and thereby drive the driven parts. Furthermore, during such driving of the driven parts, it is possible to start the internal combustion engine if the heat engine is an internal combustion engine. FIG. 75 shows the relationship between torques of the various rotary elements in this case together with the relationship between the rotational speeds of the rotary elements. In the figure, TDHE represents torque transmitted to the output portion of the heat engine (hereinafter referred to as the "heat engine-transmitted torque"), and TOUT represents torque transmitted to the driven parts (hereinafter referred to as the "driven part-transmitted torque"). Further, Tg1 represents the first electric power-generating equivalent torque, and Te2 represents the second driving equivalent torque.

When the heat engine is started as described above, as is clear from FIG. 75, the second driving equivalent torque Te2 is transmitted to both the driven parts and the output portion of the heat engine using the first electric power-generating equivalent torque Tg1 as a reaction force, and hence the torque demanded of the first rotating machine becomes larger than otherwise. In this case, the torque demanded of the first rotating machine, i.e. the first electric power-generating equivalent torque Tg1 is expressed by the following equation (33):

$$Tg1 = -\{\beta \cdot TOUT + (\beta+1)TDHE\}/(\alpha+1\beta) \qquad (33)$$

As is apparent from the equation (33), as the first pole pair number ratio α is larger, the first electric power-generating equivalent torque Tg1 becomes smaller with respect to the driven part-transmitted torque TOUT and the heat engine-transmitted torque TDHE assuming that the respective magnitudes thereof are unchanged. Therefore, by setting the first pole pair number ratio α to a larger value, it is possible to further reduce the size and costs of the first rotating machine.

Further, in the power plant, the speed of the driven parts in a low-speed condition can be rapidly increased e.g. by controlling the heat engine and the first and second rotating machines in the following manner: FIG. 76 shows the relationship between the rotational speeds of the various rotary elements at the start of such an operation for rapidly increasing the speed of the driven parts together with the relationship between the torques of the various rotary elements. In the figure, THE represents torque of the heat engine, and Tg2 represents the second electric power-generating equivalent torque mentioned hereinabove. In this case, the rotational speed of the heat engine is increased to such a predetermined rotational speed as will make it possible to obtain the maximum torque thereof. As shown in FIG. 76, the speed of the driven parts is not immediately increased, and hence as the rotational speed of the heat engine becomes higher than the speed of the driven parts, the difference therebetween increases, whereby the direction of rotation of the second rotating magnetic field determined by the relationship between the rotational speed of the heat engine and the speed of the driven parts becomes the direction of reverse rotation. Therefore, in order to cause positive torque from the second stator that generates such a second rotating magnetic field, to act on the driven parts, the second stator performs electric power generation. Further, electric power generated by the second stator is supplied to the first stator and the first rotating magnetic field is caused to perform normal rotation.

As described above, the heat engine torque THE, the first driving equivalent torque Te1 and the second electric power-generating equivalent torque Tg2 are all transmitted to the driven parts as positive torque, which results in a rapid increase in the speed of the driven parts. Further, when the speed of the driven parts in a low-speed condition is rapidly increased as described above, as is apparent from FIG. 76, the heat engine torque THE and the first driving equivalent torque Te1 are transmitted to the driven parts using the second electric power-generating equivalent torque Tg2 as a reaction force, and hence the torque demanded of the second rotating machine becomes larger than in the other cases. In this case, the torque demanded of the second rotating machine, i.e. the second electric power-generating equivalent torque Tg2 is expressed by the following equation (34):

$$Tg2=-\{\alpha \cdot THE+(1+\alpha)TOUT\}/(\beta+\alpha+1) \quad (34)$$

As is apparent from the equation (34), as the second pole pair number ratio β is larger, the second electric power-generating equivalent torque Tg2 becomes smaller with respect to the driven part-transmitted torque TOUT and the heat engine torque THE assuming that the respective magnitudes thereof are unchanged. Therefore, by setting the second pole pair number ratio β to a larger value, it is possible to further reduce the size and costs of the second rotating machine.

The invention as claimed in claim 2 is the power plant 1, 1A to 1E as claimed in claim 1, further comprising an electric power storage device (battery 43) that is configured to be capable of being charged and discharged and is electrically connected to the first and second stators via the first and second controllers, respectively.

With this arrangement, the electric power storage device capable of being charged and discharged is connected to the first and second stators via the first and second controllers, respectively. Therefore, for example, when motive power required for driving the driven parts is smaller than motive power that will make it possible to obtain fuel economy of the heat engine which is optimum (hereinafter referred to as the "optimum fuel economy"), it is possible to control the motive power from the heat engine such that the optimum fuel economy can be obtained, and charge surplus motive power from the heat engine in the electric power storage device as electric power. Inversely, when the motive power required for driving the driven parts is larger than the motive power that will make it possible to obtain the optimum fuel economy, it is possible to control the motive power from the heat engine such that the optimum fuel economy can be obtained, and make up for shortage of motive power by supplying the electric power charged in the electric power storage device to the first stator and/or the second stator. From the above, the optimum fuel economy of the heat engine can be obtained irrespective of the magnitude of load on the driven parts, and therefore it is possible to further enhance the driving efficiency of the power plant.

The invention as claimed in claim 3 is the power plant 1A as claimed in claim 1 or 2, further comprising a transmission 61 for changing speed of motive power from the first and fourth rotors and transmitting the motive power to the driven parts.

With this arrangement, the motive power from the first and fourth rotors is transmitted to the driven parts while changing the speed thereof by the transmission. Therefore, for example, when the load on the driven parts is very large, by controlling the transmission ratio of the transmission toward a lower-speed side, it is possible to reduce torque transmitted from the first and fourth rotors to the transmission with respect to torque transmitted from the transmission to the driven parts. This makes it possible to reduce the sizes of the two rotors, which in turn makes it possible to further reduce the sizes and costs of the first and second rotating machines.

Further, for example, when the speed of the driven parts is very high, the transmission ratio of the transmission is controlled toward a higher-speed side, whereby it is possible to lower the first and fourth rotor rotational speeds VR1 and VR4 with respect to the speed of the driven parts. This makes it possible to prevent failure of the first and second rotating machines from being caused by the rotational speed of the two rotors becoming too high. This is particularly effective because as described hereinabove, the first rotor is formed by magnets and the magnets are lower in strength than soft magnetic material elements, so that the above-mentioned inconveniences are liable to occur. Further, by controlling the transmission ratio of the transmission, the first and fourth rotor rotational speeds VR1 and VR4 can be properly controlled with respect to the speed of the driven parts, whereby it is possible to obtain high efficiencies of the first and second rotating machines.

Further, for example, as described above as to the operation of claim 1, by using the first and second rotating machines, it is possible to transmit the motive power from the heat engine to the driven parts while steplessly changing the speed thereof, and hence it is possible to reduce the frequency of the speed-changing operation of the transmission. This makes it possible to enhance the driving efficiency of the power plant for the following reason: When the rotational speed of the heat engine is reduced by changing the speed of the motive power from the heat engine by the transmission, energy based on the reduced amount of the rotational speed and the inertias of the heat engine and the transmission is lost by heat losses, whereby as the frequency of the speed-changing operation of the transmission becomes higher, the driving efficiency of the power plant becomes lower.

The invention as claimed in claim 4 is the power plant 1B as claimed in claim 1 or 2, further comprising a transmission 71 for changing the speed of motive power from the first rotor and transmitting the motive power to the driven parts.

With this arrangement, the motive power from the first rotor is transmitted to the driven parts while changing the speed thereof by the transmission. Therefore, for example, when the load on the driven parts is very large, by controlling the transmission ratio of the transmission toward the lower-speed side, it is possible to reduce the torque transmitted from the first rotor to the transmission with respect to the torque transmitted from the transmission to the driven parts. This makes it possible to reduce the size of the first rotor, which in turn makes it possible to further reduce the size and costs of the first rotating machine.

Further, for example, when the speed of the driven parts is very high, by controlling the transmission ratio of the transmission toward the higher-speed side, it is possible to lower the first rotor rotational speed VR1 with respect to the speed of the driven parts. This makes it possible to prevent failure of the first rotating machine from being caused by the first rotor rotational speed VR1 becoming too high. This is particularly effective because the first rotor is formed by magnets, and hence the above-mentioned inconveniences are liable to occur. Further, by controlling the transmission ratio of the transmission, the first rotor rotational speed VR1 can be properly controlled with respect to the speed of the driven parts, whereby it is possible to obtain high efficiency of the first rotating machine.

Further, in a case where the output portion of the heat engine is connected to the driven parts via a gear-type stepped transmission, during a speed-changing operation until a gear train selected for a change of the transmission ratio is connected, the heat engine and the driven parts are disconnected from each other by the stepped transmission, whereby transmission of the torque of the heat engine is interrupted, which is liable to cause a speed-change shock, such as a sudden decrease in torque. According to the present invention, the fourth rotor can be connected to the driven parts without via the above gear-type stepped transmission, whereby even when the gear-type stepped transmission is used as a transmission that transmits the motive power from the first rotor to the driven parts, part of the torque of the heat engine can be transmitted to the driven parts via the fourth rotor during the speed-changing operation of the transmission. Therefore, since the above-described speed-change shock can be suppressed, it is possible to improve marketability.

The invention as claimed in claim 5 is the power plant 1C as claimed in claim 1 or 2, further comprising a transmission 81 for changing the speed of motive power from the fourth rotor and transmitting the motive power to the driven parts.

With this arrangement, the motive power from the fourth rotor is transmitted to the driven parts while changing the speed thereof by the transmission. Therefore, for example, when the load on the driven parts is very large, by controlling the transmission ratio of the transmission toward the lower-speed side, it is possible to reduce the torque transmitted from the fourth rotor to the transmission with respect to the torque transmitted from the transmission to the driven parts. This makes it possible to reduce the size of the fourth rotor, which in turn makes it possible to further reduce the size and costs of the second rotating machine. Further, for example, when the speed of the driven parts is very high, the transmission ratio of the transmission is controlled toward the higher-speed side, whereby it is possible to lower the fourth rotor rotational speed VR4 with respect to the speed of the driven parts. This makes it possible to prevent failure of the second rotating machine from being caused by the fourth rotor rotational speed VR4 becoming too high. Further, by controlling the transmission ratio of the transmission, the fourth rotor rotational speed VR4 can be properly controlled with respect to the speed of the driven parts, whereby it is possible to obtain high efficiency of the second rotating machine.

Further, as described above as to the operation of claim 4, in the case where the output portion of the heat engine is connected to the driven parts via a gear-type stepped transmission, a speed-change shock is liable to occur during a speed-changing operation of the transmission. According to the present invention, the first rotor can be connected to the driven parts without via the above gear-type stepped transmission, whereby even when the gear-type stepped transmission is used as a transmission that transmits the motive power from the fourth rotor to the driven parts, part of the torque of the heat engine can be transmitted to the driven parts via the first rotor during the speed-changing operation of the transmission. Therefore, since the above-described speed-change shock can be suppressed, it is possible to improve marketability.

The invention as claimed in claim 6 is the power plant 1D as claimed in claim 1 or 2, further comprising a transmission 91 for changing speed of motive power from the output portion of the heat engine and transmitting the motive power to the second and third rotors.

With this arrangement, the motive power from the output portion of the heat engine is transmitted to the second and third rotors while changing the speed thereof by the transmission. Therefore, e.g. by controlling the transmission ratio of the transmission toward the higher-speed side, it is possible to reduce the torque input from the output portion of the heat engine to the second and third rotors, whereby it is possible to further reduce the sizes and costs of the first and second rotating machines. Further, when the rotational speed of the output portion of the heat engine is very high, by controlling the transmission ratio of the transmission toward the lower-speed side, it is possible to lower the second and third rotor rotational speeds VR2 and VR3 with respect to the rotational speed of the output portion. This makes it possible to prevent failure of the first and second rotating machines from being caused by the rotor rotational speeds VR2 and VR3 becoming too high. This is particularly effective because the third rotor is formed by magnets and hence the above-mentioned inconveniences are liable to occur.

Further, by controlling the transmission ratio of the transmission, the second and third rotor rotational speeds VR2 and VR3 can be properly controlled with respect to the rotational speed of the output portion of the heat engine, whereby it is possible to obtain high efficiencies of the first and second rotating machines. Further, as described above as to the operation of claim 4, in the case where the output portion of the heat engine is connected to the driven parts via a gear-type stepped transmission, a speed-change shock is liable to occur during a speed-changing operation of the transmission. According to the present invention, the first and fourth rotors can be connected to the driven parts without via the above gear-type stepped transmission, whereby even when the gear-type stepped transmission is used as a transmission that transmits the motive power from the output portion of the heat engine to the second and third rotors, the above-mentioned speed-change shock can be suppressed during the speed-changing operation of the transmission by an operation described hereafter.

In a case where the second and third rotors are connected to each other, when the output portion of the heat engine and the second and third rotors are disconnected from each other by the speed-changing operation of the transmission, if electric power is supplied to the first and second stators, as is clear from the aforementioned functions of the first rotating machine, the first driving equivalent torque Te1 from the first stator, and torque transmitted to the first rotor as described hereinafter are transmitted to the second rotor in a combined state. The torque transmitted to the second rotor is transmitted to the third rotor, and is then transmitted, as is clear from the aforementioned functions of the second rotating machine, to the fourth rotor in a state combined with the second driving equivalent torque Te2 from the second stator. Part of the torque transmitted to the fourth rotor is transmitted to the driven parts, and the remainder thereof is transmitted to the first rotor via the driven parts. As described above, during the speed-changing operation of the transmission, torque can be transmitted from the first and second rotating machines to the driven parts, and hence it is possible to suppress a speed-change shock, thereby making it possible to improve marketability.

The invention as claimed in claim 7 is the power plant 1, 1A to 1E as claimed in any one of claims 1 to 6, further comprising a brake mechanism BL for blocking reverse rotation of the output portion of the heat engine.

With this arrangement, the reverse rotation of the output portion of the heat engine is blocked by the brake mechanism, and in accordance therewith, the second and third rotors connected to the output portion is prevented from rotating in one direction. Hereinafter, the rotational directions of the second and third rotors, blocked by the brake mechanism, are referred to as the "second rotor-blocked direction" and the "third rotor-blocked direction", respectively. Further, as is clear from the aforementioned functions of the first rotating machine, by supplying electric power to the first stator and causing the first rotating magnetic field generated along therewith to rotate in the same direction as the above-described second rotor-blocked direction, it is possible to transmit all the electric power supplied to the first stator to the first rotor as motive power, and further to the driven parts. Further, as is clear from the aforementioned functions of the second rotating machine, by supplying electric power to the second stator and causing the second rotating magnetic field generated along therewith to rotate in a direction opposite to the above-described third rotor-blocked direction, it is possible to transmit all the electric power supplied to the second stator, to the fourth rotor as motive power, and further to the driven parts.

As described above, according to the present invention, it is possible to drive the driven parts by the first rotating machine and/or the second rotating machine without using the motive power from the heat engine. Further, in this case, it is possible to drive the driven parts while preventing not only the reverse rotation of the output portion of the heat engine by the brake mechanism but also the dragging of the heat engine by the following operation: Through the above-mentioned control of the direction of rotation of the first rotating magnetic field, the first driving equivalent torque Te1 from the first stator acts on the second rotor so as to cause the second rotor to rotate in the second rotor-blocked direction, and through the above-mentioned control of the direction of rotation of the second rotating magnetic field, the second driving equivalent torque from the second stator acts on the third rotor so as to cause the third rotor to rotate in the third rotor-blocked direction. This causes, during the above-mentioned driving of the driven parts, the output portion of the heat engine to be held stationary together with the second and third rotors, and hence the heat engine is not dragged.

To attain the object, the invention as claimed in claim 8 provides a power plant 1F to 1U for driving driven parts (drive wheels DW and DW in the embodiment (the same applies hereinafter in this section)), comprising a heat engine (engine 3) having a first output portion (crankshaft 3a) for outputting motive power, a first rotating machine 21 (second rotating machine 31) including a first rotor (A1 rotor 24, B1 rotor 34) having a magnetic pole row that is formed by a predetermined plurality of magnetic poles (permanent magnets 24a, 34a) arranged in a circumferential direction, and has each two adjacent magnetic poles so disposed as to have polarities different from each other, the first rotor being rotatable in the circumferential direction, an unmovable stator 23, 33 having an armature row that is formed by a plurality of armatures (iron cores 23a, U-phase to W-phase coils 23c to 23e, iron cores 33a, U-phase to W-phase coils 33b) arranged in the circumferential direction, and is disposed in a manner opposed to the magnetic pole row, for generating a rotating magnetic field rotating in the circumferential direction between the armature row and the magnetic pole row, by a predetermined plurality of armature magnetic poles generated at the plurality of armatures, and a second rotor (A2 rotor 25, B2 rotor 35) having a soft magnetic material element row that is formed by a predetermined plurality of soft magnetic material elements (cores 25a, cores 35a) arranged in the circumferential direction in a manner spaced from each other, and is disposed between the magnetic pole row and the armature row, the second rotor being rotatable in the circumferential direction, wherein a ratio between the number of the armature magnetic poles, the number of the magnetic poles, and the number of the soft magnetic material elements is set to 1:m:(1+m)/2 (m≠1.0), a first controller (first PDU 41, ECU 2, second PDU 42, ECU 2) electrically connected to the stator 23, 33, for controlling electric power generated by the stator 23, 33 and electric power supplied to the stator, a differential (first planetary gear unit PS1) including a first element (first sun gear S1, first ring gear R1), a second element (first carrier C1) and a third element (first ring gear R1, first sun gear S1) mechanically connected to each other, and having a function of distributing motive power input to the second element to the first and third elements and a function of combining motive power input to the first element and motive power input to the third element and then outputting combined motive power to the second element, the first to third elements rotating while holding a collinear relationship with respect to rotational speed, during distributing and combining the motive power, a second rotating machine (rotating machine 101) including a second output portion (rotor 103), and having a function of converting supplied electric power to motive power and outputting the motive power to the second output portion and a function of converting motive power input to the second output portion to electric power to thereby generate electric power, and a second controller (second PDU 42, ECU 2, first PDU 41, ECU 2) electrically connected to the second rotating machine, for controlling electric power generated by the second rotating machine and electric power supplied to the second rotating machine, wherein one of a pair of the first rotor and the second element and a pair of the second rotor and the first element are mechanically connected to the first output portion of the heat engine, while the other of the pair of the first rotor and the second element and the pair of the second rotor and the first element are mechanically connected to the driven parts, the third element being mechanically connected to the second output portion of the second rotating machine, and the stator 23, 33 and the second rotating machine being electrically connected to each other via the first and second controllers.

With this arrangement, the first rotating machine is configured similarly to the first rotating machine as claimed in claim 1, and hence it has the same functions as those of the rotating machine as claimed in claim 1, that is, the same functions as those of an apparatus formed by combining a planetary gear unit and a general one-rotor-type rotating machine. Therefore, assuming that the ratio of the pole pair number of the magnetic poles to the pole pair number of the armature magnetic poles (hereinafter referred to as the "pole pair number ratio") is represented by α, similarly to the first rotating machine as claimed in claim 1, a relationship shown in the equation (25) holds between the electrical angular velocity of the rotating magnetic field and the electrical angular velocities of the first and second rotors during supply of electric power to the stator of the first rotating machine and during generation of electric power by the stator. Further, assuming that torque equivalent to the electric power supplied to the armatures and the electrical angular velocity of the rotating magnetic field is referred to as the "driving equivalent torque", such a torque relationship as expressed by the equation (32) holds between the driving equivalent torque and torques transmitted to the first and second rotors. Furthermore, assuming that torque equivalent to the electric power generated by the armatures and the electrical angular velocity of the rotating magnetic field is referred to as the "electric power-generating equivalent torque", such a torque relationship as expressed by the equation (32) holds between the electric power-generating equivalent torque and the torques transmitted to the first and second rotors.

Further, as is clear from the above-described construction, the differential has the same functions as those of the planetary gear unit, and in the relationship between the input of motive power and the output of motive power, the first element corresponds to one of the sun gear and the ring gear of the planetary gear unit, the third element corresponds to the other thereof, and the second element corresponds to the carrier. Furthermore, one of a pair of the first rotor and the second element of the differential and a pair of the second rotor and the first element of the differential are mechanically connected to the first output portion of the heat engine, while the other of the pair of the first rotor and the second element and the pair of the second rotor and the first element are mechanically connected to the driven parts. Further, the third element of the differential is mechanically connected to the second output portion of the second rotating machine, and the stator and the second rotating machine are electrically connected to each other via the first and second controllers.

With the above arrangement, in the power plant, the motive power from the heat engine is transmitted to the driven parts e.g. in the following manner. Hereinafter, the power plant in which the second rotor and the first element are connected to the first output portion of the heat engine, and the first rotor and the second element are connected to the driven parts is referred to as the "first power plant", and the power plant in which the first rotor and the second element are connected to the first output portion of the heat engine, and the second rotor and the first element are connected to the driven parts is referred to as the "second power plant". Further, transmission of the motive power from the heat engine to the driven parts in the first and second power plants will be sequentially described starting with the first power plant. FIG. 77 schematically shows an example of the state of transmission of motive power in the first power plant. It should be noted that in FIG. 77, similarly to FIG. 73, the mechanical connections between the elements are indicated by solid lines, electrical connections therebetween are indicated by one-dot chain lines, and magnetic connections therebetween are indicated by broken lines. Further, flows of motive power and electric power are indicated by thick lines with arrows.

When the motive power from the heat engine is transmitted to the driven parts, electric power is generated by the first rotating machine using part of the motive power from the heat engine under the control of the first and second controllers, and the generated electric power is supplied to the second rotating machine. During the electric power generation by the first rotating machine, as shown in FIG. 77, part of the motive power from the heat engine is transmitted to the second rotor connected to the first output portion of the heat engine, and is further distributed to the first rotor and the stator by the above-described magnetism of magnetic force lines. In this case, part of the motive power transmitted to the second rotor is converted to electric power and is distributed to the stator. Further, the motive power distributed to the first rotor, as described above, is transmitted to the driven parts, and the electric power distributed to the stator is supplied to the second rotating machine. Furthermore, when the electric power generated by the first rotating machine, as described above, is supplied to the second rotating machine, the electric power is converted to motive power, and then the resulting motive power is transmitted to the third element. Further, the remainder of the motive power from the heat engine is transmitted to the first element, and is combined with the motive power transmitted to the third element, as described above, whereafter the combined motive power is transmitted to the driven parts via the second element. As a result, motive power equal in magnitude to the motive power from the heat engine is transmitted to the driven parts.

As described above, in the first power plant according to the present invention, similarly to the power plant as claimed in claim 1, the first rotating machine has the same functions as those of an apparatus formed by combining a planetary gear unit and a general one-rotor-type rotating machine, and hence differently from the above-described conventional power plant, which requires two planetary gear units for distributing and combining motive power for transmission, the first power plant requires only one differential for the same purpose. This makes it possible to reduce the size of the first power plant by the corresponding extent. This applies to the above-described second power plant. Further, in the first power plant, differently from the above-described conventional case, the motive power from the heat engine is transmitted to the driven parts without being recirculated, as described above, and hence it is possible to reduce motive power passing through the first rotating machine, the differential and the second rotating machine. This makes it possible to reduce the sizes and costs of the first rotating machine, the differential and the second rotating machine, thereby making it possible to attain further reduction of the size and costs of the first power plant. Further, by using the first rotating machine, the differential and the second rotating machine each having a torque capacity corresponding to the reduced motive power, as described above, it is possible to suppress the loss of the motive power to improve the driving efficiency of the first power plant.

Further, the motive power from the heat engine is transmitted to the driven parts in a divided state via a total of three paths, i.e. a first transmission path formed by the second rotor, the magnetism of magnetic force lines and the first rotor, a second transmission path formed by the second rotor, the magnetism of magnetic force lines, the stator, the first controller, the second controller, the second rotating machine, the third element and the second element, and a third transmission path formed by the first and second elements. This makes it possible to reduce electric power (energy) passing through the first and second controllers via the second transmission path, so that it is possible to reduce the sizes and costs of the first and second controllers, thereby making it possible to attain further reduction of the size and costs of the first power plant.

Furthermore, when motive power is transmitted to the driven parts, as described above, by controlling the rotational speed of the rotating magnetic field of the stator and the rotational speed of the second output portion of the second rotating machine by the first and second controllers, respectively, it is possible to transmit the motive power from the heat engine to the driven parts while steplessly changing the speed thereof. Hereinafter, a description will be given of this point. In the first rotating machine, as is clear from the above-described functions, during distributing and combining energy between the stator and the first and second rotors, the rotating magnetic field and the first and second rotors rotate while holding a collinear relationship with respect to the rotational speed, as shown in the equation (25). Further, in the differential, during distributing and combining energy between the first to third elements, the first to third elements rotate while holding a collinear relationship with respect to the rotational speed. Further, in the above-mentioned connection relationship, if the second rotor and the first element are directly connected to the first output portion of the heat engine, the rotational speeds of the second rotor and the first element are both equal to the rotational speed of the first output portion of the heat engine. Further, if both the first rotor and the second element are directly connected to the driven parts, the rotational speeds of the first rotor and the second element are both equal to the speed of the driven parts. Furthermore, if the second output portion of the second rotating machine and the third element are directly connected to each other, the rotational speeds of the second rotating machine and third element are equal to each other.

Now, the rotational speed of the first output portion of the heat engine is referred to as the "rotational speed of the heat engine", and the rotational speed of the second output portion of the second rotating machine is referred to as the "rotational speed of the second rotating machine". Further, the rotational speed of the rotating magnetic field is referred to as the "magnetic field rotational speed VF", the rotational speeds of the first and second rotors are referred to as the "first and second rotor rotational speeds VR1 and VR2", respectively, and the rotational speeds of the first to third elements are referred to as the "first to third element rotational speeds V1 to V3", respectively. From the above-described relationship between the rotational speeds of the respective rotary elements, the relationship between the rotational speed of the heat engine, the speed of the driven parts, the magnetic field rotational speed VF, the first and second rotor rotational speeds VR1 and VR2, the first to third element rotational speeds V1 to V3, and the rotational speed of the second rotating machine is indicated e.g. by thick solid lines in FIG. 78.

Therefore, as indicated by two-dot chain lines in FIG. 78, e.g. by increasing the magnetic field rotational speed VF and decreasing the rotational speed of the second rotating machine, with respect to the second rotor rotational speed VR2 and the first element rotational speed V1, it is possible to transmit the motive power from the heat engine to the driven parts while steplessly reducing the speed thereof. Inversely, as indicated by one-dot chain lines in FIG. 78, by decreasing the magnetic field rotational speed VF and increasing the rotational speed of the second rotating machine, with respect to the second rotor rotational speed VR2 and the first element rotational speed V1, it is possible to transmit the motive power from the heat engine to the driven parts while steplessly increasing the speed thereof.

Further, when the pole pair number ratio $\alpha$ of the first rotating machine is relatively large, if the rotational speed of the heat engine is higher than the speed of the driven parts (see the two-dot chain lines in FIG. 78), the magnetic field rotational speed VF becomes higher than the rotational speed of the heat engine and sometimes becomes too high. Therefore, by setting the pole pair number ratio $\alpha$ of the first rotating machine to a smaller value, as is apparent from a comparison between the broken lines and the two-dot chain lines in the velocity nomograph in FIG. 78, the magnetic field rotational speed VF can be reduced, whereby it is possible to prevent the driving efficiency from being lowered by occurrence of loss caused by the magnetic field rotational speed VF becoming too high.

Furthermore, when the collinear relationship with respect to the rotational speeds of the first to third elements of the differential is set such that the difference between the rotational speeds of the first element and the second element and the difference between the rotational speeds of the second element and the third element are 1.0:X (X>0), and when X is set to a relatively large value, if the speed of the driven parts is higher than the rotational speed of the heat engine (see the one-dot chain lines in FIG. 78), the rotational speed of the second rotating machine becomes higher than the speed of the driven parts and sometimes becomes too high. Therefore, by setting the above-mentioned X to a smaller value, as is apparent from a comparison between the broken lines and the one-dot chain lines in the velocity nomograph in FIG. 78, the rotational speed of the second rotating machine can be reduced, whereby it is possible to prevent the driving efficiency from being lowered by occurrence of loss caused by the rotational speed of the second rotating machine becoming too high.

Further, in the first power plant, by supplying electric power to the second rotating machine and generating electric power by the first stator, torque output to the second output portion of the second rotating machine (hereinafter referred to as the "second rotating machine torque") can be transmitted to the driven parts in a state where the first output portion of the heat engine is stopped, using the aforementioned electric power-generating equivalent torque of the first rotating machine as a reaction force, whereby it is possible to drive the driven parts. Furthermore, during such driving of the driven parts, if the heat engine is an internal combustion engine, it is possible to start the internal combustion engine. FIG. 79 shows the relationship between torques of the various rotary elements in this case together with the relationship between the rotational speeds thereof. In the figure, TOUT represents the driven part-transmitted torque, similarly to the case of claim 1, and TDHE, Tg and TM2 represent torque transmitted to the first output portion of the heat engine (hereinafter referred to as the "heat engine-transmitted torque"), the electric power-generating equivalent torque, and the second rotating machine torque, respectively.

When the heat engine is started as described above, as is clear from FIG. 79, the second rotating machine torque TM2 is transmitted to both the driven parts and the first output portion of the heat engine using the electric power-generating equivalent torque Tg of the first rotating machine as a reaction force, and hence the torque demanded of the first rotating machine becomes larger than in the other cases. In this case, the torque demanded of the first rotating machine, i.e. the electric power-generating equivalent torque Tg is expressed by the following equation (35):

$$Tg=-\{X\cdot TOUT+(X+1)TDHE\}/(\alpha+1+X) \quad (35)$$

As is apparent from the equation (35), as the pole pair number ratio $\alpha$ of the first rotating machine is larger, the electric power-generating equivalent torque Tg becomes smaller with respect to the driven part-transmitted torque TOUT and the heat engine-transmitted torque TDHE assuming that the respective magnitudes thereof are unchanged. Therefore, by setting the pole pair number ratio $\alpha$ to a larger value, it is possible to further reduce the size and costs of the first rotating machine.

Further, in the first power plant, the speed of the driven parts in a low-speed condition can be rapidly increased e.g. by controlling the heat engine and the first and second rotating machines in the following manner: FIG. 80 shows the relationship between the rotational speeds of the various rotary elements at the start of operation for rapidly increasing the speed of the driven parts, as described above, together with the relationship between the torques of the various rotary elements. In FIG. 80, THE represents, similarly to the case of claim 1, the torque of the heat engine, and Te represents the driving equivalent torque of the first rotating machine. In this case, the rotational speed of the heat engine is increased to such a predetermined rotational speed as will make it possible to obtain the maximum torque thereof. As shown in FIG. 80, the speed of the driven parts is not immediately increased, and hence as the rotational speed of the heat engine becomes higher than the speed of the driven parts, the difference therebetween increases, which causes the second output portion of the second rotating machine to perform reverse rotation.

Further, in order to cause positive torque from the second output portion of the second rotating machine performing such reverse rotation to act on the driven parts, the second rotating machine performs electric power generation. Further, electric power generated by the second rotating machine is supplied to the stator of the first rotating machine to cause the rotating magnetic field generated by the stator to perform normal rotation.

From the above, the heat engine torque THE, the driving equivalent torque Te and the second rotating machine torque TM2 are all transmitted to the driven parts as positive torque, which results in a rapid increase in the speed of the driven parts. Further, when the speed of the driven parts in the low-speed condition is rapidly increased as described above, as is apparent from FIG. 80, the heat engine torque THE and the driving equivalent torque Te are transmitted to the driven parts using the second rotating machine torque TM2 as a reaction force, so that the torque demanded of the second rotating machine becomes larger than in the other cases. In this case, the torque demanded of the second rotating machine, i.e. the second rotating machine torque TM2 is expressed by the following equation (36):

$$TM2 = -\{\alpha \cdot THE + (1+\alpha)TOUT\}/(X+1+\alpha) \quad (36)$$

As is apparent from the equation (36), as X is larger, the second rotating machine torque TM2 becomes smaller with respect to the driven part-transmitted torque TOUT and the heat engine torque THE assuming that the respective magnitudes thereof are unchanged. Therefore, by setting X to a larger value, it is possible to further reduce the size and costs of the second rotating machine.

Further, FIG. 81 schematically shows an example of the state of transmission of the motive power from the heat engine of the aforementioned second power plant to the driven parts. It should be noted that the method of indicating the connection relationship between the respective rotary elements in FIG. 81 is the same as the method employed in FIG. 77. In the second power plant, the motive power from the heat engine is transmitted to the driven parts e.g. as follows: Electric power is generated by the second rotating machine using part of the motive power from the heat engine under the control of the first and second controllers, and the generated electric power is supplied to the stator of the first rotating machine. During the electric power generation by the second rotating machine, as shown in FIG. 81, part of the motive power from the heat engine is transmitted to the second element connected to the first output portion of the heat engine, and is distributed to the first and third elements. The motive power distributed to the first element is transmitted to the driven parts, while the motive power distributed to the third element is transmitted to the second rotating machine to be converted to electric power and is then supplied to the stator.

Furthermore, when the electric power generated by the second rotating machine is supplied to the stator, as described above, the electric power is converted to motive power, and is then transmitted to the second rotor by the magnetism of magnetic force lines. In accordance therewith, the remainder of the motive power from the heat engine is transmitted to the first rotor, and is further transmitted to the second rotor by the magnetism of magnetic force lines. Further, the motive power transmitted to the second rotor is transmitted to the driven parts. As a result, motive power equal in magnitude to the motive power from the heat engine is transmitted to the driven parts.

As described above, also in the second power plant, similarly to the above-described first power plant, the motive power from the heat engine is transmitted to the driven parts without being recirculated, and hence it is possible to reduce motive power passing through the first rotating machine, the differential and the second rotating machine. Therefore, similarly to the first power plant, it is possible to reduce the sizes and costs of the first rotating machine, the differential and the second rotating machine, thereby making it possible to attain further reduction of the size and costs of the second power plant and enhance the driving efficiency of the second power plant. Further, the first power plant and the second power plant are only different in that the distributing and combining of motive power in the first rotating machine and the differential are in an opposite relationship, and hence also in the second power plant, as shown in FIG. 81, the motive power from the heat engine is transmitted to the driven parts in a divided state via the total of three transmission paths, i.e. the above-described first to third transmission paths. Therefore, similarly to the first power plant, it is possible to reduce the sizes and costs of the first and second controllers, thereby making it possible to attain further reduction of the size and costs of the second power plant.

Furthermore, also in the second power plant, similarly to the first power plant, when motive power is transmitted to the driven parts, as described above, by controlling the magnetic field rotational speed VF and the rotational speed of the second rotating machine using the first and second controllers, respectively, it is possible to transmit the motive power from the heat engine to the driven parts while steplessly changing the speed of the motive power. More specifically, in the second power plant, the relationship between the rotational speed of the heat engine, the speed of the driven parts, the magnetic field rotational speed VF, the first and second rotor rotational speeds VR1 and VR2, the first to third element rotational speeds V1 to V3, and the rotational speed of the second rotating machine is indicated e.g. by thick solid lines in FIG. 82. As indicated by two-dot chain lines in the figure, e.g. by increasing the rotational speed of the second rotating machine and decreasing the magnetic field rotational speed VF, with respect to the second element rotational speed V2 and the first rotor rotational speed VR1, it is possible to transmit the motive power from the heat engine to the driven parts while steplessly reducing the speed thereof. Inversely, as indicated by one-dot chain lines in FIG. 82, by decreasing the rotational speed of the second rotating machine and increasing the magnetic field rotational speed VF, with respect to the second element rotational speed V2 and the first rotor rotational speed VR1, it is possible to transmit the motive power from the heat engine to the driven parts while steplessly increasing the speed thereof.

Further, when the pole pair number ratio $\alpha$ of the first rotating machine is relatively large, if the speed of the driven parts is higher than the rotational speed of the heat engine (see the one-dot chain lines in FIG. 82), the magnetic field rotational speed VF becomes higher than the speed of the driven parts and sometimes becomes too high. Therefore, by setting the pole pair number ratio $\alpha$ to a smaller value, as is apparent from a comparison between the broken lines and the one-dot chain lines in the velocity nomograph in FIG. 82, the magnetic field rotational speed VF can be reduced, whereby it is possible to prevent the driving efficiency from being lowered by occurrence of loss caused by the magnetic field rotational speed VF becoming too high.

Furthermore, when the above-mentioned X determining the collinear relationship with respect to the rotational speeds of the differential is relatively large, if the rotational speed of the heat engine is higher than the speed of the driven parts (see the two-dot chain lines in FIG. 82), the rotational speed of the second rotating machine becomes higher than the rotational speed of the heat engine and sometimes becomes too high. Therefore, by setting the above X to a smaller value, as is apparent from a comparison between the broken lines and the two-dot chain lines in the velocity nomograph in FIG. 82, the rotational speed of the second rotating machine can be reduced, whereby it is possible to prevent the driving efficiency from being lowered by occurrence of loss caused by the rotational speed of the second rotating machine becoming too high.

Further, in the second power plant, by supplying electric power to the stator of the first rotating machine and generating electric power by the second rotating machine, the driving equivalent torque Te of the first rotating machine can be transmitted to the driven parts in a state where the first output portion of the heat engine is stopped, using the second rotating machine torque TM2 as a reaction force, whereby it is possible to drive the driven parts. Furthermore, during such driving of the driven parts, if the heat engine is an internal combustion engine, similarly to the first power plant, it is possible to start the internal combustion engine. FIG. 83 shows the relationship between torques of the various rotary elements in this case together with the relationship between the rotational speeds of the same.

When the heat engine is started as described above, as is apparent from FIG. 83, the driving equivalent torque Te is transmitted to both the driven parts and the output portion of the heat engine using the second rotating machine torque TM2 as a reaction force, and hence the torque demanded of the second rotating machine becomes larger than in the other cases. In this case, the torque demanded of the second rotating machine, i.e. the second rotating machine torque TM2 is expressed by the following equation (37):

$$TM2 = -\{\alpha \cdot TOUT + (1+\alpha)TDHE\}/(X+\alpha+1) \qquad (37)$$

As is apparent from the equation (37), as X is larger, the second rotating machine torque TM2 becomes smaller with respect to the driven part-transmitted torque TOUT and the heat engine-transmitted torque TDHE assuming that the respective magnitudes thereof are unchanged. Therefore, by setting X to a larger value, it is possible to further reduce the size and costs of the second rotating machine.

Further, in the second power plant, similarly to the first power plant, the speed of the driven parts in a low-speed condition can be rapidly increased e.g. by controlling the heat engine and the first and second rotating machines in the following manner: FIG. 84 shows the relationship between the rotational speeds of the various rotary elements together with the relationship between torques of the same at the start of such an operation for rapidly increasing the speed of the driven parts. In this case, the rotational speed of the heat engine is increased to such a predetermined rotational speed as will make it possible to obtain the maximum torque thereof. As shown in FIG. 84, the speed of the driven parts is not immediately increased, and hence as the rotational speed of the heat engine becomes higher than the speed of the driven parts, the difference therebetween increases, whereby the direction of rotation of the rotating magnetic field determined by the relationship therebetween becomes the direction of reverse rotation. Therefore, in order to cause positive torque to act on the driven parts from the stator of the first rotating machine that generates such a rotating magnetic field, electric power generation is performed by the stator. Further, electric power generated by the stator is supplied to the second rotating machine to cause the second output portion of the second rotating machine to perform normal rotation.

From the above, the heat engine torque THE, the second rotating machine torque TM2 and the electric power-generating equivalent torque Tg are all transmitted to the driven parts as positive torque, which results in a rapid increase in the speed of the driven parts. Further, when the speed of the driven parts in the low-speed condition is rapidly increased as described above, as is apparent from FIG. 84, the heat engine torque THE and the second rotating machine torque TM2 are transmitted to the driven parts using the electric power-generating equivalent torque Tg of the first rotating machine as a reaction force, so that the torque demanded of the first rotating machine becomes larger than in the other cases. In this case, the torque demanded of the first rotating machine, i.e. the electric power-generating equivalent torque Tg is expressed by the following equation (38):

$$Tg = -\{X \cdot THE + (1+X)TOUT\}/(\alpha+1+X) \qquad (38)$$

As is apparent from the equation (38), as the pole pair number ratio $\alpha$ is larger, the electric power-generating equivalent torque Tg becomes smaller with respect to the driven part-transmitted torque TOUT and the heat engine torque THE assuming that the respective magnitudes thereof are unchanged. Therefore, by setting the pole pair number ratio $\alpha$ to a larger value, it is possible to further reduce the size and costs of the first rotating machine.

The invention as claimed in claim 9 is the power plant 1F to 1U as claimed in claim 8, further comprising an electric power storage device (battery 43) that is configured to be capable of being charged and discharged and is electrically connected to the stator 23, 33 and the second rotating machine via the first and second controllers, respectively.

With this arrangement, the electric power storage device capable of being charged and discharged is connected to the stator and the second rotating machine via the first and second controllers, respectively. Therefore, it is possible to obtain the optimum fuel economy of the heat engine, for example. Specifically, when the demanded motive power demanded for driving the driven parts is smaller than the optimum fuel economy motive power that makes it possible to obtain optimum fuel economy of the heat engine, it is possible to control the motive power from the heat engine such that the optimum fuel economy can be obtained, and convert surplus motive power from the heat engine to electric power by the first or second rotating machine to charge the electric power into the electric power storage device. Inversely, when the demanded motive power is larger than the optimum fuel economy motive power, it is possible to control the motive power from the heat engine such that the optimum fuel economy can be obtained, and input the electric power charged in the above-described electric power storage device to the driven parts as rotational motive power via the first and/or second rotating machine, to thereby make up for shortage of motive power. With this, irrespective of the magnitude of load on the driven parts, the optimum fuel economy of the heat engine can be obtained, and therefore it is possible to further enhance the driving efficiency of the power plant.

The invention as claimed in claim 10 is the power plant 1G, 1O as claimed in claim 8 or 9, further comprising a transmission 111, 161 for changing speed of motive power from the other of the pair of the first rotor and the second element and the pair of the second rotor and the first element and transmitting the motive power to the driven parts.

With this arrangement, the motive power from the other pair (hereinafter referred to as the "driven part-connecting element") of the pair of the first rotor and the second element and the pair of the second rotor and the first element is transmitted to the driven parts while having the speed of the motive power changed by the transmission. Therefore, for example, when load on the driven parts is very large, and hence torque transmitted to the driven parts is too large, by controlling the transmission ratio of the transmission toward the lower-speed side, torque transmitted from the driven part-connecting element to the transmission can be reduced with respect to the torque transmitted from the transmission to the driven parts. This makes it possible to reduce the size of the first or second rotor, which in turn makes it possible to further reduce the size and costs of the first rotating machine.

Further, for example, in both of a case where the first element is connected to the driven parts and a case where the second element is connected to the driven parts, it is possible to further reduce the sizes and costs of the second rotating machine and the differential. Specifically, in the case where the first element is connected to the driven parts (see FIG. 81), when the load on the driven parts is very large, the transmission ratio of the transmission is controlled toward the lower-speed side, whereby the torque transmitted from the first element to the transmission is reduced with respect to the torque transmitted from the transmission to the driven parts. This makes it possible to reduce torque distributed to the first and third elements via the second element, and hence it is possible to further reduce the size and costs of the differential. Further, as the torque distributed to the third element becomes smaller as described above, torque transmitted from the third element to the second rotating machine can be reduced, and hence it is possible to further reduce the size and costs of the second rotating machine.

Furthermore, for example, in the case where the second element is connected to the driven parts (see FIG. 77), when the load on the driven parts is very large, by controlling the transmission ratio of the transmission toward the lower-speed side, the torque transmitted from the second rotating machine to the transmission via the third and second elements can be reduced with respect to the torque transmitted from the transmission to the driven parts. This makes it possible to further reduce the sizes and costs of the second rotating machine and the differential.

Further, for example, when the speed of the driven parts is very high, by controlling the transmission ratio of the transmission toward the higher-speed side, it is possible to lower the first or second rotor rotational speed VR1 or VR2 with respect to the speed of the driven parts, so that it is possible to prevent failure of the first rotating machine from being caused by the first or second rotor rotational speed VR1 or VR2 becoming too high. This is particularly effective when the first rotor is connected to the driven parts because the first rotor is formed by magnets and the magnets are lower in strength than soft magnetic material elements, as described hereinabove, so that the above-mentioned inconveniences are liable to occur.

Furthermore, in the case where the second element is connected to the driven parts, when the speed of the driven parts is higher than the rotational speed of the heat engine, as is apparent from FIG. 78, referred to hereinabove, the rotational speed of the second rotating machine sometimes becomes too high. Therefore, in such a case, for example, by controlling the transmission ratio of the transmission toward the higher-speed side, to thereby lower the second element rotational speed V2 with respect to the speed of the driven parts, it is possible to lower the rotational speed of the second rotating machine, as is apparent from FIG. 78, so that it is possible to prevent failure of the second rotating machine from being caused by the rotational speed of the second rotating machine becoming too high.

Further, in the case where the first element is connected to the driven parts, when the rotational speed of the heat engine is higher than the speed of the driven parts, as is clear from FIG. 82, referred to hereinabove, the rotational speed of the second rotating machine sometimes becomes too high. Therefore, in such a case, for example, by controlling the transmission ratio of the transmission toward the lower-speed side, to thereby increase the first element rotational speed V1 with respect to the speed of the driven parts, it is possible to lower the rotational speed of the second rotating machine, as is apparent from FIG. 82. This makes it possible to prevent failure of the second rotating machine from being caused by the rotational speed of the second rotating machine becoming too high.

Furthermore, for example, by controlling the transmission ratio of the transmission, it is possible to control the first or second rotor rotational speed VR1 or VR2 to an appropriate speed with respect to the speed of the driven parts, whereby it is possible to obtain high efficiency of the first rotating machine. Further, by controlling the transmission ratio of the transmission, the second or first element rotational speed V2 or V1 is increased or decreased with respect to the speed of the driven parts, whereby as is apparent from FIG. 78 and FIG. 82, the rotational speed of the second rotating machine can be controlled to an appropriate speed, thereby making it possible to obtain high efficiency of the second rotating machine.

Further, for example, as described above as to the operation of claim 8, by using the first rotating machine, the differential and the second rotating machine, it is possible to transmit the motive power from the heat engine to the driven parts while steplessly changing the speed thereof, and hence it is possible to reduce the frequency of the speed-changing operation of the transmission. This makes it possible to enhance the driving efficiency of the power plant, similarly to the power plant as claimed in claim 3.

The invention as claimed in claim 11 is the power plant 1H, 1P as claimed in claim 8 or 9, further comprising a transmission 121, 171 for changing speed of motive power from the first output portion of the heat engine and transmitting the motive power to the one of the pair of the first rotor and the second element and the pair of the second rotor and the first element.

With this arrangement, the motive power from the first output portion of the heat engine is transmitted to the one pair (hereinafter referred to as the "heat engine-connecting element") of the pair of the first rotor and the second element and the pair of the second rotor and the first element while having the speed of the motive power changed by the transmission. Therefore, by controlling the transmission ratio of the transmission toward the higher-speed side, for example, it is possible to reduce the torque input from the first output portion of the heat engine to the heat engine-connecting element, thereby making it possible to further reduce the sizes and costs of the first rotating machine, the differential and the second rotating machine.

Further, for example, when the rotational speed of the heat engine is very high, by controlling the transmission ratio of the transmission toward the lower-speed side, the first or second rotor rotational speed VR1 or VR2 can be lowered with respect to the rotational speed of the heat engine, so that it is possible to prevent failure of the first rotating machine from being caused by the first or second rotor rotational speed VR1 or VR2 becoming too high. In the case where the first rotor is connected to the first output portion of the heat engine, this is particularly effective because the first rotor is formed by magnets and hence the above-mentioned inconveniences are liable to occur.

Further, for example, in both of the case where the second element is connected to the first output portion of the heat engine and the case where the first element is connected to the first output portion of the heat engine, it is possible to prevent failure of the second rotating machine from being caused by the rotational speed of the second rotating machine becoming too high. Specifically, in the case where the first element is connected to the first output portion of the heat engine, when the speed of the driven parts is higher than the rotational speed of the heat engine, as is apparent from FIG. 78, the rotational speed of the second rotating machine sometimes becomes too high. Therefore, in such a case, for example, by controlling the transmission ratio of the transmission toward the higher-speed side, to thereby increase the first element rotational speed V1 with respect to the rotational speed of the heat engine, it is possible, as is apparent from FIG. 78, to lower the rotational speed of the second rotating machine, so that it is possible to prevent failure of the second rotating machine from being caused by the rotational speed of the second rotating machine becoming too high.

Further, in the case where the second element is connected to the first output portion of the heat engine, when the rotational speed of the heat engine is higher than the speed of the driven parts, as is apparent from FIG. 82, the rotational speed of the second rotating machine sometimes becomes too high. Therefore, in such a case, for example, by controlling the transmission ratio of the transmission toward the lower-speed side to thereby lower the second element rotational speed V2 with respect to the rotational speed of the heat engine, it is possible, as is apparent from FIG. 82, to lower the rotational speed of the second rotating machine, so that it is possible to prevent failure of the second rotating machine from being caused by the rotational speed of the second rotating machine becoming too high.

Furthermore, for example, by controlling the transmission ratio of the transmission, it is possible to control the first or second rotor rotational speed VR1 or VR2 to an appropriate speed with respect to the rotational speed of the heat engine, whereby it is possible to obtain high efficiency of the first rotating machine. Further, by controlling the transmission ratio of the transmission, the first or second element rotational speed V1 or V2 is increased or decreased with respect to the rotational speed of the heat engine, whereby, as is apparent from FIG. 78 and FIG. 82, the rotational speed of the second rotating machine can be controlled to an appropriate speed, thereby making it possible to obtain high efficiency of the second rotating machine.

Further, in a case where the first output portion of the heat engine is connected to the driven parts via a gear-type stepped transmission, during a speed-changing operation until a gear train selected for a change of the transmission ratio, the heat engine and the driven parts are disconnected from each other by the stepped transmission, whereby transmission of the torque of the heat engine is interrupted, which is liable to cause a speed-change shock, such as a sudden decrease in torque. According to the present invention, the other of the pair of the first rotor and the second element and the pair of the second rotor and the first element can be connected to the driven parts without via the above stepped transmission for example, for example, whereby it is possible, even when the stepped transmission is used as a transmission for transmitting motive power from the first output portion of the heat engine to the heat engine-connecting element, to suppress the above-mentioned speed-change shock during the speed-changing operation of the transmission by the following operation:

In the case where the second rotor and the first element are connected to the first output portion of the heat engine and the second rotor and the first element are connected to each other, when the first output portion of the heat engine is disconnected from the second rotor and the first element by the speed-changing operation of the transmission, electric power is supplied to the stator of the first rotating machine and the second rotating machine. As a consequence, by the aforementioned functions of the first rotating machine, the above-mentioned driving equivalent torque Te from the stator and torque transmitted to the first rotor, as described hereafter, are combined, and then the combined torque is transmitted to the second rotor. Since the second rotor and the first element are connected to each other as mentioned above, the torque transmitted to the second rotor is transmitted to the first element, and is combined with torque transmitted from the second rotating machine to the third element, and then the combined torque is transmitted to the second element. Part of the torque transmitted to the second element is transmitted to the driven parts, and the remainder thereof is transmitted to the first rotor via the driven parts. As described above, during the speed-changing operation of the transmission, torque can be transmitted from the first and second rotating machines to the driven parts, and hence it is possible to suppress speed-change shock, thereby making it possible to improve marketability.

The above effects can be obtained similarly also when the first rotor and the second element are connected to the first output portion of the heat engine, and the first rotor and the second element are connected to each other. Specifically, in this case, when electric power is supplied to the stator and the second rotating machine, torque from the second rotating machine is transmitted to the third element and is combined with torque transmitted to the first element, as described hereinafter. The combined torque is transmitted to the second element. Since the first rotor and the second element are connected to each other, the torque transmitted to the second element is transmitted to the first rotor and is combined with the driving equivalent torque Te from the stator, and then the combined torque is transmitted to the second rotor. Part of the torque transmitted to the second rotor is transmitted to the driven parts, and the remainder thereof is transmitted to the first element via the driven parts. Therefore, in this case as well, during the speed-changing operation of the transmission, it is possible to suppress a speed-change shock, thereby making it possible to improve marketability.

The invention as claimed in claim 12 is the power plant 1I as claimed in claim 8 or 9, wherein the second rotor and the first element are mechanically connected to the first output portion of the heat engine, and the first rotor and the second element are mechanically connected to the driven parts, and the power plant further comprising a transmission 131 for changing speed of motive power from the first rotor and transmitting the motive power to the driven parts.

With this arrangement, the second rotor and the first element are mechanically connected to the first output portion of the heat engine, while the first rotor and the second element are mechanically connected to the driven parts, and the transmission transmits the motive power from the first rotor to the driven parts while changing the speed of the motive power. Therefore, e.g. during transmission of motive power to the driven parts, described above with reference to FIG. 77, when the load on the driven parts is very large, by controlling the transmission ratio of the transmission toward the lower-speed side, torque transmitted from the first rotor to the transmission can be reduced with respect to the torque transmitted from the transmission to the driven parts. This makes it possible to reduce the size of the first rotor, which in turn makes it possible to further reduce the size and costs of the first rotating machine.

Further, for example, when the speed of the driven parts is very high, by controlling the transmission ratio of the transmission toward the higher-speed side, it is possible to lower the first rotor rotational speed VR1 with respect to the speed of the driven parts, so that it is possible to prevent failure of the first rotating machine from being caused by the first rotor rotational speed VR1 becoming too high. This is particularly effective because the first rotor is formed by magnets, as described hereinabove, and hence the above-mentioned inconveniences are liable to occur. Furthermore, by controlling the transmission ratio of the transmission, the first rotor rotational speed VR1 can be controlled to an appropriate speed with respect to the speed of the driven parts, whereby it is possible to obtain high efficiency of the first rotating machine.

Further, as described above as to the operation of claim 11, when the first output portion of the heat engine is connected to the driven parts via a gear-type stepped transmission, during the speed-changing operation of the transmission, a speed-change shock is liable to occur. According to the present invention, for example, the second element can be connected to the driven parts without via such a stepped transmission and therefore, whereby even when the stepped transmission is used as a transmission for transmitting motive power from the first rotor to the driven parts, part of torque from the heat engine can be transmitted to the driven parts via the first and second elements during the speed-changing operation of the transmission, as is apparent from FIG. 77. This enables the above-described speed-change shock to be suppressed, and hence it is possible to improve marketability.

Further, for example, as described above as to the operation of claim 8, by using the first rotating machine, the differential and the second rotating machine, it is possible to transmit the motive power from the heat engine to the driven parts while steplessly changing the speed thereof, and hence it is possible to reduce the frequency of the speed-changing operation of the transmission. This makes it possible to enhance the driving efficiency of the power plant, similarly to the power plant as claimed in claim 10.

The invention as claimed in claim 13 is the power plant 1J as claimed in claim 8 or 9, wherein the second rotor and the first element are mechanically connected to the first output portion of the heat engine, and the first rotor and the second element are mechanically connected to the driven parts, the power plant further comprising a transmission 141 for changing speed of motive power from the second output portion of the second rotating machine and transmitting the motive power to the third element.

With this arrangement, the second rotor and the first element are mechanically connected to the first output portion of the heat engine, and the first rotor and the second element are mechanically connected to the driven parts. The transmission transmits the motive power from the second output portion of the second rotating machine to the third element while changing the speed of the motive power. Therefore, e.g. during the transmission of motive power to the driven parts, described above with reference to FIG. 77, when the load on the driven parts is very large, by controlling the transmission ratio of the transmission toward the lower-speed side, torque transmitted from the second rotating machine to the transmission can be reduced with respect to the torque transmitted from the transmission to the driven parts via the third and second elements. This makes it possible to further reduce the size and costs of the second rotating machine.

Further, when the speed of the driven parts is higher than the rotational speed of the heat engine, as is apparent from FIG. 78, the rotational speed of the second rotating machine sometimes becomes too high. Therefore, in such a case, for example, by controlling the transmission ratio of the transmission toward the higher-speed side, it is possible to lower the rotational speed of the second rotating machine with respect to the third element rotational speed V3 which is determined by the relationship between the speed of the driven parts and the rotational speed of the heat engine, so that it is possible to prevent failure of the second rotating machine from being caused by the rotational speed of the second rotating machine becoming too high. Furthermore, by controlling the transmission ratio of the transmission, the rotational speed of the second rotating machine can be controlled to an appropriate speed with respect to the third element rotational speed V3 which is determined by the relationship between the speed of the driven parts and the rotational speed of the heat engine, assumed at the time, thereby making it possible to obtain high efficiency of the second rotating machine.

Further, as described above as to the operation of claim 11, when connecting the first output portion of the heat engine to the driven parts via a gear-type stepped transmission, a speed-change shock is liable to occur during the speed-changing operation of the transmission. According to the present invention, for example, the first rotor can be connected to the driven parts without via such a stepped transmission, whereby even when the stepped transmission is used as a transmission for transmitting motive power from the second rotating machine to the third element, part of torque from the heat engine can be transmitted to the driven parts via the second and first rotors during the speed-changing operation of the transmission, as is apparent from FIG. 77. Therefore, the above-described speed-change shock can be suppressed, which makes it possible to improve marketability.

Further, for example, as described above as to the operation of claim 8, by using the first rotating machine, the differential and the second rotating machine, the motive power from the heat engine can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 14 is the power plant 1K as claimed in claim 8 or 9, wherein the second rotor and the first element are mechanically connected to the first output portion of the heat engine, and the first rotor and the second element are mechanically connected to the driven parts, the power plant further comprising a transmission 151 for changing speed of motive power from the second element and transmitting the motive power to the driven parts.

With this arrangement, the second rotor and the first element are mechanically connected to the first output portion of the heat engine, and the first rotor and the second element are mechanically connected to the driven parts. The transmission transmits motive power from the second element to the driven parts while changing the speed of the power. Therefore, e.g. during the transmission of motive power to the driven parts, described above with reference to FIG. 77, when the load on the driven parts is very large, by controlling the transmission ratio of the transmission toward the lower-speed side, torque transmitted from the second element to the transmission can be reduced with respect to the torque transmitted from the transmission to the driven parts, which in turn makes it possible to reduce the torque combined via the first and third elements of the differential. Therefore, it is possible to reduce the sizes and costs of the differential and the second rotating machine.

Further, when the speed of the driven parts is higher than the rotational speed of the heat engine, as is apparent from FIG. 78, the rotational speed of the second rotating machine sometimes becomes too high. Therefore, in such a case, for example, by controlling the transmission ratio of the transmission toward the higher-speed side, it is possible to lower the second element rotational speed V2 with respect to the speed of the driven parts, thereby making it possible to lower the rotational speed of the second rotating machine, as is apparent from FIG. 78. Therefore, it is possible to prevent failure of the second rotating machine from being caused by the rotational speed of the second rotating machine becoming too high. Furthermore, by controlling the transmission ratio of the transmission, for example, the second element rotational speed V2 is increased or decreased with respect to the speed of the driven parts, whereby as is apparent from FIG. 78, the rotational speed of the second rotating machine can be controlled to an appropriate speed, thereby making it possible to obtain high efficiency of the second rotating machine.

Further, as described above as to the operation of claim 11, when connecting the first output portion of the heat engine to the driven parts via a gear-type stepped transmission, a speed-change shock is liable to occur during the speed-changing operation of the transmission. According to the present invention, for example, the first rotor can be connected to the driven parts without via such a stepped transmission, whereby even when the stepped transmission is used as a transmission for transmitting motive power from the second element to the driven parts, it is possible, as is apparent from FIG. 77, to transmit part of torque from the heat engine to the driven parts via the second and first rotors during the speed-changing operation of the transmission. Therefore, since the above-described speed-change shock can be suppressed, it is possible to improve marketability.

Further, for example, as described above as to the operation of claim 8, by using the first rotating machine, the differential and the second rotating machine, the motive power from the heat engine can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 15 is the power plant 1L as claimed in claim 8 or 9, wherein the second rotor and the first element are mechanically connected to the first output portion of the heat engine, the first rotor and the second element being mechanically connected to the driven parts, the power plant further comprising a planetary gear unit (second planetary gear unit PS2) including a sun gear (second sun gear S2), a ring gear (second ring gear R2), and a carrier (second carrier C2) rotatably supporting planetary gears (second planetary gears P2) in mesh with the sun gear and the ring gear, a first clutch CL1, and a second clutch CL2, wherein one of the sun gear and the ring gear is mechanically connected to the second element, wherein the carrier is mechanically connected to the third element, and is mechanically connected to the second output portion of the second rotating machine via the first clutch CL1, and wherein the other of the sun gear and the ring gear is mechanically connected to the second output portion via the second clutch CL2.

With this arrangement, the second rotor and the first element are mechanically connected to the first output portion of the heat engine, and the first rotor and the second element are mechanically connected to the driven parts. Further, one of the sun gear and the ring gear of the planetary gear unit (hereinafter referred to as the "one gear") is mechanically connected to the second element connected to the driven parts, and the carrier is mechanically connected to the third element. The carrier is mechanically connected to the second output portion of the second rotating machine via the first clutch. Furthermore, the other of the sun gear and the ring gear (hereinafter referred to as the "other gear") is mechanically connected to the second output portion of the second rotating machine via the second clutch. Thus, the second output portion of the second rotating machine is mechanically connected to the third element via the first clutch and the carrier, and is mechanically connected to the third element via the second clutch, the other gear, the planetary gears, and the carrier.

Now, the rotational speed of the one gear is referred to as the "first gear rotational speed VG1", the rotational speed of the other gear as the "second gear rotational speed VG2", and the rotational speed of the carrier as the "carrier rotational speed VC". In the above-described connection relationship, when the rotary elements are directly connected to each other, and at the same time the first clutch is engaged to thereby connect the second output portion of the second rotating machine to the carrier while the second clutch is disengaged to thereby disconnect between the second output portion and the other gear (hereinafter, such a first clutch-engaged and second clutch-disengaged state is referred to as "the first speed change mode"), the relationship between the rotational speed of the heat engine, the speed of the driven parts, etc. is expressed e.g. as shown in FIG. 85(*a*). Further, when the first clutch is disengaged to thereby disconnect between the second output portion of the second rotating machine and the carrier while the second clutch is engaged to thereby connect the second output portion to the other gear (hereinafter, such a first clutch-disengaged and second clutch-engaged state is referred to as "the second speed change mode"), the relationship between the rotational speed of the heat engine, the speed of the driven parts, etc. is expressed e.g. as shown in FIG. 85(*b*).

It should be noted that as described hereinabove, the first rotating machine according to the present invention has the same functions as the first rotating machine as claimed in claim 1 does, and hence as is clear from the aforementioned equation (25), the relationship between the magnetic field rotational speed VF, the first rotor rotational speed VR1 and the second rotor rotational speed VR2 is expressed by an equation $VF=(\alpha+1) VR2 - \alpha \cdot VR1$. Therefore, in the velocity nomograph illustrated in FIG. 85, the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is $1:(1/\alpha)$. Further, the distance from a vertical line representing the first gear rotational speed VG1 to a vertical line representing the carrier rotational speed VC is represented by Y, and the distance from a vertical line representing the carrier rotational speed VC to a vertical line representing the second gear rotational speed VG2 is represented by Z.

As is clear from a comparison between FIGS. 85(*a*) and 85(*b*), in the velocity nomograph, the distance between a vertical line representing the speed of the driven parts and a vertical line representing the rotational speed of the second rotating machine is shorter in the first speed change mode than in the second speed change mode, and therefore a ratio (D2/D1) between a speed difference D2 between the second output portion of the second rotating machine and the driven parts and a speed difference D1 between the driven parts and the heat engine is smaller in the first speed change mode. Further, when the speed of the driven parts is higher than the rotational speed of the heat engine, the rotational speed of the second rotating machine becomes higher than the speed of the driven parts, and sometimes becomes too high. Therefore, in such a case, for example, by using the first speed change mode, as is clear from the relationship of the above-described ratio between the speed differences D1 and D2, the rotational speed of the second rotating machine can be made smaller than when the second speed change mode is used, and hence it is possible to prevent failure of the second rotating machine from being caused by the rotational speed of the second rotating machine becoming too high.

Further, in such a case where the torque demanded of the second rotating machine becomes large, as described above with reference to FIG. 80, when the first speed change mode is used, the relationship between the driving equivalent torque Te, the heat engine torque THE, the driven part-transmitted torque TOUT, and the second rotating machine torque TM2 is shown e.g. in FIG. 86(a). Further, the torque demanded of the second rotating machine, i.e. the second rotating machine torque TM2 is represented by the following equation (39):

$$TM2=-\{THE+[(1/\alpha)+1]TOUT\}/[Y+((1/\alpha)+1] \quad (39)$$

On the other hand, when the second speed change mode is used, the relationship between the driving equivalent torque Te, the heat engine torque THE, the driven part-transmitted torque TOUT, and the second rotating machine torque TM2 is shown e.g. in FIG. 86(b). Further, the second rotating machine torque TM2 is represented by the following equation (40):

$$TM2=-\{THE+[(1/\alpha)+1]TOUT\}/[Z+Y+((1/\alpha)+1] \quad (40)$$

As is clear from a comparison between the above-described equations (39) and (40), the torque TM2 of the second rotating machine is smaller in the second speed change mode with respect to the driven part-transmitted torque TOUT and the torque THE of the heat engine assuming that the respective magnitudes thereof are unchanged. Therefore, for example, in such a case where the torque demanded of the second rotating machine becomes large, as mentioned above, by using the second speed change mode, it is possible to reduce the second rotating machine torque TM2, which in turn makes it possible to further reduce the size and costs of the second rotating machine.

Further, for example, by selecting the first or second speed change mode according to the rotational speed of the heat engine and the speed of the driven parts, it is possible to control the rotational speed of the second rotating machine to an appropriate speed, thereby making it possible to obtain high efficiency of the second rotating machine. Furthermore, by performing switching between the first and second speed change modes when the carrier rotational speed VC and the second gear rotational speed VG2 are equal to each other, as illustrated in FIG. 87, it is possible to smoothly perform the switching while maintaining the respective rotations of the driven parts and the heat engine, thereby making it possible to ensure excellent drivability.

Further, for example, the first rotor can be connected to the driven parts without via the gear-type stepped transmission, whereby during switching between the first and second speed change modes, even if both the first and second clutches are disengaged to disconnect between the second rotating machine and the driven parts, as is apparent from FIG. 77, part of the torque THE of the heat engine can be transmitted to the driven parts via the second and first rotors. Therefore, during switching between the first and second speed change modes, it is possible to suppress a speed-change shock, thereby making it possible to enhance marketability.

The invention as claimed in claim 16 is the power plant 1Q as claimed in claim 8 or 9, wherein the first rotor and the second element are mechanically connected to the first output portion of the heat engine, and the second rotor and the first element are mechanically connected to the driven parts, the power plant further comprising a transmission 181 for changing speed of motive power transmitted between the second output portion of the second rotating machine and the third element.

With this arrangement, the first rotor and the second element are mechanically connected to the first output portion of the heat engine, the second rotor and the first element are mechanically connected to the driven parts, and the transmission changes the speed of the motive power transmitted between the second output portion of the second rotating machine and the third element. Therefore, e.g. during transmission of the motive power to the driven parts, described above with reference to FIG. 81, when the load on the driven parts is very large, so that very large torque is transmitted to the second rotating machine via the differential, the transmission ratio of the transmission is controlled in a direction in which the motive power transmitted to the second rotating machine is increased. This makes it possible to reduce the torque transmitted from the transmission to the second rotating machine with respect to torque transmitted from the third element to the transmission, and hence it is possible to reduce the size and costs of the second rotating machine.

Further, in this case, even when the speed-changing operation as described above is performed by the transmission, the magnitude itself of the motive power transmitted from the third element to the second rotating machine is not changed, and when electric power generated by the second rotating machine is transmitted as motive power to the second rotor via the stator, the torque transmitted to the driven parts via the second rotor can be controlled to a desired magnitude. This makes it possible to transmit torque having a sufficient magnitude to the driven parts.

Furthermore, when the rotational speed of the heat engine is higher than the speed of the driven parts, as is apparent from FIG. 82, the rotational speed of the second rotating machine sometimes becomes too high. Therefore, in such a case, for example, by controlling the transmission ratio of the transmission in a direction in which the motive power transmitted to the second rotating machine is reduced, the rotational speed of the second rotating machine can be lowered with respect to the third element rotational speed V3 which is determined by the relationship between the rotational speed of the heat engine and the speed of the driven parts, assumed at the time, and hence it is possible to prevent failure of the second rotating machine from being caused by the rotational speed of the second rotating machine becoming too high. Further, by controlling the transmission ratio of the transmission, the rotational speed of the second rotating machine can be controlled to an appropriate speed with respect to the third element rotational speed V3 which is determined by the relationship between the rotational speed of the heat engine and the speed of the driven parts, assumed at the time, thereby making it possible to obtain high efficiency of the second rotating machine.

Further, during the transmission of the motive power to the driven parts, described above with reference to FIG. 81, the torque from the heat engine transmitted to the second element is transmitted to the driven parts via the first element by using load torque acting on the third element along with electric power generation by the second rotating machine, as a reaction force. Therefore, when the gear-type stepped transmission is used as the transmission of the present invention, the third element and the second rotating machine are disconnected from each other by the speed-changing operation of the transmission, whereby the load torque from the second rotating machine ceases to act on the third element. As a consequence, the torque transmitted from the heat engine via the second and first elements becomes very small. According to the present invention, the second rotor can be connected to the driven parts without via the gear-type stepped transmission, for example, whereby during the speed-changing operation of the transmission, as is apparent from FIG. 81, part of the torque from the heat engine can be transmitted to the driven parts via the first and second rotors. This makes it possible to suppress a speed-change shock, such as a sudden decrease in torque, and therefore it is possible to enhance marketability.

Further, for example, as described above as to the operation of claim 8, the motive power from the heat engine can be transmitted to the driven parts while having the speed thereof steplessly changed by using the first rotating machine, the differential and the second rotating machine, and hence it is possible to reduce the frequency of the speed-changing operation of the transmission. This makes it possible to enhance the driving efficiency of the power plant, similarly to the power plant as claimed in claim 10.

The invention as claimed in claim 17 is the power plant 1R as claimed in claim 8 or 9, wherein the first rotor and the second element are mechanically connected to the first output portion of the heat engine, and the second rotor and the first element are mechanically connected to the driven parts, the power plant further comprising a transmission 191 for transmitting the motive power from the first element to the driven parts while changing the speed of the motive power.

With this arrangement, the first rotor and the second element are mechanically connected to the first output portion of the heat engine, and the second rotor and the first element are mechanically connected to the driven parts. The transmission transmits the motive power from the first element to the driven parts while changing the speed of the motive power. As a consequence, e.g. during the transmission of the motive power to the driven parts, described above with reference to FIG. 81, when the load on the driven parts is very large, by controlling the transmission ratio of the transmission toward the lower-speed side, the torque transmitted from the first element to the transmission can be reduced with respect to the torque transmitted from the transmission to the driven parts, whereby it is possible to reduce the sizes and costs of the differential and the second rotating machine.

Further, for example, when the rotational speed of the heat engine is higher than the speed of the driven parts, as is apparent from FIG. 82, the rotational speed of the second rotating machine sometimes becomes too high. Therefore, in such a case, for example, by controlling the transmission ratio of the transmission toward the lower-speed side and thereby increasing the first element rotational speed V1 with respect to the speed of the driven parts, as is apparent from FIG. 82, it is possible to lower the rotational speed of the second rotating machine, so that it is possible to prevent failure of the second rotating machine from being caused by the rotational speed of the second rotating machine becoming too high. Furthermore, by controlling the transmission ratio of the transmission, the first element rotational speed V1 is increased or decreased with respect to the speed of the driven parts, whereby as is apparent from FIG. 82, the rotational speed of the second rotating machine can be controlled to an appropriate speed, thereby making it possible to obtain high efficiency of the second rotating machine.

Further, as described above as to the operation of claim 11, when the first output portion of the heat engine is connected to the driven parts via a gear-type stepped transmission, during the speed-changing operation of the transmission, a speed-change shock is liable to occur. According to the present invention, for example, the second rotor can be connected to the driven parts without via such a stepped transmission, whereby even when the stepped transmission is used as a transmission for transmitting motive power from the first element to the driven parts, part of torque from the heat engine can be transmitted to the driven parts via the first and second rotors during the speed-changing operation of the transmission, as is apparent from FIG. 81. Therefore, since the above-described speed-change shock can be suppressed, it is possible to improve marketability.

Further, for example, as described above as to the operation of claim 8, the motive power from the heat engine can be transmitted to the driven parts while having the speed thereof steplessly changed by using the first rotating machine, the differential and the second rotating machine, and hence it is possible to reduce the frequency of the speed-changing operation of the transmission. This makes it possible to enhance the driving efficiency of the power plant, similarly to the power plant as claimed in claim 10.

The invention as claimed in claim 18 is the power plant 1S as claimed in claim 8 or 9, wherein the first rotor and the second element are mechanically connected to the first output portion of the heat engine, and the second rotor and the first element are mechanically connected to the driven parts, the power plant further comprising a planetary gear unit (second planetary gear unit PS2) including a sun gear (second sun gear S2), a ring gear (second ring gear R2), and a carrier (second carrier C2) rotatably supporting planetary gears (second planetary gears P2) in mesh with the sun gear and the ring gear, a first clutch CL1, and a second clutch CL2, wherein one of the sun gear and the ring gear is mechanically connected to the second element, wherein the carrier is mechanically connected to the third element and is mechanically connected to the second output portion of the second rotating machine via the first clutch CL1, and wherein the other of the sun gear and the ring gear is mechanically connected to the second output portion via the second clutch CL2.

With this arrangement, the first rotor and the second element are mechanically connected to the first output portion of the heat engine, and the second rotor and the first element are mechanically connected to the driven parts. Further, one of the sun gear and the ring gear of the planetary gear unit, that is, the one gear is mechanically connected to the second element connected to the heat engine, and the carrier is mechanically connected to the third element and is mechanically connected to the second output portion of the second rotating machine via the first clutch. Furthermore, the other of the sun gear and the ring gear, that is, the other gear is mechanically connected to the second output portion of the second rotating machine via the second clutch. As described above, the second output portion of the second rotating machine is mechanically connected to the third element via the first clutch and the carrier, and is mechanically connected to the third element via the second clutch, the other clutch, the planetary gears and the carrier.

Now, similarly to the case of claim 15, the rotational speed of the one gear is referred to as the first gear rotational speed VG1, the rotational speed of the other gear as the second gear rotational speed VG2, and the rotational speed of the carrier as the carrier rotational speed VC. In the above-described connection relationship, when the rotary elements are directly connected to each other, and at the same time the first clutch is engaged to thereby connect the second output portion of the second rotating machine to the carrier while the second clutch is disengaged to thereby disconnect between the second output portion and the other gear, the relationship between the rotational speed of the heat engine, the speed of the driven parts, etc. is expressed e.g. as shown in FIG. 88(*a*). Hereinafter, such a first clutch-engaged and second clutch-disengaged state is referred to as "the first speed change mode", similarly to the case of claim 15. Further, when the first clutch is disengaged to thereby disconnect between the second output portion of the second rotating machine and the carrier while the second clutch is engaged to thereby connect the second output portion to the other gear, the relationship between the rotational speed of the heat engine, the speed of the driven parts, etc. is expressed e.g. as shown in FIG. 88(*b*). Hereinafter, such a first clutch-disengaged and second clutch-engaged state is referred to as "the second speed change mode", similarly to the case of claim 15.

It should be noted that similarly to the case of claim 15, in the velocity nomograph in FIG. 88, the ratio between the distance from a vertical line representing the magnetic field rotational speed VF to a vertical line representing the second rotor rotational speed VR2, and the distance from the vertical line representing the second rotor rotational speed VR2 to a vertical line representing the first rotor rotational speed VR1 is 1:(1/α). Furthermore, in FIG. 88, the distance from a vertical line representing the first gear rotational speed VG1 to a vertical line representing the carrier rotational speed VC is represented by Y, and the distance from the vertical line representing the carrier rotational speed VC to a vertical line representing the second gear rotational speed VG2 is represented by Z.

As is clear from a comparison between FIGS. 88(*a*) and 88(*b*), in the velocity nomograph, the distance between a vertical line representing the speed of the driven parts and a vertical line representing the rotational speed of the second rotating machine is shorter in the first speed change mode than in the second speed change mode, and therefore a ratio (D2/D1) between a speed difference D2 between the second output portion of the second rotating machine and the driven parts and a speed difference D1 between the heat engine and the driven parts is smaller in the first speed change mode. Further, when the rotational speed of the heat engine is higher than the speed of the driven parts, the rotational speed of the second rotating machine becomes higher than the speed of the driven parts, and sometimes becomes too high. Therefore, in such a case, for example, by using the first speed change mode, as is clear from the relationship of the above-described ratio between the speed differences D2 and D1, the rotational speed of the second rotating machine can be made smaller than when the second speed change mode is used, and hence it is possible to prevent failure of the second rotating machine from being caused by the rotational speed of the second rotating machine becoming too high.

Further, in such a case where the torque demanded of the second rotating machine becomes large, as described above with reference to FIG. 83, when the first speed change mode is used, the relationship between the driving equivalent torque Te, the heat engine transmitting torque TDHE, the driven part-transmitted torque TOUT, and the second rotating machine torque TM2 is shown e.g. as in FIG. 89(*a*). Further, the torque demanded of the second rotating machine, i.e. the second rotating machine torque TM2 is represented by the following equation (41):

$$TM2 = -\{TOUT + [(1/\alpha)+1]TDHE\}/[Y+((1/\alpha)+1]] \quad (41)$$

On the other hand, when the second speed change mode is used, the relationship between the driving equivalent torque Te, the heat engine transmitting torque TDHE, the driven part-transmitted torque TOUT, and the second rotating machine torque TM2 is shown e.g. as in FIG. 89(*b*). Further, the second rotating machine torque TM2 is represented by the following equation (42):

$$TM2 = -\{TOUT + [(1/\alpha)+1]TDHE\}/[Z+Y+(1/\alpha)+1] \quad (42)$$

As is clear from a comparison between the above-described equations (41) and (42), the second rotating machine torque TM2 is smaller in the second speed change mode with respect to the heat engine transmitting torque TDHE and the driven part-transmitted torque TOUT assuming that the respective magnitudes thereof are unchanged. Therefore, for example, in such a case as the torque demanded of the second rotating machine becomes large, as described above, by using the second speed change mode, it is possible to reduce the second rotating machine torque TM2, which in turn makes it possible to further reduce the size and costs of the second rotating machine.

Further, for example, by selecting the first or second speed change mode according to the rotational speed of the heat engine and the speed of the driven parts, it is possible to control the rotational speed of the second rotating machine to an appropriate speed, thereby making it possible to obtain high efficiency of the second rotating machine. Furthermore, similarly to the case of claim 15, by performing switching between the first and second speed change modes when the carrier rotational speed VC and the second gear rotational speed VG2 are equal to each other, it is possible to smoothly perform the switching while maintaining the respective rotations of the driven parts and the heat engine, thereby making it possible to ensure excellent drivability.

Further, similarly to the case of claim 16, during the transmission of the motive power from the heat engine to the driven parts, described above with reference to FIG. 81, the torque THE of the heat engine transmitted to the second element is transmitted to the driven parts via the first element by using load torque acting on the third element along with electric power generation by the second rotating machine, as a reaction force. Therefore, during switching between the first and second speed change modes, if both the first and second clutches are disengaged, the third element and the second rotating machine are disconnected from each other, whereby the load torque from the second rotating machine ceases to act on the third element. As a consequence, the torque THE of the heat engine transmitted via the second and first elements becomes very small. According to the present invention, the second rotor can be connected to the driven parts without via the gear-type stepped transmission, for example, whereby even if both the first and second clutches are disengaged, as is apparent from FIG. 81, part of the torque THE of the heat engine can be transmitted to the driven parts via the first and second rotors. This makes it possible to suppress a speed-change shock, such as a sudden decrease in torque, and therefore it is possible to enhance marketability.

The invention as claimed in claim 19 is the power plant 11 as claimed in claim 8 or 9, wherein the first rotor and the second element are mechanically connected to the first output portion of the heat engine, and the second rotor and the first element are mechanically connected to the driven parts, the power plant further comprising a transmission 201 for changing speed of motive power from the second rotor and transmitting the motive power to the driven parts.

With this arrangement, the first rotor and the second element are mechanically connected to the first output portion of the heat engine, and the second rotor and the first element are mechanically connected to the driven parts. The transmission transmits the motive power from the second rotor to the driven parts while changing the speed of the motive power. As a consequence, e.g. during the transmission of motive power to the driven parts, described above with reference to FIG. 81, when the load on the driven parts is very large, by controlling the transmission ratio of the transmission toward the lower-speed side, the torque transmitted from the second rotor to the transmission can be reduced with respect to the torque transmitted from the transmission to the driven parts, whereby it is possible to reduce the size of the second rotor, which in turn makes it possible to further reduce the size and costs of the first rotating machine.

Further, for example, when the speed of the driven parts is very high, by controlling the transmission ratio of the transmission toward the higher-speed side, it is possible to lower the second rotor rotational speed VR2 with respect to the speed of the driven parts, so that it is possible to prevent failure of the first rotating machine from being caused by the second rotor rotational speed VR2 from becoming too high. Furthermore, by controlling the transmission ratio of the transmission, the second rotor rotational speed VR2 can be controlled to an appropriate speed with respect to the speed of the driven parts, whereby it is possible to obtain high efficiency of the first rotating machine.

Further, as described concerning the operation of claim 11, when the first output portion of the heat engine is connected to the driven parts via a gear-type stepped transmission, a speed-change shock is liable to occur during the speed-changing operation of the transmission. According to the present invention, for example, the first element can be connected to the driven parts without via such a stepped transmission and therefore, even when the stepped transmission is used as a transmission for transmitting motive power from the second rotor to the driven parts, as is apparent from FIG. 81, part of torque from the heat engine can be transmitted to the driven parts via the second and first elements during the speed-changing operation of the transmission. Therefore, since the above-described speed-change shock can be suppressed, it is possible to improve marketability.

Further, for example, as described above as to the operation of claim 8, by using the first rotating machine, the differential and the second rotating machine, the motive power from the heat engine can be transmitted to the driven parts while having the speed thereof steplessly changed, and hence it is possible to reduce the frequency of the speed-changing operation of the transmission. This makes it possible to enhance the driving efficiency of the power plant, similarly to the power plant as claimed in claim 10.

The invention as claimed in claim 20 is the power plant 1M, 1U as claimed in any one of claims 8 to 19, further comprising a brake mechanism BL for blocking reverse rotation of the first output portion of the heat engine.

With this arrangement, the reverse rotation of the first output portion of the heat engine is blocked by the brake mechanism, and in accordance therewith, one of a pair of the first rotor and the second element and a pair of the second rotor and the first element, which are connected to the first output portion, is prevented from rotating in one direction. Hereinafter, the operation and effects of the present invention will be described, first, as to the first power plant in which the second rotor and first element are connected to the first output portion of the heat engine, and the first rotor and the second element are connected to the driven parts. Further, the directions of rotations of the second rotor and the first element, which are blocked by the brake mechanism, are referred to as the "second rotor-blocked direction" and the "first element-blocked direction", respectively. As is clear from the aforementioned functions of the first rotating machine, by supplying electric power to the stator, and thereby causing a rotating magnetic field generated along therewith to rotate in the same direction as the above-mentioned second rotor-blocked direction, it is possible to transmit all the electric power supplied to the stator to the first rotor as motive power, and further to the driven parts. Further, the differential has the same functions as those of the planetary gear unit as described hereinabove, and hence by supplying electric power to the second rotating machine and causing the second output portion of the second rotating machine to rotate in a direction opposite to the above-mentioned first element-blocked direction together with the third element, it is possible to transmit all the motive power from the second rotating machine to the second element, and further to the driven parts.

As described above, according to the first power plant, it is possible to drive the driven parts by the first rotating machine and/or the second rotating machine without using the motive power from the heat engine. Further, in this case, it is possible to drive the driven parts while preventing not only the reverse rotation of the first output portion of the heat engine by the brake mechanism but also the dragging of the heat engine by the following operation: Through the above-mentioned control of the direction of rotation of the rotating magnetic field, the driving equivalent torque Te from the stator acts on the second rotor so as to cause the second rotor to rotate in the second rotor-blocked direction, and through the above-mentioned control of the direction of rotation of the second output portion, the second rotating machine torque TM2 acts on the first element, via the third and second elements, so as to cause the first element to rotate in the first element-blocked direction. This causes, during the above-mentioned driving of the driven parts, the first output portion of the heat engine to be held stationary together with the second rotor and the first element, and hence the first output portion does not drag the heat engine.

The above-described effects can also be obtained by the second power plant in which the first rotor and the second element are connected to the first output portion of the heat engine, and the second rotor and the first element are connected to the driven parts. Hereinafter, the directions of rotations of the first rotor and the second element, blocked by the brake mechanism, are referred to as the "first rotor-blocked direction" and the "second element-blocked direction", respectively. Using the aforementioned functions of the first rotating machine, by supplying electric power to the stator and causing a rotating magnetic field generated along therewith to rotate in a direction opposite to the above-mentioned first rotor-blocked direction, it is possible to transmit all the electric power supplied to the stator, to the second rotor as motive power, and further to the driven parts. Further, since the differential has the same functions as those of the planetary gear unit, by supplying electric power to the second rotating machine and causing the second output portion of the second rotating machine to rotate in the same direction as the above-mentioned second element-blocked direction together with the third element, it is possible to transmit all the motive power from the second rotating machine to the first element, and further to the driven parts.

As described above, according to the second power plant, similarly to the first power plant, it is possible to drive the driven parts by the first rotating machine and/or the second rotating machine without using the motive power from the heat engine. Further, in this case, similarly to the first power plant, it is possible to drive the driven parts while preventing not only the reverse rotation of the first output portion of the heat engine by the brake mechanism but also the dragging of the heat engine by the following operation: Through the above-mentioned control of the direction of rotation of the rotating magnetic field, the driving equivalent torque Te from the stator acts on the first rotor so as to cause the first rotor to rotate in the first rotor-blocked direction, and through the above-mentioned control of the direction of rotation of the second output portion, the second rotating machine torque TM2 acts on the second element, via the third element, so as to cause the second element to rotate in the second element-blocked direction. This causes, during the above-mentioned driving of the driven parts, the first output portion of the heat engine to be held stationary together with the first rotor and the second element, and hence the first output portion does not drag the heat engine.

BRIEF DESCRIPTION OF THE DRAWINGS

[FIG. 2] A block diagram of a control system for controlling an engine, etc. appearing in FIG. 1.

[FIG. 15] A diagram illustrating an example of changes in the U-phase to W-phase counter-electromotive force voltages in the case where the A2 rotor of the first rotating machine in the present invention is held unrotatable.

[FIG. 16] A diagram illustrating an example of changes in the first driving equivalent torque and the A1 and A2 rotor-transmitted torques in the case where the A2 rotor of the first rotating machine in the present invention is held unrotatable.

[FIG. 19] A velocity nomograph illustrating an example of the relationship between the rotational speeds, such as the engine speed, of rotary elements of the power plant shown in FIG. 1 during the EV creep.

[FIG. 22] A velocity nomograph illustrating an example of the relationship between the rotational speeds of the various rotary elements of the power plant shown in FIG. 1 at the time of the ENG start during EV traveling.

[FIG. 42] A diagram showing an example of the relationship between the rotational speeds and torques of various rotary elements of the power plant shown in FIG. 40 at the start of the ENG start during EV traveling.

[FIG. 43] A diagram which is useful in explaining speed-changing operations by a first rotating machine and a rotating machine of the power plant shown in FIG. 40.

[FIG. 51] (a) A velocity nomograph illustrating an example of the relationship between a first sun gear rotational speed, a first carrier rotational speed and a first ring gear rotational speed, depicted together with a velocity nomograph illustrating an example of the relationship between a second sun gear rotational speed, a second carrier rotational speed and a second ring gear rotational speed; and (b) a velocity nomograph illustrating an example of the relationship between the rotational speeds of four rotary elements formed by connecting the first and second planetary gear units of the power plant shown in FIG. 50.

[FIG. 53] Velocity nomographs illustrating examples of the relationship between the rotational speeds of the various rotary elements of the power plant shown in FIG. 50, during (a) a first speed change mode and (b) a second speed change mode, respectively.

[FIG. 54] Diagrams illustrating examples of the relationship between the rotational speeds and torques of the various rotary elements of the power plant shown in FIG. 50 at the start of the rapid acceleration operation during the ENG traveling, in the respective cases of (a) the first speed change mode and (b) the second speed change mode.

[FIG. 67] Velocity nomographs illustrating examples of the relationship between the rotational speeds of the various rotary elements of the power plant shown in FIG. 64, during (a) the first speed change mode and (b) the second speed change mode, respectively.

[FIG. 68] Diagrams illustrating examples of the relationship between the rotational speeds and torques of the various rotary elements of the power plant shown in FIG. 64 at the start of the ENG start during EV traveling, in the respective cases of (a) the first speed change mode and (b) the second speed change mode.

[FIG. 73] A diagram which is useful in explaining an example of the operation of a power plant of the invention as claimed in claim 1.

[FIG. 88] Velocity nomographs illustrating examples of the relationship between the rotational speeds of various rotary elements of a power plant of the invention as claimed in claim 18, during (a) the first speed change mode and (b) the second speed change mode, respectively.

[FIG. 89] Diagrams illustrating examples of the relationship between the rotational speeds and torques of various rotary elements of the power plant of the invention as claimed in claim 18 when the heat engine is started during driving of the driven parts by the first and second rotating machines and at the same time in the respective cases of (a) the first speed change mode and (b) the second speed change mode.

DESCRIPTION OF EMBODIMENTS

Figure 1:
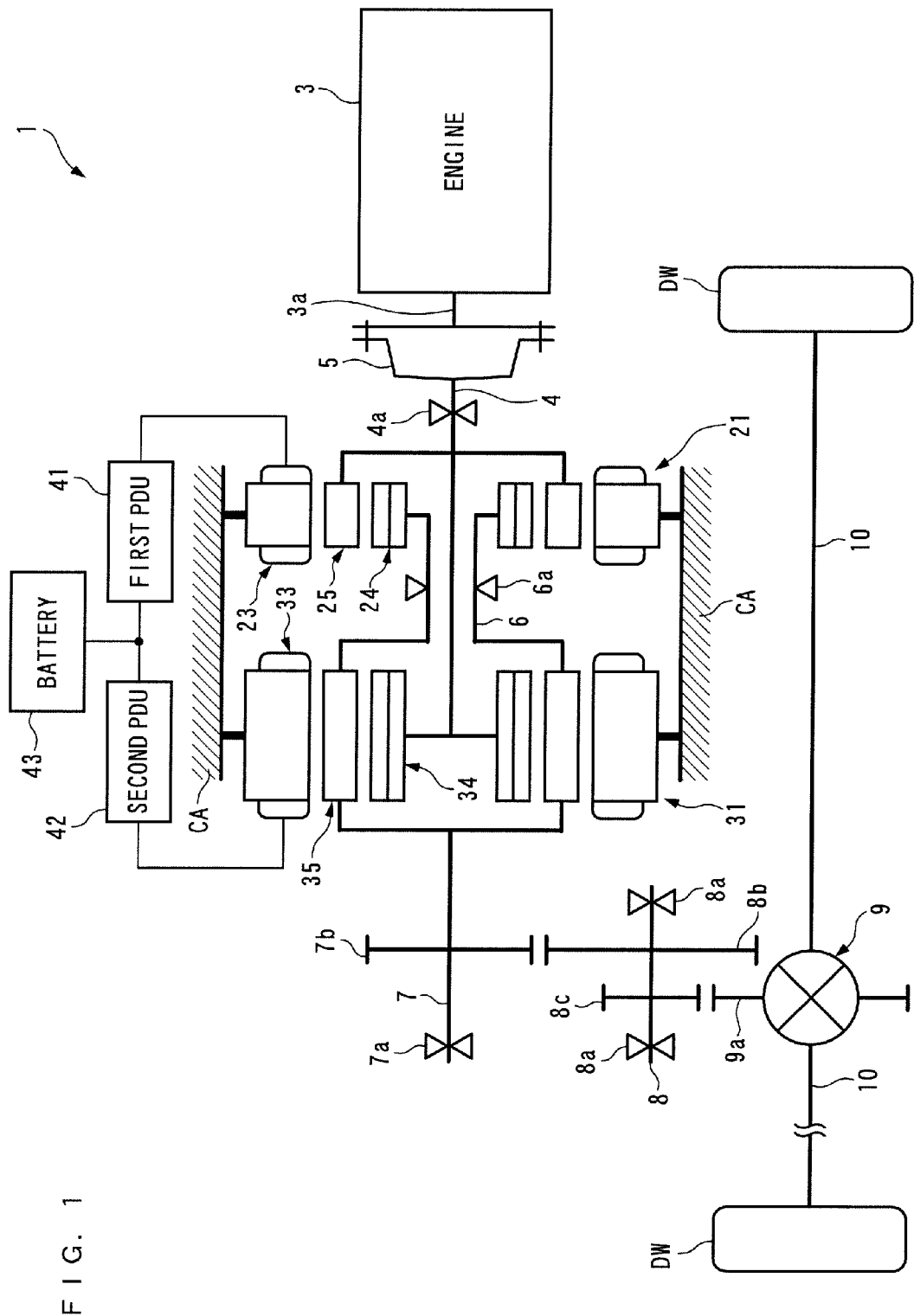
[FIG. 1] A schematic diagram of a power plant according to a first embodiment of the present invention.

The present invention will now be described in detail with reference to the drawings showing preferred embodiments thereof. It should be noted that in the figures, hatching in portions illustrating cross-sections are omitted for convenience, if appropriate. FIGS. 1 and 2 schematically shows a power plant 1 according to a first embodiment of the present invention. The power plant 1 is for driving left and right drive wheels DW and DW (driven parts) of a vehicle (not shown), and as shown in FIG. 1, includes an internal combustion engine 3 (heat engine), a first rotating machine 21 and a second rotating machine 31 as motive power sources, and a differential gear mechanism 9 connected to the drive wheels DW and DW via drive shafts 10 and 10. Further, as shown in FIG. 2, the power plant 1 includes an ECU 2, a first power drive unit (hereinafter referred to as the "first PDU") 41 and a second power drive unit (hereinafter referred to as the "second PDU") 42, for controlling the respective operations of the internal combustion engine 3 and the first and second rotating machines 21 and 31. The first and second rotating machines 21 and 31 also function as stepless transmissions, as will be described hereinafter.

The internal combustion engine (hereinafter referred to as the "engine") 3 is e.g. a gasoline engine, and has a crankshaft 3a to which is directly connected a first rotating shaft 4 rotatably supported by a bearing 4a, via a flywheel 5. Further, a connection shaft 6 and a second rotating shaft 7 are arranged concentrically with the first rotating shaft 4, and an idler shaft 8 is disposed in parallel with the first rotating shaft 4. The connection shaft 6, the second rotating shaft 7, and the idler shaft 8 are rotatably supported by bearings 6a, 7a, and 8a and 8a, respectively.

The connection shaft 6 is formed to be hollow, and the first rotating shaft 4 is rotatably fitted through the connection shaft 6. The idler shaft 8 is integrally formed with a first gear 8b and a second gear 8c. The first gear 8b is in mesh with a gear 7b integrally formed with the second rotating shaft 7, and the second gear 8c is in mesh with a gear 9a of the differential gear mechanism 9. With the above arrangement, the second rotating shaft 7 is connected to the drive wheels DW and DW via the idler shaft 8 and the differential gear mechanism 9. Hereinafter, the direction of circumference, the direction of axis, and the direction of radius, of the first rotating shaft 4, the connection shaft 6, and the second rotating shaft 7 are simply referred to as "the circumferential direction", "the axial direction", and "the radial direction", respectively.

Figure 3:
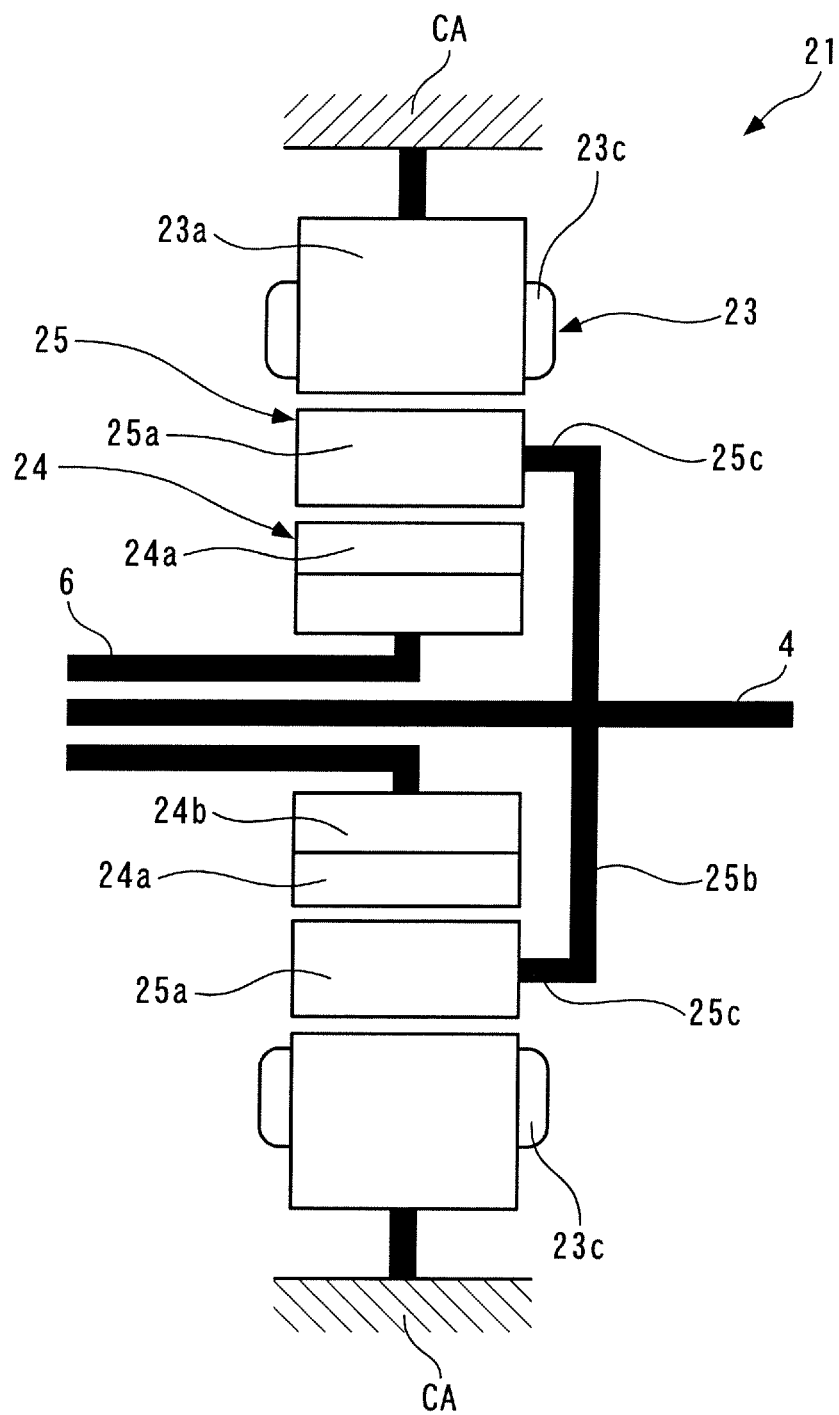
[FIG. 3] An enlarged cross-sectional view of the first rotating machine appearing in FIG. 1.

As shown in FIGS. 1 and 3, the first rotating machine 21 includes a stator 23, an A1 rotor 24 disposed in a manner opposed to the stator 23, and an A2 rotor 25 disposed between the two 23 and 24. The stator 23, the A2 rotor 25 and the A1 rotor 24 are arranged concentrically with each other in the radial direction from outside in the mentioned order. In FIG. 3, some of the elements, such as the first rotating shaft 4, are illustrated in a skeleton diagram-like manner for convenience of illustration.

Figure 4:
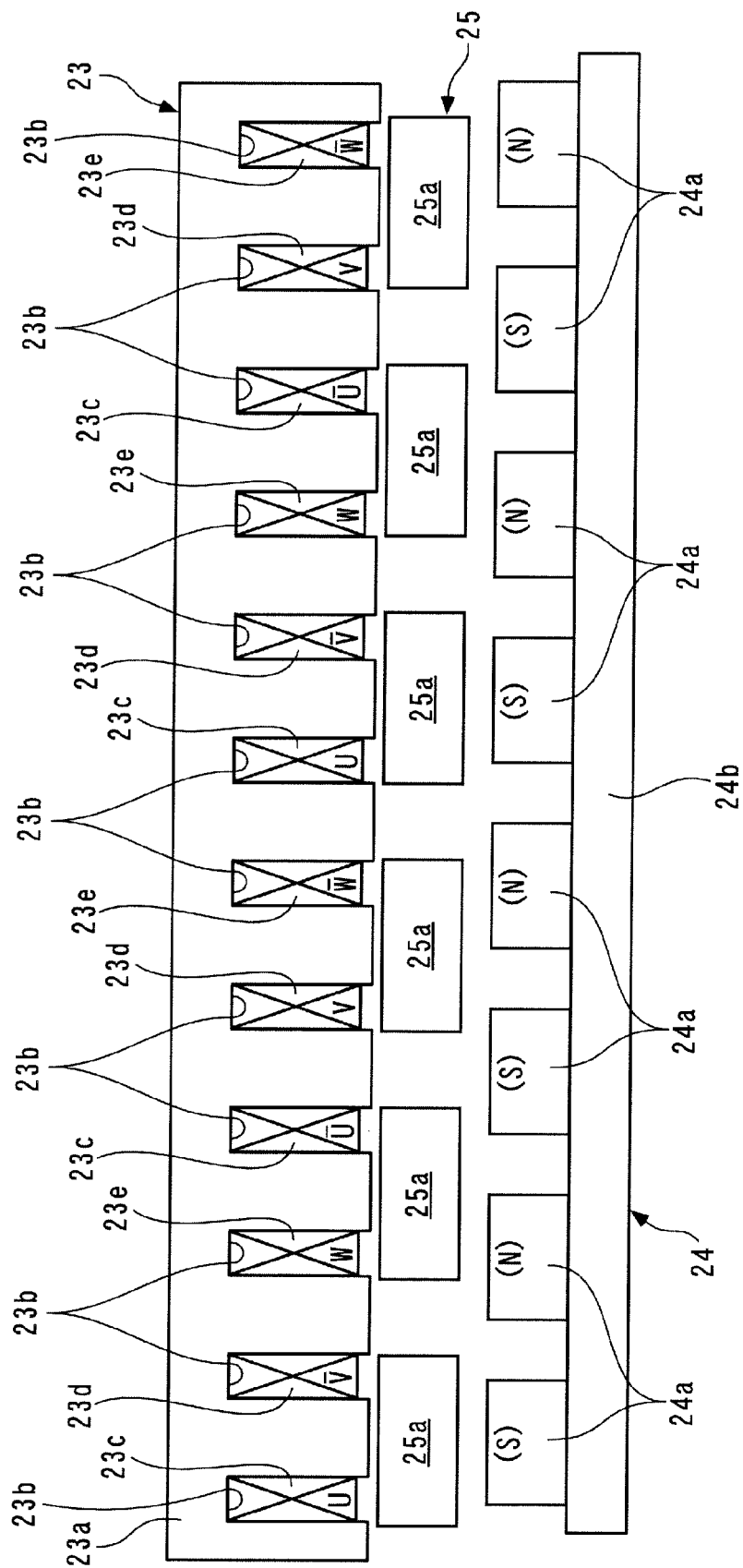
[FIG. 4] A schematic development view showing a stator and A1 and A2 rotors of the first rotating machine appearing in FIG. 1, in a state developed in the circumferential direction.

The aforementioned stator 23 is for generating a first rotating magnetic field, and as shown in FIGS. 3 and 4, includes an iron core 23a, and U-phase, V-phase and W-phase coils 23c, 23d and 23e provided on the iron core 23a. It should be noted that in FIG. 3, only the U-phase coil 23c is shown for convenience. The iron core 23a, which has a hollow cylindrical shape formed by laminating a plurality of steel plates, extends in the axial direction, and is fixed to an immovable casing CA. Further, the inner peripheral surface of the iron core 23a is formed with twelve slots 23b. The slots 23b extend in the axial direction, and are arranged at equally-spaced intervals in the circumferential direction. The U-phase to W-phase coils 23c to 23e are wound in the slots 23b by distributed winding (wave winding), and are connected to a battery 43 via the above-mentioned first PDU 41. The first PDU 41 is implemented as an electric circuit comprising an inverter, and is connected to the ECU 2 (see FIG. 2).

In the stator 23 constructed as above, when electric power is supplied from the battery 43, to thereby cause electric currents to flow through the U-phase to W-phase coils 23c to 23e, or when electric power is generated, as described hereinafter, four magnetic poles are generated at respective ends of the iron core 23a toward the A1 rotor 24 at equally-spaced intervals in the circumferential direction (see FIG. 6), and the first rotating magnetic field generated by the magnetic poles rotates in the circumferential direction. Hereinafter, the magnetic poles generated on the iron core 23a are referred to as the "first armature magnetic poles". Further, each two first armature magnetic poles which are circumferentially adjacent to each other have polarities different from each other. It should be noted that in FIG. 6 and other figures, referred to hereinafter, the first armature magnetic poles are represented by (N) and (S) over the iron core 23a and the U-phase to W-phase coils 23c to 23e.

As shown in FIG. 4, the A1 rotor 24 includes a first magnetic pole row comprising eight permanent magnets 24a. These permanent magnets 24a are arranged at equally-spaced intervals in the circumferential direction, and the first magnetic pole row is opposed to the iron core 23a of the stator 23. Each permanent magnet 24a extends in the axial direction, and the length thereof in the axial direction is set to the same length as that of the iron core 23a of the stator 23.

Further, the permanent magnets 24a are mounted on an outer peripheral surface of an annular fixed portion 24b. This fixed portion 24b is formed by a soft magnetic material, such as iron or a laminate of a plurality of steel plates, and has an inner peripheral surface thereof attached to the outer peripheral surface of an annular plate-shaped flange. The flange is integrally formed on the aforementioned connection shaft 6. Thus, the A1 rotor 24 including the permanent magnets 24a is rotatable in unison with the connection shaft 6. Further, the permanent magnets 24a are attached to the outer peripheral surface of the fixed portion 24b formed by the soft magnetic material, as described above, and hence a magnetic pole of (N) or (S) appears on an end of each permanent magnet 24a toward the stator 23. It should be noted that in FIG. 4 and other figures, referred to hereinafter, the magnetic poles of the permanent magnets 24a are denoted by (N) and (S). Further, each two permanent magnets 24a circumferentially adjacent to each other have polarities different from each other.

The A2 rotor 25 includes a first soft magnetic material element row formed by six cores 25a. These cores 25a are arranged at equally-spaced intervals in the circumferential direction, and the first soft magnetic material element row is disposed between the iron core 23a of the stator 23 and the first magnetic pole row of the A1 rotor 24, in a manner spaced therefrom by respective predetermined distances. Each core 25a is formed by a soft magnetic material, such as a laminate of a plurality of steel plates, and extends in the axial direction. Further, similarly to the permanent magnet 24a, the length of the core 25a in the axial direction is set to the same length as that of the iron core 23a of the stator 23. Furthermore, the core 25a is mounted on an outer end of a disk-shaped flange 25b via a hollow cylindrical connecting portion 25c slightly extending in the axial direction. This flange 25b is integrally formed on the aforementioned first rotating shaft 4. This arrangement makes the A2 rotor 25 including the cores 25a rotatable in unison with the first rotating shaft 4. It should be noted that in FIGS. 4 and 6, the connecting portion 25c and the flange 25b are omitted for convenience.

Now, a description will be given of the operation of the first rotating machine 21 constructed as described above. As described hereinabove, the first rotating machine 21 includes the four first armature magnetic poles, the eight magnetic poles of the permanent magnets 24a (hereinafter referred to as the "first magnetic poles"), and the six cores 25a. That is, the ratio between the number of the first armature magnetic poles, the number of the first magnetic poles, and the number of the cores 25a is set to 1:2.0:(1+2.0)/2. The ratio of the number of pole pairs of the first magnetic poles to the number of pole pairs of the first armature magnetic poles (hereinafter referred to as the "first pole pair number ratio α") is set to 2.0. As is clear from this configuration and the aforementioned equations (18) to (20), counter-electromotive force voltages, which are generated by the U-phase to W-phase coils 23c to 23e as the A1 rotor 24 and the A2 rotor 25 rotate with respect to the stator 23 (hereinafter referred to as the "U-phase counter-electromotive force voltage Vcu", the "V-phase counter-electromotive force voltage Vcv" and the "W-phase counter-electromotive force voltage Vcw", respectively), are expressed by the following equations (43), (44) and (45).

$$Vcu = -3 \cdot \psi F[(3 \cdot \omega ER2 - 2 \cdot \omega ER1)\sin(3 \cdot \theta ER2 - 2 \cdot \theta ER1)] \quad (43)$$

$$Vcv = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \quad (44)$$

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \quad (45)$$

In these equations, $\phi F$ represents the maximum value of magnetic fluxes of the first magnetic poles. Further, $\theta ER1$ represents an A1 rotor electrical angle, which is a value obtained by converting a rotational angular position of a specific permanent magnet 24a of the A1 rotor 24 with respect to a specific U-phase coil 23c (hereinafter referred to as the "first reference coil") to an electrical angular position. More specifically, the A1 rotor electrical angle $\theta ER1$ is a value obtained by multiplying the rotational angle position of the specific permanent magnet 24a (hereinafter referred to as the "A1 rotor rotational angle $\theta A1$") by a pole pair number of the first armature magnetic poles, i.e. a value of 2. Further, $\theta ER2$ represents an A2 rotor electrical angle, which is a value obtained by converting a rotational angle position of a specific core 25a of the A2 rotor 25 with respect to the aforementioned first reference coil to an electrical angular position. More specifically, the A2 rotor electrical angle $\theta ER2$ is a value obtained by multiplying the rotational angle position of this specific core 25a (hereinafter referred to as the "A2 rotor rotational angle $\theta A2$") by a pole pair number (value of 2) of the first armature magnetic poles.

Further, $\omega ER1$ in the equations (43) to (45) represents a value obtained by differentiating $\theta ER1$ with respect to time, i.e. a value obtained by converting an angular velocity of the A1 rotor 24 with respect to the stator 23 to an electrical angular velocity (hereinafter referred to as the "A1 rotor electrical angular velocity"). Furthermore, ωER2 represents a value obtained by differentiating θER2 with respect to time, i.e. a value obtained by converting an angular velocity of the A2 rotor 25 with respect to the stator 23 to an electrical angular velocity (hereinafter referred to as the "A2 rotor electrical angular velocity").

Further, as is clear from the aforementioned first pole pair number ratio α (=2.0) and the aforementioned equations (21) to (23), currents flowing through the respective U-phase, V-phase and W-phase coils 23c, 23d and 23e (hereinafter referred to as the "U-phase current Iu", the "V-phase current Iv" and the "W-phase current Iw") are expressed by the following equations (46), (47) and (48), respectively.

$$Iu = I \cdot \sin(3 \cdot \theta ER2 - 2 \cdot \theta ER1) \tag{46}$$

$$Iv = I \cdot \sin\left(3 \cdot \theta ER2 - 2 \cdot \theta ER1 - \frac{2\pi}{3}\right) \tag{47}$$

$$Iw = I \cdot \sin\left(3 \cdot \theta ER2 - 2 \cdot \theta ER1 + \frac{2\pi}{3}\right) \tag{48}$$

In these equations, I represents the amplitude (maximum value) of the currents flowing through the U-phase to W-phase coils 23c to 23e. Furthermore, as is clear from the first pole pair number ratio α (=2.0) and the aforementioned equations (24) and (25), the electrical angular position of a vector of the first rotating magnetic field of the stator 23 with respect to the first reference coil (hereinafter referred to as the "first magnetic field electrical angular position θMFR") is expressed by the following equation (49), and the electrical angular velocity of the first rotating magnetic field with respect to the stator 23 (hereinafter referred to as the "first magnetic field electrical angular velocity ωMFR") is expressed by the following equation (50):

$$\theta MFR = (\alpha+1)\theta ER2 - \alpha \cdot \theta ER1 = 3 \cdot \theta ER2 - 2 \cdot \theta ER1 \tag{49}$$

$$\omega MFR = (\alpha+1)\omega ER2 - \alpha \cdot \omega ER1 = 3 \cdot \omega ER2 - 2 \cdot \omega ER1 \tag{50}$$

Figure 5:
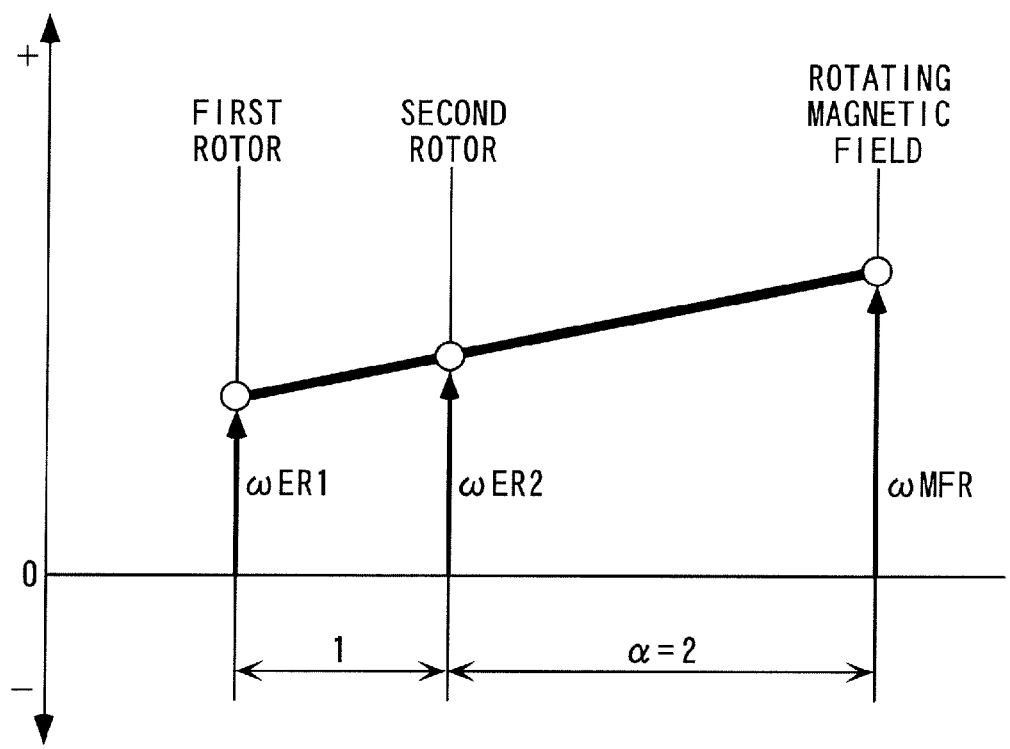
[FIG. 5] A velocity nomograph illustrating an example of the relationship between a first magnetic field electrical angular velocity, and A1 and A2 rotor electrical angular velocities of the first rotating machine appearing in FIG. 1.

Therefore, the relationship between the first magnetic field electrical angular velocity ωMFR, the A1 rotor electrical angular velocity ωER1, and the A2 rotor electrical angular velocity ωER2, which is represented in a so-called nomograph, is illustrated e.g. as in FIG. 5.

Further, assuming that a torque equivalent to electric power supplied to the stator 23 and the first magnetic field electrical angular velocity ωMFR is a first driving equivalent torque TSE1, as is clear from the first pole pair number ratio α (=2.0) and the aforementioned equation (32), the relationship between the first driving equivalent torque TSE1, a torque transmitted to the A1 rotor 24 (hereinafter referred to as the "A1 rotor-transmitted torque") TRA1, and a torque transmitted to the A2 rotor 25 (hereinafter referred to as the "A2 rotor-transmitted torque") TRA2 is expressed by the following equation (51):

$$TSE1 = \frac{TRA1}{\alpha} = \frac{-TRA2}{(\alpha+1)} = \frac{TRA1}{2} = \frac{-TRA2}{3} \tag{51}$$

The relationships between the electrical angular velocities and torques expressed by the equations (50) and (51) are quite the same as the relationships between the rotational speeds and torques of the sun gear, the ring gear, and the carrier of a planetary gear unit having a gear ratio between the sun gear and the ring gear set to 1:2.

Next, a more specific description will be given of how electric power supplied to the stator 23 is converted to motive power and is output from the A1 rotor 24 and the A2 rotor 25. First, a case where electric power is supplied to the stator 23 in a state in which the A1 rotor 24 is held unrotatable will be described with reference to FIGS. 6 to 8. It should be noted that in FIGS. 6 to 8, reference numerals indicative of a plurality of component elements are omitted for convenience. This also applies to other figures, referred to hereinafter. Further, in FIGS. 6 to 8, one identical first armature magnetic pole and one identical core 25a are indicated by hatching for clarity.

First, as shown in FIG. 6(a), from a state where the center of a certain core 25a and the center of a certain permanent magnet 24a are circumferentially coincident with each other, and the center of a third core 25a from the certain core 25a and the center of a fourth permanent magnet 24a from the certain permanent magnet 24a are circumferentially coincident with each other, the first rotating magnetic field is generated such that it rotates leftward, as viewed in the figure. At the start of generation of the first rotating magnetic field, the positions of two first armature magnetic poles adjacent but one to each other that have the same polarity are caused to circumferentially coincide with the centers of ones of the permanent magnets 24a the centers of which are coincident with the centers of cores 25a, respectively, and the polarity of these first armature magnetic poles is made different from the polarity of the first magnetic poles of these permanent magnets 24a.

Since the first rotating magnetic field is generated by the stator 23, between the same and the A1 rotor 24, and the A2 rotor 25 having the cores 25a is disposed between the stator 23 and the A1 rotor 24, as described hereinabove, the cores 25a are magnetized by the first armature magnetic poles and the first magnetic poles. Because of this fact and the fact that the cores 25a adjacent to each other are spaced from each other, magnetic force lines ML are generated in a manner connecting between the first armature magnetic poles, the cores 25a, and the first magnetic poles. It should be noted that in FIGS. 6 to 8, magnetic force lines ML at the iron core 23a and the fixed portion 24b are omitted for convenience. This also applies to other figures, referred to hereinafter.

In the state shown in FIG. 6(a), the magnetic force lines ML are generated in a manner connecting the first armature magnetic poles, cores 25a and first magnetic poles the circumferential positions of which are coincident with each other, and at the same time in a manner connecting first armature magnetic poles, cores 25a and first magnetic poles which are adjacent to the above-mentioned first armature magnetic poles, cores 25a, and first magnetic poles, on respective circumferentially opposite sides thereof. Further, in this state, since the magnetic force lines ML are straight, no magnetic forces for circumferentially rotating the cores 25a act on the cores 25a.

Figure 6:
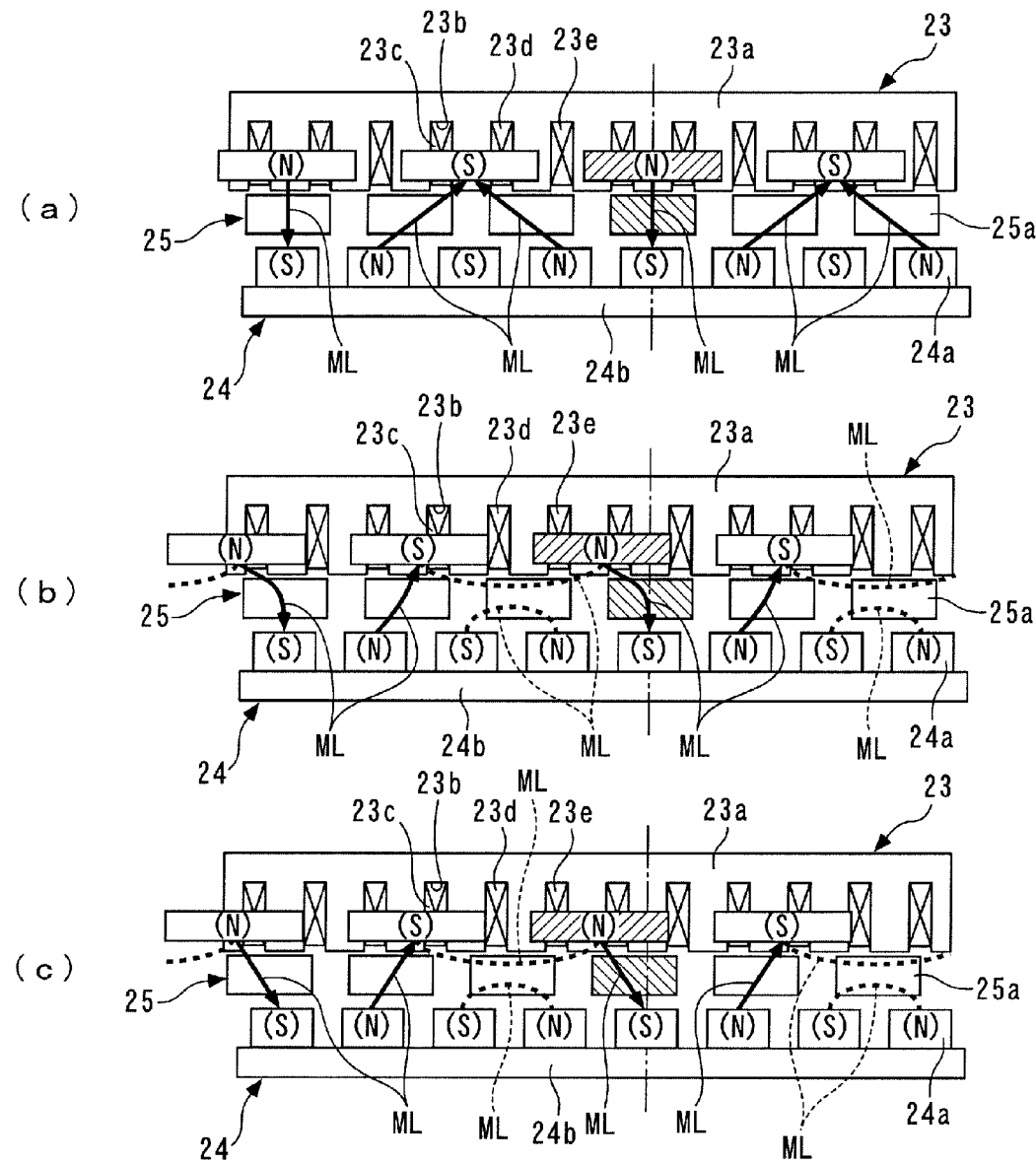
[FIG. 6] Diagrams illustrating the operation of the first rotating machine appearing in FIG. 1 in a case where electric power is supplied to the stator in a state of the A1 rotor being held unrotatable.

When the first armature magnetic poles rotate from the positions shown in FIG. 6(a) to respective positions shown in FIG. 6(b) in accordance with rotation of the first rotating magnetic field, the magnetic force lines ML are bent, and accordingly magnetic forces act on the cores 25a in such a manner that the magnetic force lines ML are made straight. In this case, the magnetic force lines ML are bent at the cores 25a in a manner convexly curved in an opposite direction to a direction of rotation of the first rotating magnetic field (hereinafter, this direction is referred to as the "magnetic field rotation direction") with respect to the straight lines each connecting a first armature magnetic pole and a first magnetic pole which are connected to each other by an associated one of the magnetic force lines ML. Therefore, the above-described magnetic forces act on the cores 25a to drive the same in the magnetic field rotation direction. The cores 25a are driven in the magnetic field rotation direction by such action of the magnetic forces caused by the magnetic force lines ML, for rotation to respective positions shown in FIG. 6(*c*), and the A2 rotor 25 provided with the cores 25a also rotates in the magnetic field rotation direction. It should be noted that broken lines in FIGS. 6(*b*) and 6(*c*) represent very small magnetic flux amounts of the magnetic force lines ML, and hence weak magnetic connections between the first armature magnetic poles, the cores 25a, and the first magnetic poles. This also applies to other figures, referred to hereinafter.

Figure 7:
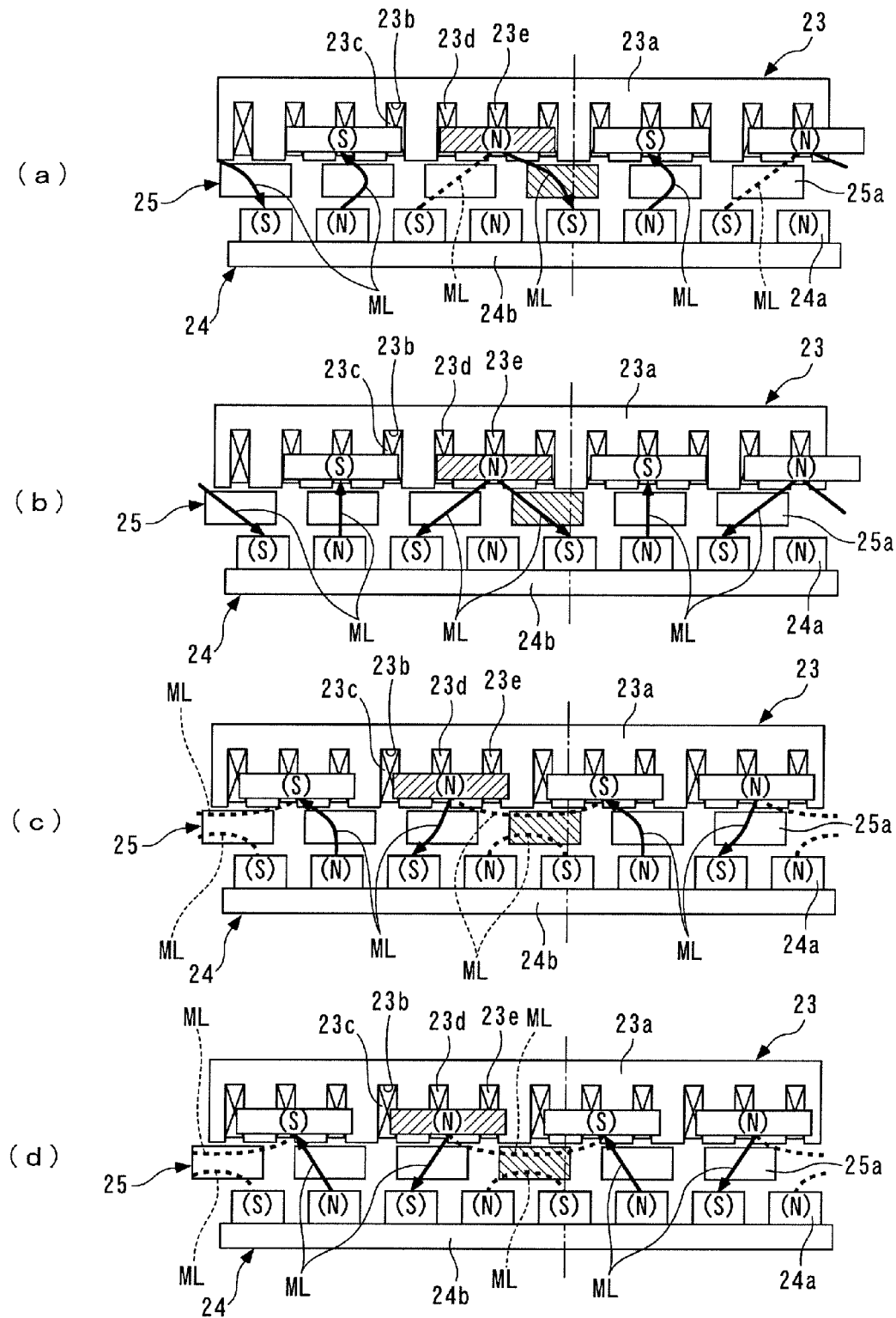
[FIG. 7] Diagrams illustrating a continuation of the operation illustrated in FIG. 6.
Figure 8:
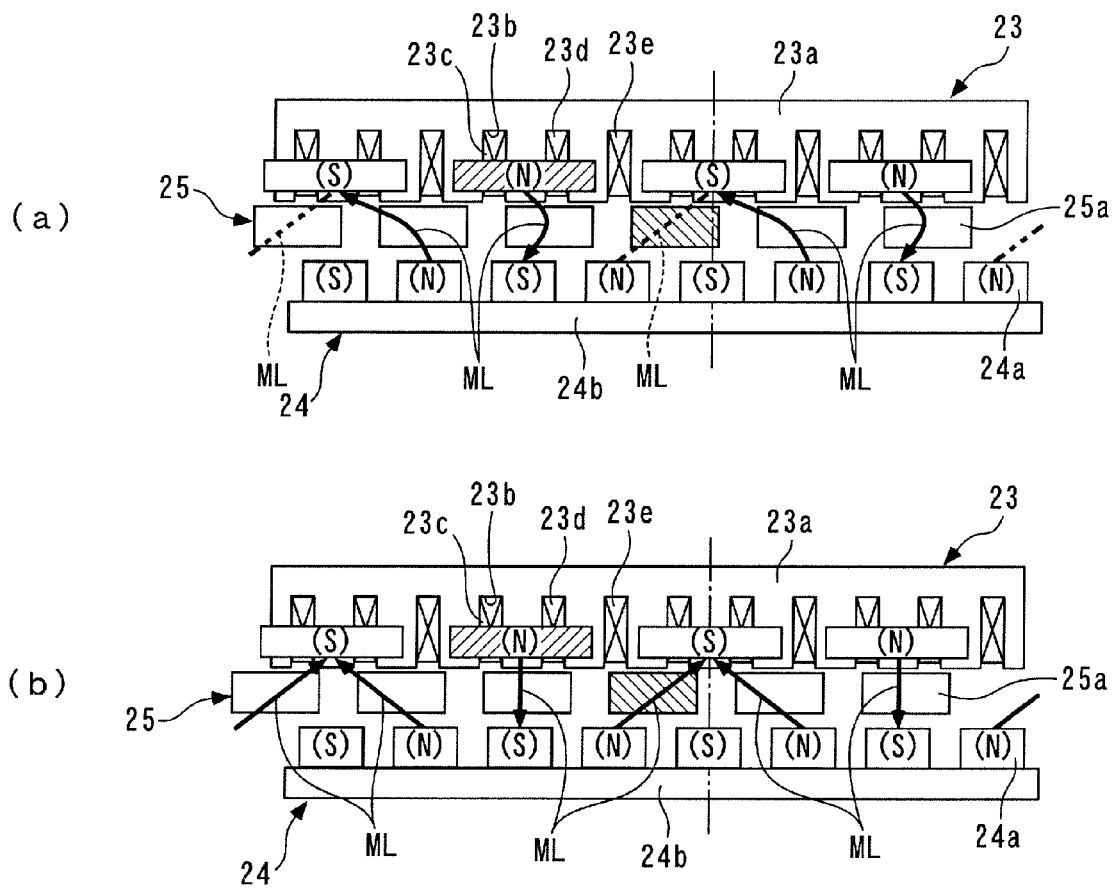
[FIG. 8] Diagrams illustrating a continuation of the operation illustrated in FIG. 7.

As the first rotating magnetic field further rotates, a sequence of the above-described operations, that is, the operations that "the magnetic force lines ML are bent at the cores 25a in a manner convexly curved in the direction opposite to the magnetic field rotation direction→the magnetic forces act on the cores 25a in such a manner that the magnetic force lines ML are made straight→the cores 25a and the A2 rotor 25 rotate in the magnetic field rotation direction" are repeatedly performed as shown in FIGS. 7(*a*) to 7(*d*), and FIGS. 8(*a*) and 8(*b*). As described above, in the case where electric power is supplied to the stator 23 in the state of the A1 rotor 24 being held unrotatable, the action of the magnetic forces caused by the magnetic force lines ML as described above converts electric power supplied to the stator 23 to motive power, and outputs the motive power from the A2 rotor 25.

Figure 9:
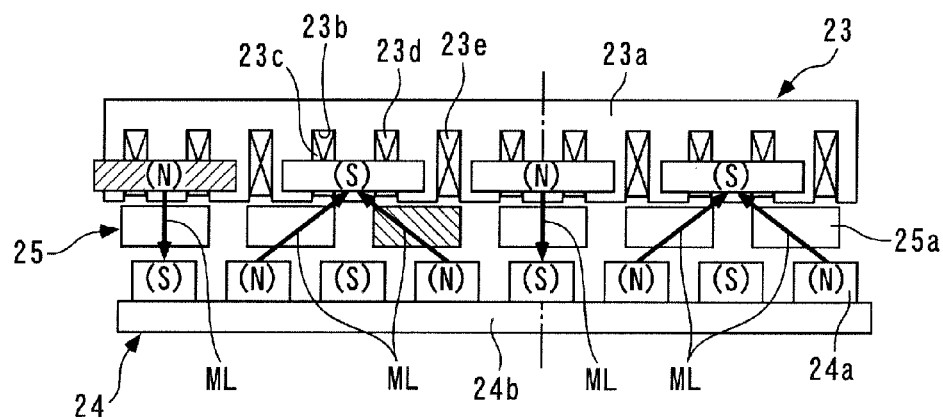
[FIG. 9] A diagram illustrating the positional relationship between first armature magnetic poles and cores in a case where the first armature magnetic poles have rotated through an electrical angle of $2\pi$ from the state shown in FIG. 6.

FIG. 9 shows a state in which the first armature magnetic poles have rotated from the FIG. 6(*a*) state through an electrical angle of 2π. As is apparent from a comparison between FIG. 9 and FIG. 6(*a*), it is understood that the cores 25a have rotated in the same direction through ⅓ of a rotational angle of the first armature magnetic poles. This agrees with the fact that by substituting ωER1=0 into the aforementioned equation (50), ωER2=ωMFR/3 is obtained.

Figure 10:
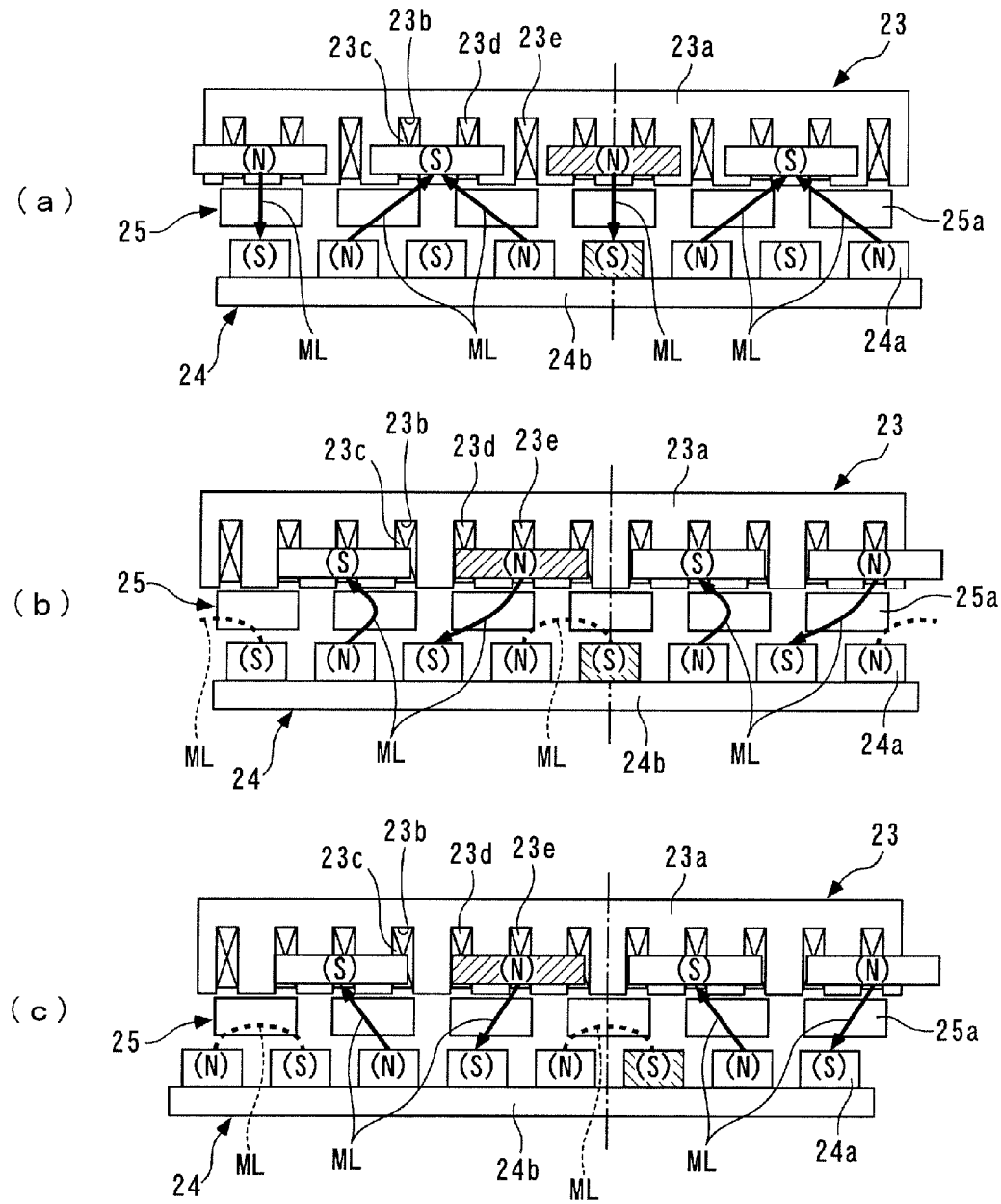
[FIG. 10] Diagrams illustrating the operation of the first rotating machine appearing in FIG. 1 in a case where electric power is supplied to the stator in a state of the A2 rotor being held unrotatable.

Next, an operation in a case where electric power is supplied to the stator 23 in a state in which the A2 rotor 25 is held unrotatable will be described with reference to FIGS. 10 to 12. It should be noted that in FIGS. 10 to 12, one identical first armature magnetic pole and one identical permanent magnet 24a are indicated by hatching for clarity. First, as shown in FIG. 10(*a*), similarly to the above-described case shown in FIG. 6(*a*), from a state where the center of a certain core 25a and the center of a certain permanent magnet 24a are circumferentially coincident with each other, and the center of the third core 25a from the certain core 25a and the center of the fourth permanent magnet 24a from the permanent magnet 24a are circumferentially coincident with each other, the first rotating magnetic field is generated such that it rotates leftward, as viewed in the figure. At the start of generation of the first rotating magnetic field, the positions of two first armature magnetic poles adjacent but one to each other that have the same polarity are caused to circumferentially coincide with the centers of corresponding ones of the respective permanent magnets 24a having centers coincident with the centers of cores 25a, and the polarity of these first armature magnetic poles is made different from the polarity of the first magnetic poles of these permanent magnets 24a.

In the state shown in FIG. 10(*a*), similarly to the case shown in FIG. 6(*a*), magnetic force lines ML are generated in a manner connecting the first armature magnetic poles, cores 25a and first magnetic poles the circumferential positions of which are coincident with each other, and at the same time in a manner connecting first armature magnetic poles, cores 25a and first magnetic poles which are adjacent to the above-mentioned first armature magnetic pole, core 25a, and first magnetic pole, on respective circumferentially opposite sides thereof. Further, in this state, since the magnetic force lines ML are straight, no magnetic forces for circumferentially rotating the permanent magnets 24a act on the permanent magnets 24a.

When the first armature magnetic poles rotate from the positions shown in FIG. 10(*a*) to respective positions shown in FIG. 10(*b*) in accordance with rotation of the first rotating magnetic field, the magnetic force lines ML are bent, and accordingly magnetic forces act on the permanent magnets 24a in such a manner that the magnetic force lines ML are made straight. In this case, the permanent magnets 24a are each positioned forward of a line of extension from a first armature magnetic pole and a core 25a which are connected to each other by an associated one of the magnetic force lines ML, in the magnetic field rotation direction, and therefore the above-described magnetic forces act on the permanent magnets 24a such that each permanent magnet 24a is caused to be positioned on the extension line, i.e. such that the permanent magnet 24a is driven in a direction opposite to the magnetic field rotation direction. The permanent magnets 24a are driven in a direction opposite to the magnetic field rotation direction by such action of the magnetic forces caused by the magnetic force lines ML, and rotate to respective positions shown in FIG. 10(*c*). The A1 rotor 24 provided with the permanent magnets 24a also rotates in the direction opposite to the magnetic field rotation direction.

Figure 11:
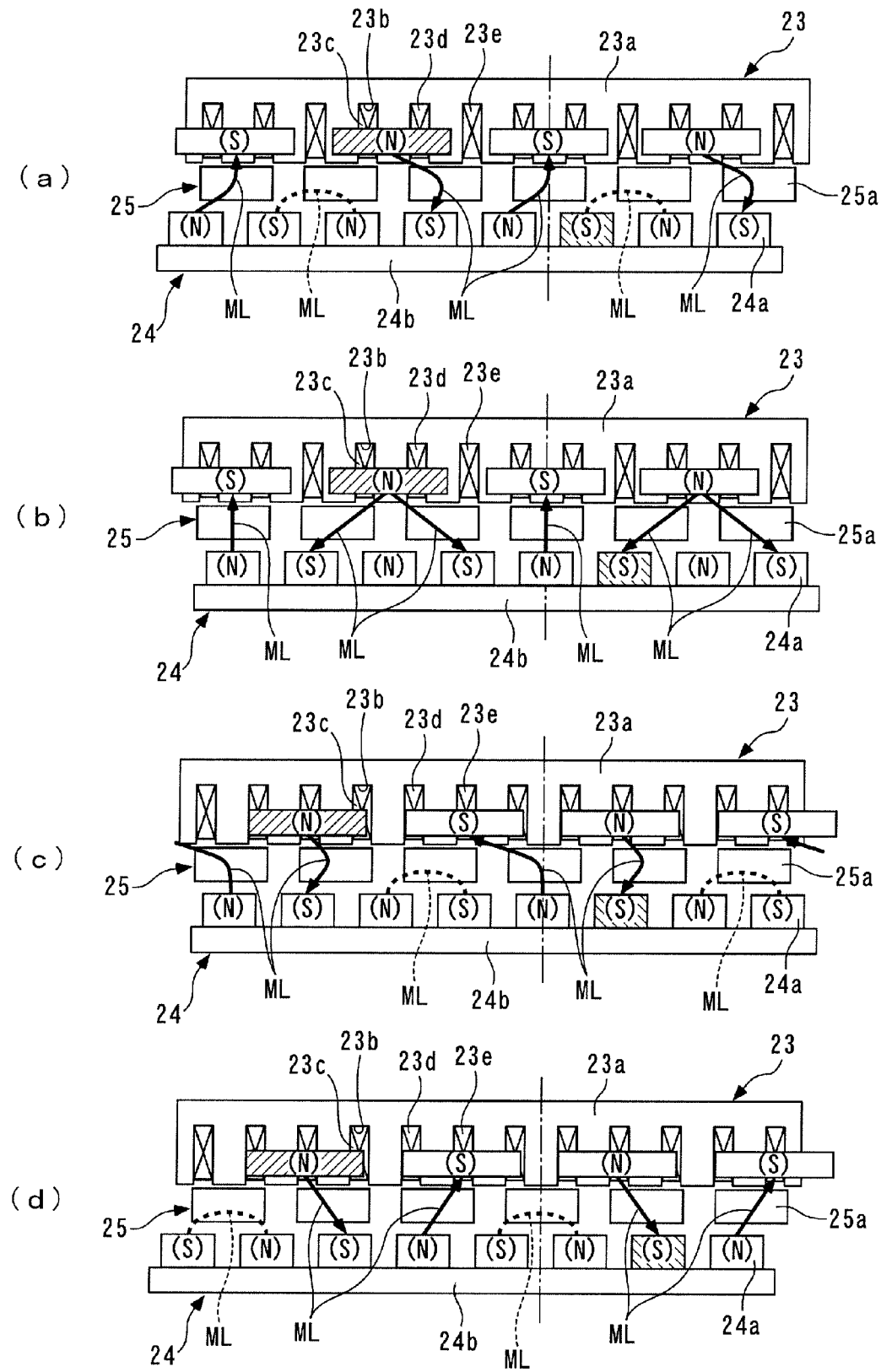
[FIG. 11] Diagrams illustrating a continuation of the operation illustrated in FIG. 10.
Figure 12:
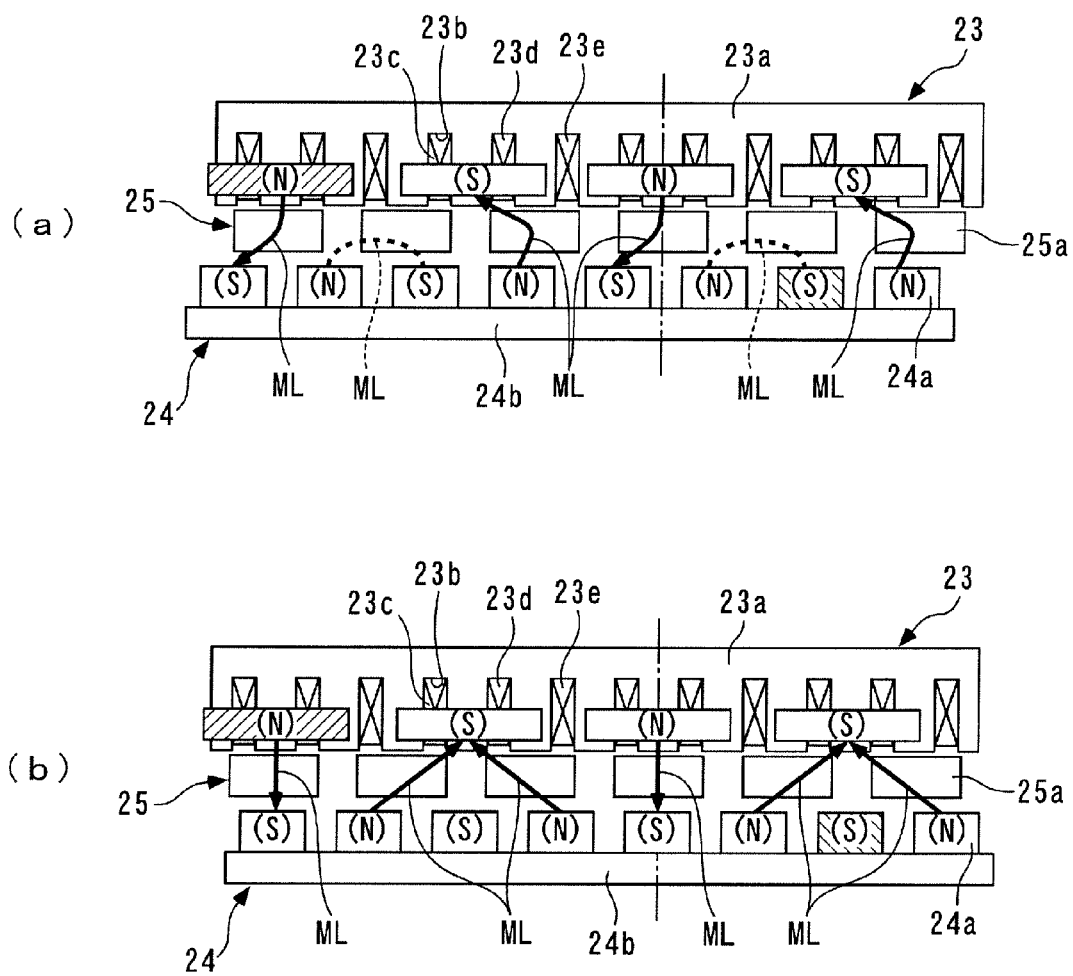
[FIG. 12] Diagrams illustrating a continuation of the operation illustrated in FIG. 11.

As the first rotating magnetic field further rotates, a sequence of the above-described operations, that is, the operations that "the magnetic force lines ML are bent and the permanent magnets 24a are each positioned forward of a line of extension from a first armature magnetic pole and a core 25a which are connected to each other by an associated one of the magnetic force lines ML, in the magnetic field rotation direction→the magnetic forces act on the permanent magnets 24a in such a manner that the magnetic force lines ML are made straight→the permanent magnets 24a and the A1 rotor 24 rotate in the direction opposite to the magnetic field rotation direction" are repeatedly performed as shown in FIGS. 11(*a*) to 11(*d*), and FIGS. 12(*a*) and 12(*b*). As described above, in the case where electric power is supplied to the stator 23 in the state of the A2 rotor 25 being held unrotatable, the above-described action of the magnetic forces caused by the magnetic force lines ML converts electric power supplied to the stator 23 to motive power, and outputs the motive power from the A1 rotor 24.

FIG. 12(*b*) shows a state in which the first armature magnetic poles have rotated from the FIG. 10(*a*) state through the electrical angle of 2π. As is apparent from a comparison between FIG. 12(*b*) and FIG. 10(*a*), it is understood that the permanent magnets 24a have rotated in the opposite direction through ½ of a rotational angle of the first armature magnetic poles. This agrees with the fact that by substituting ωER2=0 into the aforementioned equation (50), −ωER1=ωMFR/2 is obtained.

Figure 13:
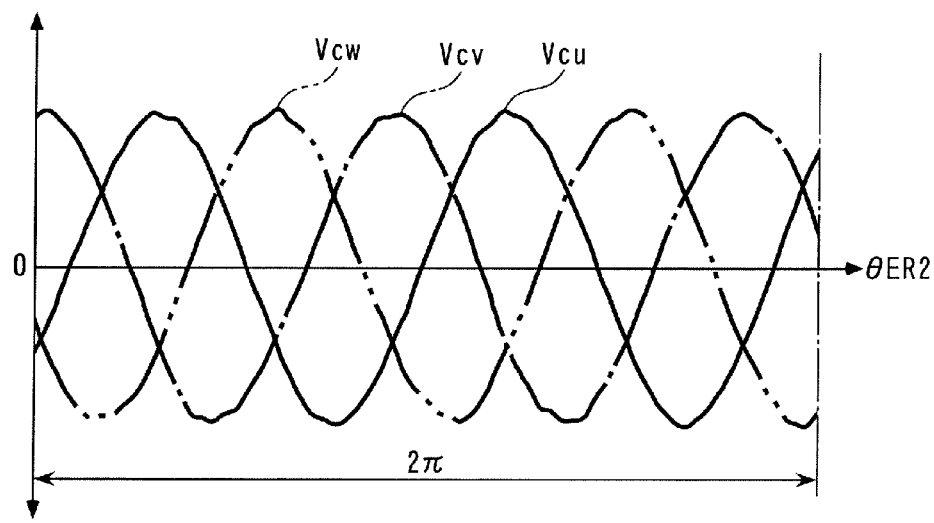
[FIG. 13] A diagram illustrating an example of changes in U-phase to W-phase counter-electromotive force voltages in a case where the A1 rotor of the first rotating machine in the present invention is held unrotatable.
Figure 14:
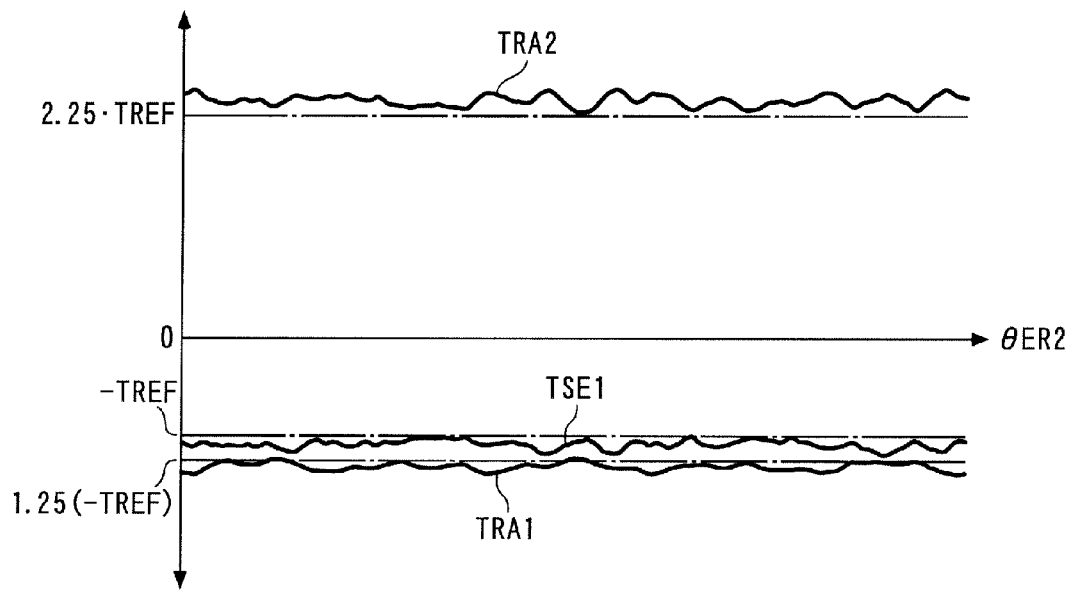
[FIG. 14] A diagram illustrating an example of changes in a first driving equivalent torque and A1 and A2 rotor-transmitted torques in the case where the A1 rotor of the first rotating machine in the present invention is held unrotatable.

FIGS. 13 and 14 show results of a simulation of control in which the numbers of the first armature magnetic poles, the cores 25a, and the permanent magnets 24a are set to 16, 18 and 20, respectively; the A1 rotor 24 is held unrotatable; and motive power is output from the A2 rotor 25 by supplying electric power to the stator 23. FIG. 13 shows an example of changes in the U-phase to W-phase counter-electromotive force voltages Vcu to Vcw during a time period over which the A2 rotor electrical angle θER2 changes from 0 to 2π.

In this case, due to the fact that the A1 rotor 24 is held unrotatable, and the fact that the pole pair numbers of the first armature magnetic poles and the first magnetic poles are equal to 8 and 10, respectively, and from the aforementioned equation (25), the relationship between the first magnetic field electrical angular velocity ωMFR and the A1 and A2 rotor electrical angular velocities ωER1 and ωER2 is expressed by ωMFR=2.25·ωER2. As shown in FIG. 13, during a time period over which the A2 rotor electrical angle θER2 changes from 0 to 2π, the U-phase to W-phase counter-electromotive force voltages Vcu to Vcw are generated over approximately 2.25 repetition periods thereof. Further, FIG. 13 shows changes in the U-phase to W-phase counter-electromotive force voltages Vcu to Vcw, as viewed from the A2 rotor 25. As shown in the figure, with the A2 rotor electrical angle θER2 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the A2 rotor 25 rotates in the magnetic field rotation direction. The simulation results described above with reference to FIG. 13 agree with the relationship of ωMFR=2.25·ωER2, based on the aforementioned equation (25).

Further, FIG. 14 shows an example of changes in the first driving equivalent torque TSE1, and the A1 and A2 rotor-transmitted torques TRA1 and TRA2. In this case, due to the fact that the pole pair numbers of the first armature magnetic poles and the first magnetic poles are equal to 8 and 10, respectively, and from the aforementioned equation (32), the relationship between the first driving equivalent torque TSE1, and the A1 and A2 rotor-transmitted torques TRA1 and TRA2 is represented by TSE1=TRA1/1.25=−TRA2/2.25. As shown in FIG. 14, the first driving equivalent torque TSE1 is approximately equal to −TREF; the A1 rotor-transmitted torque TRA1 is approximately equal to 1.25·(−TREF); and the A2 rotor-transmitted torque TRA2 is approximately equal to 2.25·TREF. This TREF represents a predetermined torque value (e.g. 200 Nm). The simulation results described above with reference to FIG. 14 agree with the relationship of TSE1=TRA1/1.25=−TRA2/2.25, based on the aforementioned equation (32).

FIGS. 15 and 16 show results of a simulation of control in which the numbers of the first armature magnetic poles, the cores 25a, and the permanent magnets 24a are set in the same manner as in the cases illustrated in FIGS. 13 and 14; the A2 rotor 25 is held unrotatable in place of the A1 rotor 24; and motive power is output from the A1 rotor 24 by supplying electric power to the stator 23. FIG. 15 shows an example of changes in the U-phase to W-phase counter-electromotive force voltages Vcu to Vcw during a time period over which the A1 rotor electrical angle θER1 changes from 0 to 2π.

In this case, due to the fact that the A2 rotor 25 is held unrotatable, and the fact that the pole pair numbers of the first armature magnetic poles and the first magnetic poles are equal to 8 and 10, respectively, and from the aforementioned equation (25), the relationship between the magnetic field electrical angular velocity wMFR, and the A1 and A2 rotor electrical angular velocities ωER1 and ωER2 is expressed by ωMFR=−1.25·ωER1. As shown in FIG. 15, during a time period over which the A1 rotor electrical angle θER1 changes from 0 to 2π, the U-phase to W-phase counter-electromotive force voltages Vcu to Vcw are generated for approximately 1.25 repetition periods thereof. Further, FIG. 15 shows changes in the U-phase to W-phase counter-electromotive force voltages Vcu to Vcw, as viewed from the A1 rotor 24. As shown in the figure, with the A1 rotor electrical angle θER1 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the A1 rotor 24 rotates in the direction opposite to the magnetic field rotation direction. The simulation results described above with reference to FIG. 15 agree with the relationship of ωMFR=−1.25·ωER1, based on the aforementioned equation (25).

Further, FIG. 16 shows an example of changes in the first driving equivalent torque TSE1 and the A1 and A2 rotor-transmitted torques TRA1 and TRA2. Also in this case, similarly to the FIG. 14 case, the relationship between the first driving equivalent torque TSE1, and the A1 and A2 rotor-transmitted torques TRA1 and TRA2 is represented by TSE1=TRA1/1.25=−TRA2/2.25 from the aforementioned equation (32). As shown in FIG. 16, the first driving equivalent torque TSE1 is approximately equal to TREF; the A1 rotor-transmitted torque TRA1 is approximately equal to 1.25·TREF; and the A2 rotor-transmitted torque TRA2 is approximately equal to −2.25·TREF. The simulation results described above with reference to FIG. 16 agree with the relationship of TSE1=TRA1/1.25=−TRA2/2.25, based on the aforementioned equation (32).

As described above, in the first rotating machine 21, when the first rotating magnetic field is generated by supplying electric power to the stator 23, the aforementioned magnetic force lines ML are generated in a manner connecting between the first magnetic poles, the cores 25a and the first armature magnetic poles, and the action of the magnetic forces caused by the magnetic force lines ML converts the electric power supplied to the stator 23 to motive power, and the motive power is output from the A1 rotor 24 or the A2 rotor 25. In this case, the relationship as expressed by the aforementioned equation (50) holds between the magnetic field electrical angular velocity ωMFR, and the A1 and A2 rotor electrical angular velocities ωER1 and ωER2, and the relationship as expressed by the aforementioned equation (51) holds between the first driving equivalent torque TSE1, and the A1 and A2 rotor-transmitted torques TRA1 and TRA2.

Therefore, by supplying motive power to at least one of the A1 and A2 rotors 24 and 25, without electric power being supplied to the stator 23, the at least one rotor is caused to rotate with respect to the stator 23. This causes electric power to be generated by the stator 23, and generates a first rotating magnetic field. In this case as well, magnetic force lines ML are generated in a manner connecting between the first magnetic poles, the cores 25a, and the first armature magnetic poles, and the action of the magnetic forces caused by the magnetic force lines ML causes the relationship of the electrical angular velocities shown in the equation (50) and the relationship of the torques shown in the equation (51) to hold.

That is, assuming that a torque equivalent to the generated electric power and the first magnetic field electrical angular velocity ωMFR is a first electric power-generating equivalent torque TGE1, there holds the relationship expressed by the equation (52) between this first electric power-generating equivalent torque TGE1, and the A1 and A2 rotor-transmitted torques TRA1 and TRA2.

$$TGE1=TRA1/\alpha=-TRA2/(\alpha+1)=TRA1/2=-TRA2/3 \qquad (52)$$

Further, during supply of electric power to the stator 23 and during generation of electric power by the stator 23, there holds the following equation (53) between the rotational speed of the first rotating magnetic field (hereinafter referred to as the "first magnetic field rotational speed VMF1"), and the rotational speeds of the A1 and A2 rotors 24 and 25 (hereinafter referred to as the "A1 rotor rotational speed VRA1" and the "A2 rotor rotational speed VRA2", respectively):

$$VMF1=(\alpha+1)VRA2-\alpha \cdot VRA1=3 \cdot VRA2-2 \cdot VRA1 \qquad (53)$$

As is clear from the above, the first rotating machine 21 has the same functions as those of an apparatus formed by combining a planetary gear unit and a general one-rotor-type rotating machine.

Through the control of the first PDU 41, the ECU 2 controls the electric power supplied to the stator 23 of the first rotating machine 21 and the first magnetic field rotational speed VMF1 of the first rotating magnetic field generated by the stator 23 in accordance with the supply of electric power. Further, through the control of the first PDU 41, the ECU 2 controls the electric power generated by the stator 23 and the first magnetic field rotational speed VMF1 of the first rotating magnetic field generated by the stator 23 along with the electric power generation.

Figure 17:
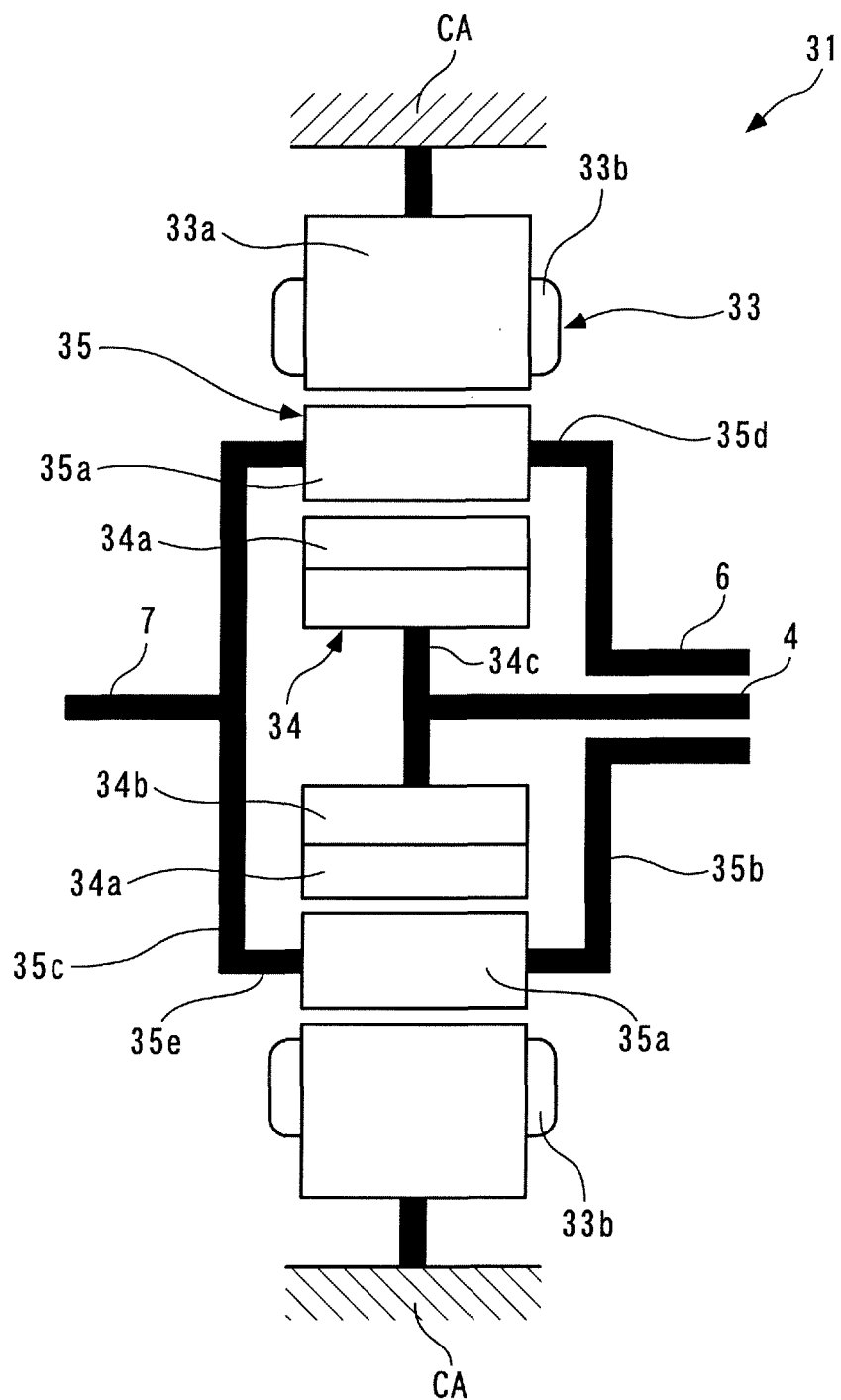
[FIG. 17] An enlarged cross-sectional view of the second rotating machine shown in FIG. 1.

Furthermore, the second rotating machine 31 is configured similarly to the first rotating machine 21, and a brief description will be given hereinafter of the construction and the operations thereof. As shown in FIGS. 1 and 17, the second rotating machine 31 includes a stator 33, a B1 rotor 34 disposed in a manner opposed to the stator 33, and a B2 rotor 35 disposed between the two 33 and 34. The stator 33, the B2 rotor 35 and the B1 rotor 34 are arranged concentrically with each other in the radial direction from outside in the mentioned order. In FIG. 17, similarly to the FIG. 3, some of the elements, such as the first rotating shaft 4 and the like, are illustrated in a skeleton diagram-like manner for convenience of illustration.

The aforementioned stator 33 is for generating a second rotating magnetic field, and includes an iron core 33a, and U-phase, V-phase and W-phase coils 33b provided on the iron core 33a. The iron core 33a, which has a hollow cylindrical shape formed by laminating a plurality of steel plates, extends in the axial direction, and is fixed to the casing CA. Further, the inner peripheral surface of the iron core 33a is formed with twelve slots (not shown). The slots are arranged at equally-spaced intervals in the circumferential direction. The above-described U-phase to W-phase coils 33b are wound in the slots by distributed winding (wave winding), and are connected to the battery 43 via the aforementioned second PDU 42. Similarly to the first PDU 41, the second PDU 42 is implemented as an electric circuit comprising an inverter, and is connected to the first PDU 41 and the ECU 2 (see FIG. 2).

In the stator 33 constructed as above, when electric power is supplied from the battery 43, to thereby cause electric currents to flow through the U-phase to W-phase coils 33b, or when electric power is generated, as described hereinafter, four magnetic poles are generated at respective ends of the iron core 33a toward the B1 rotor 34 at equally-spaced intervals in the circumferential direction, and the second rotating magnetic field generated by the magnetic poles rotates in the circumferential direction. Hereinafter, the magnetic poles generated on the iron core 33a are referred to as the "second armature magnetic poles". Further, each two second armature magnetic poles which are circumferentially adjacent to each other have polarities different from each other.

The B1 rotor 34 includes a second magnetic pole row comprising eight permanent magnets 34a (only two of which are shown). These permanent magnets 34a are arranged at equally-spaced intervals in the circumferential direction, and the second magnetic pole row is opposed to the iron core 33a of the stator 33. Each permanent magnet 34a extends in the axial direction, and the length thereof in the axial direction is set to the same length as that of the iron core 33a of the stator 33.

Further, the permanent magnets 34a are mounted on an outer peripheral surface of an annular fixed portion 34b. This fixed portion 34b is formed by a soft magnetic material, such as iron or a laminate of a plurality of steel plates, and has an inner peripheral surface thereof attached to the outer peripheral surface of a disk-shaped flange 34c. The flange 34c is integrally formed on the aforementioned first rotating shaft 4. Thus, the B1 rotor 34 including the permanent magnets 34a is rotatable in unison with the first rotating shaft 4. Further, the permanent magnets 34a are attached to the outer peripheral surface of the fixed portion 34b formed by the soft magnetic material, as described above, and hence a magnetic pole of (N) or (S) appears on an end of each permanent magnet 34a toward the stator 33. Further, each two permanent magnets 34a circumferentially adjacent to each other have polarities different from each other.

The B2 rotor 35 includes a second soft magnetic material element row comprising six cores 35a (only two of which are shown). These cores 35a are arranged at equally-spaced intervals in the circumferential direction, and the second soft magnetic material element row is disposed between the iron core 33a of the stator 33 and the magnetic pole row of the B1 rotor 34, in a manner spaced therefrom by respective predetermined distances. Each core 35a is formed by a soft magnetic material, such as a laminate of a plurality of steel plates, and extends in the axial direction. Further, similarly to the permanent magnet 34a, the length of the core 35a in the axial direction is set to the same length as that of the iron core 33a of the stator 33. Furthermore, the core 35a is mounted on outer ends of disk-shaped flanges 35b and 35c via respective hollow cylindrical connecting portions 35d and 35e slightly extending in the axial direction. These flanges 35b and 35c are integrally formed on the aforementioned connection shaft 6 and second rotating shaft 7, respectively. This arrangement makes the B2 rotor 35 including the cores 35a rotatable in unison with the connection shaft 6 and the second rotating shaft 7.

As described hereinabove, the second rotating machine 31 includes the four second armature magnetic poles, the eight magnetic poles of the permanent magnets 34a (hereinafter referred to as the "second magnetic poles"), and the six cores 35a. That is, the ratio between the number of the second armature magnetic poles, the number of the second magnetic poles, and the number of the cores 35a is set to 1:2.0:(1+2.0)/2, similarly to the number of the first armature magnetic poles, the number of the first magnetic poles, and the number of the cores 25a of the first rotating machine 21. Further, the ratio of the number of pole pairs of the second magnetic poles to the number of pole pairs of the second armature magnetic poles (hereinafter referred to as the "second pole pair number ratio $\beta$") is set to 2.0, similarly to the first pole pair number ratio $\alpha$. As described above, since the second rotating machine 31 is constructed similarly to the first rotating machine 21, it has the same functions as those of the first rotating machine 21.

More specifically, the second rotating machine 31 converts electric power supplied to the stator 33 to motive power, for outputting the motive power from the B1 rotor 34 or the B2 rotor 35, and converts motive power input to the B1 rotor 34 and the B2 rotor 35 to electric power, for outputting the electric power from the stator 33. Further, during such input and output of electric power and motive power, the second rotating magnetic field and the B1 and B2 rotors 34 and 35 rotate while holding a collinear relationship with respect to the rotational speed, as shown in the equation (50). That is, in this case, between the rotational speed of the second rotating magnetic field (hereinafter referred to as the "second magnetic field rotational speed VMF2"), and the rotational speeds of the B1 and B2 rotors 34 and 35 (hereinafter referred to as the "B1 rotor rotational speed VRB1" and the "B2 rotor rotational speed VRB2", respectively), there holds the following equation (54):

$$VMF2=(\beta+1)VRB2-\beta \cdot VRB1=3 \cdot VRB2-2 \cdot VRB1 \qquad (54)$$

Further, if torque equivalent to the electric power supplied to the stator 33 and the second rotating magnetic field is referred to as the "second driving equivalent torque TSE2", there holds the following equation (55) between the second driving equivalent torque TSE2, and torques transmitted to the B1 and B2 rotors 34 and 35 (hereinafter referred to as the "B1 rotor-transmitted torque TRB1" and the "B2 rotor-transmitted torque TRB2", respectively):

$$TSE2=TRB1/\beta=-TRB2/(\beta+1)=TRB1/2=-TRB2/3 \qquad (55)$$

Furthermore, if torque equivalent to the electric power generated by the stator 33 and the second rotating magnetic field is referred to as the "second electric power-generating equivalent torque TGE2", between the second electric power-generating equivalent torque TGE2 and the B1 and B2 rotor-transmitted torques TRB1 and TRB2, there holds the following equation (56):

$$TGE2=TRB1/\beta=-TRB2/(1+\beta)=TRB1/2=-TRB2/3 \qquad (56)$$

As described above, similarly to the first rotating machine 21, the second rotating machine 31 has the same functions as those of an apparatus formed by combining a planetary gear unit and a general one-rotor-type rotating machine.

Through the control of the second PDU 42, the ECU 2 controls the electric power supplied to the stator 33 of the second rotating machine 31 and the second magnetic field rotational speed VMF2 of the second rotating magnetic field generated by the stator 33 along with the supply of electric power. Further, through the control of the second PDU 42, the ECU 2 controls the electric power generated by the stator 33 and the second magnetic field rotational speed VMF2 of the second rotating magnetic field generated by the stator 33 along with the electric power generation.

As described hereinabove, in the power plant 1, the crankshaft 3a of the engine 3, the A2 rotor 25 of the first rotating machine 21, and the B1 rotor 34 of the second rotating machine 31 are mechanically connected to each other via the first rotating shaft 4. Further, the A1 rotor 24 of the first rotating machine 21 and the B2 rotor 35 of the second rotating machine 31 are mechanically connected to each other via the connection shaft 6, and the B2 rotor 35 and the drive wheels DW and DW are mechanically connected to each other via the second rotating shaft 7 and the like. That is, the A1 rotor 24 and the B2 rotor 35 are mechanically connected to the drive wheels DW and DW. Further, the stator 23 of the first rotating machine 21 and the stator 33 of the second rotating machine 31 are electrically connected to each other via the first and second PDUs 41 and 42. Further, the battery 43 is electrically connected to the stators 23 and 33 via the first and second PDUs 41 and 42, respectively.

It should be noted that in the present embodiment, the crankshaft 3a corresponds to the output portion in the invention as claimed in claim 1, and the stator 23 and the A1 and A2 rotors 24 and 25 correspond to a first stator and first and second rotors in the invention as claimed in claim 1, respectively. Further, in the present embodiment, the iron core 23a and the U-phase to W-phase coils 23c to 23e correspond to first armatures in the invention as claimed in claim 1, and the permanent magnets 24a and the cores 25a correspond to first magnetic poles and the first soft magnetic material elements in the invention as claimed in claim 1, respectively.

Further, in the present embodiment, the stator 33 and the B1 and B2 rotors 34 and 35 correspond to a second stator and third and fourth rotors in the invention as claimed in claim 1, respectively; the iron core 33a and the U-phase to W-phase coils 33b correspond to second armatures in the invention as claimed in claim 1; and the permanent magnets 34a and the cores 35a correspond to second magnetic poles and second soft magnetic material elements in the invention as claimed in claim 1, respectively. Further, in the present embodiment, the first PDU 41 and the ECU 2 correspond to a first controller in the invention as claimed in claim 1; the second PDU 42 and the ECU 2 correspond to a second controller in the invention as claimed in claim 1; and the battery 43 corresponds to an electric power storage device in the invention as claimed in claim 2.

Further, as shown in FIG. 2, a crank angle sensor 51 delivers a signal indicative of the detected crank angle position of the crankshaft 3a to the ECU 2. The ECU 2 calculates engine speed NE based on the crank angle position. Further, a first rotational angle sensor 52 and a second rotational angle sensor 53 are connected to the ECU 2. These first and second rotational angle sensors 52 and 53 detect the aforementioned A1 and A2 rotor rotational angles θA1 and θA2, respectively, and deliver respective signals indicative of the detected A1 and A2 rotor rotational angles θA1 and θA2 to the ECU 2. The ECU 2 calculates the A1 and A2 rotor rotational speeds VRA1 and VRA2 based on the respective detected A1 and A2 rotor rotational angles θA1 and θA2.

Further, a third rotational angle sensor 54 and a fourth rotational angle sensor 55 are connected to the ECU 2. The third rotational angle sensor 54 detects a rotational angle position of a specific permanent magnet 34a of the B1 rotor 34 (hereinafter referred to as the "B1 rotor rotational angle θB1") with respect to a specific U-phase coil 33b of the second rotating machine 31 (hereinafter referred to as the "second reference coil"), and delivers a signal indicative of the detected B1 rotor rotational angle θB1 to the ECU 2. The ECU 2 calculates the B1 rotor rotational speed VRB1 based on the detected B1 rotor rotational angle θB1. The above-described fourth rotational angle sensor 55 detects a rotational angle position of a specific core 35a of the B2 rotor 35 (hereinafter referred to as the "B2 rotor rotational angle θB2") with respect to the second reference coil, and delivers a signal indicative of the detected B2 rotor rotational angle θB2 to the ECU 2. The ECU 2 calculates the B2 rotor rotational speed VRB2 based on the detected B2 rotor rotational angle θB2.

Further, a current-voltage sensor 56 outputs signals indicative of detected values of current and voltage input to and output from the battery 43 to the ECU 2. The ECU 2 calculates a charge state of the battery 43 based on these signals. Furthermore, an accelerator pedal opening sensor 57 delivers a signal indicative of an accelerator pedal opening AP detected thereby as a stepped-on amount of an accelerator pedal (not shown) of the vehicle to the ECU 2. A vehicle speed sensor 58 delivers a signal indicative of a vehicle speed VP detected thereby to the ECU 2. It should be noted that the vehicle speed VP is the rotational speed of the drive wheels DW and DW.

The ECU 2 is implemented by a microcomputer comprising an I/O interface, a CPU, a RAM and a ROM, and controls the operations of the engine 3 and the first and second rotating machines 21 and 31 based on the signals from the aforementioned sensors 51 to 58.

Figure 18:
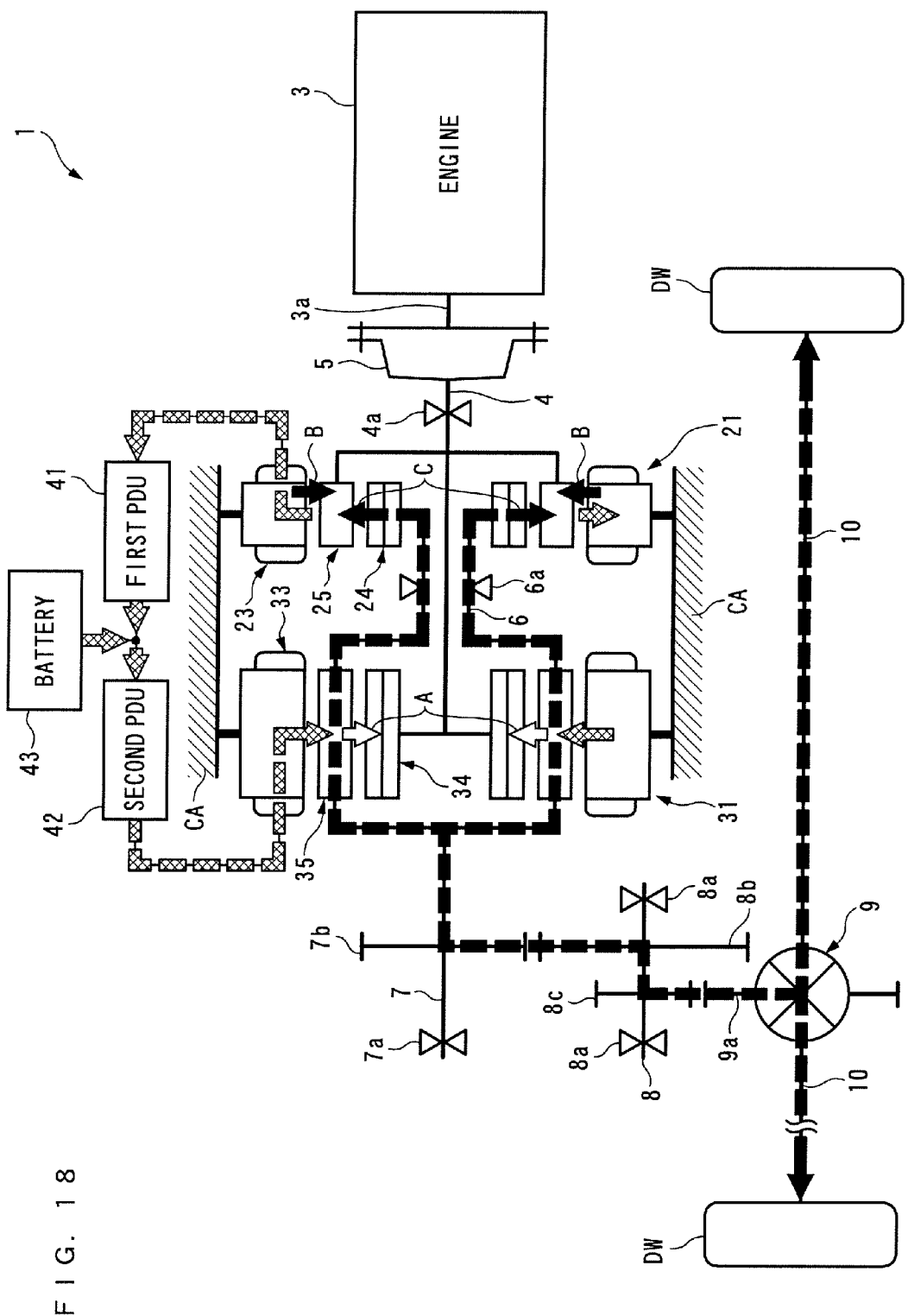
[FIG. 18] A diagram showing a state of transmission of torque in the power plant shown in FIG. 1 during EV creep.

Next, a description will be given of the operation of the power plant 1 performed under the control of the ECU 2. Operation modes of the power plant 1 include EV creep, EV standing start, ENG start during EV traveling, ENG traveling, deceleration regeneration, ENG start during stoppage of the vehicle, ENG creep, and ENG-based standing start. Now, a description will be given of these operation modes, in order from the EV creep, with reference to figures, such as FIG. 18, showing states of transmission of torque, and velocity nomographs, such as FIG. 19, illustrating the relationship between rotational speeds of the various rotary elements. Before the description of the operation modes, these nomographs will be explained.

As is apparent from the above-described connection relationship, the engine speed NE, the A2 rotor rotational speed VRA2 and the B1 rotor rotational speed VRB1 are equal to each other. Further, the A1 rotor rotational speed VRA1 and the B2 rotor rotational speed VRB2 are equal to each other, and the vehicle speed VP is equal to the A1 rotor rotational speed VRA1 and the B2 rotor rotational speed VRB2, assuming that there is no change in speed by the differential gear mechanism 9 and the like. Due to the above fact and from the aforementioned equations (53) and (54), the relationship between the engine speed NE, the vehicle speed VP, the first magnetic field rotational speed VMF1, the A1 rotor rotational speed VRA1, the A2 rotor rotational speed VRA2, the second magnetic field rotational speed VMF2, the B1 rotor rotational speed VRB1, and the B2 rotor rotational speed VRB2 is shown by each of the velocity nomographs illustrated in FIG. 19 and the like. It should be noted that in these velocity nomographs, the first pole pair number ratio α and the second pole pair number ratio 3 are both equal to 2.0, as mentioned heretofore. Further, in the following description of the operation modes, as to all the rotary elements of the power plant 1, rotation in the same direction as the direction of normal rotation of the crankshaft 3a of the engine 3 is referred to as "normal rotation", and rotation in the same direction as the direction of reverse rotation of the crankshaft 3a is referred to as "reverse rotation".

EV Creep

The EV creep is an operation mode for performing a creep operation of the vehicle using the first and second rotating machines 21 and 31 in a state where the engine 3 is stopped. Specifically, electric power is supplied from the battery 43 to the stator 33 of the second rotating machine 31, and the second rotating magnetic field generated by the stator 33 in accordance with the supply of electric power is caused to perform normal rotation. Further, electric power is generated by the stator 23 of the first rotating machine 21 using motive power transmitted to the A1 rotor 24 of the first rotating machine 21, as described hereinafter, and the generated electric power is further supplied to the stator 33.

FIG. 18 shows a state of transmission of torque during the above-described EV creep, and FIG. 19 shows a velocity nomograph illustrating the relationship between the first and second magnetic field rotational speeds VMF1 and VMF2 during the EV creep. Further, in FIG. 18 and other figures, referred to hereinafter, which show states of transmission of torque, thick broken lines with arrows indicate flows of torque. Further, black-filled arrows and hollow arrows show torques acting in the direction of normal rotation and in the direction of reverse rotation, respectively. Further, it is assumed that although in the stators 23 and 33, actually, torque is transmitted in the form of electric energy, in FIG. 18 and other figures showing states of transmission of torque, referred to hereinafter, the input and output of energy to and from the stators 23 and 33 is indicated by hatching added to the flow of torque, for convenience. Furthermore, in FIG. 19 and other velocity nomographs, referred to hereinafter, it is assumed that the direction of normal rotation is indicated by "+", and the direction of reverse rotation is indicated by "−".

As shown in FIG. 18, during the EV creep, as electric power is supplied to the stator 33 of the second rotating machine 31, the second driving equivalent torque TSE2 from the stator 33 acts on the B2 rotor 35 so as to cause the B2 rotor 35 to perform normal rotation, and as indicated by arrows A, acts on the B1 rotor 34 so as to cause the B1 rotor 34 to perform reverse rotation. Further, part of the torque transmitted to the B2 rotor 35 is transmitted to the drive wheels DW and DW via the second rotating shaft 7, the differential gear mechanism 9, and so forth, whereby the drive wheels DW and DW perform normal rotation.

Furthermore, during the EV creep, the remainder of the torque transmitted to the B2 rotor 35 is transmitted to the A1 rotor 24 via the connection shaft 6, and is then transmitted to the stator 23 of the first rotating machine 21 as electric energy along with the electric power generation by the stator 23. Further, as shown in FIG. 19, the first rotating magnetic field generated along with the electric power generation by the stator 23 performs reverse rotation. As a result, as indicated by arrows B in FIG. 18, the first electric power-generating equivalent torque TGE1 generated along with the electric power generation by the stator 23 acts on the A2 rotor 25 to cause the A2 rotor 25 to perform normal rotation. Further, the torque transmitted to the A1 rotor 24 such that it is balanced with the first electric power-generating equivalent torque TGE1 is further transmitted to the A2 rotor 25 (as indicated by arrows C), thereby acting on the A2 rotor 25 to cause the A2 rotor 25 to perform normal rotation.

In this case, the electric power supplied to the stator 33 and the electric power generated by the stator 23 are controlled such that the above-mentioned torque indicated by the arrows A, which causes the B1 rotor 34 to perform reverse rotation, and the torques indicated by the arrows B and C, which cause the A2 rotor 25 to perform normal rotation, are balanced with each other, whereby the A2 rotor 25, the B1 rotor 34 and the crankshaft 3a, which are connected to each other, are held stationary. As a consequence, as shown in FIG. 19, during the EV creep, the A2 and B1 rotor rotational speeds VRA2 and VRB1 become equal to 0, and the engine speed NE as well becomes equal to 0.

Further, during the EV creep, the electric power supplied to the stator 33 of the second rotating machine 31, the electric power generated by the stator 23 of the first rotating machine 21, and the first and second magnetic field rotational speeds VMF1 and VMF2 are controlled such that the relationships between the rotational speeds expressed by the aforementioned equations (53) and (54) are maintained, and at the same time, the A1 and B2 rotor rotational speeds VRA1 and VRB2 become very small (see FIG. 19). From the above, the creep operation with a very low vehicle speed VP is carried out. As described above, it is possible to perform the creep operation using the driving forces of the first and second rotating machines 21 and 31 in a state in which the engine 3 is stopped.

EV Standing Start

Figure 20:
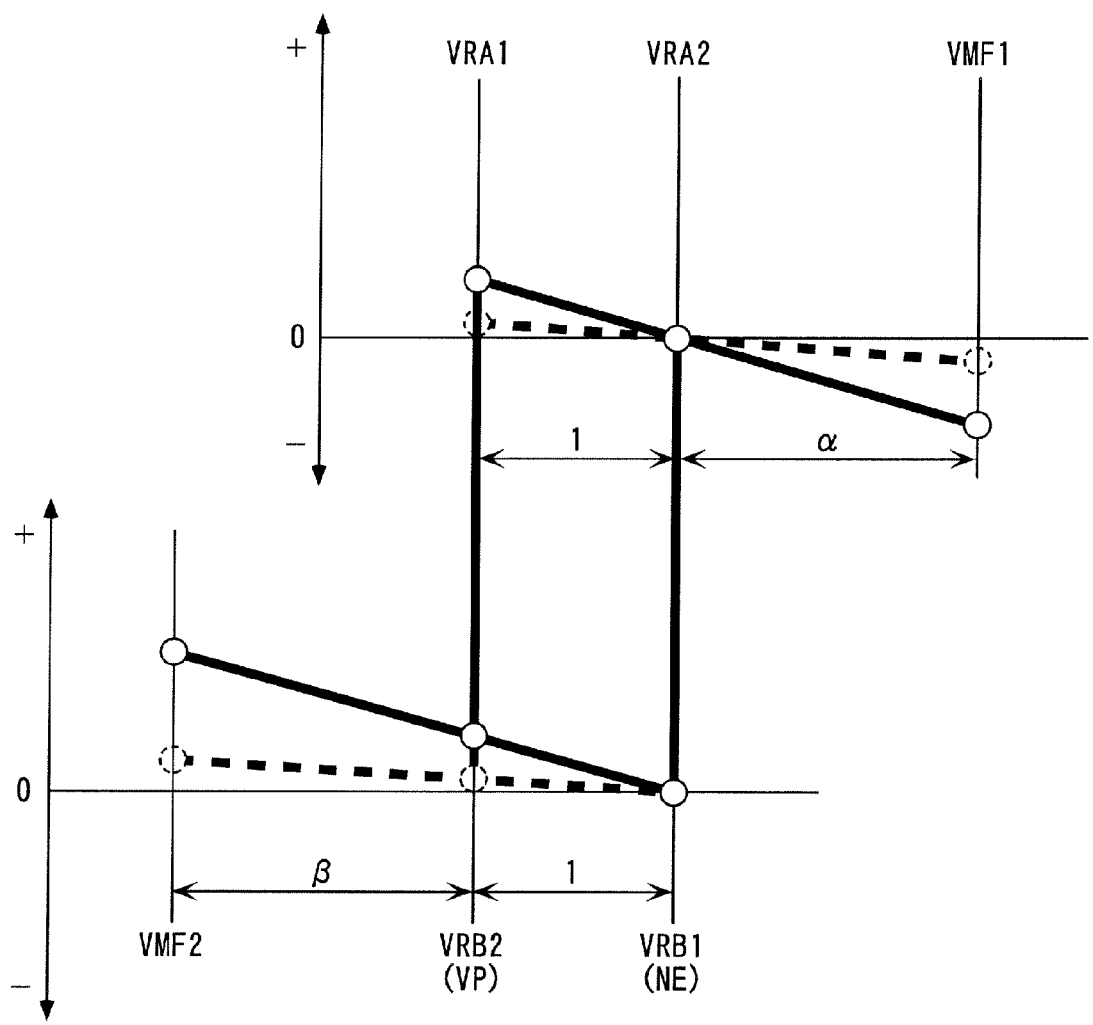
[FIG. 20] A velocity nomograph illustrating an example of the relationship between the rotational speeds of the various rotary elements of the power plant shown in FIG. 1 at the time of EV standing start.

The EV standing start is an operation mode for causing the vehicle to start and travel from the above-described EV creep, using the first and second rotating machines 21 and 31 in the state where the engine 3 is stopped. At the time of the EV standing start, the electric power supplied to the stator 33 of the second rotating machine 31 and the electric power generated by the stator 23 of the first rotating machine 21 are both increased. Further, while maintaining the relationships between the rotational speeds expressed by the equations (53) and (54) and at the same time holding the A2 and B1 rotor rotational speeds VRA2 and VRB1, that is, the engine speed NE at 0, the first magnetic field rotational speed VMF1 of the first rotating magnetic field that has been performing reverse rotation during the EV creep and the second magnetic field rotational speed VMF2 of the second rotating magnetic field that has been performing normal rotation during the EV creep are increased in the same rotation directions as they have been. From the above, as indicated by thick solid lines in FIG. 20, the A1 and B2 rotor rotational speeds VRA1 and VRB2, that is, the vehicle speed VP is increased from the state of the EV creep, indicated by broken lines in FIG. 20, causing the vehicle to start.

ENG Start During EV Traveling

The ENG start during EV traveling is an operation mode for starting the engine 3 during traveling of the vehicle after the above-described EV standing start. At the time of the ENG start during EV traveling, while holding the A1 and B2 rotor rotational speeds VRA1 and VRB2, that is, the vehicle speed VP at the value assumed then, the first magnetic field rotational speed VMF1 of the first rotating magnetic field that has been performing reverse rotation during the EV standing start, as described above, is controlled such that it becomes equal to 0, and the second magnetic field rotational speed VMF2 of the second rotating magnetic field that has been performing normal rotation during the EV standing start is controlled such that it is lowered. Then, after the first magnetic field rotational speed VMF1 becomes equal to 0, electric power is supplied from the battery 43 not only to the stator 33 of the second rotating machine 31 but also to the stator 23 of the first rotating machine 21, whereby the first rotating magnetic field generated by the stator 23 is caused to perform normal rotation, and the first magnetic field rotational speed VMF1 is caused to be increased.

Figure 21:
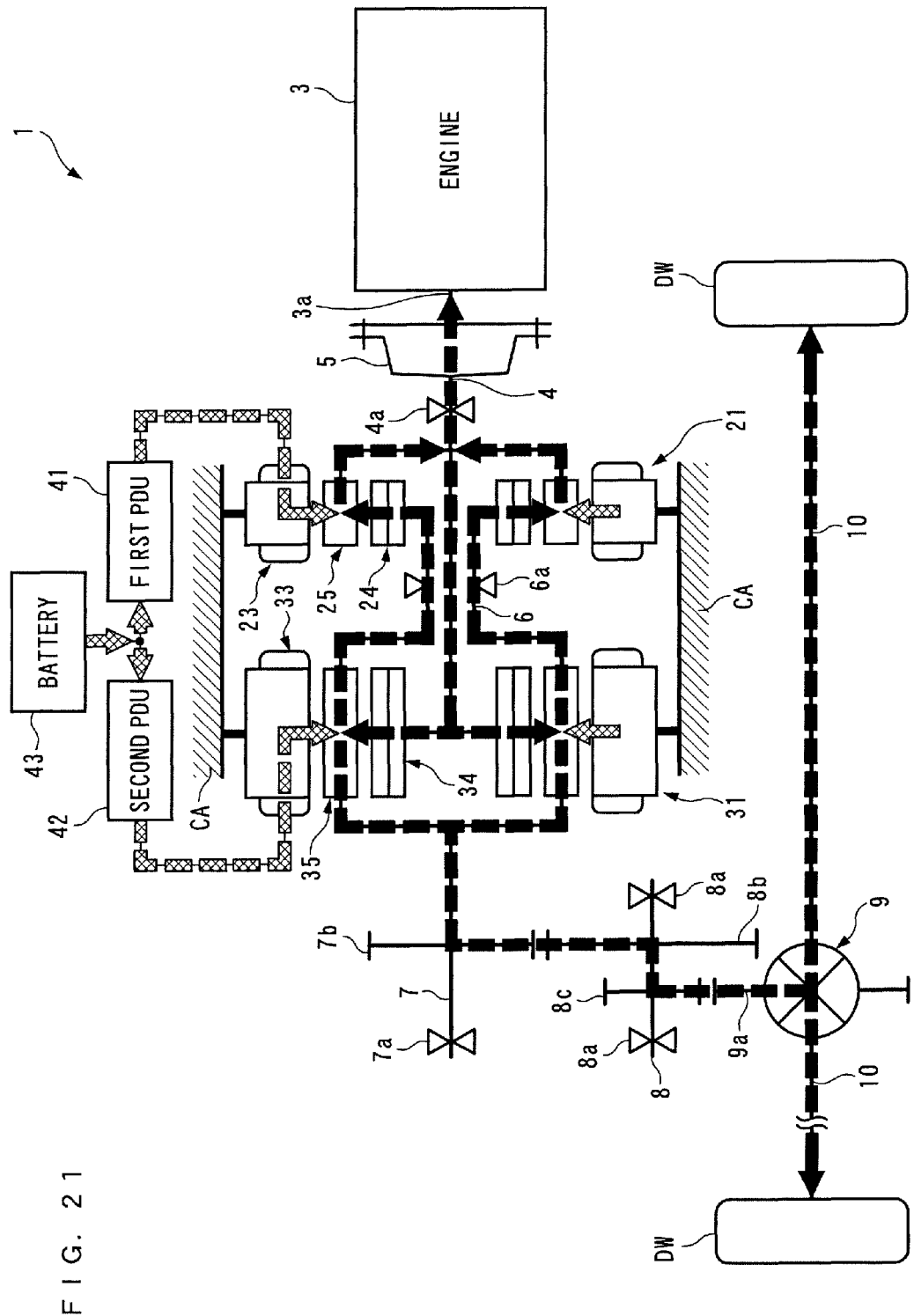
[FIG. 21] A diagram showing a state of transmission of torque in the power plant shown in FIG. 1 at the time of ENG start during EV traveling.

FIG. 21 shows a state of transmission of torque in a state in which electric power is supplied to both of the stators 23 and 33, as described above, at the time of the ENG start during EV traveling. From the aforementioned functions of the second rotating machine 31, as shown in FIG. 21, the electric power is supplied to the stator 33 as described above, whereby as the second driving equivalent torque TSE2 is transmitted to the B2 rotor 35, torque transmitted to the B1 rotor 34, as described hereinafter, is transmitted to the B2 rotor 35. That is, the second driving equivalent torque TSE2, and the B1 rotor-transmitted torque TRB1 transmitted to the B1 rotor 34 are combined, and the combined torque is transmitted to the B2 rotor 35. Further, part of the torque transmitted to the B2 rotor 35 is transmitted to the A1 rotor 24 via the connection shaft 6, and the remainder thereof is transmitted to the drive wheels DW and DW via the second rotating shaft 7 and so forth.

Further, at the time of the ENG start during EV traveling, from the aforementioned functions of the first rotating machine 21, as shown in FIG. 21, the electric power is supplied from the battery 43 to the stator 23, whereby as the first driving equivalent torque TSE1 is transmitted to the A2 rotor 25, the torque transmitted to the A1 rotor 24, as described above, is transmitted to the A2 rotor 25. That is, the first driving equivalent torque TSE1 and the A1 rotor-transmitted torque TRA1 transmitted to the A1 rotor 24 are combined, and the combined torque is transmitted to the A2 rotor 25. Further, part of the torque transmitted to the A2 rotor 25 is transmitted to the B1 rotor 34 via the first rotating shaft 4, and the remainder thereof is transmitted to the crankshaft 3a via the first rotating shaft 4 and the flywheel 5, whereby the crankshaft 3a performs normal rotation. Furthermore, in this case, the electric power supplied to the stators 23 and 33 is controlled such that sufficient motive power is transmitted to the drive wheels DW and DW and the engine 3.

From the above, as indicated by thick solid lines in FIG. 22, at the time of the ENG start during EV traveling, while the vehicle speed VP is held at the value assumed then, the A2 and B1 rotor rotational speeds VRA2 and VRB1 are increased from a state in which they are equal to 0, indicated by broken lines, and the rotational speed of the crankshaft 3a connected to the A2 and B1 rotors 25 and 34, that is, the engine speed NE is also increased. In this state, the ignition operation of fuel injection valves (not shown) and spark plugs (not shown) of the engine 3 is controlled according to the detected crank angle position, whereby the engine 3 is started. Further, in this case, by controlling the first and second magnetic field rotational speeds VMF1 and VMF2, the engine speed NE is controlled to a relatively small value suitable for starting the engine 3.

Figure 23:
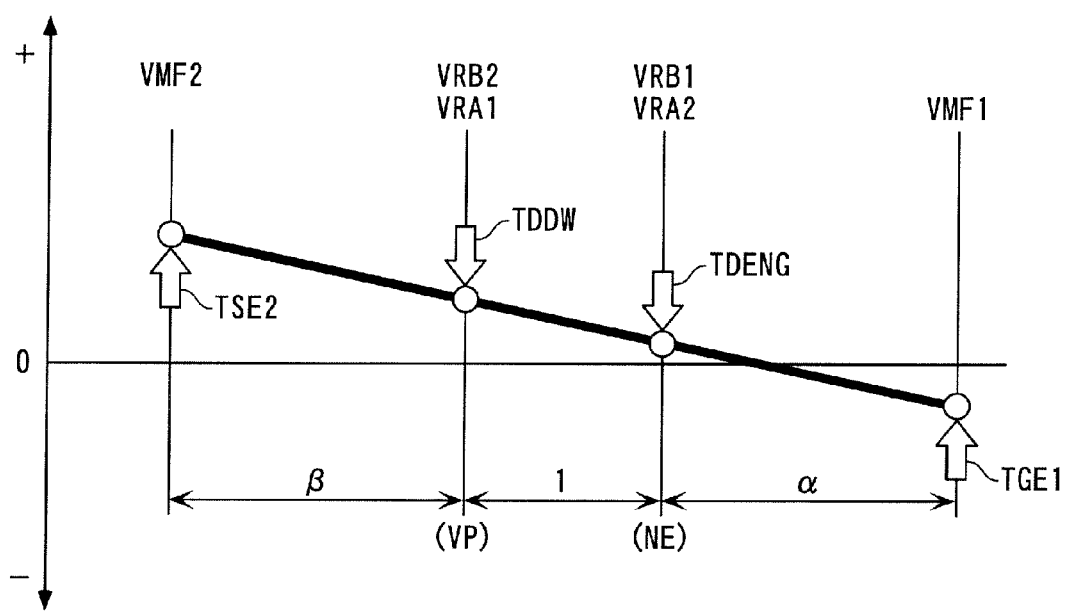
[FIG. 23] A diagram showing an example of the relationship between the rotational speeds and torques of the various rotary elements of the power plant shown in FIG. 1 at the start of the ENG start during EV traveling.

FIG. 23 shows an example of the relationship between the rotational speeds and torques of the rotary elements at the start of the ENG start during EV traveling. In the figure, TDENG represents torque transmitted to the crankshaft 3a of the engine 3 (hereinafter referred to as the "engine-transmitted torque"), and TDDW represents torque transmitted to the drive wheels DW and DW (hereinafter referred to as the "drive wheel-transmitted torque"). In this case, as is apparent from FIG. 23, the second driving equivalent torque TSE2 is transmitted to both the drive wheels DW and DW and the crankshaft 3a using the first electric power-generating equivalent torque TGE1 as a reaction force, and hence the torque demanded of the first rotating machine 21 becomes larger than in the other cases. In this case, the torque demanded of the first rotating machine 21, i.e. the first electric power-generating equivalent torque TGE1 is expressed by the following equation (57):

$$TGE1=-\{\beta \cdot TDDW+(\beta+1)TDENG\}/(\alpha+1+\beta) \quad (57)$$

As is apparent from the equation (57), as the first pole pair number ratio α is larger, the first electric power-generating equivalent torque TGE1 becomes smaller with respect to the drive wheel-transmitted torque TDDW and the engine-transmitted torque TDENG assuming that the respective magnitudes thereof are unchanged. In the present embodiment, since the first pole pair number ratio α is set to 2.0, the first electric power-generating equivalent torque TGE1 can be made smaller than when the first pole pair number ratio α is set to a value smaller than 1.0.

ENG Traveling

Figure 24:
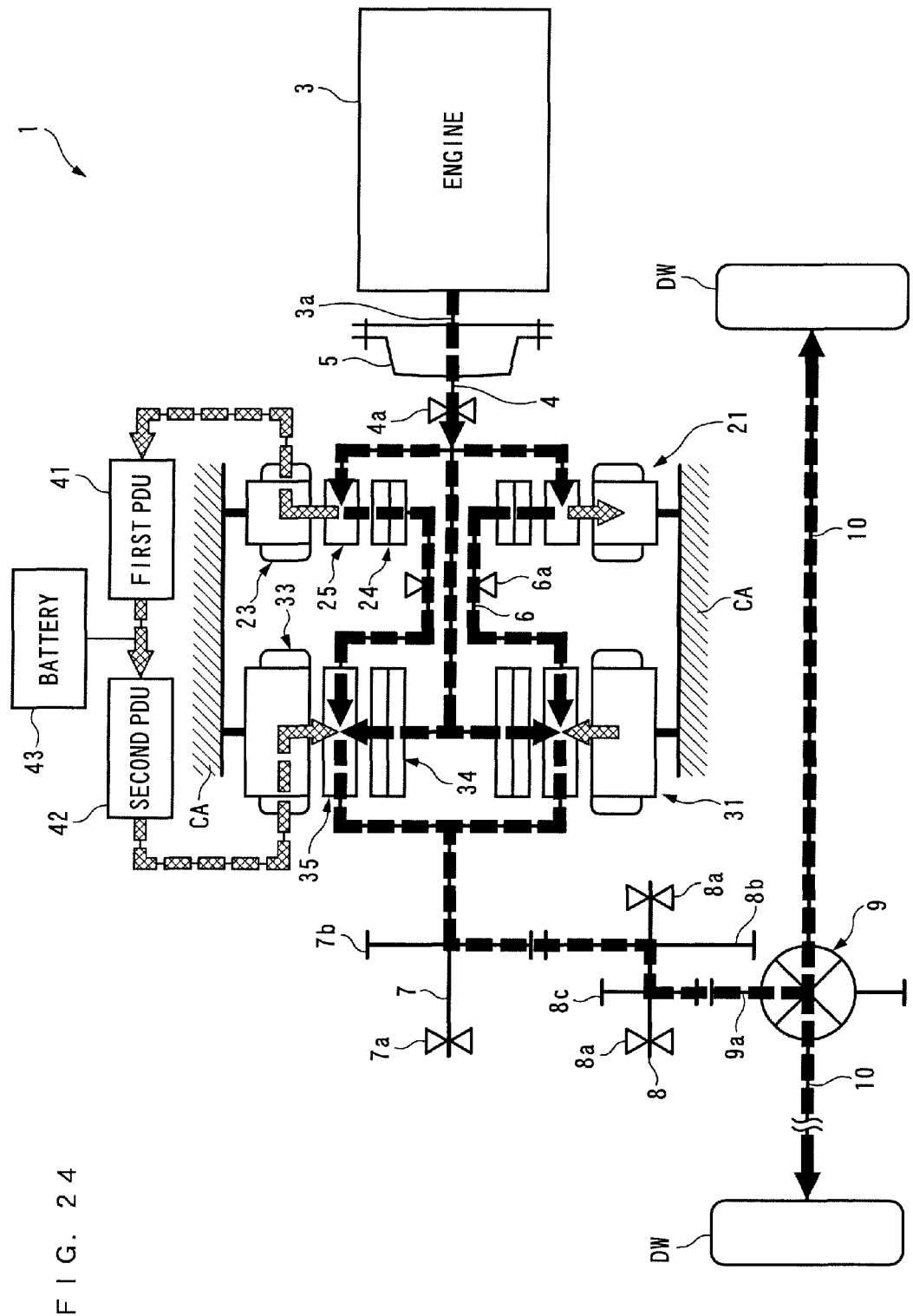
[FIG. 24] A diagram showing a state of transmission of torque in the power plant shown in FIG. 1 in a battery input/output zero mode.

The ENG traveling is an operation mode for causing the vehicle to travel using the motive power from the engine 3. During the ENG traveling, motive power output to the crankshaft 3a by combustion of the engine 3 (hereinafter referred to as the "engine motive power") is basically controlled such that fuel economy which is optimum (hereinafter referred to as the "optimum fuel economy") can be obtained within a range within which a demanded torque can be generated. The demanded torque is torque demanded by the vehicle and is calculated e.g. by searching a map (not shown) according to the detected vehicle speed VP and accelerator pedal opening AP. Further, during the ENG traveling, by using the engine motive power transmitted to the A2 rotor 25, electric power generation is performed by the stator 23 of the first rotating machine 21, and the generated electric power is to supplied to the stator 33 of the second rotating machine 31 without charging the battery 43 therewith. Hereinafter, this operation mode is referred to as the "battery input/output zero mode". FIG. 24 shows a state of transmission of torque in the battery input/output zero mode.

By the above-described functions of the first rotating machine 21, as shown in FIG. 24, during the battery input/output zero mode, as part of torque output to the crankshaft 3a by combustion of the engine 3 (hereinafter referred to as the "engine torque") is transmitted to the stator 23 as the first electric power-generating equivalent torque TGE1 via the A2 rotor 25, part of the engine torque is also transmitted to the A1 rotor 24 via the A2 rotor 25. That is, part of the engine torque is transmitted to the A2 rotor 25, and the engine torque transmitted to the A2 rotor 25 is distributed to the stator 23 and the A1 rotor 24. Further, the remainder of the engine torque is transmitted to the B1 rotor 34 via the first rotating shaft 4.

Further, similarly to the case of the ENG start during EV traveling, the second driving equivalent torque TSE2 and the B1 rotor-transmitted torque TRB1 are combined, and the combined torque is transmitted to the B2 rotor 35 as the B2 rotor-transmitted torque TRB2. Therefore, in the battery input/output zero mode, the electric power generated by the stator 23 of the first rotating machine 21 as described above is supplied to the stator 33 of the second rotating machine 31, whereby as the second driving equivalent torque TSE2 is transmitted to the B2 rotor 35, the engine torque transmitted to the B1 rotor 34 as described above is transmitted to the B2 rotor 35. Further, the engine torque distributed to the A1 rotor 24 as described above, is further transmitted to the B2 rotor 35 via the connection shaft 6.

As described above, combined torque formed by combining the engine torque distributed to the A1 rotor 24, the second driving equivalent torque TSE2, and the engine torque transmitted to the B1 rotor 34 is transmitted to the B2 rotor 35. Further, this combined torque is transmitted to the drive wheels DW and DW via the second rotating shaft 7 and so forth. As a consequence, assuming that there is no transmission loss caused by the gears, in the battery input/output zero mode, motive power equal in magnitude to the engine motive power is transmitted to the drive wheels DW and DW.

Furthermore, in the battery input/output zero mode, the engine motive power is transmitted to the drive wheels DW and DW while having the speed thereof steplessly changed through the control of the first and second magnetic field rotational speeds VMF1 and VMF2. In short, the first and second rotating machines 21 and 31 function as a stepless transmission.

Figure 25:
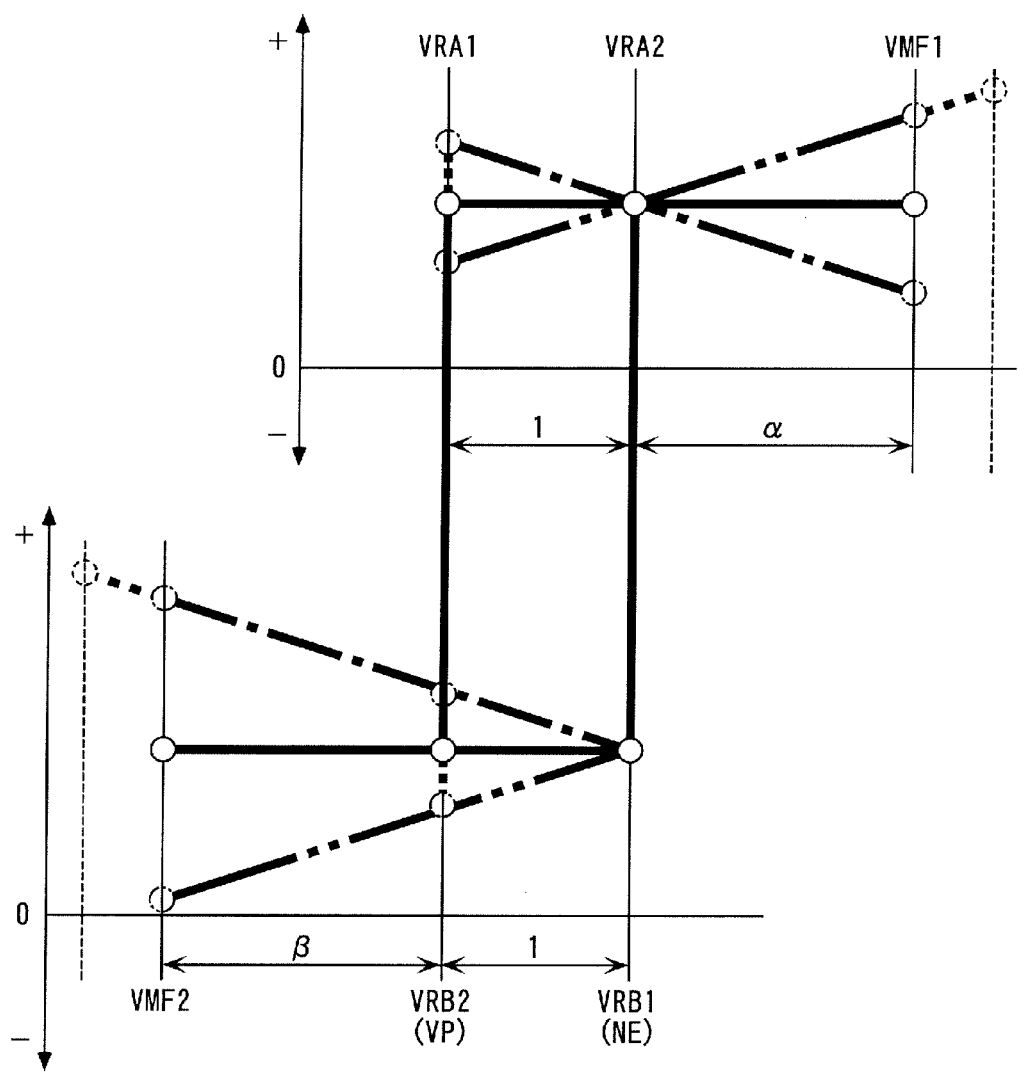
[FIG. 25] A diagram which is useful in explaining speed-changing operations by the first and second rotating machines of the power plant shown in FIG. 1.

Specifically, as indicated by two-dot chain lines in FIG. 25, while maintaining the speed relationships expressed by the equations (53) and (54), by increasing the first magnetic field rotational speed VMF1 and decreasing the second magnetic field rotational speed VMF2, with respect to the A2 and B1 rotor rotational speeds VRA2 and VRB1, that is, the engine speed NE, it is possible to steplessly decrease the A1 and B2 rotor rotational speeds VRA1 and VRB2, that is, the vehicle speed VP. Inversely, as indicated by one-dot chain lines in FIG. 25, by decreasing the first magnetic field rotational speed VMF1 and increasing the second magnetic field rotational speed VMF2 with respect to the A2 and B1 rotor rotational speeds VRA2 and VRB1, it is possible to steplessly increase the vehicle speed VP.

Furthermore, in this case, the first and second magnetic field rotational speeds VMF1 and VMF2 are controlled such that the engine speed NE becomes equal to a target engine speed. The target engine speed is calculated e.g. by searching a map (not shown) according to the vehicle speed VP and the calculated demanded torque. In this map, the target engine speed is set to such a value as will make it possible to obtain the optimum fuel economy of the engine 3 with respect to the vehicle speed VP and the demanded torque assumed then.

As described hereinabove, in the battery input/output zero mode, the engine motive power is once divided by the first and second rotating machines 21 and 31, and is transmitted to the B2 rotor 35 via the following first to third transmission paths. Then, the divided engine motive power is transmitted to the drive wheels DW and DW in a combined state.

First transmission path: A2 rotor 25→magnetic forces caused by magnetic force lines ML→A1 rotor 24→connection shaft 6→B2 rotor 35

Second transmission path: B1 rotor 34→magnetic forces caused by magnetic force lines ML→B2 rotor 35

Third transmission path: A2 rotor 25→magnetic forces caused by magnetic force lines ML→stator 23→first PDU 41→second PDU 42→stator 33→magnetic forces caused by magnetic force lines ML→B2 rotor 35

In the above first and second transmission paths, the engine motive power is transmitted to the drive wheels DW and DW by the magnetic forces caused by the magnetic force lines ML via so-called magnetic paths, without being converted to electric power. Further, in the above-mentioned third transmission path, the engine motive power is once converted to electric power, and is then converted back to motive power again so as to be transmitted to the drive wheels DW and DW by so-called electrical paths.

Further, in the battery input/output zero mode, the electric power generated by the stator 23 and the first and second magnetic field rotational speeds VMF1 and VMF2 are controlled such that the speed relationships expressed by the equations (53) and (54) are maintained.

On the other hand, during the ENG traveling, if the following conditions (a) and (b) based on the calculated demanded torque and charge state are both satisfied, the engine 3 is assisted by the second rotating machine 31. Hereinafter, this operation mode is referred to as the "assist mode".

(a) demanded torque>first predetermined value
(b) charge state>lower limit value Here, the first predetermined value is calculated e.g. by searching a map (not shown) according to the vehicle speed VP. In this map, the first predetermined value is set to such a torque value as will make it possible to obtain the optimum fuel economy of the engine 3 with respect to the vehicle speed VP assumed then. The above-described lower limit value is set to such a value as will not cause excessive discharge of the battery 43. Thus, the operation in the assist mode is performed when motive power required for driving the vehicle (hereinafter referred to as the "vehicle demand motive power"), which is represented by the vehicle speed VP and the demanded torque assumed then, is larger than the engine motive power that will make it possible to obtain the optimum fuel economy of the engine 3, and at the same time when the remaining electric power in the battery 43 is large enough.

Figure 26:
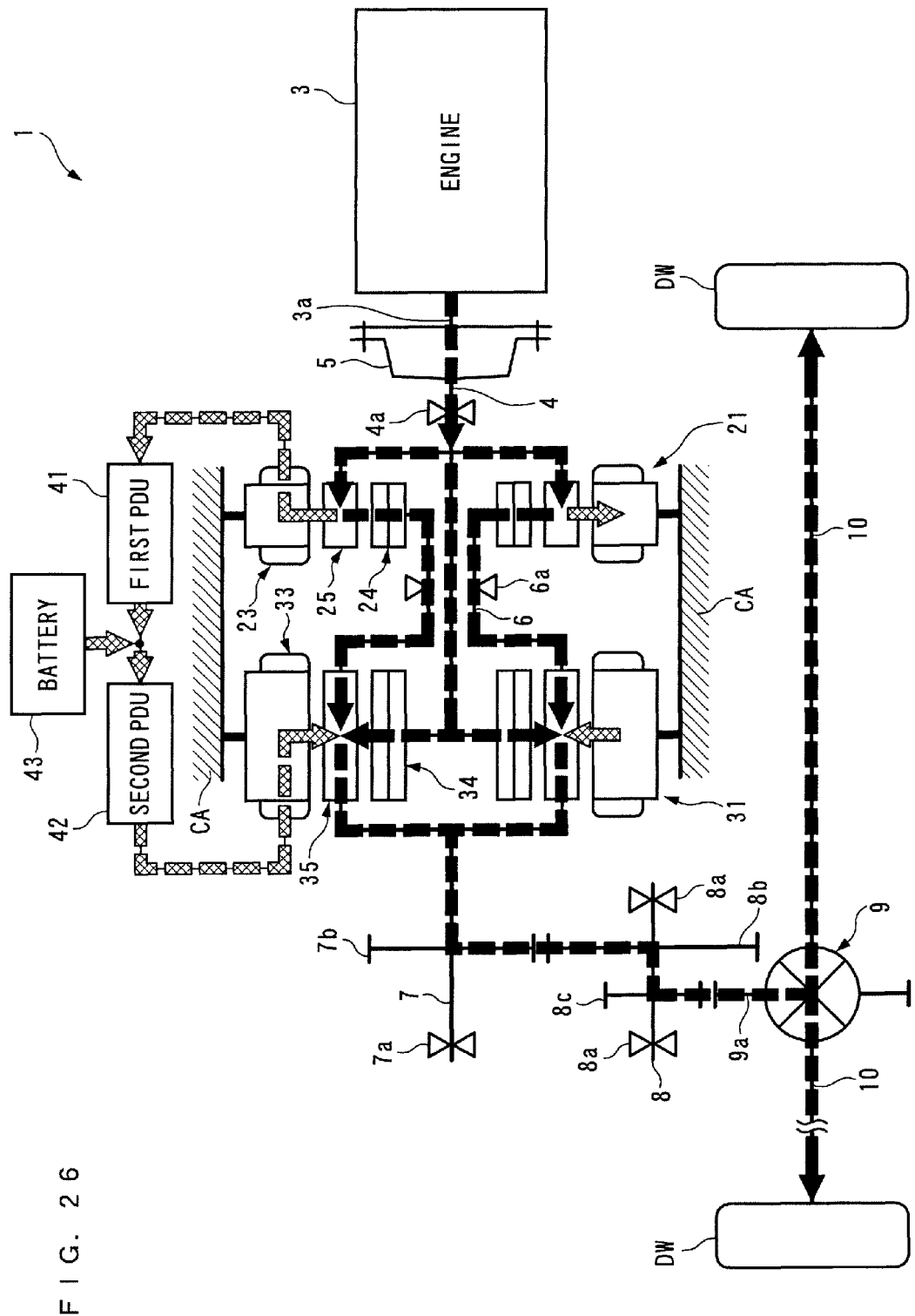
[FIG. 26] A diagram showing a state of transmission of torque in the power plant shown in FIG. 1 in an assist mode.

Specifically, similarly to the battery input/output zero mode described above, electric power is generated by the stator 23 using the engine motive power transmitted to the A2 rotor 25. Further, in this case, differently from the battery input/output zero mode, as shown in FIG. 26, electric power charged in the battery 43 is supplied to the stator 33 in addition to the electric power generated by the stator 23. Therefore, the second driving equivalent torque TSE2 based on the electric power supplied from the stator 23 and the battery 43 is transmitted to the B2 rotor 35. Further, similarly to the battery input/output zero mode, torque formed by combining the above second driving equivalent torque TSE2, the engine torque distributed to the A1 rotor 24 along with the electric power generation, and the engine torque transmitted to the B1 rotor 34 is transmitted to the drive wheels DW and DW via the B2 rotor 35. As a result, assuming that there is no transmission loss caused by the gears, in the assist mode, the motive power transmitted to the drive wheels DW and DW becomes equal to the sum of the engine motive power and the electric power (energy) supplied from the battery 43.

Further, in the assist mode, the electric power generated by the stator 23, the electric power supplied from the battery 43 to the stator 33, and the first and second magnetic field rotational speeds VMF1 and VMF2 are controlled such that the speed relationships expressed by the equations (53) and (54) are maintained. As a result, the insufficient amount of the engine motive power with respect to the vehicle demand motive power is made up for by supply of electric power from the battery 43 to the stator 33. It should be noted that although the above-described example is an example of a case in which the insufficient amount of the engine motive power with respect to the vehicle demand motive power is relatively small, if the insufficient amount is relatively large, the electric power is supplied from the battery 43 not only to the stator 33 of the second rotating machine 31 but also to the stator 23 of the first rotating machine 21.

On the other hand, during the ENG traveling, if the following conditions (c) and (d) are both satisfied, the battery 43 is charged with part of the electric power generated by the stator 23 of the first rotating machine 21 using the engine motive power, as described above, and the remainder of the generated electric power is supplied to the stator 33 of the second rotating machine 31. Hereinafter, this operation mode is referred to as the "drive-time charging mode".

(c) demanded torque<second predetermined value (d) charge state<upper limit value Here, the second predetermined value is calculated e.g. by searching a map (not shown) according to the vehicle speed VP. In this map, the second predetermined value is set to a value smaller than such a torque value as will make it possible to obtain the optimum fuel economy of the engine 3 with respect to the vehicle speed VP assumed then. The upper limit value is set to such a value as will not cause overcharge of the battery 43. Thus, the operation in the drive-time charging mode is performed when the vehicle demand motive power is smaller than the engine motive power that will make it possible to obtain the optimum fuel economy of the engine 3, and at the same time when the charge state is relatively low.

Figure 27:
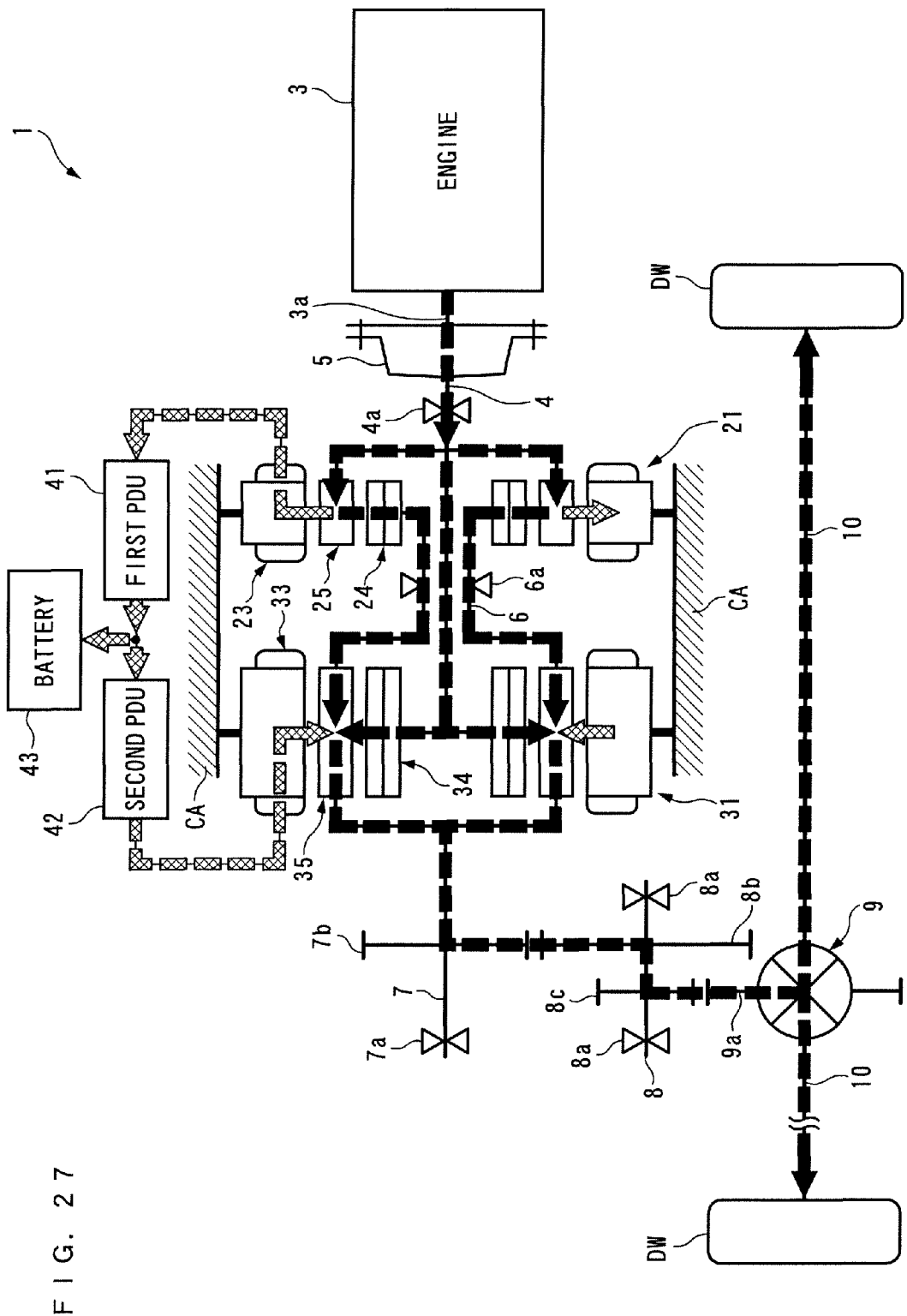
[FIG. 27] A diagram showing a state of transmission of torque in the power plant shown in FIG. 1 in a drive-time charging mode.

Referring to FIG. 27, in the drive-time charging mode, differently from the aforementioned battery input/output zero mode, electric power, which has a magnitude obtained by subtracting the electric power charged into the battery 43 from the electric power generated by the stator 23 of the first rotating machine 21, is supplied to the stator 33 of the second rotating machine 31, and the second driving equivalent torque TSE2 based on the electric power having the magnitude is transmitted to the B2 rotor 35. Further, similarly to the battery input/output zero mode, torque formed by combining the above second driving equivalent torque TSE2, the engine torque distributed to the A1 rotor 24 along with the electric power generation, and the engine torque transmitted to the B1 rotor 34 is transmitted to the drive wheels DW and DW via the B2 rotor 35. As a result, assuming that there is no transmission loss caused by the gears, in the drive-time charging mode, the motive power transmitted to the drive wheels DW and DW has a magnitude obtained by subtracting the electric power (energy) charged into the battery 43 from the engine motive power.

Further, in the drive-time charging mode, the electric power generated by the stator 23, the electric power charged into the battery 43, and the first and second magnetic field rotational speeds VMF1 and VMF2 are controlled such that the speed relationships expressed by the equations (53) and (54) are maintained. As a result, the surplus amount of the engine motive power with respect to the vehicle demand motive power is converted to electric power by the stator 23 of the first rotating machine 21, and is charged into the battery 43.

Further, during the ENG traveling, when the electric power generation is not performed by the stator 23 of the first rotating machine 21 but electric power is supplied from the battery 43 to the stator 33 of the second rotating machine 31, and this electric power is controlled such that the second driving equivalent torque TSE2 becomes equal to a half of the engine torque, as is clear from the aforementioned equation (55), all of the engine torque and the second driving equivalent torque TSE2 are combined by the B2 rotor 35, and then the combined torque is transmitted to the drive wheels DW and DW. That is, in this case, it is possible to transmit all the engine motive power to the drive wheels DW and DW only by the magnetic paths without transmitting the same by the aforementioned electrical paths. Further, in this case, torque having a magnitude 3/2 times as large as that of the engine torque is transmitted to the drive wheels DW and DW.

Furthermore, when the electric power generated by the stator 23 of the first rotating machine 21 is controlled such that the first electric power-generating equivalent torque TGE1 becomes equal to ⅓ of the engine torque, it is possible to transmit the motive power from the engine 3 to the drive wheels DW and DW only by the magnetic paths. In this case, torque having a magnitude ⅔ times as large as that of the engine torque is transmitted to the drive wheels DW and DW.

Figure 28:
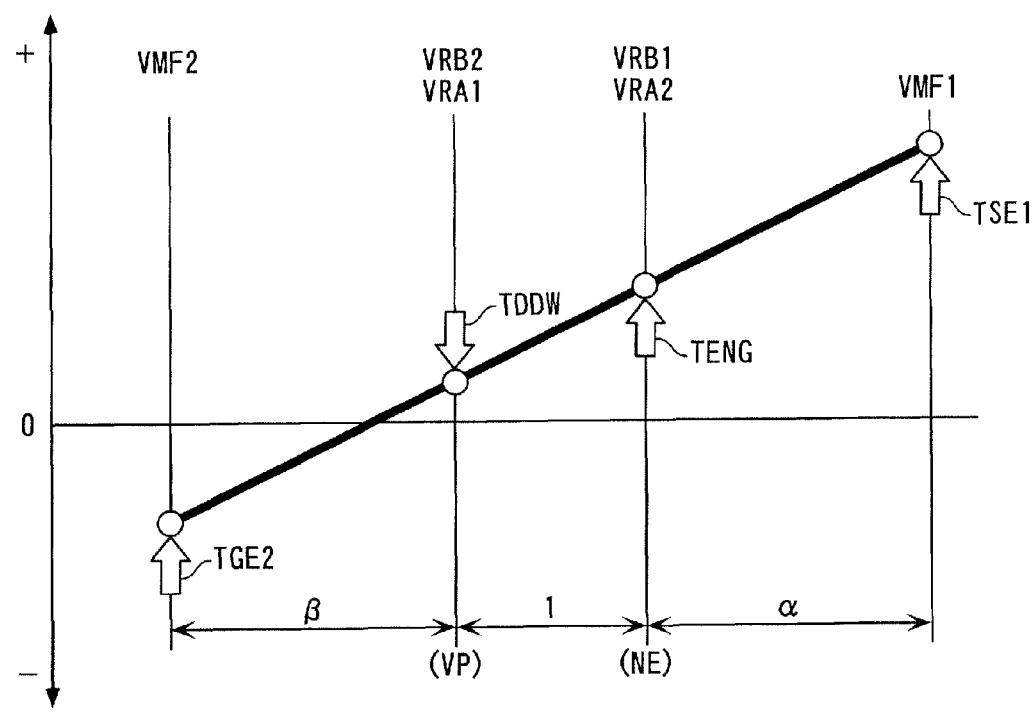
[FIG. 28] A diagram showing an example of the relationship between the rotational speeds and torques of the various rotary elements of the power plant shown in FIG. 1 at the start of rapid acceleration operation during ENG traveling.

Further, during the ENG traveling, when the vehicle speed VP in a low-speed condition of the vehicle is rapidly increased (hereinafter such operation of the vehicle is referred to as the "rapid acceleration operation during the ENG traveling"), the engine 3 and the first and second rotating machines 21 and 31 are controlled in the following manner: FIG. 28 shows an example of the relationship between the rotational speeds and torques of the rotary elements at the start of this rapid acceleration operation during the ENG traveling. In the figure, TENG represents torque of the engine 3. In this case, the engine speed NE is increased to such a predetermined engine speed as will make it possible to obtain the maximum torque thereof. As shown in FIG. 28, the vehicle speed VP is not immediately increased, and hence as the engine speed NE becomes higher than the vehicle speed VP, the difference between the engine speed NE and the vehicle speed VP increases, so that the direction of rotation of the second rotating magnetic field determined by the relationship between the engine speed NE and the vehicle speed VP becomes the direction of reverse rotation. Therefore, in order to cause positive torque from the stator 33 of the second rotating machine 31, which generates such a second rotating magnetic field, to act on the drive wheels DW and DW, the stator 33 performs electric power generation. Further, electric power generated by the stator 33 is supplied to the stator 23 of the first rotating machine 21 to cause the first rotating magnetic field to perform normal rotation.

As described above, the engine torque TENG, the first driving equivalent torque TSE1, and the second electric power-generating equivalent torque TGE2 are all transmitted to the drive wheels DW and DW as positive torque, which results in a rapid increase in the vehicle speed VP. Further, at the start of the rapid acceleration operation during the ENG traveling, as is apparent from FIG. 28, the engine torque TENG and the first driving equivalent torque TSE1 are transmitted to the drive wheels DW and DW using the second electric power-generating equivalent torque TGE2 as a reaction force, so that torque demanded of the second rotating machine 31 becomes larger than otherwise. In this case, the torque demanded of the second rotating machine 31, i.e. the second electric power-generating equivalent torque TGE2 is expressed by the following equation (58):

$$TGE2 = -\{\alpha \cdot TENG + (1+\alpha)TDDW\}/(\beta+1\alpha) \qquad (58)$$

As is apparent from the equation (58), as the second pole pair number ratio 3 is larger, the second electric power-generating equivalent torque TGE2 becomes smaller with respect to the drive wheel-transmitted torque TDDW and the engine torque TENG assuming that the respective magnitudes thereof are unchanged. In the present embodiment, since the second pole pair number ratio β is set to 2.0, the second driving equivalent torque TSE2 can be made smaller than when the second pole pair number ratio β is set to a value smaller than 1.0.

Deceleration Regeneration

The deceleration regeneration is an operation mode for generating electric power by the first rotating machine 21 and the second rotating machine 31 using inertia energy of the drive wheels DW and DW, and charging the battery 43 with the generated electric power, during decelerating traveling of the vehicle, i.e. when the vehicle is traveling by inertia. During the deceleration regeneration, when the ratio of torque of the drive wheels DW and DW transmitted to the engine 3 to torque of the drive wheels DW and DW (torque by inertia) is small, electric power generation is performed by both the stators 23 and 33 using part of motive power from the drive wheels DW and DW, and the generated electric power is charged into the battery 43. Specifically, this electric power generation is performed by the stator 23 of the first rotating machine 21 using motive power transmitted to the A2 rotor 25 as described hereinafter, and is performed by the stator 33 of the second rotating machine 31 using motive power transmitted to the B2 rotor 35 as described hereinafter.

Figure 29:
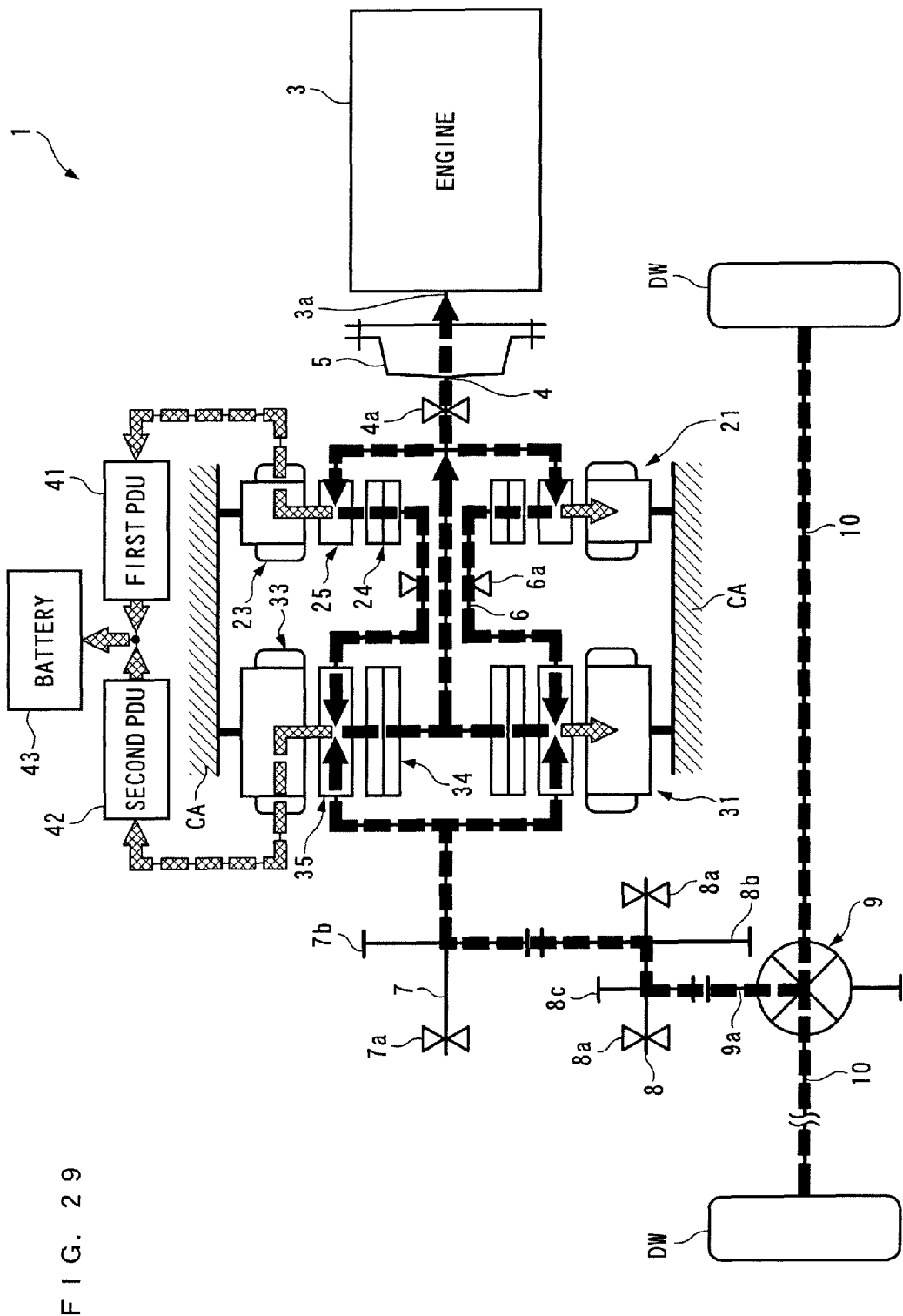
[FIG. 29] A diagram showing a state of transmission of torque in the power plant shown in FIG. 1 during deceleration regeneration.

FIG. 29 shows a state of transmission of torque during the above-described deceleration regeneration. As shown in the figure, along with the electric power generation by the stator 33, combined torque formed by combining all the torque of the drive wheels DW and DW and torque distributed to the A1 rotor 24, as described hereinafter, is transmitted to the B2 rotor 35. Further, by the aforementioned functions of the second rotating machine 31, the above-described combined torque transmitted to the B2 rotor 35 is distributed to the stator 33 and the B1 rotor 34.

Further, part of the torque distributed to the B1 rotor 34 is transmitted to the engine 3, and the remainder thereof is, similarly to the case of the aforementioned battery input/output zero mode, transmitted to the A2 rotor 25 along with the electric power generation by the stator 23, and is then distributed to the stator 23 and the A1 rotor 24. Further, the torque distributed to the A1 rotor 24 is transmitted to the B2 rotor 35. As a result, assuming that there is no transmission loss caused by the gears, during the deceleration regeneration, the sum of the motive power transmitted to the engine 3 and the electric power (energy) charged into the battery 43 becomes equal to the motive power from the drive wheels DW and DW.

ENG Start During Stoppage of the Vehicle

The ENG start during stoppage of the vehicle is an operation mode for starting the engine 3 during stoppage of the vehicle. At the time of the ENG start during stoppage of the vehicle, electric power is supplied from the battery 43 to the stator 23 of the first rotating machine 21, causing the first rotating magnetic field generated by the stator 23 in accordance with the supply of the electric power to perform normal rotation, and by using motive power transmitted to the B1 rotor 34 as described hereinafter, electric power generation is performed by the stator 33 to further supply the generated electric power to the stator 23.

Figure 30:
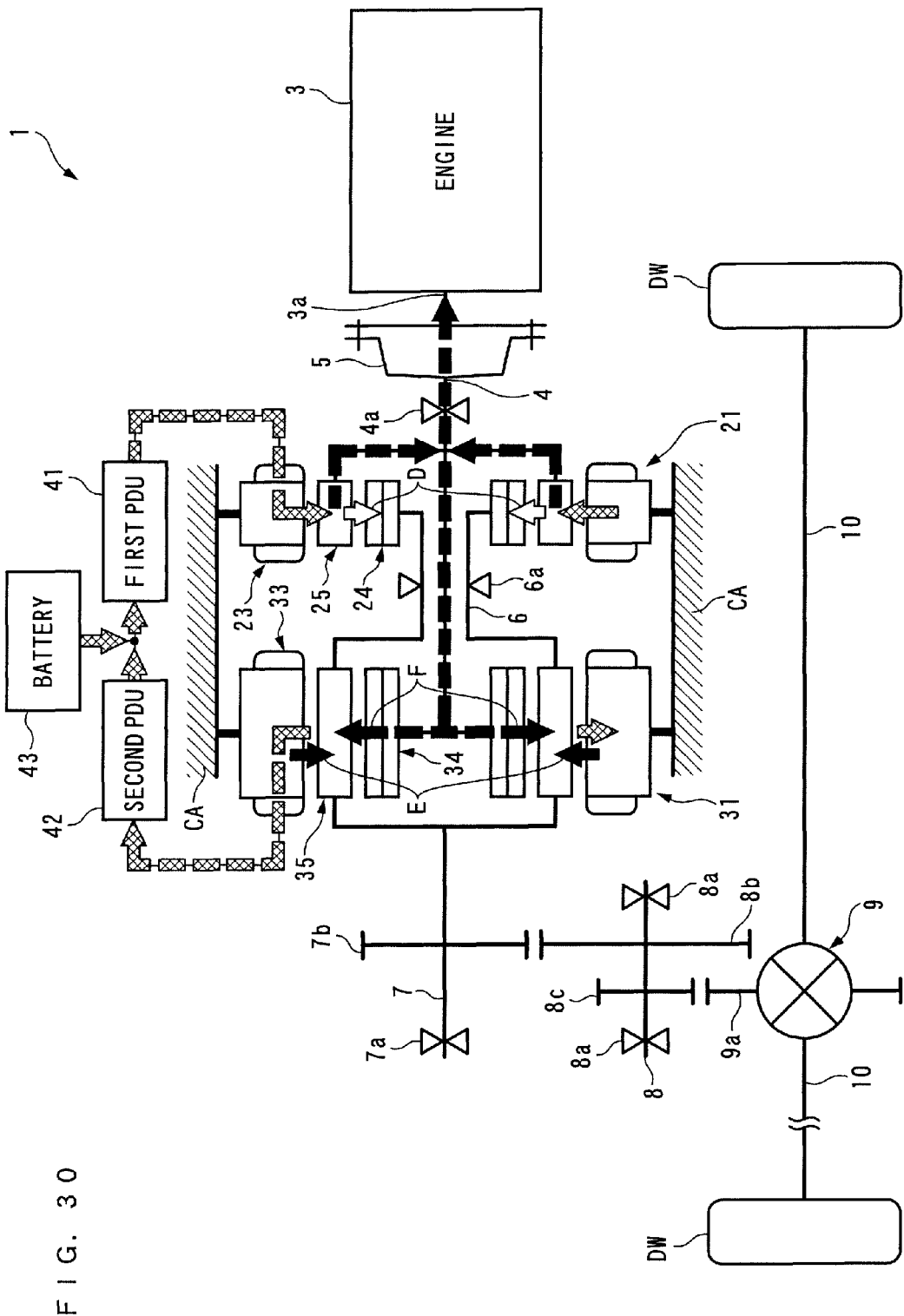
[FIG. 30] A diagram showing a state of transmission of torque in the power plant shown in FIG. 1 at the time of ENG start during stoppage of the vehicle.
Figure 31:
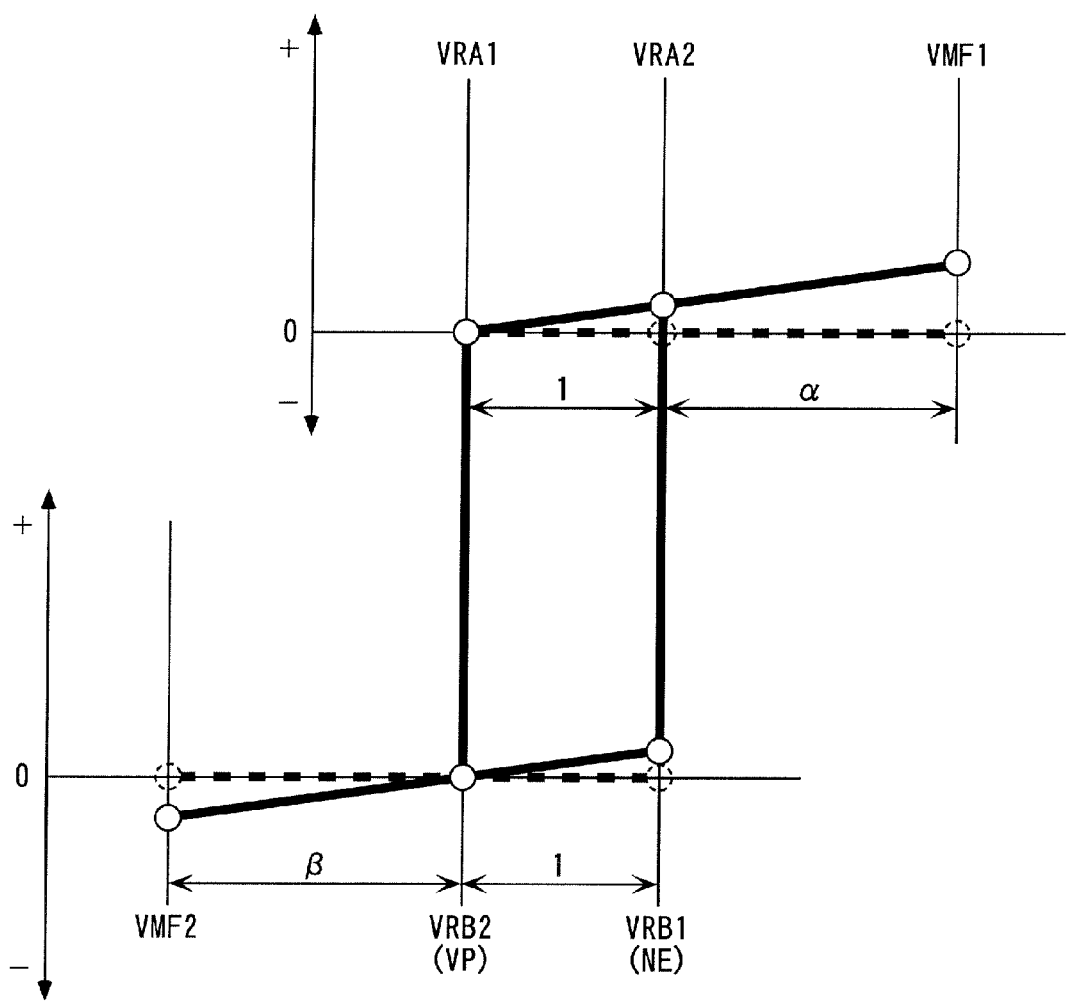
[FIG. 31] A velocity nomograph illustrating an example of the relationship between the rotational speeds of the various rotary elements of the power plant shown in FIG. 1 at the time of the ENG start during stoppage of the vehicle.

FIG. 30 shows a state of transmission of torque at the time of above-described ENG start during stoppage of the vehicle, and FIG. 31 shows a velocity nomograph at the time of the ENG start during stoppage of the vehicle. As shown in FIG. 30, at the time of the ENG start during stoppage of the vehicle, as the electric power is supplied to the stator 23, the first driving equivalent torque TSE1 from the stator 23 acts on the A2 rotor 25 to cause the A2 rotor 25 to perform normal rotation, and acts on the A1 rotor 24 to cause the A1 rotor 24 to perform reverse rotation, as indicated by arrows D. Further, part of the torque transmitted to the A2 rotor 25 is transmitted to the crankshaft 3a, whereby the crankshaft 3a performs normal rotation.

Furthermore, at the time of the ENG start during stoppage of the vehicle, the remainder of the torque transmitted to the A2 rotor 25 is transmitted to the B1 rotor 34, and is then transmitted to the stator 33 of the second rotating machine 31 as electric energy along with the electric power generation by the stator 33. Further, as indicated by thick solid lines in FIG. 31, the second rotating magnetic field generated along with the electric power generation by the stator 33 performs reverse rotation. As a result, as indicated by arrows E in FIG. 30, the second electric power-generating equivalent torque TGE2 generated along with the electric power generation of the stator 33 acts on the B2 rotor 35 to cause the B2 rotor 35 to perform normal rotation. Further, the torque transmitted to the B1 rotor 34 such that it is balanced with the second electric power-generating equivalent torque TGE2 is further transmitted to the B2 rotor 35 (as indicated by arrows F), thereby acting on the B2 rotor 35 to cause the B2 rotor 35 to perform normal rotation.

In this case, the electric power supplied to the stator 23 of the first rotating machine 21 and the electric power generated by the stator 33 of the second rotating machine 31 are controlled such that the above-mentioned torque, indicated by the arrows D, for causing the A1 rotor 24 to perform reverse rotation, and the torques, indicated by the arrows E and F, for causing the B2 rotor 35 to perform normal rotation are balanced with each other, whereby the A1 rotor 24, the B2 rotor 35 and the drive wheels DW and DW, which are connected to each other, are held stationary. As a consequence, as shown in FIG. 31, the A1 and B2 rotor rotational speeds VRA1 and VRB2 become equal to 0, and the vehicle speed VP as well become equal to 0.

Further, in this case, the electric power supplied to the stator 23, the electric power generated by the stator 33 and the first and second magnetic field rotational speeds VMF1 and VMF2 are controlled such that the speed relationships expressed by the aforementioned equations (53) and (54) are maintained and at the same time, the A2 and B1 rotor rotational speeds VRA2 and VRB1 takes a relatively small value (see FIG. 31). With this, at the time of the ENG start during stoppage of the vehicle, while holding the vehicle speed VP at 0, the engine speed NE is controlled to a relatively small value suitable for the start of the engine 3. Further, in this state, the ignition operation of the fuel injection valves and the spark plugs of the engine 3 is controlled according to the crank angle position, whereby the engine 3 is started.

ENG Creep

The ENG creep is an operation mode for performing the creep operation of the vehicle using the motive power from the engine 3. During the ENG creep, by using the engine motive power transmitted to the A2 rotor 25, electric power generation is performed by the stator 23, and by using the engine motive power transmitted to the B1 rotor 34, electric power generation is performed by the stator 33. Further, electric power thus generated by the stators 23 and 33 is charged into the battery 43.

Figure 32:
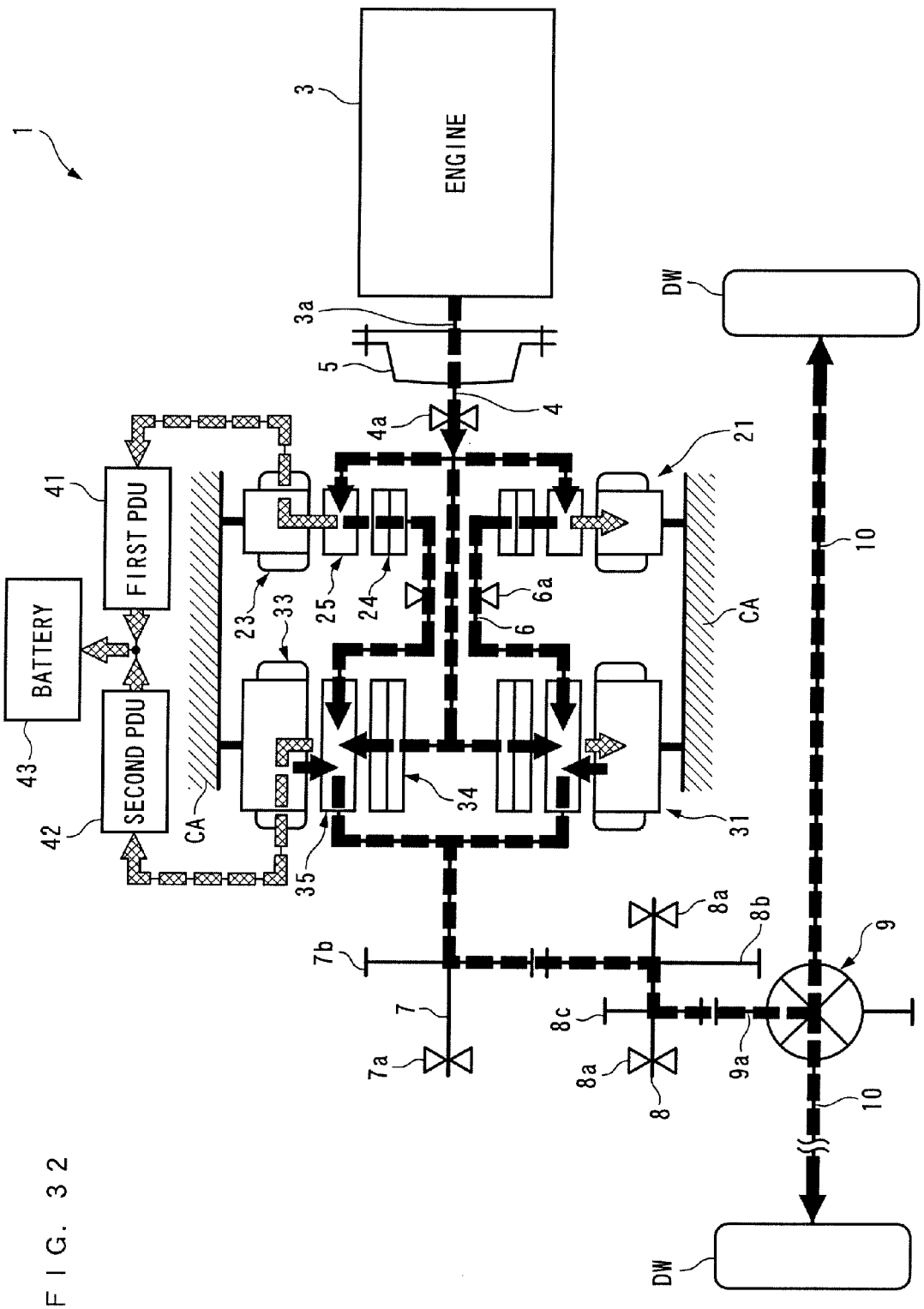
[FIG. 32] A diagram showing a state of transmission of torque in the power plant shown in FIG. 1 during ENG creep.
Figure 33:
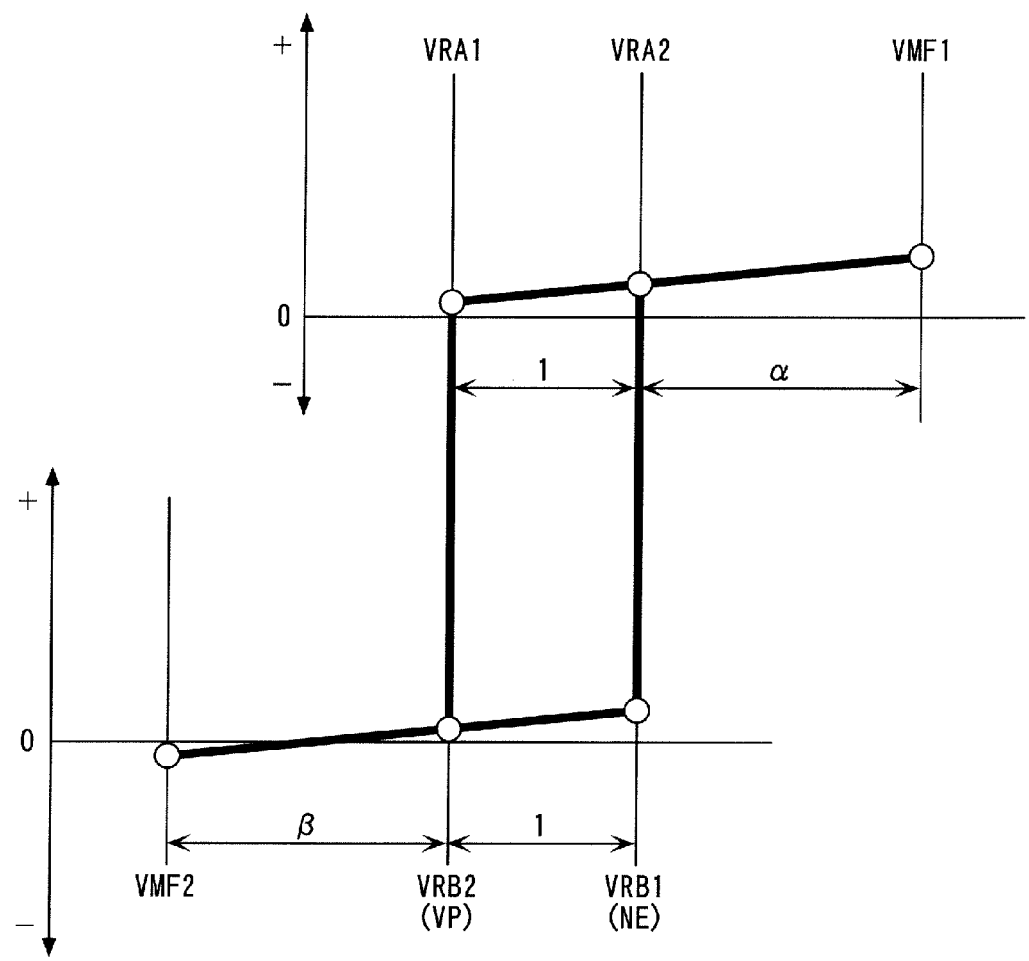
[FIG. 33] A velocity nomograph illustrating an example of the relationship between the rotational speeds of the various rotary elements of the power plant shown in FIG. 1 during the ENG creep.

FIG. 32 shows a state of transmission of torque during the above-described ENG creep, and FIG. 33 shows a velocity nomograph during the ENG creep. As shown in FIG. 32, during the ENG creep, similarly to the case of the above-mentioned battery input/output zero mode, along with the above-mentioned electric power generation by the stator 23, part of the engine torque TENG is transmitted to the A2 rotor 25, and the engine torque TENG transmitted to the A2 rotor 25 is distributed to the stator 23 and the A1 rotor 24. Further, as shown in FIG. 33, the second rotating magnetic field generated along with the electric power generation by the stator 33 performs reverse rotation. As a result, as shown in FIG. 32, although the vehicle speed VP is approximately equal to 0, the crankshaft 3a is performing normal rotation, so that similarly to the above-described case of the ENG start during stoppage of the vehicle, the second electric power-generating equivalent torque TGE2 generated by the above electric power generation acts on the B2 rotor 35 to cause the B2 rotor 35 to perform normal rotation. Further, the engine torque TENG transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation. Furthermore, the engine torque TENG distributed to the A1 rotor 24 as described above, is transmitted to the B2 rotor 35.

As described above, during the ENG creep, combined torque formed by combining the engine torque TENG distributed to the A1 rotor 24, the second electric power-generating equivalent torque TGE2, and the engine torque TENG transmitted to the B1 rotor 34 is transmitted to the B2 rotor 35. Further, this combined torque is transmitted to the drive wheels DW and DW, for causing the drive wheels DW and DW to perform normal rotation. Furthermore, the electric power generated by the stators 23 and 33, and the first and second magnetic field rotational speeds VMF1 and VMF2 are controlled such that the A1 and B2 rotor rotational speeds VRA1 and VRB2, that is, the vehicle speed VP, becomes very small (see FIG. 33), whereby the creep operation is carried out.

Further, during the ENG creep, as described above, the engine torque TENG distributed to the A1 rotor 24 along with the electric power generation by the stator 23, and the engine torque TENG transmitted to the B2 rotor 35 via the B1 rotor 34 along with the electric power generation by the stator 33 are transmitted to the drive wheels DW and DW. That is, since part of the engine torque TENG can be transmitted to the drive wheels DW and DW, it is possible to prevent a large reaction force from the drive wheels DW and DW from acting on the engine 3, thereby making it possible to perform the creep operation without causing engine stall. It should be noted that the above ENG creep operation is mainly carried out when the charged state is small or when the vehicle is ascending a slope.

ENG-Based Standing Start

Figure 34:
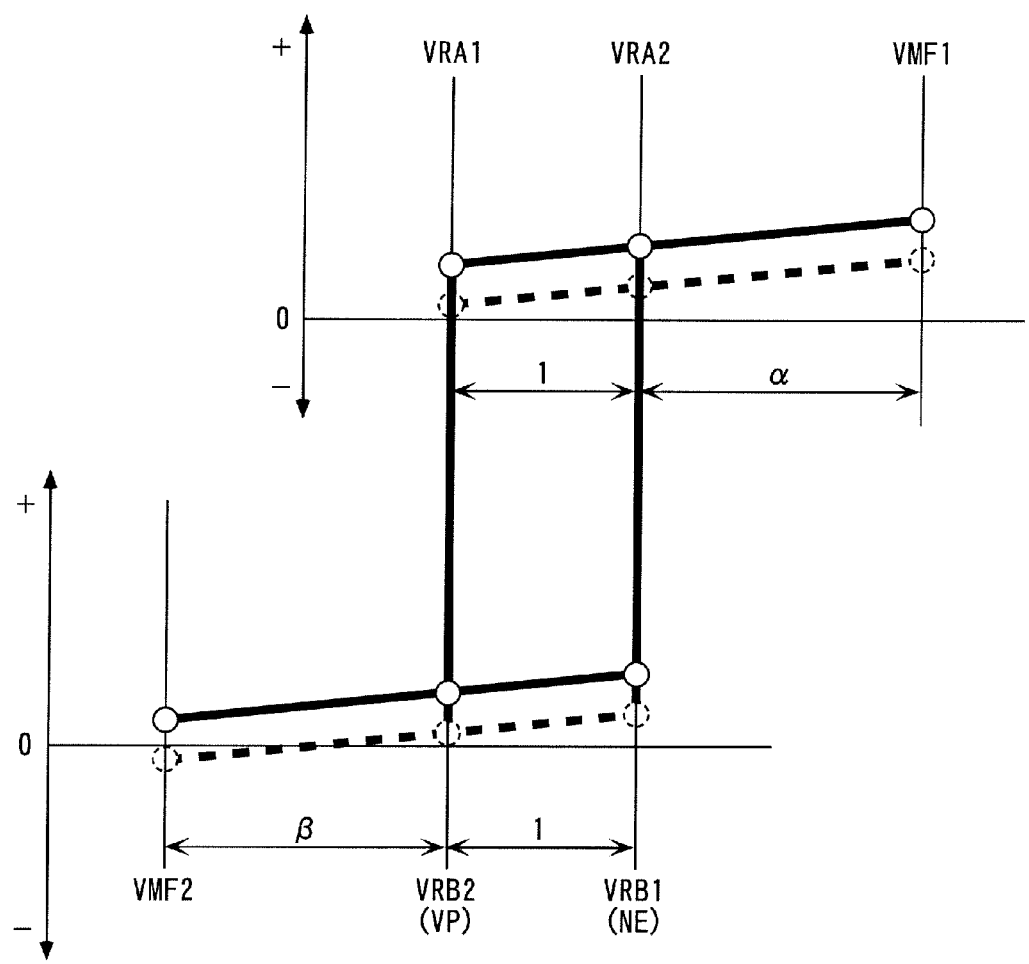
[FIG. 34] A velocity nomograph illustrating an example of the relationship between the rotational speeds of the various rotary elements of the power plant shown in FIG. 1 at the time of ENG-based standing start.

The ENG-based standing start is an operation mode for starting the vehicle using the motive power from the engine 3. At the time of the ENG-based standing start, the second magnetic field rotational speed VMF2 of the second rotating magnetic field that has been performing reverse rotation during the ENG creep is controlled such that it becomes equal to 0, the first magnetic field rotational speed VMF1 of the first rotating magnetic field that has been performing normal rotation during the ENG creep is increased, and the engine motive power is increased. Then, after the second magnetic field rotational speed VMF2 becomes equal to 0, the operation in the above-mentioned battery input/output zero mode is performed. This causes, as indicated by thick solid lines in FIG. 34, the A1 and B2 rotor rotational speeds VRA1 and VRB2, i.e. the vehicle speed VP to be increased from a state of the ENG creep, indicated by broken lines in FIG. 34, causing the vehicle to start.

As described hereinabove, according to the present embodiment, the first and second rotating machines 21 and 31 have the same functions as those of an apparatus formed by combining a planetary gear unit and a general one-rotor-type rotating machine, so that differently from the aforementioned conventional power plant, it is possible to dispense with the planetary gear unit for distributing and combining motive power for transmission, which makes it possible to reduce the size of the power plant 1 by the corresponding extent. Further, differently from the aforementioned conventional case, as already described with reference to FIG. 24, the motive power from the engine is transmitted to the drive wheels DW and DW without being recirculated, and hence it is possible to reduce motive power passing through the first and second rotating machines 21 and 31. This makes it possible to reduce the sizes and costs of the first and second rotating machines 21 and 31, thereby making it possible to attain further reduction of the size and costs of the power plant 1. Further, by using the first and second rotating machines 21 and 31, each having a torque capacity corresponding to motive power reduced as described above, it is possible to suppress the loss of motive power to improve the driving efficiency of the power plant 1.

Further, the motive power from the engine is transmitted to the drive wheels DW and DW in a divided state via a total of three paths, i.e. the above-described first transmission path (the A2 rotor 25, magnetic forces caused by magnetic force lines ML, the A1 rotor 24, the connection shaft 6, and the B2 rotor 35), the second transmission path (the B1 rotor 34, magnetic forces caused by magnetic force lines ML, and the B2 rotor 35), and the third transmission path (the A2 rotor 25, magnetic forces caused by magnetic force lines ML, the stator 23, the first PDU 41, the second PDU 42, the stator 33, magnetic forces caused by magnetic force lines ML, and the B2 rotor 35). This makes it possible to reduce electric power (energy) passing through the first and second PDUs 41 and 42 in the third transmission path, so that it is possible to reduce the sizes and costs of the first and second PDUs 41 and 42, thereby making it possible to attain further reduction of the size and costs of the power plant 1. Further, although in the third transmission path, the engine motive power is transmitted to the drive wheels DW and DW via the electrical paths, in the first and second transmission paths, the motive power is transmitted to the drive wheels DW and DW via the magnetic paths, so that the first and second transmission paths are higher in transmission efficiency than the third transmission path.

Further, as described hereinabove with reference to FIG. 25, the engine motive power is transmitted to the drive wheels DW and DW while having the speed thereof steplessly changed by controlling the first and second magnetic field rotational speeds VMF1 and VMF2. Further, in this case, the first and second magnetic field rotational speeds VMF1 and VMF2 are controlled such that the engine speed NE becomes equal to the target engine speed set to a value that will make it possible to obtain the optimum fuel economy of the engine 3, and therefore it is possible to drive the drive wheels DW and DW while controlling the engine motive power such that the optimum fuel economy of the engine 3 can be obtained. This makes it possible to further enhance the driving efficiency of the power plant 1.

Further, the first pole pair number ratio α of the first rotating machine 21 is set to 2.0, and therefore at the time of the ENG start during EV traveling when the torque demanded of the first rotating machine 21 becomes particularly large, as described above using the aforementioned equation (57), it is possible to make the first electric power-generating equivalent torque TGE1 smaller than when the first pole pair number ratio α is set to a value smaller than 1.0. This makes it possible to further reduce the size and costs of the first rotating machine 21. Furthermore, since the second pole pair number ratio β of the second rotating machine 31 is set to 2.0, it is possible to make the second driving equivalent torque TSE2 smaller than when the second pole pair number ratio β is set to a value smaller than 1.0, at the start of the rapid acceleration operation during the ENG traveling in which torque demanded of the second rotating machine 31 becomes particularly large, as described above using the aforementioned equation (58). This makes it possible to further reduce the size and costs of the second rotating machine 31.

The operation in the drive-time charging mode is performed when the vehicle demand motive power is smaller than the engine motive power that will make it possible to obtain the optimum fuel economy of the engine 3, and during the drive-time charging mode, the engine motive power is controlled such that the optimum fuel economy of the engine 3 can be obtained, and the surplus amount of the engine motive power with respect to the vehicle demand motive power is charged into the battery 43 as electric power. Further, the operation in the assist mode is performed when the vehicle demand motive power is larger than the engine motive power that will make it possible to obtain the optimum fuel economy of the engine 3, and during the assist mode, the engine motive power is controlled such that the optimum fuel economy of the engine 3 can be obtained. Further, the insufficient amount of the engine motive power with respect to the vehicle demand motive power is made up for by supply of electric power from the battery 43. Therefore, it is possible to further enhance the driving efficiency of the power plant 1 irrespective of the volume of the load of the drive wheels DW and DW.

Next, power plants 1A, 1B, 1C, and 1D according to second to fifth embodiments of the present invention will be described with reference to FIGS. 35 to 38. These power plant 1A to 1D are distinguished from the first embodiment mainly in that they further include transmissions 61, 71, 81 and 91, respectively. In any one of the second to fifth embodiments, the connection relationship between the engine 3, the first and second rotating machines 21 and 31, and the drive wheels DW and DW is the same as the connection relationship therebetween in the first embodiment. More specifically, the A2 and B1 rotors 25 and 34 are mechanically connected to the crankshaft 3a of the engine 3, and the A1 and B2 rotors 24 and 35 are mechanically connected to the drive wheels DW and DW. Further, in FIGS. 35 to 38, component elements identical to those of the first embodiment are denoted by the same reference numerals. This also similarly applies to figures for use in describing the other embodiments described hereinafter. The following description will be mainly given of different points of the power plants 1A to 1D from the first embodiment, in order from the power plant 1A of the second embodiment.

Figure 35:
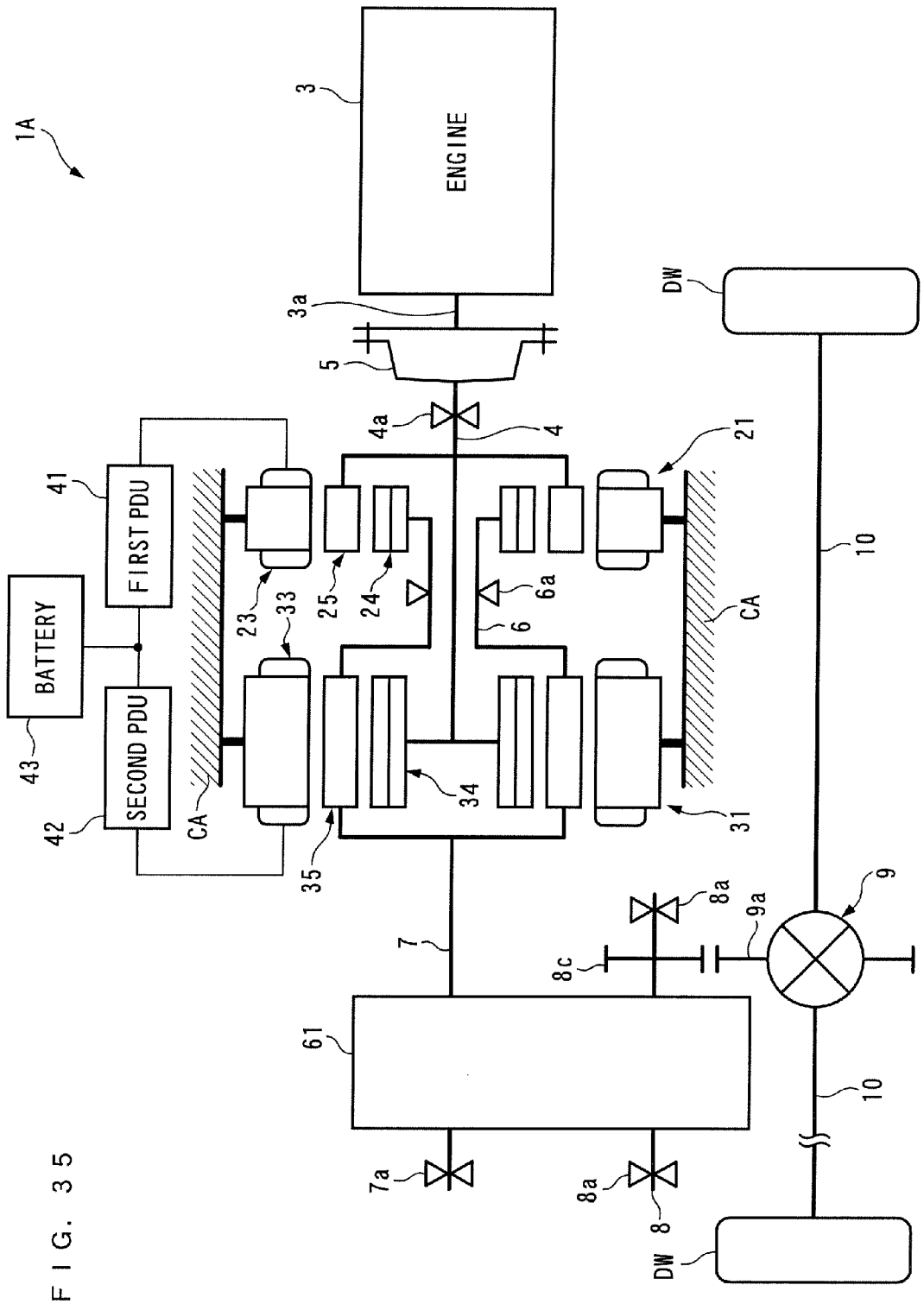
[FIG. 35] A schematic diagram of a power plant according to a second embodiment of the present invention.

Referring to FIG. 35, in the power plant 1A, the transmission 61 is provided in place of the gear 7b and the first gear 8b in mesh with each other. This transmission 61 is a belt-type stepless transmission, and includes an input shaft connected to the aforementioned second rotating shaft 7, an output shaft connected to the idler shaft 8, pulleys provided on the input shaft and the output shaft, respectively, and a metal belt wound around the pulleys, none of which are shown. The transmission 61 changes the effective diameters of the pulleys, thereby outputting motive power input to the input shaft to the output shaft while changing the speed thereof. Further, the transmission ratio of the transmission 61 (the rotational speed of the input shaft/the rotational speed of the output shaft) is controlled by the ECU 2.

As described above, the transmission 61 is provided between the A1 and B2 rotors 24 and 35 and the drive wheels DW and DW, and the motive power transmitted to the A1 and B2 rotors 24 and 35 is transmitted to the drive wheels DW and DW while having the speed thereof changed by the transmission 61. It should be noted that in the present embodiment, the transmission 61 corresponds to a transmission in the invention as claimed in claim 3.

In the power plant 1A constructed as above, when a very large torque is transmitted from the A1 and B2 rotors 24 and 35 to the drive wheels DW and DW, e.g. during the above-described EV standing start and ENG-based standing start, the transmission ratio of the transmission 61 is controlled to a predetermined lower-speed value larger than 1.0. This causes the transmission 61 to increase torque transmitted to the A1 and B2 rotors 24 and 35, and then the increased torque is transmitted to the drive wheels DW and DW. In accordance therewith, electric power generated by the first rotating machine 21 and electric power supplied to the second rotating machine 31 (generated electric power) are controlled such that the torque transmitted to the A1 and B2 rotors 24 and 35 becomes smaller. Therefore, according to the present embodiment, the respective maximum values of torque demanded of the first and second rotating machines 21 and 31 can be reduced, thereby making it possible to further reduce the sizes and costs of the first and second rotating machines 21 and 31.

Further, in cases where the A1 and B2 rotor rotational speeds VRA1 and VRB2 become too high, e.g. during the high-vehicle speed operation in which the vehicle speed VP is very high, the transmission ratio of the transmission 61 is controlled to a predetermined higher-speed value smaller than 1.0. This makes it possible to lower the A1 and B2 rotor rotational speeds VRA1 and VRB2 with respect to the vehicle speed VP, and hence it is possible to prevent failure of the first and second rotating machines 21 and 31 from being caused by the A1 and B2 rotor rotational speeds VRA1 and VRB2 becoming too high. The above-mentioned control is particularly effective because as described hereinabove, the A1 rotor 24 is formed by magnets and the magnets are lower in strength than soft magnetic material elements, so that the above-mentioned inconveniences are liable to occur.

Furthermore, during traveling of the vehicle, including the EV traveling and the ENG traveling, the transmission ratio of the transmission 61 is controlled such that the first and second magnetic field rotational speeds VMF1 and VMF2 become equal to first and second predetermined target values, respectively. The first and second target values are calculated by searching a map according to the vehicle speed VP when only the first and second rotating machines 21 and 31 are used as motive power sources, whereas when the engine 3 and the first and second rotating machines 21 and 31 are used as motive power sources, the first and second target values are calculated by searching a map other than the above-mentioned map according to the engine speed NE and the vehicle speed VP. Further, in these maps, the first and second target values are set to such values as will make it possible to obtain high efficiencies of the first and second rotating machines 21 and 31 with respect to the vehicle speed VP (and engine speed NE) assumed then. Furthermore, in parallel with the above control of the transmission 61, the first and second magnetic field rotational speeds VMF1 and VMF2 are controlled to the first and second target values, respectively. With this, according to the present embodiment, during traveling of the vehicle, it is possible to obtain the high efficiencies of the first and second rotating machines 21 and 31.

Further, as described above with reference to FIG. 25, if the first and second rotating machines 21 and 31 are used, it is possible to transmit the engine motive power to the drive wheels DW and DW while steplessly changing the speed thereof, thereby making it possible to reduce the frequency of the speed-changing operation of the transmission 61. This makes it possible to suppress heat losses by the speed-changing operation, whereby it is possible to ensure the high driving efficiency of the power plant 1A. In addition to this, according to the present embodiment, it is possible to obtain the same advantageous effects as provided by the first embodiment.

It should be noted that although in the present embodiment, the transmission 61 is a belt-type stepless transmission, it is to be understood that a toroidal-type stepless transmission or a gear-type stepped transmission may be employed.

Figure 36:
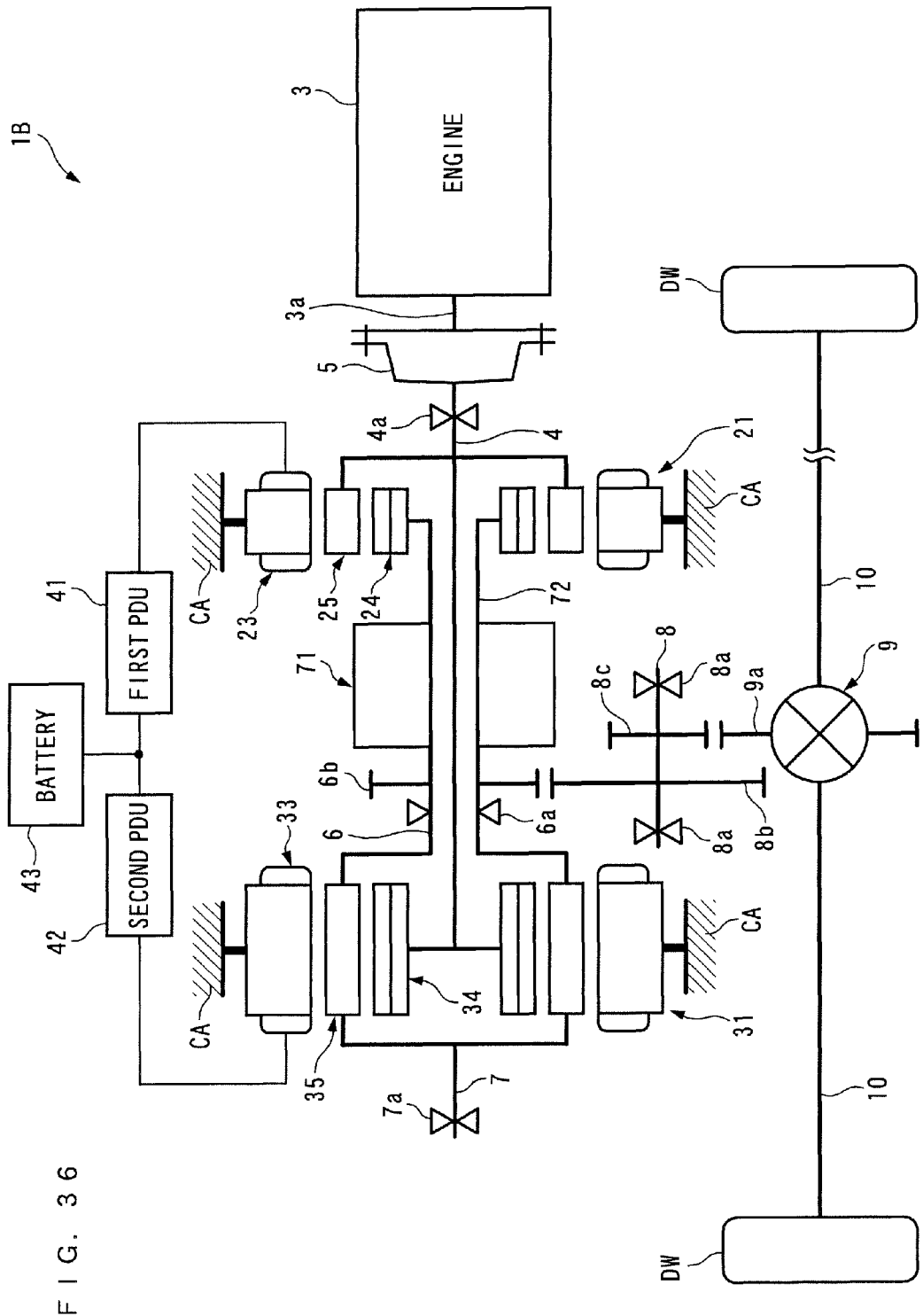
[FIG. 36] A schematic diagram of a power plant according to a third embodiment of the present invention.

In the power plant 1B according to the third embodiment shown in FIG. 36, the transmission 71 is a gear-type stepped transmission including an input shaft 72 and an output shaft (not shown), a plurality of gear trains different in gear ratio from each other, and clutches (not shown) for engaging and disengaging between the gear trains, and the input shaft 72 and the output shaft, on a gear train-by-gear train basis. The transmission 71 changes the speed of motive power inputted to the input shaft 72 by using one of the gear trains, and outputs the motive power changed in speed to the output shaft. Further, in the transmission 71, a total of four speed positions, i.e. a first speed (transmission ratio=the rotational speed of the input shaft 72/the rotational speed of the output shaft>1.0), a second speed (transmission ratio=1.0), a third speed (transmission ratio<1.0) for forward travel, and one speed position for rearward travel can be set using these gear trains, and the ECU 2 controls a change between these speed positions.

Further, in the power plant 1B, differently from the first embodiment, the second rotating shaft 7 is not provided with the gear 7b, and the A1 and B2 rotors 24 and 35 are connected to the drive wheels DW and DW, in the following manner: The A1 rotor 24 is directly connected to the input shaft 72 of the transmission 71, and the output shaft of the transmission 71 is directly connected to the above-described connection shaft 6. The connection shaft 6 is integrally formed with a gear 6b, and the gear 6b is in mesh with the aforementioned first gear 8b.

As described above, the A1 rotor 24 is mechanically connected to the drive wheels DW and DW via the transmission 71, the gear 6b, the first gear 8b, the idler shaft 8, the second gear 8c, the gear 9a and the differential gear mechanism 9, etc. Further, the motive power transmitted to the A1 rotor 24 is transmitted to the drive wheels DW and DW while having the speed thereof changed by the transmission 71. Furthermore, the B2 rotor 35 is mechanically connected to the drive wheels DW and DW via the connection shaft 6, the gear 6b, the first gear 8b, etc., without via the transmission 71. It should be noted that in the present embodiment, the transmission 71 corresponds to a transmission in the invention as claimed in claim 4.

In the power plant 1B constructed as above, in cases where a very large torque is transmitted from the A1 rotor 24 to the drive wheels DW and DW, e.g. at the time of the ENG-based standing start, the speed position of the transmission 71 is controlled to the first speed (transmission ratio>1.0). This causes the transmission 71 to increase torque transmitted to the A1 rotor 24, and then the increased torque is transmitted to the drive wheels DW and DW. In accordance therewith, the electric power generated by the first rotating machine 21 is controlled such that the torque transmitted to the A1 rotor 24 becomes smaller. With this, according to the present embodiment, the maximum value of the torque demanded of the first rotating machine 21 can be reduced, thereby making it possible to further reduce the size and costs of the first rotating machine 21.

Further, in cases where the A1 rotor rotational speed VRA1 becomes too high, e.g. during the high-vehicle speed operation in which the vehicle speed VP is very high, the speed position of the transmission 71 is controlled to the third speed (transmission ratio<1.0). According to the present embodiment, this makes it possible to lower the A1 rotor rotational speed VRA1 with respect to the vehicle speed VP, and hence it is possible to prevent failure of the first rotating machine 21 from being caused by the A1 rotor rotational speed VRA1 becoming too high. The above-mentioned control is particularly effective because the A1 rotor 24 is formed by magnets and the magnets are lower in strength than soft magnetic material elements, so that the above-mentioned inconveniences are liable to occur.

Furthermore, during traveling of the vehicle including the EV traveling and the ENG traveling, the speed position of the transmission 71 is controlled such that the first magnetic field rotational speed VMF1 becomes equal to a predetermined target value. This target value is calculated by searching a map according to the vehicle speed VP when only the first and second rotating machines 21 and 31 are used as motive power sources, whereas when the engine 3 and the first and second rotating machines 21 and 31 are used as motive power sources, the target value is calculated by searching a map other than the above-mentioned map according to the engine speed NE and the vehicle speed VP. Further, in these maps, the target values are set to such values that will make it possible to obtain high efficiency of the first rotating machine 21 with respect to the vehicle speed VP (and engine speed NE) assumed at the time. Furthermore, in parallel with the above control of the transmission 71, the first magnetic field rotational speed VMF1 is controlled to the above-mentioned target value. According to the present embodiment, this makes it possible to obtain the high efficiency of the first rotating machine 21 during traveling of the vehicle.

Further, during the ENG traveling, and at the same time during the speed-changing operation of the transmission 71, that is, after the input shaft 72 and output shaft of the transmission 71 are disconnected from a gear train having been selected before a speed change and until the input shaft 72 and the output shaft are connected to a gear train selected for the speed change, the first and second rotating machines 21 and 31 are controlled in the following manner: During the speed-changing operation of the transmission 71, by disconnecting the gear train of the transmission 71 from the input shaft 72 and output shaft thereof, the A1 rotor 24 is disconnected from the drive wheels DW and DW, whereby the load of the drive wheels DW and DW ceases to act on the A1 rotor 24. Therefore, no electric power is generated by the first rotating machine 21, and electric power is supplied from the battery 43 to the stator 33 of the second rotating machine 31.

With this, according to the present embodiment, during the speed-changing operation of the transmission 71, the second driving equivalent torque TSE2 from the stator 33 and part of the engine torque TENG transmitted to the B1 rotor 34 are combined, and the combined torque is transmitted to the drive wheels DW and DW via the B2 rotor 35. This makes it possible to suppress a speed-change shock, which can be caused by interruption of transmission of the engine torque TENG to the drive wheels DW and DW via the transmission 71. This makes it possible to improve marketability. In addition to this, according to the present embodiment it is possible to obtain the same advantageous effects as provided by the first embodiment.

Figure 37:
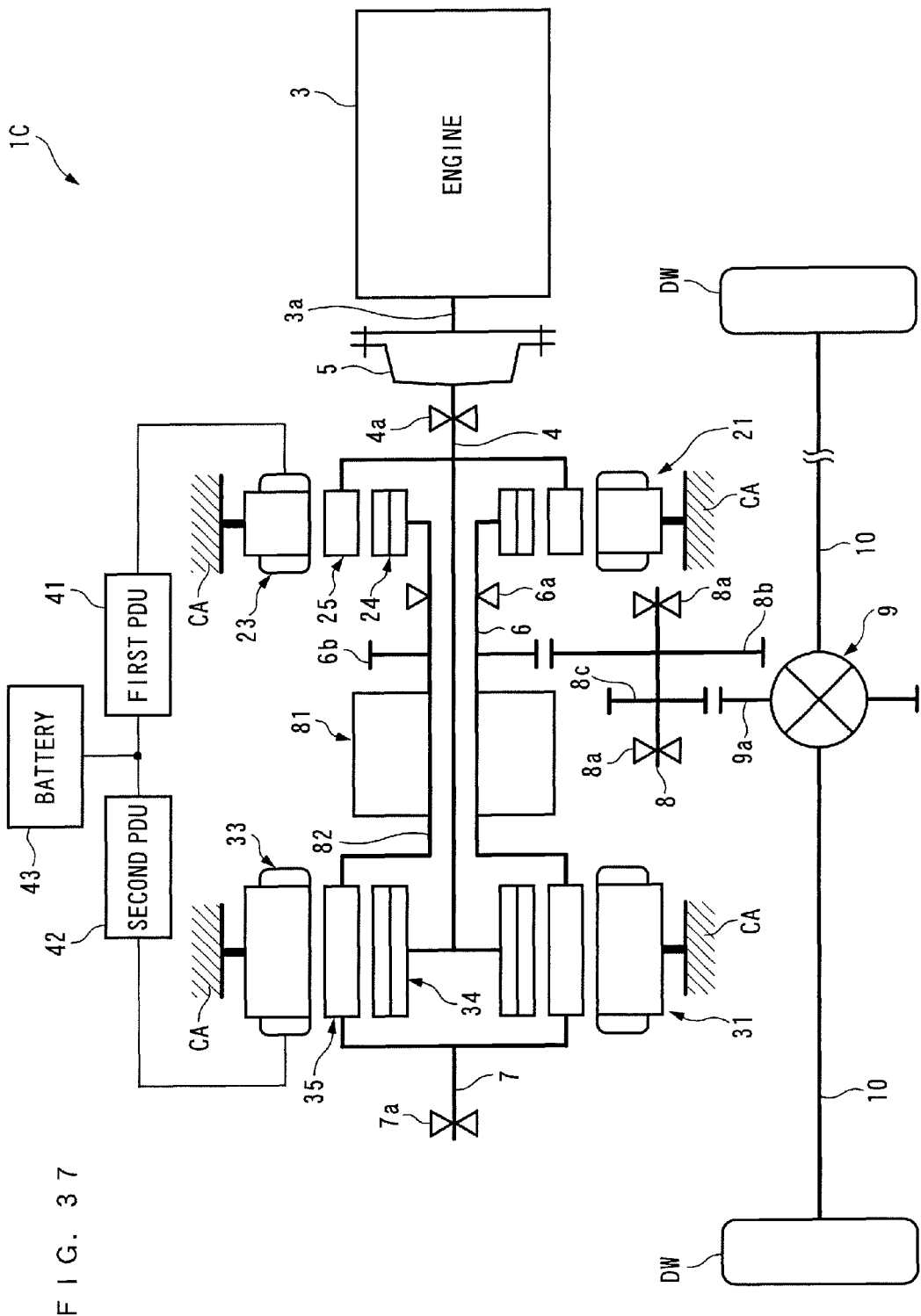
[FIG. 37] A schematic diagram of a power plant according to a fourth embodiment of the present invention.

In the power plant 1C according to the fourth embodiment shown in FIG. 37, differently from the first embodiment, the gear 7b is not provided on the second rotating shaft 7, and the aforementioned first gear 8b is in mesh with the gear 6b integrally formed with the connection shaft 6. This connects the A1 rotor 24 to the drive wheels DW and DW via the connection shaft 6, the gear 6b, the first gear 8b, the idler shaft 8, the second gear 8c, the gear 9a and the differential gear mechanism 9, without via the transmission 81.

Further, the transmission 81 is a gear-type stepped transmission which is configured, similarly to the transmission 71 according to the third embodiment, to have speed positions including a first speed to a third speed. The transmission 81 includes an input shaft 82 directly connected to the B2 rotor 35, and an output shaft (not shown) directly connected to the connection shaft 6, and transmits motive power input to the input shaft 82 to the output shaft while changing the speed of the motive power. Further, the ECU 2 controls a change between the speed positions of the transmission 81.

With the above-described arrangement, the B2 rotor 35 is mechanically connected to the drive wheels DW and DW via the transmission 81, the gear 6b, the second gear 8c, and so forth. Further, the motive power transmitted to the B2 rotor 35 is transmitted to the drive wheels DW and DW while having the speed thereof changed by the transmission 81. It should be noted that in the present embodiment, the transmission 81 corresponds to a transmission in the invention as claimed in claim 5.

In the power plant 1C constructed as above, when a very large torque is transmitted from the B2 rotor 35 to the drive wheels DW and DW, e.g. during the EV standing start and the ENG-based standing start, the speed position of the transmission 81 is controlled to the first speed (transmission ratio>1.0). The torque transmitted to the B2 rotor 35 is increased by the transmission 81, and is then transmitted to the drive wheels DW and DW. In accordance therewith, the electric power supplied to the second rotating machine 31 is controlled such that the torque transmitted to the B2 rotor 35 becomes smaller. Therefore, according to the present embodiment, it is possible to reduce the maximum value of torque demanded of the second rotating machine 31, thereby making it possible to further reduce the size and costs of the second rotating machine 31. This is particularly effective because as described above, during the ENG-based standing start, the torque from the stator 33 and part of the engine torque TENG transmitted to the B1 rotor 34 are combined and the combined torque is transmitted to the drive wheels DW and DW via the B2 rotor 35, and hence a larger torque acts on the B2 rotor 35 than on the A1 rotor 24.

Further, when the B2 rotor rotational speed VRB2 becomes very high, e.g. during the high-vehicle speed operation in which the vehicle speed VP is very high, the speed position of the transmission 81 is controlled to the third speed (transmission ratio<1.0). According to the present embodiment, this makes it possible to reduce the B2 rotor rotational speed VRB2 with respect to the vehicle speed VP, and hence it is possible to prevent failure of the second rotating machine 31 from being caused by the B2 rotor rotational speed VRB2 becoming too high.

Furthermore, during traveling of the vehicle including the EV traveling and the ENG traveling, the speed position of the transmission 81 is controlled such that the second magnetic field rotational speed VMF2 becomes equal to a predetermined target value. This target value is calculated by searching a map according to the vehicle speed VP when only the first and second rotating machines 21 and 31 are used as motive power sources, whereas when the engine 3 and the first and second rotating machines 21 and 31 are used as motive power sources, the target value is calculated by searching a map other than the above-mentioned map according to the engine speed NE and the vehicle speed VP. Further, in these maps, the target values are set to such values that will make it possible to obtain high efficiency of the second rotating machine 31 with respect to the vehicle speed VP (and engine speed NE) assumed at the time. Furthermore, in parallel with the above control of the transmission 81, the second magnetic field rotational speed VMF2 is controlled to the above-mentioned target value. According to the present embodiment, this makes it possible to obtain the high efficiency of the second rotating machine 31 during traveling of the vehicle.

Further, during the ENG traveling, and at the same time during the speed-changing operation of the transmission 81 (after the input shaft 82 and the output shaft are disconnected from a gear train having been selected before a speed change and until the input shaft 82 and the output shaft are connected to a gear train selected for the speed change), that is, when the B2 rotor 35 is disconnected from the drive wheels DW and DW by the transmission 81, as is clear from the state of transmission of torque, described with reference to FIG. 24, and the like, part of the engine torque TENG is transmitted to the drive wheels DW and DW via the A1 rotor 24. With this, according to the present embodiment, it is possible to suppress a speed-change shock, which can be caused by interruption of transmission of the engine torque TENG to the drive wheels DW and DW via the transmission 81. This makes it possible to improve marketability. In addition to this, according to the present embodiment, it is possible to obtain the same advantageous effects as provided by the first embodiment.

Figure 38:
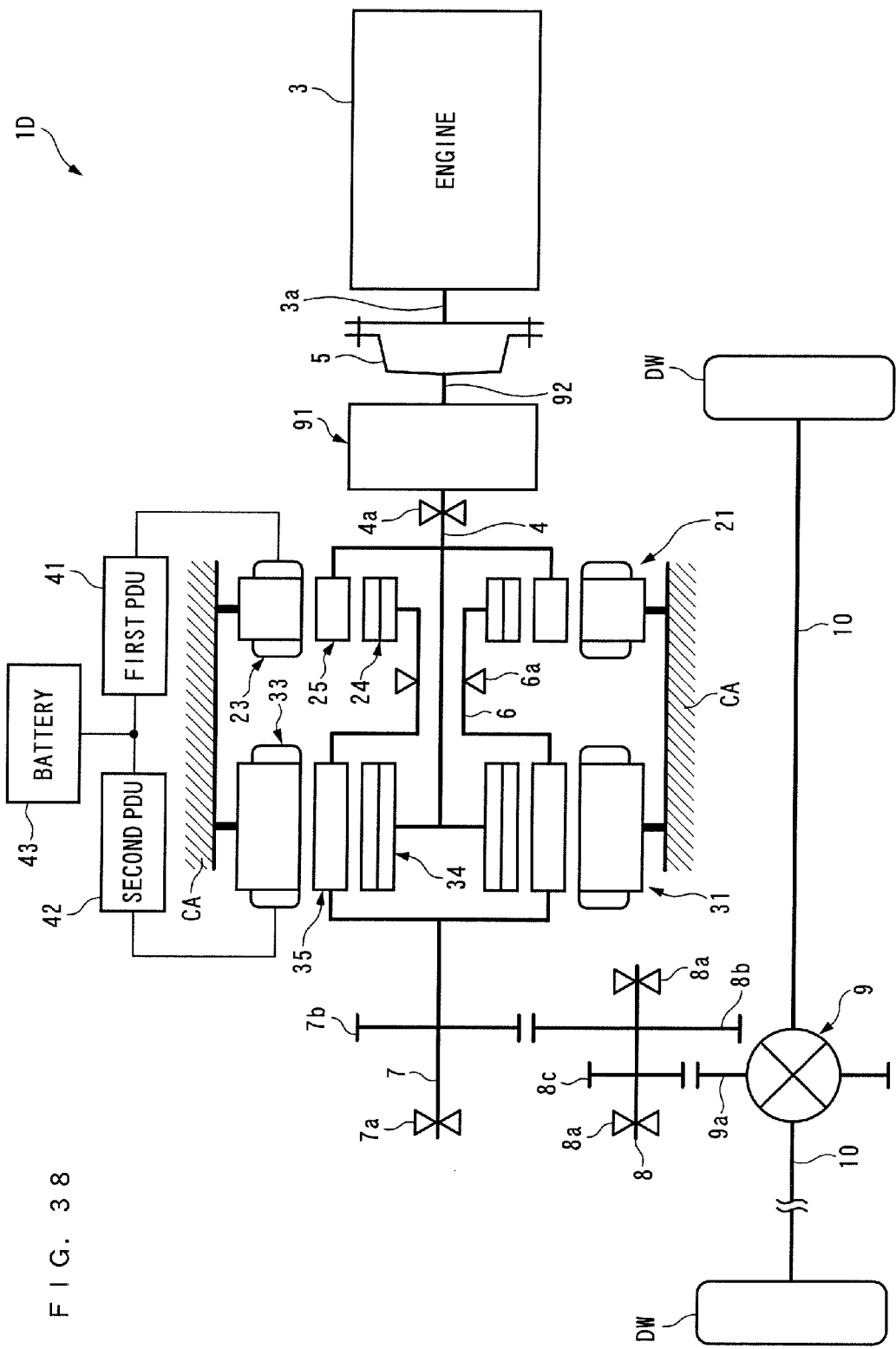
[FIG. 38] A schematic diagram of a power plant according to a fifth embodiment of the present invention.

In the power plant 1D according to the fifth embodiment shown FIG. 38, the transmission 91 is a gear-type stepped transmission formed by a planetary gear unit etc., and includes an input shaft 92 and an output shaft (not shown). In the transmission 91, a total of two speed positions, i.e. a first speed (transmission ratio=the rotational speed of the input shaft 92/the rotational speed of the output shaft=1.0) and a second speed (transmission ratio<1.0) are set as speed positions. The ECU 2 performs a change between these speed positions.

Further, the input shaft 92 of the transmission 91 is directly connected to the flywheel 5, and the output shaft (not shown) thereof is directly connected to the first rotating shaft 4. As described above, the transmission 91 is provided between the crankshaft 3a, and the A2 and B1 rotors 25 and 34 for transmitting the engine motive power to the A2 rotor 25 and the B1 rotor 34 while changing the speed of the engine motive power. Furthermore, the number of the gear teeth of the gear 9a of the aforementioned differential gear mechanism 9 is larger than that of the gear teeth of the second gear 8c of the idler shaft 8, whereby the motive power transmitted to the idler shaft 8 is transmitted to the drive wheels DW and DW in a speed-reduced state. It should be noted that in the present embodiment, the transmission 91 corresponds to a transmission in the invention as claimed in claim 6.

In the power plant 1D constructed as above, in cases where a very large torque is transmitted from the A1 and B2 rotors 24 and 35 to the drive wheels DW and DW, e.g. during the ENG-based standing start, the speed position of the transmission 91 is controlled to the second speed (transmission ratio<1.0). This reduces the engine torque TENG input to the A2 and B1 rotors 25 and 34. In accordance therewith, the electric power generated by the first rotating machine 21 and the electric power supplied to the second rotating machine (generated electric power) are controlled such that the engine torque TENG to be transmitted to the A1 and B2 rotors 24 and 35 becomes smaller. Further, the engine torque TENG transmitted to the A1 and B2 rotors 24 and 35 is transmitted to the drive wheels DW and DW in an increased state through deceleration by the second gear 8c and the gear 9a. With this, according to the present embodiment, it is possible to reduce the respective maximum values of torque demanded of the first and second rotating machines 21 and 31, thereby making it possible to further reduce the sizes and costs of the first and second rotating machines 21 and 31.

Further, when the engine speed NE is very high, the speed position of the transmission 91 is controlled to the first speed (transmission ratio=1.0). According to the present embodiment, this makes it possible to make the A2 and B1 rotor rotational speeds VRA2 and VRB1 lower than when the second speed is selected for the speed position, whereby it is possible to prevent failure of the first and second rotating machines 21 and 31 from being caused by the A2 and B1 rotor rotational speeds VRA2 and VRB1 becoming too high. This control is particularly effective because the B1 rotor 34 is formed by magnets so that the above-mentioned inconveniences are liable to occur.

Furthermore, during the ENG traveling, the speed position of the transmission 91 is changed according to the engine speed NE and the vehicle speed VP such that the first and second magnetic field rotational speeds VMF1 and VMF2 take respective values that will make it possible to obtain the high efficiencies of the first and second rotating machines 21 and 31. Further, in parallel with such a change in the speed position of the transmission 91, the first and second magnetic field rotational speeds VMF1 and VMF2 are controlled to values determined based on the engine speed NE, the vehicle speed VP, and the speed position of the transmission 91, which are assumed then, and the aforementioned equations (53) and (54). According to the present embodiment, this makes it possible to obtain the high efficiencies of the first and second rotating machines 21 and 31 during traveling of the vehicle.

Further, during the ENG traveling, and at the same time during the speed-changing operation of the transmission 91, that is, when the engine 3 and the A2 and B1 rotors 25 and 34 are disconnected from each other by the transmission 91, to suppress a speed-change shock, the first and second rotating machines 21 and 31 are controlled, as described hereafter. Hereinafter, such control of the first and second rotating machines 21 and 31 is referred to as the "speed-change shock control".

Electric power is supplied to the stators 23 and 33, and both the first and second rotating magnetic fields, which are generated by the stators 23 and 33 in accordance with the supply of the electric power, respectively, are caused to perform normal rotation. As a consequence, the first driving equivalent torque TSE1 from the stator 23 and the torque transmitted to the A1 rotor 24, as described hereafter, are combined, and the combined torque is transmitted to the A2 rotor 25. The torque transmitted to the A2 rotor 25 is transmitted to the B1 rotor 34 without being transmitted to the crankshaft 3a, due to the above-mentioned disconnection by the transmission 91. Further, this torque is combined with the second driving equivalent torque TSE2 from the stator 33, and is then transmitted to the B2 rotor 35. Part of the torque transmitted to the B2 rotor 35 is transmitted to the A1 rotor 24, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, and therefore it is possible to improve marketability. It should be noted that this speed-change shock control is performed only during the speed-changing operation of the transmission 91. In addition, according to the present embodiment, it is possible to obtain the same advantageous effects as provided by the first embodiment.

It should be noted that although in the third to fifth embodiments, the transmissions 71, 81, and 91 are each a gear-type stepped transmission, it is to be understood that a belt-type or toroidal-type stepless transmission may be employed.

Figure 39:
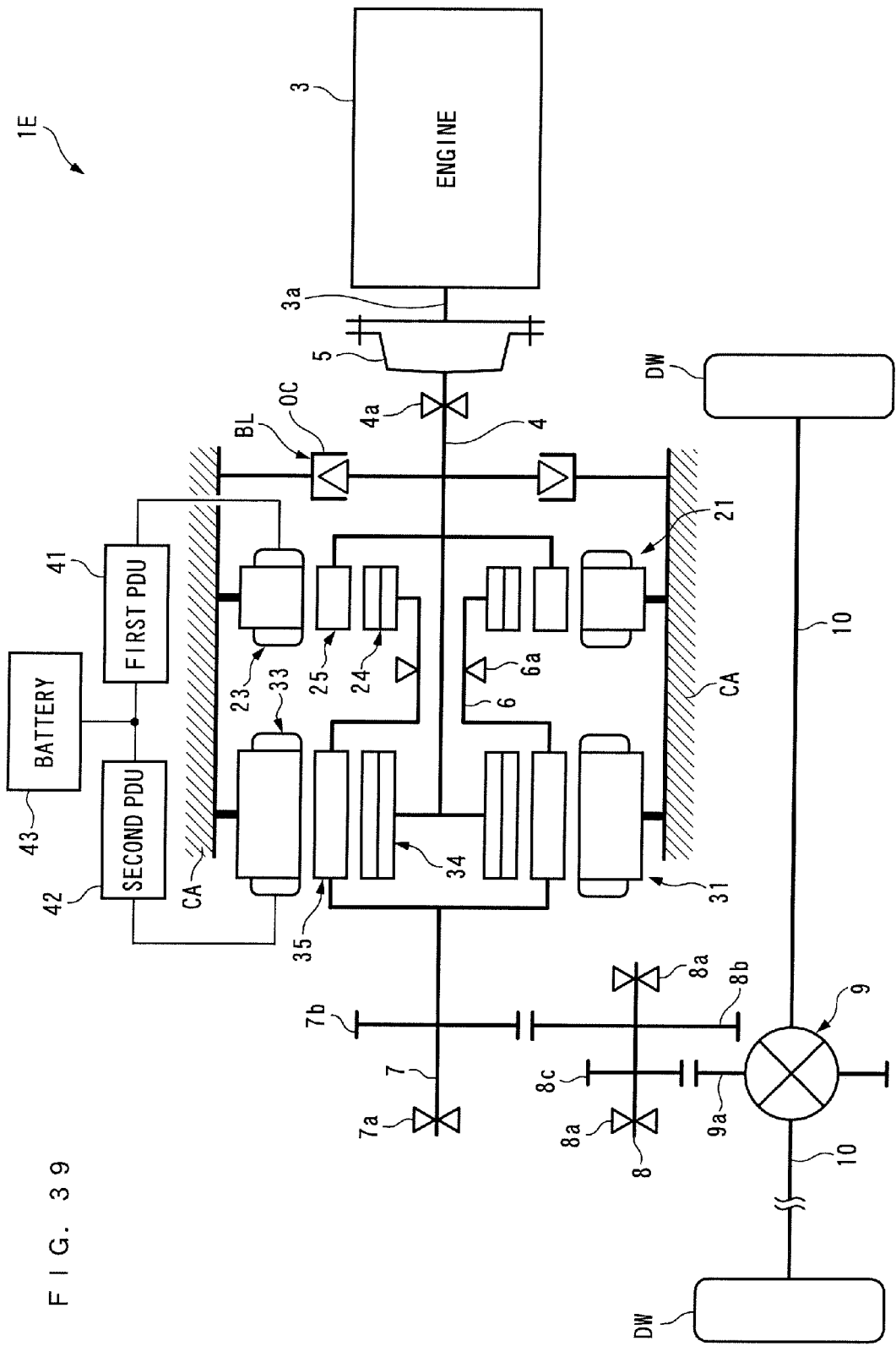
[FIG. 39] A schematic diagram of a power plant according to a sixth embodiment of the present invention.

Next, a power plant 1E according to a sixth embodiment will be described with reference to FIG. 39. As shown in the figure, this power plant 1E is constructed by adding a brake mechanism BL to the power plant 1 according to the first embodiment. The following description is mainly given of different points from the first embodiment.

This brake mechanism BL includes a one-way clutch OC connected to the aforementioned first rotating shaft 4 and casing CA. The one-way clutch OC is arranged such that it engages between the first rotating shaft 4 and the casing CA constructed to be unrotatable, when such motive power as causes the crankshaft 3a having the first rotating shaft 4 connected thereto to perform reverse rotation, acts on the crankshaft 3a, whereas when such motive power as causes the crankshaft 3a to perform normal rotation acts on the crankshaft 3a, the one-way clutch OC disengages between the first rotating shaft 4 and the casing CA.

More specifically, the brake mechanism BL formed by the one-way clutch OC and the casing CA permits the first rotating shaft 4 to rotate only when it performs normal rotation together with the crankshaft 3a, the A2 rotor 25 and the B1 rotor 34, but blocks the first rotating shaft 4 from performs reserve rotation together with the crankshaft 3a etc. It should be noted that in the present embodiment, the brake mechanism BL corresponds to a brake mechanism in the invention as claimed in claim 7.

The power plant 1E constructed as above performs the operations by the aforementioned EV creep and EV standing start in the following manner: The power plant 1E supplies electric power to the stators 23 and 33, and causes the first rotating magnetic field generated by the stator 23 in accordance with the supply of the electric power to perform reverse rotation and the second rotating magnetic field generated by the stator 33 in accordance with the supply of the electric power to perform normal rotation. Further, the power plant 1E controls the first and second magnetic field rotational speeds VMF1 and VMF2 such that $(\beta+1) \cdot |VMF1| = \alpha \cdot |VMF2|$ holds. Furthermore, the power plant 1E controls the electric power supplied to the first and second rotating machines 21 and 31 such that sufficient torque is transmitted to the drive wheels DW and DW.

While the first rotating magnetic field of the stator 23 performs reverse rotation as described above, the brake mechanism BL blocks the A2 rotor 25 from performing reverse rotation as described above, so that as is clear from the aforementioned functions of the first rotating machine 21, all the electric power supplied to the stator 23 is transmitted to the A1 rotor 24 as motive power, to thereby cause the A1 rotor 24 to perform normal rotation. Further, while the second rotating magnetic field of the stator 33 performs normal rotation as described above, the brake mechanism BL blocks the B1 rotor 34 from performing reverse rotation, so that as is clear from the aforementioned functions of the second rotating machine 31, all the electric power supplied to the stator 33 is transmitted to the B2 rotor 35 as motive power, to thereby cause the B2 rotor 35 to perform normal rotation. Furthermore, the motive power transmitted to the A1 and B2 rotors 24 and 35 is transmitted to the drive wheels DW and DW, and causes the drive wheels DW and DW to perform normal rotation.

Further, in this case, on the A2 and B1 rotors 25 and 34, which are blocked from performing reverse rotation by the brake mechanism BL, the first and second driving equivalent torques TSE1 and TSE2 act such that the torques TSE1 and TSE2 attempt to cause the A2 and B1 rotors 25 and 34 to perform reverse rotation, respectively, whereby the crankshaft 3a and the A2 and B1 rotors 25 and 34 are not only blocked from performing reverse rotation but are also held stationary.

As described above, according to the present embodiment, it is possible to drive the drive wheels DW and DW by the first and second rotating machines 21 and 31 without using the engine motive power. Further, during driving of the drive wheels DW and DW, the crankshaft 3a. is not only prevented from reverse rotation but also held stationary, and hence the crankshaft 3a. does not drag the engine 3.

It should be noted that although in the above-described first to sixth embodiments, the first and second pole pair number ratios α and β are set to 2.0, if the first and second pole pair number ratios α and β are set to less than 1.0, it is possible to obtain the following advantageous effects: As is clear from the aforementioned relationship between the rotational speeds of the various rotary elements, shown in FIG. 25, when the first pole pair number ratio α is set to a relatively large value, if the engine speed NE is higher than the vehicle speed VP (see the two-dot chain lines in FIG. 25), the first magnetic field rotational speed VMF1 becomes higher than the engine speed NE, and sometimes becomes too high. In contrast, by setting the first pole pair number ratio α to less than 1.0, as is apparent from a comparison between broken lines and two-dot chain lines in the velocity nomograph in FIG. 25, the first magnetic field rotational speed VMF1 can be reduced, and hence it is possible to prevent the driving efficiency from being lowered by occurrence of loss caused by the first magnetic field rotational speed VMF1 becoming too high.

Further, when the second pole pair number ratio β is set to a relatively large value, if the vehicle speed VP is higher than the engine speed NE (see the one-dot chain lines in FIG. 25), the second magnetic field rotational speed VMF2 becomes higher than the vehicle speed VP, and sometimes becomes too high. In contrast, by setting the second pole pair number ratio β is set to less than 1.0, as is apparent from a comparison between the broken lines and one-dot chain lines in the velocity nomograph in FIG. 25, the second magnetic field rotational speed VMF2 can be reduced, and hence it is possible to prevent the driving efficiency from being lowered by occurrence of loss caused by the second magnetic field rotational speed VMF2 becoming too high.

Furthermore, although in the first to sixth embodiments, the A2 rotor 25 and the B1 rotor 34 are connected to each other, and the A1 rotor 24 and the B2 rotor 35 are connected to each other, if the A2 rotor 25 and the B1 rotor 34 are connected to the crankshaft 3a, they are not necessarily required to be connected to each other. Further, if the A1 rotor 24 and the B2 rotor 35 are connected to the drive wheels DW and DW, they are not necessarily required to be connected to each other. In this case, the transmission 61 according to the second embodiment may be constructed by two transmissions such that one of the two transmissions is disposed between the A1 rotor 24 and the drive wheels DW and DW, and the other thereof is disposed between the B2 rotor 35 and the drive wheels DW and DW. Similarly, the transmission 91 according to the fifth embodiment may be constructed by two transmissions such that one of the two transmissions is disposed between the A2 rotor 25 and the crankshaft 3a, and the other thereof is disposed between the B1 rotor 34 and the crankshaft 3a.

It is to be understood that in the first to fifth embodiments, the brake mechanism BL for blocking the reverse rotation of the crankshaft 3a. may be provided. Further, although the brake mechanism BL is formed by the one-way clutch OC and the casing CA, the brake mechanism BL may be formed by another suitable mechanism, such as a hand brake, insofar as it is capable of blocking the reverse rotation of the crankshaft 3a.

Next, a power plant 1F according to a seventh embodiment of the present invention will be described with reference to FIG. 40. This power plant 1F is distinguished from the power plant 1 according to the first embodiment only in that the second rotating machine 31 is replaced by a first planetary gear unit PS1 of a general single pinion type and a general one-rotor-type rotating machine 101. It should be noted that in FIG. 40, component elements identical to those of the first embodiment are denoted by the same reference numerals. This also applies to the other embodiments, described hereinafter. The following description is mainly given of different points from the first embodiment.

Figure 40:
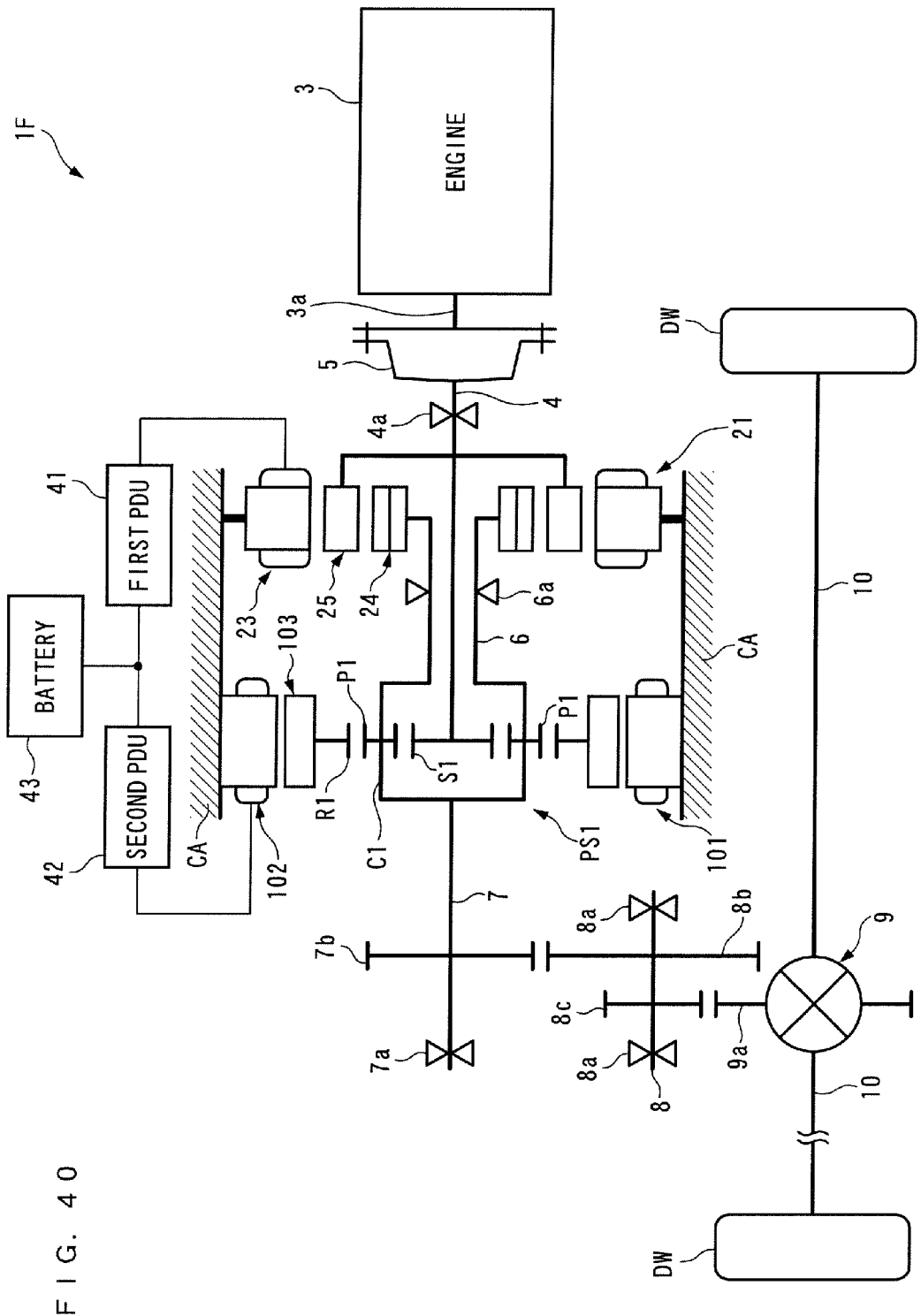
[FIG. 40] A schematic diagram of a power plant according to a seventh embodiment of the present invention.

As shown in FIG. 40, the first planetary gear unit PS1 comprises a first sun gear S1, a first ring gear R1 disposed around a periphery of the first sun gear S1, a plurality of (e.g. three) first planetary gears P1 (only two of which are shown) in mesh with the gears S1 and R1, a first carrier C1 rotatably supporting the first planetary gears P1. A ratio between the number of the gear teeth of the first sun gear S1 and that of the gear teeth of the first ring gear R1 (the number of the gear teeth of the first sun gear S1/the number of the gear teeth of the first ring gear R1; hereinafter referred to as the "first planetary gear ratio r1") is set to a predetermined value slightly smaller than 1.0, and is set to a relatively large one of values that can be taken by a general planetary gear unit.

The above-described first sun gear S1 is mechanically directly connected to the A2 rotor 25 via the first rotating shaft 4, and is mechanically directly connected to the crankshaft 3a. via the first rotating shaft 4 and the flywheel 5. Further, the first carrier C1 is mechanically directly connected to the A1 rotor 24 via the connection shaft 6, and is mechanically connected to the drive wheels DW and DW via the second rotating shaft 7, the gear 7b, the first gear 8b, the idler shaft 8, the second gear 8c, the gear 9a, the differential gear mechanism 9, etc. That is, the A1 rotor 24 and the first carrier C1 are mechanically connected to the drive wheels DW and DW.

Further, the first planetary gear unit PS1 has the same known functions as those of a general planetary gear unit provided by the arrangement thereof.

That is, when the directions of the rotations of the first sun gear S1, the first ring gear R1 and the first carrier C1 are identical to each other, the first planetary gear unit PS1 has the function of distributing motive power input to the first carrier C1 to the first sun gear S1 and the first ring gear R1, and the function of combining the motive power input to the first sun gear S1 and the motive power input to the first ring gear R1 and outputting the combined motive power to the first carrier C1. Further, when the first planetary gear unit PS1 is distributing and combining the motive power as described above, the first sun gear S1, the first ring gear R1 and the first carrier C1 are rotating while holding a collinear relationship with respect to the rotational speed. In this case, the relationship between the rotational speeds of the first sun gear S1, the first ring gear R1 and the first carrier C1 is expressed by the following equation (59):

$$VRI1=(r1+1)VCA1-r1 \cdot VSU1 \qquad (59)$$

In this equation, VRI1 represents the rotational speed of the first ring gear R1 (hereinafter referred to as the "first ring gear rotational speed"), VCA1 represents the rotational speed of the first carrier C1 (hereinafter referred to as the "first carrier rotational speed"), and VSU1 represents the rotational speed of the first sun gear S1 (hereinafter referred to as the "first sun gear rotational speed").

The rotating machine 101 is a three-phase brushless DC motor, and includes a stator 102 formed e.g. by a plurality of coils, and a rotor 103 formed by magnets or the like. Further, the rotating machine 101 has the function of converting electric power supplied to the stator 102 to motive power and outputting the motive power to the rotor 103, and the function of converting the motive power input to the rotor 103 to electric power and outputting the electric power to the stator 102. The rotor 103 is integrally formed with the first ring gear R1 such that it is rotatable together with the first ring gear R1. The stator 102 is electrically connected to the battery 43 via the second PDU 42. More specifically, the stator 23 of the first rotating machine 21 and the stator 102 of the rotating machine 101 are electrically connected to each other via the first and second PDUs 41 and 42.

It should be noted that in the present embodiment, the crankshaft 3a. corresponds to a first output portion in the invention as claimed in claim 8, and the first planetary gear unit PS1, the first sun gear S1, the first carrier C1, and the first ring gear R1 correspond to a differential gear, a first element, a second element, and a third element in the invention as claimed in claim 8, respectively. Further, the iron core 23a. and the U-phase to W-phase coils 23c. to 23e correspond to armatures in the invention as claimed in claim 8. Further, the A1 rotor and A2 rotor 24 and 25 correspond to first and second rotors in the invention as claimed in claim 8, respectively, and the permanent magnets 24a. and the cores 25a. correspond to magnetic poles and soft magnetic material elements in the invention as claimed in claim 8, respectively. Further, the rotating machine 101 and the rotor 103 correspond to a second rotating machine and a second output portion in the invention as claimed in claim 8, respectively; the first PDU 41 and the ECU 2 correspond to a first controller in the invention as claimed in claim 8; and the second PDU 42 and the ECU 2 correspond to a second controller in the invention as claimed in claim 8. Further, the battery 43 corresponds to a electric power storage device in the invention as claimed in claim 9.

Figure 41:
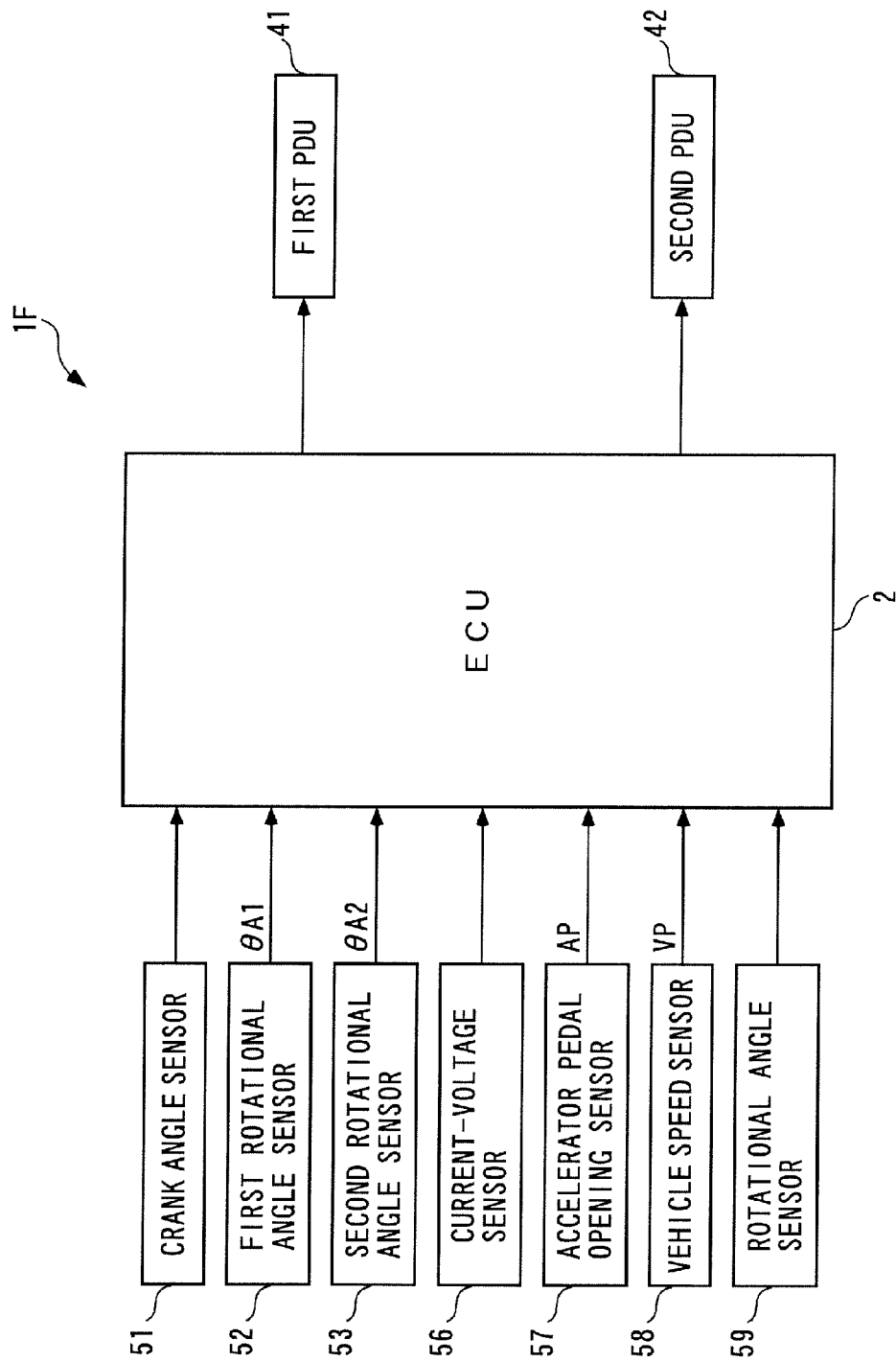
[FIG. 41] A block diagram of a control system for controlling an engine etc. appearing in FIG. 40.

Further, as shown in FIG. 41, a rotational angle sensor 59 is connected to the ECU 2. This rotational angle sensor 59 detects a rotational angle position of the rotor 103 of the rotating machine 101, and delivers a signal indicative of the detected rotational angle position to the ECU 2. The ECU 2 calculates the rotational speed of the rotor 103 (hereinafter referred to as the "rotor rotational speed") based on the signal. Further, the ECU 2 controls the second PDU 42 based on the detected rotational angle position of the rotor 103 to thereby control the electric power supplied to the stator 102 of the rotating machine 101, electric power generated by the stator 102, and the rotor rotational speed.

As described hereinabove, the power plant 1F according to the present embodiment is distinguished from the power plant 1 according to the first embodiment only in that the second rotating machine 31 is replaced by the first planetary gear unit PS1 and the rotating machine 101, and has quite the same functions as those of the power plant 1. Further, in the power plant 1F, operations in the operation modes, such as the EV creep, described as to the first embodiment, are carried out in the same manner. In this case, the operations in these operation modes are performed by replacing the parameters (e.g. the second magnetic field rotational speed VMF2) concerning the second rotating machine 31 by corresponding parameters concerning the rotating machine 101. In the following, a brief description is given of the operation modes by focusing on different points thereof from the first embodiment.

EV Creep

During the EV creep, electric power is supplied from the battery 43 to the stator 102 of the rotating machine 101, and the rotor 103 is caused to perform normal rotation. Further, electric power generation is performed by the stator 23 using motive power transmitted to the A1 rotor 24 of the first rotating machine 21, as described hereinafter, and the generated electric power is further supplied to the stator 102. In accordance therewith, torque output to the rotor 103 of the rotating machine 101 (hereinafter referred to as the "rotating machine torque") acts on the first carrier C1 to cause the first carrier C1 to perform normal rotation, and at the same time acts on the first sun gear S1 to cause the first sun gear S1 to perform reverse rotation. Further, part of torque transmitted to the first carrier C1 is transmitted to the drive wheels DW and DW via the second rotating shaft 7 and so forth, whereby the drive wheels DW and DW perform normal rotation.

Furthermore, during the EV creep, the remainder of the torque transmitted to the first carrier C1 is transmitted to the A1 rotor 24 via the connection shaft 6, and is then transmitted to the stator 23 as electric energy along with the electric power generation by the stator 23 of the first rotating machine 21. Further, as described as to the first embodiment, the first rotating magnetic field generated along with the electric power generation by the stator 23 performs reverse rotation, so that the first electric power-generating equivalent torque TGE1 acts on the A2 rotor 25 to cause the A2 rotor 25 to perform normal rotation. Further, the torque transmitted to the A1 rotor 24 such that it is balanced with the first electric power-generating equivalent torque TGE1 is further transmitted to the A2 rotor 25, thereby acting on the A2 rotor 25 to cause the A2 rotor 25 to perform normal rotation.

In this case, the electric power supplied to the stator 102 and the electric power generated by the stator 23 are controlled such that the above-mentioned torque for causing the first sun gear S1 to perform reverse rotation and the torques for causing the A2 rotor 25 to perform normal rotation are balanced with each other, whereby the A2 rotor 25, the first sun gear S1 and the crankshaft 3a, which are connected to each other, are held stationary. As a consequence, during the EV creep, the A2 rotor rotational speed VRA2 and the first sun gear rotational speed VSU1 become equal to 0, and the engine speed NE as well becomes equal to 0.

Further, during the EV creep, the electric power supplied to the stator 102, the electric power generated by the stator 23, the first magnetic field rotational speed VMF1 and the rotor rotational speed are controlled such that the speed relationships expressed by the aforementioned equations (53) and (59) are maintained and at the same time the first carrier rotational speed VCA1 and the A1 rotor rotational speed VRA1 become very small. From the above, the creep operation with a very low vehicle speed VP is carried out. As described above, it is possible to perform the creep operation using the first rotating machine 21 and the rotating machine 101 in a state where the engine 3 is stopped.

EV Standing Start

At the time of the EV standing start, the electric power supplied to the stator 102 of the rotating machine 101 and the electric power generated by the stator 23 of the first rotating machine 21 are both increased. Further, while maintaining the relationships between the rotational speeds shown in the equations (53) and (59) and at the same time holding the engine speed NE at 0, the first magnetic field rotational speed VMF1 of the first rotating magnetic field that has been performing reverse rotation during the EV creep and the rotor rotational speed of the rotor 103 that has been performing normal rotation during the EV creep are increased in the same rotation directions as they have been. From the above, the vehicle speed VP is increased to cause the vehicle to start.

ENG Start During EV Traveling

At the time of the ENG start during EV traveling, while holding the vehicle speed VP at the value assumed then, the first magnetic field rotational speed VMF1 of the first rotating magnetic field that has been performing reverse rotation during the EV standing start, as described above, is controlled to 0, and the rotor rotational speed of the rotor 103 that has been performing normal rotation during the EV standing start, is controlled such that it is lowered. Then, after the first magnetic field rotational speed VMF1 becomes equal to 0, electric power is supplied from the battery 43 not only to the stator 102 of the rotating machine 101 but also to the stator 23 of the first rotating machine 21, whereby the first rotating magnetic field generated in the stator 23 is caused to perform normal rotation and the first magnetic field rotational speed VMF1 is caused to be increased.

By supplying the electric power to the stator 102 as described above, the rotating machine torque of the rotating machine 101 is transmitted to the first carrier C1 via the first ring gear R1, and in accordance with this, torque transmitted to the first sun gear S1, as described hereinafter, is transmitted to the first carrier C1. That is, the rotating machine torque and the torque transmitted to the first sun gear S1 are combined, and the combined torque is transmitted to the first carrier C1. Further, part of the torque transmitted to the first carrier C1 is transmitted to the A1 rotor 24 via the connection shaft 6, and the remainder thereof is transmitted to the drive wheels DW and DW via the second rotating shaft 7 and so forth.

At the time of the ENG start during EV traveling, as described as to the first embodiment, by supplying the electric power from the battery 43 to the stator 23, the first driving equivalent torque TSE1 is transmitted to the A2 rotor 25, and in accordance therewith, the torque transmitted to the A1 rotor 24 as described above is transmitted to the A2 rotor 25. Further, part of the torque transmitted to the A2 rotor 25 is transmitted to the first sun gear S1 via the first rotating shaft 4, and the remainder thereof is transmitted to the crankshaft 3a. via the first rotating shaft 4 etc., whereby the crankshaft 3a. performs normal rotation. Furthermore, in this case, the electric power supplied to the stators 102 and 23 is controlled such that sufficient motive power is transmitted to the drive wheels DW and DW and the engine 3.

From the above, at the time of the ENG start during EV traveling, while the vehicle speed VP is held at the value assumed then, the engine speed NE is increased. In this state, similarly to the first embodiment, the ignition operation of the fuel injection valves and the spark plugs of the engine 3 is controlled according to the crank angle position, whereby the engine 3 is started. Further, by controlling the first magnetic field rotational speed VMF1 and the rotor rotational speed, the engine speed NE is controlled to a relatively small value suitable for starting the engine 3.

FIG. 42 shows an example of the relationship between the rotational speeds and torques of the various rotary elements at the start of the ENG start during EV traveling. In the figure, VRO and TMOT represent the rotor rotational speed and the rotating machine torque of the rotating machine 101, respectively. In this case, as is apparent from FIG. 42, the rotating machine torque TMOT is transmitted to both the drive wheels DW and DW and the crankshaft 3a using the first electric power-generating equivalent torque TGE1 as a reaction force, and hence similarly to the first embodiment, the torque demanded of the first rotating machine 21 becomes larger than in the other cases. In this case, similarly to the first embodiment, the torque demanded of the first rotating machine 21, i.e. the first electric power-generating equivalent torque TGE1 is expressed by the following equation (60):

$$TGE1 = -\{r1 \cdot TDDW + (1+r1)TDENG\}/(\alpha+1+r1) \qquad (60)$$

As is clear from the above equation (60), as the first pole pair number ratio $\alpha$ is larger, the first electric power-generating equivalent torque TGE1 becomes smaller with respect to the drive wheel-transmitted torque TDDW and the engine-transmitted torque TDENG assuming that the respective magnitudes thereof are unchanged. In the present embodiment, similarly to the first embodiment, the first pole pair number ratio $\alpha$ is set to 2.0, so that the first electric power-generating equivalent torque TGE1 can be made smaller than when the first pole pair number ratio $\alpha$ is set to a value smaller than 1.0.

ENG Traveling

During the ENG traveling, the operations in the battery input/output zero mode, the assist mode, and the drive-time charging mode are executed according to the executing conditions described in the first embodiment. In the battery input/output zero mode, by using the engine motive power transmitted to the A2 rotor 25, electric power generation is performed by the stator 23 of the first rotating machine 21, and the generated electric power is supplied to the stator 102 of the rotating machine 101 without charging it into the battery 43. In this case, similarly to the first embodiment, part of the engine torque TENG is distributed to the stator 23 and the A1 rotor 24 via the A2 rotor 25. Further, the remainder of the engine torque TENG is transmitted to the first sun gear S1 via the first rotating shaft 4. Furthermore, similarly to the case of the ENG start during EV traveling, the rotating machine torque TMOT and the torque transmitted to the first sun gear S1 as described above are combined, and the combined torque is transmitted to the first carrier C1. Further, the engine torque TENG distributed to the A1 rotor 24 as described above is further transmitted to the first carrier C1 via the connection shaft 6.

As described above, the combined torque formed by combining the engine torque TENG distributed to the A1 rotor 24, the rotating machine torque TMOT and the engine torque TENG transmitted to the first sun gear S1 is transmitted to the first carrier C1. Further, this combined torque is transmitted to the drive wheels DW and DW e.g. via the second rotating shaft 7 etc. As a consequence, assuming that there is no transmission loss caused by the gears, in the battery input/output zero mode, motive power equal in magnitude to the engine motive power is transmitted to the drive wheels DW and DW, similarly to the first embodiment.

Furthermore, in the battery input/output zero mode, the engine motive power is transmitted to the drive wheels DW and DW while having the speed thereof steplessly changed through the control of the first magnetic field rotational speed VMF1 and the rotor rotational speed VRO. In short, the first rotating machine 21, the first planetary gear unit PS1 and the rotating machine 101 function as a stepless transmission.

More specifically, as indicated by two-dot chain lines in FIG. 43, while maintaining the speed relationships expressed by the aforementioned equations (53) and (59), by increasing the first magnetic field rotational speed VMF1 and decreasing the rotor rotational speed VRO with respect to the A2 rotor rotational speed VRA2 and the first sun gear rotational speed VSU1, that is, the engine speed NE, it is possible to steplessly decrease the A1 rotor rotational speed VRA1 and the first carrier rotational speed VCA1, that is, the vehicle speed VP. Inversely, as indicated by one-dot chain lines in FIG. 43, by decreasing the first magnetic field rotational speed VMF1 and increasing the rotor rotational speed VRO with respect to the engine speed NE, it is possible to steplessly increase the vehicle speed VP. Further, in this case, the first magnetic field rotational speed VMF1 and the rotor rotational speed VRO are controlled such that the engine speed NE becomes equal to the target engine speed.

As described hereinabove, in the battery input/output zero mode, the engine motive power is once divided by the first rotating machine 21, the first planetary gear unit PS1 and the rotating machine 101, and is transmitted to the first carrier C1 via the following first to third transmission paths. Then, the divided engine motive power is combined by the first carrier C1 and is then transmitted to the drive wheels DW and DW.

First transmission path: A2 rotor 25→magnetic forces caused by magnetic force lines ML→A1 rotor 24→connection shaft 6→first carrier C1

Second transmission path: first sun gear S1→first planetary gears P1→first carrier C1

Third transmission path: A2 rotor 25→magnetic forces caused by magnetic force lines ML→stator 23→first PDU 41→second PDU 42→rotating machine 101→first ring gear R1→first planetary gears P1→first carrier C1

In the above first and second transmission paths, the engine motive power is transmitted to the drive wheels DW and DW by the magnetic paths and so-called mechanical paths formed by the meshing of gears without being converted to electric power.

Further, in the battery input/output zero mode, the electric power generated by the stator 23, the first magnetic field rotational speed VMF1 and the rotor rotational speed VRO are controlled such that the speed relationships expressed by the aforementioned equations (53) and (59) are maintained.

More specifically, in the assist modes, electric power is generated by the stator 23 using the engine motive power transmitted to the A2 rotor 25, and electric power charged in the battery 43 is supplied to the stator 102 of the rotating machine 101 in addition to the electric power generated by the stator 23. Therefore, the rotating machine torque TMOT based on the electric power supplied from the stator 23 and the battery 43 to the stator 102 is transmitted to the first carrier C1. Further, similarly to the above-described battery input/output zero mode, this rotating machine torque TMOT, the engine torque TENG distributed to the A1 rotor 24 along with the electric power generation by the stator 23, and the engine torque TENG transmitted to the first sun gear S1 are combined, and the combined torque is transmitted to the drive wheels DW and DW via the first carrier C1. As a result, assuming that there is no transmission loss caused by the gears or the like, in the assist mode, similarly to the first embodiment, the motive power transmitted to the drive wheels DW and DW becomes equal to the sum of the engine motive power and the electric power (energy) supplied from the battery 43.

Further, in the assist mode, the electric power generated by the stator 23, the electric power supplied from the battery 43 to the stator 102, the first magnetic field rotational speed VMF1 and the rotor rotational speed VRO are controlled such that the speed relationships expressed by the aforementioned equations (53) and (59) are maintained. As a consequence, similarly to the first embodiment, the insufficient amount of the engine motive power with respect to the vehicle demand motive power is made up for by supply of electric power from the battery 43 to the stator 102. It should be noted that if the insufficient amount of the engine motive power with respect to the vehicle demand motive power is relatively large, electric power is supplied from the battery 43 not only to the stator 102 of the rotating machine 101 but also to the stator 23 of the first rotating machine 21.

Further, in the drive-time charging mode, electric power, which has a magnitude obtained by subtracting the electric power charged into the battery 43 from the electric power generated by the stator 23 of the first rotating machine 21, is supplied to the stator 102 of the rotating machine 101, and the rotating machine torque TMOT based on this electric power is transmitted to the first carrier C1. Furthermore, similarly to the battery input/output zero mode, this rotating machine torque TMOT, the engine torque TENG distributed to the A1 rotor 24 along with the electric power generation by the stator 23, and the engine torque TENG transmitted to the first sun gear S1 are combined, and the combined torque is transmitted to the drive wheels DW and DW via the first carrier C1. As a result, during the drive-time charging mode, assuming that there is no transmission loss caused by the gears or the like, similarly to the first embodiment, the motive power transmitted to the drive wheels DW and DW has a magnitude obtained by subtracting the electric power (energy) charged into the battery 43 from the engine motive power.

Furthermore, in the drive-time charging mode, the electric power generated by the stator 23, the electric power charged into the battery 43, the first magnetic field rotational speed VMF1 and the rotor rotational speed VRO are controlled such that the speed relationships expressed by the equations (53) and (59) are maintained. As a result, similarly to the first embodiment, the surplus amount of the engine motive power with respect to the vehicle demand motive power is converted to electric power by the stator 23 of the first rotating machine 21, and is charged into the battery 43.

Further, during the ENG traveling, when the electric power generation is not performed by the stator 23 of the first rotating machine 21 but electric power is supplied from the battery 43 to the stator 102 of the rotating machine 101, and this electric power is controlled such that the rotating machine torque TMOT has a magnitude 1/r1 times as large as the engine torque TENG, all of the engine torque TENG and the rotating machine torque TMOT are combined by the first carrier C1, and then the combined torque is transmitted to the drive wheels DW and DW. More specifically, in this case, it is possible to transmit the engine motive power to the drive wheels DW and DW only by the mechanical paths without transmitting the same by the aforementioned electrical paths. Further, in this case, torque having a magnitude (r1+1)/r1 times as large as that of the engine torque TENG is transmitted to the drive wheels DW and DW.

Figure 44:
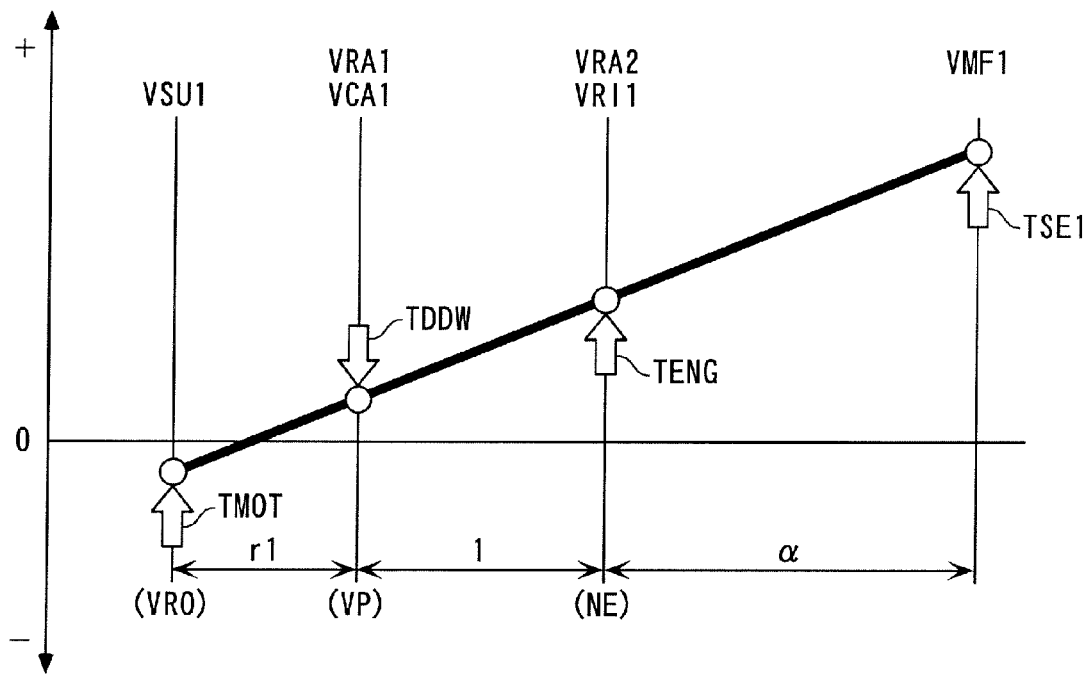
[FIG. 44] A diagram showing an example of the relationship between the rotational speeds and torques of various rotary elements of the power plant shown in FIG. 40 at the start of the rapid acceleration operation during ENG traveling.

Furthermore, at the time of the rapid acceleration operation during the ENG traveling described in the first embodiment, the engine 3, the first rotating machine 21 and the rotating machine 101 are controlled in the following manner: FIG. 44 shows an example of the relationship between the rotational speeds and torques of various rotary elements at the start of the rapid acceleration operation during ENG traveling. In this case, similarly to the first embodiment, the engine speed NE is increased to such a predetermined engine speed as will make it possible to obtain the maximum torque thereof. Further, as shown in FIG. 44, the vehicle speed VP is not immediately increased, and hence as the engine speed NE becomes higher than the vehicle speed VP, the difference between the engine speed NE and the vehicle speed VP becomes larger, whereby the rotor 103 of the rotating machine 101 performs reverse rotation. In order to cause positive torque from the rotor 103 thus performing reverse rotation to act on the drive wheels DW and DW, the stator 102 performs electric power generation. Further, electric power generated by the stator 102 is supplied to the stator 23 of the first rotating machine 21 to cause the first rotating magnetic field to perform normal rotation.

As described above, the engine torque TENG, the first driving equivalent torque TSE1, and the rotating machine torque TMOT are all transmitted to the drive wheels DW and DW as positive torque, which results in a rapid increase in the vehicle speed VP. Further, at the start of the rapid acceleration operation during the ENG traveling, as is apparent from FIG. 44, the engine torque TENG and the first driving equivalent torque TSE1 are transmitted to the drive wheels DW and DW using the rotating machine torque TMOT as a reaction force, so that torque demanded of the rotating machine 101 becomes larger than otherwise. In this case, the torque demanded of the rotating machine 101, i.e. the rotating machine torque TMOT is expressed by the following equation (61):

$$TMOT=-\{\alpha \cdot TENG+(1+\alpha)TDDW\}/(r1+1+\alpha) \tag{61}$$

As is clear from this equation (60), as the first planetary gear ratio r1 is larger, the rotating machine torque TMOT becomes smaller with respect to the drive wheel-transmitted torque TDDW and the engine torque TENG assuming that the respective magnitudes thereof are unchanged. In the present embodiment, since the first planetary gear ratio r1 is set to a relatively large one of values that can be taken by a general planetary gear unit, the rotating machine torque TMOT can be made smaller than when the first planetary gear ratio r1 is set to a smaller value.

Deceleration Regeneration

During the deceleration regeneration, when the ratio of the torque of the drive wheels DW and DW transmitted to the engine 3 to the torque of the drive wheels DW and DW (torque by inertia) is small, electric power generation is performed by the stators 23 and 102 using part of motive power from the drive wheels DW and DW, and the generated electric power is charged into the battery 43. Along with the electric power generation by the stator 102, combined torque formed by combining all the torque of the drive wheels DW and DW and torque distributed to the A1 rotor 24, as described hereinafter, is transmitted to the first carrier C1. Further, the above-described combined torque transmitted to the first carrier C1 is distributed to the first sun gear S1 and the first ring gear R1. The torque distributed to the first ring gear R1 is transmitted to the rotor 103.

Further, part of the torque distributed to the first sun gear S1 is transmitted to the engine 3, and the remainder thereof is, similarly to the case of the aforementioned battery input/output zero mode, transmitted to the A2 rotor 25 along with the electric power generation by the stator 23, and is then distributed to the stator 23 and the A1 rotor 24. Further, the torque distributed to the A1 rotor 24 is transmitted to the first carrier C1. As a result, during the deceleration regeneration, assuming that there is no transmission loss caused by the gears, similarly to the first embodiment, the sum of the motive power transmitted to the engine 3 and the electric power (energy) charged into the battery 43 becomes equal to the motive power from the drive wheels DW and DW.

ENG Start During Stoppage of the Vehicle

At the time of the ENG start during stoppage of the vehicle, electric power is supplied from the battery 43 to the stator 23 of the first rotating machine 21, whereby the first rotating magnetic field generated by the stator 23 is caused to perform normal rotation, and electric power generation is performed by the stator 102 of the rotating machine 101 to further supply the generated electric power to the stator 23. As described as to the first embodiment, as the electric power is supplied to the stator 23, the first driving equivalent torque TSE1 from the stator 23 acts on the A2 rotor 25 to cause A2 rotor 25 to perform normal rotation, and acts on the A1 rotor 24 to cause the A1 rotor 24 to perform reverse rotation. Further, part of the torque transmitted to the A2 rotor 25 is transmitted to the crankshaft 3a, whereby the crankshaft 3a. performs normal rotation.

Furthermore, at the time of the ENG start during stoppage of the vehicle, the remainder of the torque transmitted to the A2 rotor 25 is transmitted to the first sun gear S1, and is then transmitted to the stator 102 as electric energy via the first planetary gears P1, the first ring gear R1 and the rotor 103 along with the electric power generation by the stator 102 of the rotating machine 101. Further, the vehicle speed VP is approximately equal to 0, whereas the crankshaft 3a. performs normal rotation as described above, and hence the rotor 103 performs reverse rotation. As a result, the rotating machine torque TMOT generated along with the electric power generation by the stator 102 is transmitted to the first carrier C1 via the first ring gear R1, thereby acting on the first carrier C1 to cause the first carrier C1 to perform normal rotation. Further, the torque transmitted to the first sun gear S1 such that it is balanced with the rotating machine torque TMOT is further transmitted to the first carrier C1, thereby acting on the first carrier C1 to cause the first carrier C1 to perform normal rotation.

In this case, the electric power supplied to the stator 23 of the first rotating machine 21 and the electric power generated by the stator 102 of the rotating machine 101 are controlled such that the above-described torque for causing the A1 rotor 24 to perform reverse rotation, and the torques for causing the first carrier C1 to perform normal rotation are balanced with each other, whereby the A1 rotor 24, the first carrier C1 and the drive wheels DW and DW, which are connected to each other, are held stationary. As a consequence, the A1 rotor rotational speed VRA1 and the first carrier rotational speed VCA1 become equal to 0, and the vehicle speed VP as well become equal to 0.

Further, in this case, the electric power supplied to the stator 23, the electric power generated by the stator 102, the first magnetic field rotational speed VMF1 and the rotor rotational speed VRO are controlled such that the speed relationships expressed by the equations (53) and (59) are maintained and at the same time, the A2 rotor rotational speed VRA2 and the first sun gear rotational speed VSU1 take relatively small values. From the above, at the time of the ENG start during stoppage of the vehicle, similarly to the first embodiment, while holding the vehicle speed VP at 0, the engine speed NE is controlled to a relatively small value suitable for the start of the engine 3. Further, in this state, the ignition operation of the fuel injection valves and the spark plugs of the engine 3 is controlled according to the crank angle position, whereby the engine 3 is started.

ENG Creep

During the ENG creep, electric power generation is performed by the stators 23 and 102. Further, electric power thus generated by the stators 23 and 102 is charged into the battery 43. Similarly to the case of the aforementioned battery input/output zero mode, along with the above-mentioned electric power generation by the stator 23, part of the engine torque TENG is transmitted to the A2 rotor 25, and the engine torque TENG transmitted to the A2 rotor 25 is distributed to the stator 23 and the A1 rotor 24. Further, the vehicle speed VP is approximately equal to 0, whereas the crankshaft 3*a*. is performing normal rotation, and hence the rotor 103 of the rotating machine 101 performs reverse rotation. As a result, similarly to the case of the above-described ENG start during stoppage of the vehicle, the rotating machine torque TMOT generated along with the electric power generation by the stator 102 acts on the first carrier C1 to cause the first carrier C1 to perform normal rotation. Further, the engine torque TENG transmitted to the first sun gear S1 such that it is balanced with the rotating machine torque TMOT is further transmitted to the first carrier C1, thereby acting on the first carrier C1 to cause the first carrier C1 to perform normal rotation. Furthermore, the engine torque TENG distributed to the A1 rotor 24 as described above is transmitted to the first carrier C1.

As described above, during the ENG creep, combined torque formed by combining the engine torque TENG distributed to the A1 rotor 24, the rotating machine torque TMOT and the engine torque TENG transmitted to the first sun gear S1 is transmitted to the first carrier C1. Further, this combined torque is transmitted to the drive wheels DW and DW to cause the drive wheels DW and DW to perform normal rotation. Furthermore, the electric power generated by the stators 23 and 102, the first magnetic field rotational speed VMF1 and the rotor rotational speed VRO are controlled such that the A1 rotor rotational speed VRA1 and the first carrier rotational speed VCA1, that is, the vehicle speed VP becomes very small, whereby the creep operation is carried out.

Further, during the ENG creep, as described above, the engine torque TENG distributed to the A1 rotor 24 along with the electric power generation by the stator 23, and the engine torque TENG transmitted to the first carrier C1 via the first sun gear S1 along with the electric power generation by the stator 102 are transmitted to the drive wheels DW and DW. Thus, similarly to the first embodiment, part of the engine torque TENG can be transmitted to the drive wheels DW and DW, thereby making it possible to perform the creep operation without causing engine stall.

ENG-Based Standing Start

At the time of the ENG-based standing start, the rotor rotational speed VRO of the rotor 103 that has been performing reverse rotation during the ENG creep is controlled such that it becomes equal to 0, the first magnetic field rotational speed VMF1 of the first rotating magnetic field that has been performing normal rotation during the ENG creep is increased, and the engine motive power is increased. Then, after the rotor rotational speed VRO becomes equal to 0, the operation in the above-mentioned battery input/output zero mode is performed. This increases the vehicle speed VP to cause the vehicle to start.

As described heretofore, according to the present embodiment, the first rotating machine 21 has the same functions as those of an apparatus formed by combining a planetary gear unit and a general one-rotor-type rotating machine, so that differently from the aforementioned conventional power plant, the power plant 1F does not require two planetary gear units for distributing and combining motive power for transmission but requires only the first planetary gear unit PS1. This makes it possible to reduce the size of the power plant 1F by the corresponding extent. Further, in the power plant 1F, as already described in the description of the operation in the battery input/output zero mode, differently from the above-described conventional case, the engine motive power is transmitted to the drive wheels DW and DW without being recirculated, so that it is possible to reduce motive power passing through the first rotating machine 21, the first planetary gear unit PS1 and the rotating machine 101. This makes it possible to reduce the sizes and costs of the first rotating machine 21, the first planetary gear unit PS1 and the rotating machine 101, thereby making it possible to attain further reduction of the size and costs of the power plant 1F. Further, by using the first rotating machine 21, the first planetary gear unit PS1 and the rotating machine 101, each having a torque capacity corresponding to motive power reduced as described above, it is possible to suppress the loss of motive power to improve the driving efficiency of the power plant 1F.

Further, the engine motive power is transmitted to the drive wheels DW and DW in a divided state via a total of three transmission paths: a first transmission path (the A2 rotor 25, magnetic forces caused by magnetic force lines ML, the A1 rotor 24, the connection shaft 6, and the first carrier C1), a second transmission path (the first sun gear S1, the first planetary gears P1, and the first carrier C1), a third transmission path (the A2 rotor 25, magnetic forces caused by magnetic force lines ML, the stator 23, the first PDU 41, the second PDU 42, the rotating machine 101, the first ring gear R1, the first planetary gears P1, and the first carrier C1). This makes it possible to reduce electric power (energy) passing through the first and second PDUs 41 and 42 via the third transmission path, so that it is possible to reduce the sizes and costs of the first and second PDUs 41 and 42, thereby making it possible to attain further reduction of the size and costs of the power plant 1F.

Furthermore, as described above with reference to FIG. 43, the engine motive power is transmitted to the drive wheels DW and DW while having the speed thereof steplessly changed through the control of the first magnetic field rotational speed VMF1 and the rotor rotational speed VRO. Further, in this case, the first magnetic field rotational speed VMF1 and the rotor rotational speed VRO are controlled such that the engine speed NE becomes equal to the target engine speed set to a value that will make it possible to obtain the optimum fuel economy of the engine 3, and therefore it is possible to drive the drive wheels DW and DW while controlling the engine motive power such that the optimum fuel economy of the engine 3 can be obtained. This makes it possible to further enhance the driving efficiency of the power plant 1F.

Further, similarly to the first embodiment, the first pole pair number ratio α of the first rotating machine 21 is set to 2.0. With this, at the time of the ENG start during EV traveling in which the torque demanded of the first rotating machine 21 becomes particularly large, as described hereinabove with reference to FIG. 42 using the aforementioned equation (60), it is possible to make the first electric power-generating equivalent torque TGE1 smaller than when the first pole pair number ratio α is set to less than 1.0, and therefore it is possible to further reduce the size and costs of the first rotating machine 21. Furthermore, the first planetary gear ratio r1 of the first planetary gear unit PS1 is set to a relatively large one of values that can be taken by a general planetary gear unit. As a consequence, at the start of the rapid acceleration operation during the ENG traveling in which torque demanded of the rotating machine 101 becomes particularly large, as described above with reference to FIG. 44 using the aforementioned equation (61), it is possible to make the rotating machine torque TMOT smaller than when the first planetary gear ratio r1 is set to a small value, which makes it possible to further reduce the size and costs of the rotating machine 101. In addition, according to the present embodiment, it is possible to obtain the same advantageous effects as provided by the first embodiment.

Next, power plants 1G, 1H, 1I, 1J and 1K according to eighth to twelfth embodiments of the present invention will be described with reference to FIGS. 45 to 49. These power plants 1G to 1K are distinguished from the seventh embodiment mainly in that they further include transmissions 111, 121, 131, 141 and 151, respectively. In any of the eighth to twelfth embodiments, the connection relationship between the engine 3, the first rotating machine 21, the first planetary gear unit PS1, the rotating machine 101, and the drive wheels DW and DW is the same as the connection relationship in the seventh embodiment. More specifically, the A2 rotor 25 and the first sun gear S1 are mechanically connected to the crankshaft 3a of the engine 3, and the A1 rotor 24 and the first carrier C1 are mechanically connected to the drive wheels DW and DW. Further, the rotor 103 of the rotating machine 101 is mechanically connected to the first ring gear R1. Further, in FIGS. 45 to 49, the component elements identical to those of the seventh embodiment are denoted by the same reference numerals. This also similarly applies to figures for use in describing the other embodiments described hereinafter. The following description is mainly given of different points of the power plants 1G to 1K from the seventh embodiment, in order from the power plant 1G of the eighth embodiment.

Figure 45:
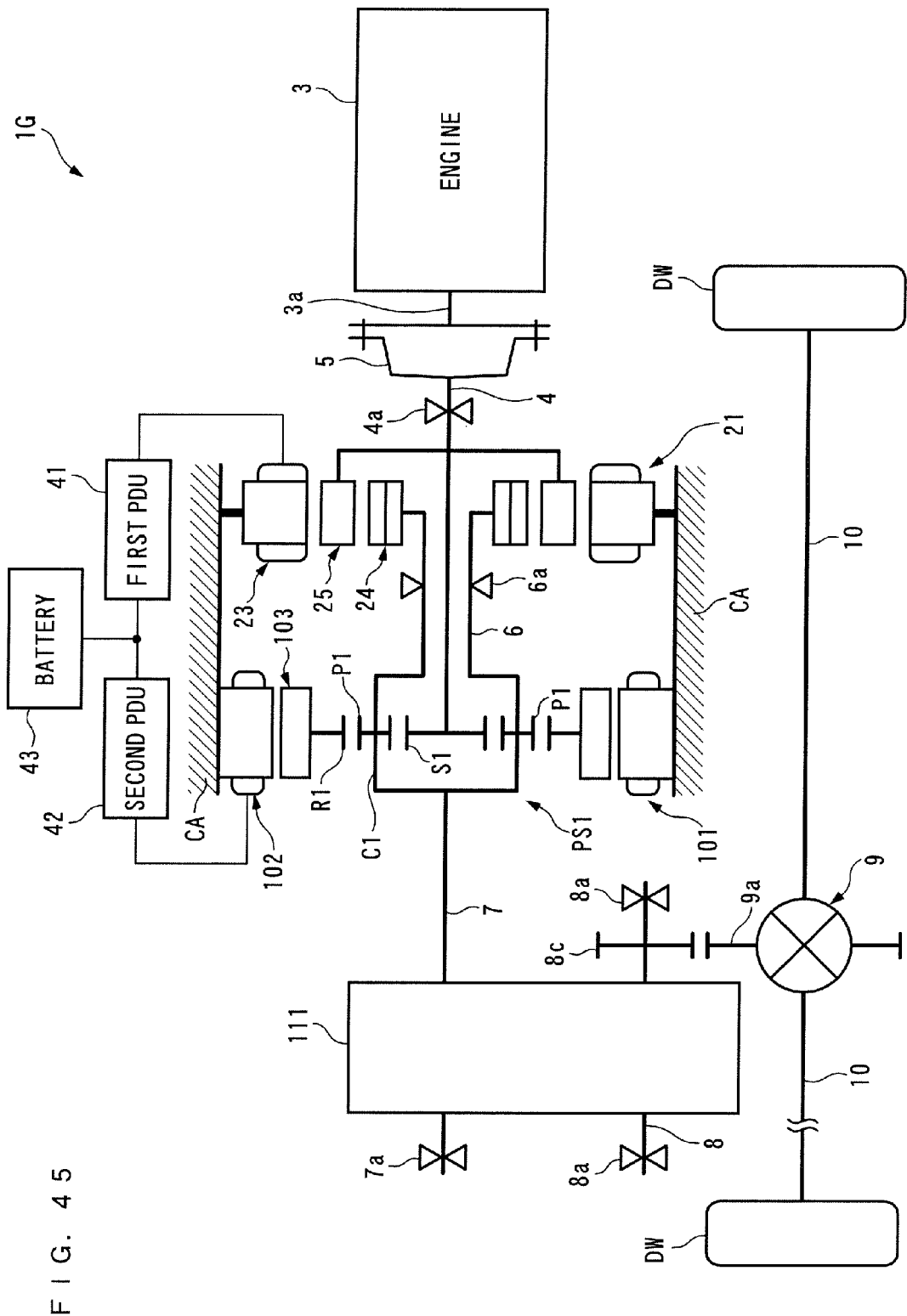
[FIG. 45] A schematic diagram of a power plant according to an eighth embodiment of the present invention.

Referring to FIG. 45, in the power plant 1G, the transmission 111 is provided in place of the aforementioned gear 7b. and first gear 8b. in mesh with each other. This transmission 111 is a belt-type stepless transmission, and includes an input shaft connected to the aforementioned second rotating shaft 7, an output shaft connected to the idler shaft 8, pulleys provided on the input shaft and the output shaft, respectively, and a metal belt wound around the pulleys, none of which are shown. The transmission 111 changes the effective diameters of the pulleys, thereby outputting motive power input to the input shaft to the output shaft while changing the speed thereof. Further, the transmission ratio of the transmission 111 (the rotational speed of the input shaft/the rotational speed of the output shaft) is controlled by the ECU 2.

As described above, the transmission 111 is provided between the A1 rotor 24 and the first carrier C1, and the drive wheels DW and DW, and the motive power transmitted to the A1 rotor 24 and the first carrier C1 is transmitted to the drive wheels DW and DW while having the speed thereof changed by the transmission 111. It should be noted that in the present embodiment, the transmission 111 corresponds to a transmission in the invention as claimed in claim 10.

In the power plant 1G constructed as above, when a very large torque is transmitted from the A1 rotor 24 and the first carrier C1 to the drive wheels DW and DW, e.g. during the above-described EV standing start and ENG-based standing start, the transmission ratio of the transmission 111 is controlled to a predetermined lower-speed value larger than 1.0. This causes the torque transmitted to the A1 rotor 24 and the first carrier C1 to be increased by the transmission 111, and then be transmitted to the drive wheels DW and DW. In accordance therewith, electric power generated by the first rotating machine 21 and electric power supplied to the rotating machine 101 (generated electric power) are controlled such that the torque transmitted to the A1 rotor 24 and the first carrier C1 becomes smaller. Therefore, according to the present embodiment, it is possible to reduce the respective maximum values of torque demanded of the first rotating machine 21 and the rotating machine 101, thereby making it possible to further reduce the sizes and costs of the first rotating machine 21 and the rotating machine 101. In addition, the maximum value of the torque transmitted to the first carrier C1 via the first sun gear S1 and the first ring gear R1 can be reduced, and hence it is possible to further reduce the size and costs of the first planetary gear unit PS1.

Furthermore, during traveling of the vehicle including the EV traveling and the ENG traveling, in cases where the A1 rotor rotational speed VRA1 becomes too high, e.g. when the vehicle speed VP becomes very high, the transmission ratio of the transmission 111 is controlled to a predetermined higher-speed value smaller than 1.0. With this, according to the present embodiment, the A1 rotor rotational speed VRA1 can be decreased with respect to the vehicle speed VP, and hence it is possible to prevent failure of the first rotating machine 21 from being caused by the A1 rotor rotational speed VRA1 becoming too high. This is particularly effective because the A1 rotor 24 is formed by magnets and the magnets are lower in strength than soft magnetic material elements, so that the above-mentioned inconveniences are liable to occur.

Further, in cases where the rotor rotational speed VRO, which is determined by the relationship between the vehicle speed VP and the engine speed NE, becomes too high, e.g. during high-vehicle speed operation of the vehicle in which the vehicle speed VP is higher than the engine speed NE, the transmission ratio of the transmission 111 is controlled to a predetermined higher-speed value smaller than 1.0. With this, according to the present embodiment, the first carrier rotational speed VCA1 is lowered with respect to the vehicle speed VP, whereby as is apparent from FIG. 43, referred to hereinabove, it is possible to make the rotor rotational speed VRO lower, thereby making it possible to prevent failure of the rotating machine 101 from being caused by the rotor rotational speed VRO becoming too high.

Furthermore, during traveling of the vehicle, the transmission ratio of the transmission 111 is controlled such that the first magnetic field rotational speed VMF1 and the rotor rotational speed VRO become equal to first and second predetermined target values, respectively. The first and second target values are calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the first and second target values are calculated by searching a map other than the above-mentioned map according to the engine speed NE and the vehicle speed VP. Further, in these maps, the first and second target values are set to such values that will make it possible to obtain high efficiencies of the first rotating machine 21 and the rotating machine 101 with respect to the vehicle speed VP (and engine speed NE) assumed at the time. Furthermore, in parallel with the above-described control of the transmission 111, the first magnetic field rotational speed VMF1 and the rotor rotational speed VRO are controlled to the first and second target values, respectively. With this, according to the present embodiment, during traveling of the vehicle, it is possible to obtain the high efficiencies of the first rotating machine 21 and the rotating machine 101.

Further, also in the present embodiment, as described above with reference to FIG. 43, using the first rotating machine 21, the first planetary gear unit PS1 and the rotating machine 101, it is possible to transmit the engine motive power to the drive wheels DW and DW while steplessly changing the speed thereof, and hence it is possible to reduce the frequency of the speed-changing operation of the transmission 111. This makes it possible to suppress heat losses by the speed-changing operation, and thereby secure the high driving efficiency of the power plant 1G. In addition to this, according to the present embodiment, it is possible to obtain the same advantageous effects as provided by the seventh embodiment.

It should be noted that although in the present embodiment, the transmission 111 is a belt-type stepless transmission, it is to be understood that a toroidal-type or a hydraulic-type stepless transmission or a gear-type stepped transmission may be employed.

Figure 46:
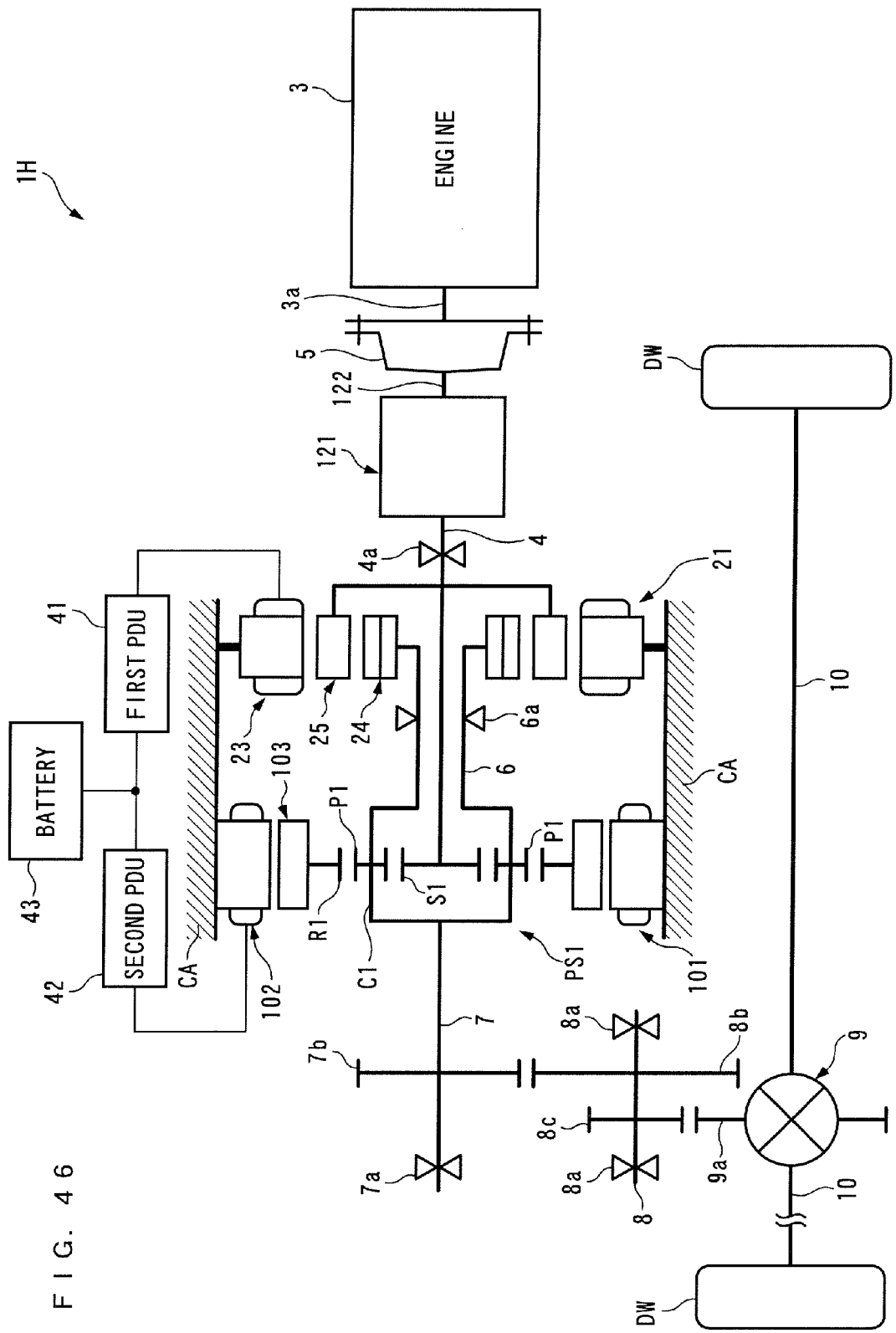
[FIG. 46] A schematic diagram of a power plant according to a ninth embodiment of the present invention.

In the power plant 1H according to the ninth embodiment shown FIG. 46, the transmission 121 is a gear-type stepped transmission formed by a planetary gear unit etc., and includes an input shaft 122 and an output shaft (not shown). In the transmission 121, a total of two speed positions, i.e. a first speed (transmission ratio=the rotational speed of the input shaft 122/the rotational speed of the output shaft=1.0) and a second speed (transmission ratio<1.0) are set as speed positions. The ECU 2 performs a change between these speed positions. Further, the input shaft 122 of the transmission 121 is directly connected to the crankshaft 3$a$. via the flywheel 5, and the output shaft (not shown) thereof is directly connected to the aforementioned first rotating shaft 4. As described above, the transmission 121 is provided between the crankshaft 3$a$. and the A2 rotor 25 and the first sun gear S1, for transmitting the engine motive power to the A2 rotor 25 and the first sun gear S1 while changing the speed of the engine motive power. It should be noted that in the present embodiment, the transmission 121 corresponds to a transmission in the invention as claimed in claim 11.

Furthermore, the number of the gear teeth of the gear 9$a$. of the aforementioned differential gear mechanism 9 is larger than that of the gear teeth of the second gear 8$c$. of the idler shaft 8, whereby motive power transmitted to the idler shaft 8 is transmitted to the drive wheels DW and DW in a speed-reduced state.

In the power plant 1H constructed as above, in cases where a very large torque is transmitted from the A1 rotor 24 and the first carrier C1 to the drive wheels DW and DW, e.g. during the ENG-based standing start, the speed position of the transmission 121 is controlled to the second speed (transmission ratio<1.0). This reduces the engine torque TENG input to the A2 rotor 25 and the first sun gear S1. In accordance therewith, electric power generated by the first rotating machine 21 and electric power supplied to the rotating machine 101 (generated electric power) are controlled such that the engine torque TENG transmitted to the A1 rotor 24 and the first carrier C1 becomes smaller. Further, the engine torque TENG transmitted to the A1 rotor 24 and the first carrier C1 is transmitted to the drive wheels DW and DW in a state increased by deceleration by the second gear 8$c$. and the gear 9$a$. With this, according to the present embodiment, it is possible to reduce the respective maximum values of torque demanded of the first rotating machine 21 and the rotating machine 101, thereby making it possible to reduce the sizes and costs of the first rotating machine 21 and the rotating machine 101. In addition, it is possible to reduce the maximum value of the torque transmitted to the first carrier C1 via the first sun gear S1 and the first ring gear R1, which makes it possible to further reduce the size and costs of the first planetary gear unit PS1.

Further, when the engine speed NE is very high, the speed position of the transmission 121 is controlled to the first speed (transmission ratio=1.0). With this, according to the present embodiment, compared with the case of the speed position being the second speed, the A2 rotor rotational speed VRA2 can be reduced, whereby it is possible to prevent failure of the first rotating machine 21 from being caused by the A2 rotor rotational speed VRA2 becoming too high.

Further, in cases where the rotor rotational speed VRO becomes too high, e.g. during the high-vehicle speed operation of the vehicle in which the vehicle speed VP is higher than the engine speed NE, the speed position of the transmission 121 is controlled to the second speed. With this, according to the present embodiment, a second sun gear rotational speed VSU2 is increased with respect to the engine speed NE, whereby as is apparent from FIG. 43, it is possible to reduce the rotor rotational speed VRO, thereby making it possible to prevent failure of the rotating machine 101 from being caused by the rotor rotational speed VRO becoming too high.

Furthermore, during the ENG traveling, the speed position of the transmission 121 is changed according to the engine speed NE and the vehicle speed VP such that the first magnetic field rotational speed VMF1 and the rotor rotational speed VRO take such respective values that will make it possible to obtain the high efficiencies of the first rotating machine 21 and the rotating machine 101. Further, in parallel with such a change in the speed position of the transmission 121, the first magnetic field rotational speed VMF1 and the rotor rotational speed VRO are controlled to respective values determined based on the engine speed NE, the vehicle speed VP, and the speed position of the transmission 121, which are assumed then, and the aforementioned equations (53) and (59). With this, according to the present embodiment, during traveling of the vehicle, it is possible to obtain the high efficiencies of the first rotating machine 21 and the rotating machine 101.

Furthermore, during the ENG traveling, and at the same time during the speed-changing operation of the transmission 121, that is, when the engine 3 is disconnected from the A2 rotor 25 and the first sun gear S1 by the transmission 121, to suppress a speed-change shock, the first rotating machine 21 and the rotating machine 101 are controlled as described hereinafter. Hereinafter, such control of the first rotating machine 21 and the rotating machine 101 is referred to as the "speed-change shock control".

More specifically, electric power is supplied to the stator 23 of the first rotating machine 21, causing the first rotating magnetic field generated in the stator 23 in accordance therewith to perform normal rotation, and electric power is supplied to the stator 102 of the rotating machine 101, causing the rotor 103 to perform normal rotation. This causes the first driving equivalent torque TSE1 and torque transmitted to the A1 rotor 24 as described hereafter to be combined, and this combined torque is transmitted to the A2 rotor 25. The torque transmitted to the A2 rotor 25 is transmitted to the first sun gear S1 without being transmitted to the crankshaft 3$a$, by the above-mentioned disconnection by the transmission 121. Further, this torque is combined with the rotating machine torque TMOT transmitted to the first ring gear R1, and is then transmitted to the first carrier C1. Part of the torque transmitted to the first carrier C1 is transmitted to the A1 rotor 24, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, thereby making it possible to improve marketability. It should be noted that this speed-change shock control is performed only during the speed-changing operation of the transmission 121. In addition to this, according to the present embodiment, it is possible to obtain the same advantageous effects as provided by the seventh embodiment.

Figure 47:
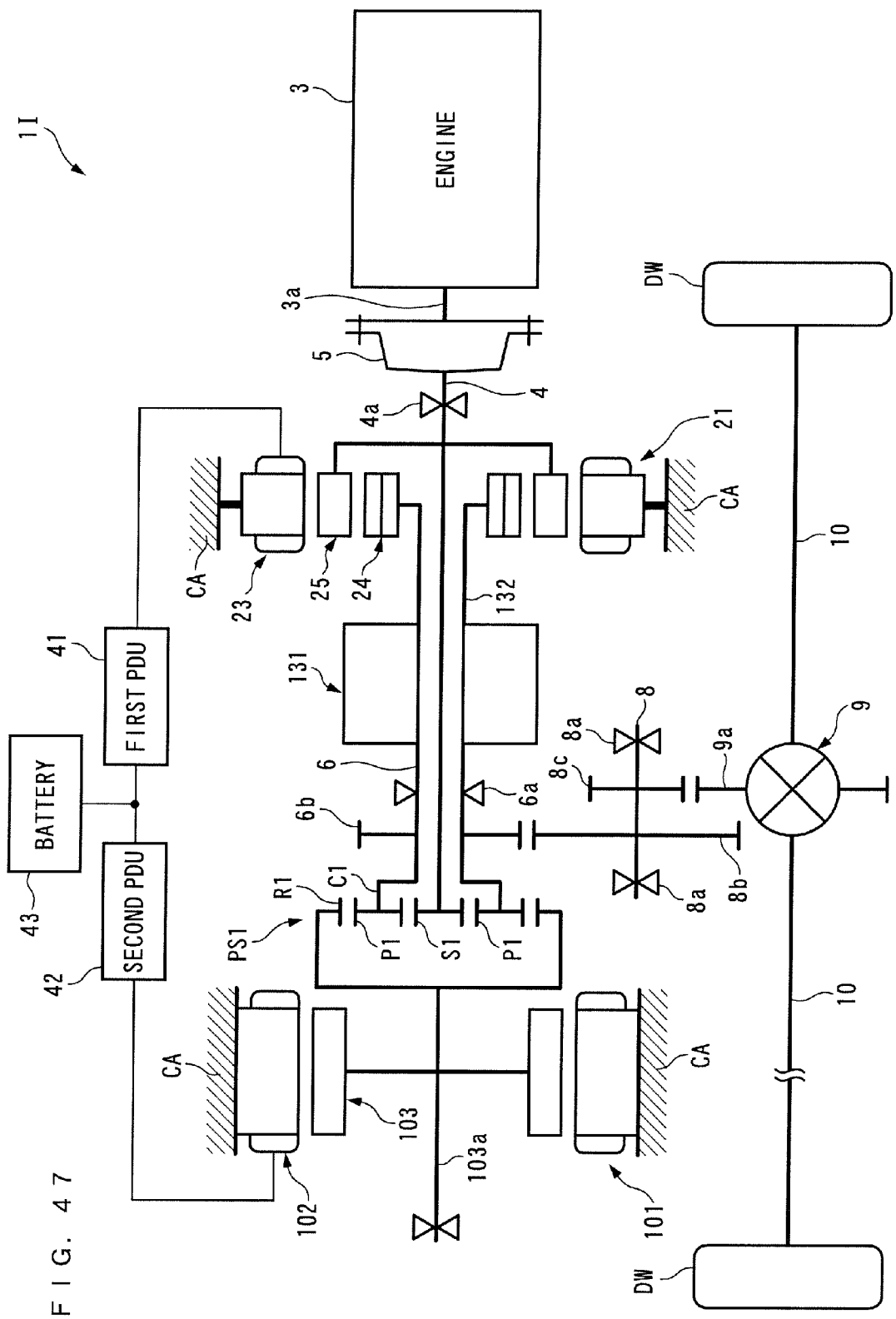
[FIG. 47] A schematic diagram of a power plant according to a tenth embodiment of the present invention.

In the power plant 1I according to the tenth embodiment shown in FIG. 47, the transmission 131 is a gear-type stepped transmission including an input shaft 132 and an output shaft (not shown), a plurality of gear trains different in gear ratio from each other, and clutches (not shown) for engaging and disengaging respectively between the gear trains, and the input shaft 132 and the output shaft, on a gear train-by-gear train basis. The transmission 131 changes the speed of motive power inputted to the input shaft 132 by using one of the gear trains, and outputs the motive power to the output shaft. Further, in the transmission 131, a total of four speed positions, i.e. a first speed (transmission ratio=the rotational speed of the input shaft 132/the rotational speed of the output shaft>1.0), a second speed (transmission ratio=1.0), a third speed (transmission ratio<1.0) for forward travel, and one speed position for rearward travel can be set using these gear trains, and the ECU 2 controls a change between these speed positions.

Further, in the power plant 1I, differently from the seventh embodiment, the second rotating shaft 7 is not provided, and the A1 rotor 24 is directly connected to the input shaft 132 of the transmission 131, while the output shaft of the transmission 131 is directly connected to the above-described connection shaft 6. The connection shaft 6 is integrally formed with the gear 6$b$, and the gear 6$b$. is in mesh with the aforementioned first gear 8$b$.

As described above, the A1 rotor 24 is mechanically connected to the drive wheels DW and DW via the transmission 131, the connection shaft 6, the gear 6$b$, the first gear 8$b$, the idler shaft 8, the second gear 8$c$, the gear 9$a$, the differential gear mechanism 9, and so forth. Further, the motive power transmitted to the A1 rotor 24 is transmitted to the drive wheels DW and DW while having the speed thereof changed by the transmission 131. Furthermore, the first carrier C1 is mechanically connected to the drive wheels DW and DW via the connection shaft 6, the gear 6$b$, the first gear 8$b$, and so forth, without via the transmission 131. It should be noted that in the present embodiment, the transmission 131 corresponds to the transmission in the invention as claimed in claim 12.

Further, the rotor 103 of the rotating machine 101 is integrally formed with a rotating shaft 103$a$. The rotating shaft 103$a$. is directly connected to the first ring gear R1 via a flange. This mechanically directly connects the rotor 103 to the first ring gear R1 such that the rotor 103 is rotatable in unison with the first ring gear R1.

In the power plant 1I constructed as above, in cases where a very large torque is transmitted from the A1 rotor 24 to the drive wheels DW and DW, e.g. during the ENG-based standing start, the speed position of the transmission 131 is controlled to the first speed (transmission ratio>1.0). With this, torque transmitted to the A1 rotor 24 is increased by the transmission 131, and is then transmitted to the drive wheels DW and DW. In accordance therewith, the electric power generated by the first rotating machine 21 is controlled such that the torque transmitted to the A1 rotor 24 becomes smaller. With this, according to the present embodiment, the maximum value of the torque demanded of the first rotating machine 21 can be reduced, thereby making it possible to further reduce the size and costs of the first rotating machine 21.

Further, in cases where the A1 rotor rotational speed VRA1 becomes too high, e.g. during the high-vehicle speed operation in which the vehicle speed VP is very high, the speed position of the transmission 131 is controlled to the third speed (transmission ratio<1.0). With this, according to the present embodiment, since the A1 rotor rotational speed VRA1 can be lowered with respect to the vehicle speed VP, it is possible to prevent failure of the first rotating machine 21 from being caused by the A1 rotor rotational speed VRA1 becoming too high. This is particularly effective because the A1 rotor 24 is formed by magnets and the magnets are lower in strength than soft magnetic material elements, so that the above-mentioned inconveniences are liable to occur.

Furthermore, during traveling of the vehicle including the EV traveling and the ENG traveling, the speed position of the transmission 131 is controlled such that the first magnetic field rotational speed VMF1 becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-mentioned map according to the engine speed NE and the vehicle speed VP. Further, in these maps, the target values are set to such values that will make it possible to obtain high efficiency of the first rotating machine 21 with respect to the vehicle speed VP (and engine speed NE) assumed at the time. Furthermore, in parallel with the above-described control of the transmission 131, the first magnetic field rotational speed VMF1 is controlled to the above-mentioned target value. With this, according to the present embodiment, during traveling of the vehicle, it is possible to obtain the high efficiency of the first rotating machine 21.

Further, during the ENG traveling, and at the same time during the speed-changing operation of the transmission 131, that is, after the input shaft 132 and output shaft of the transmission 131 are disconnected from a gear train having being selected before a speed change and until the input shaft 132 and the output shaft are connected to a gear train selected for the speed change, the first rotating machine 21 and the rotating machine 101 are controlled in the following manner: During the speed-changing operation of the transmission 131, the gear train of the transmission 131 is disconnected from the input shaft 132 and output shaft to thereby disconnect between the A1 rotor 24 and the drive wheels DW and DW, whereby the load of the drive wheels DW and DW ceases to act on the A1 rotor 24. Therefore, no electric power is generated by the first rotating machine 21, and the stator 102 of the rotating machine 101 is supplied with electric power from the battery 43.

With this, according to the present embodiment, during the speed-changing operation of the transmission 131, the rotating machine torque TMOT transmitted to the first ring gear R1 and the engine torque TENG transmitted to the first sun gear S1 are combined, and the combined torque is transmitted to the drive wheels DW and DW via the first carrier C1. This makes it possible to suppress a speed-change shock, which is caused by interruption of transmission of the engine torque TENG to the drive wheels DW and DW. Therefore, it is possible to improve marketability.

Further, by using the first rotating machine 21, the first planetary gear unit PS1 and the rotating machine 101, it is possible to transmit the engine motive power to the drive wheels DW and DW while steplessly changing the speed thereof, and hence it is possible to reduce the frequency of the speed-changing operation of the transmission 131. Therefore, it is possible to enhance the driving efficiency of the power plant 1I. In addition to this, according to the present embodiment, it is possible to obtain the same advantageous effects as provided by the seventh embodiment.

Figure 48:
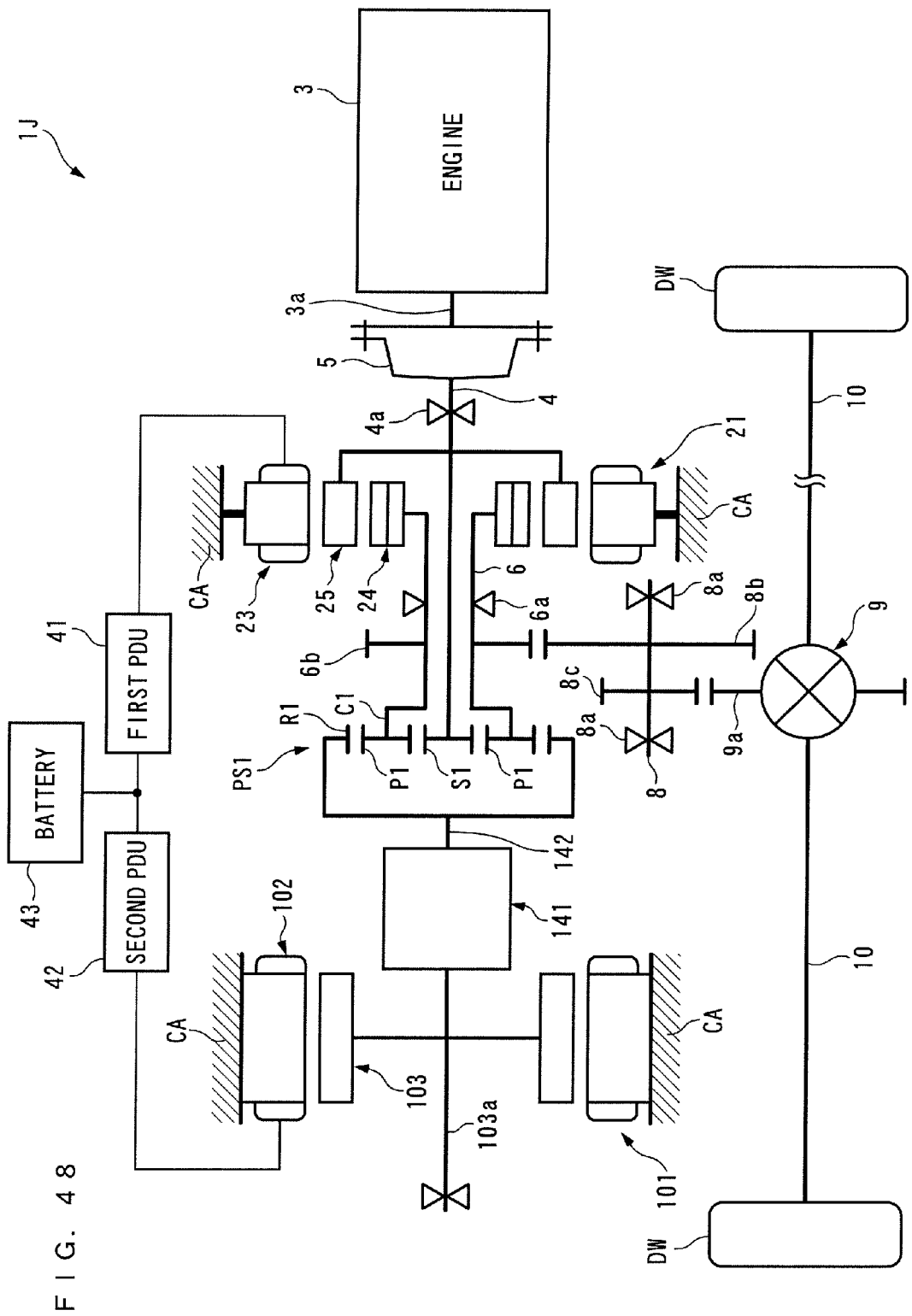
[FIG. 48] A schematic diagram of a power plant according to an eleventh embodiment of the present invention.

In the power plant 1J according to the eleventh embodiment shown in FIG. 48, similarly to the tenth embodiment, the second rotating shaft 7 is not provided, and the first gear 8b. is in mesh with the gear 6b integrally formed with the connection shaft 6. With this, the A1 rotor 24 and the first carrier C1 are mechanically connected to the drive wheels DW and DW via the connection shaft 6, the gear 6b, the first gear 8b, the idler shaft 8, the second gear 8c, the gear 9a and the differential gear mechanism 9, without via the transmission 141.

Further, the transmission 141 is a gear-type stepped transmission configured, similarly to the transmission 131 according to the tenth embodiment, to have speed positions including a first speed to a third speed. The transmission 141 includes an input shaft (not shown) directly connected to the rotor 103 of the rotating machine 101 via the rotating shaft 103a, and an output shaft 142 directly connected to the first ring gear R1, and transmits motive power input to the input shaft to the output shaft 142 while changing the speed of the motive power. Further, the ECU 2 controls a change between the speed positions of the transmission 141. As described above, the rotor 103 is mechanically connected to the first ring gear R1 via the transmission 141. Further, the motive power of the rotor 103 is transmitted to the first ring gear R1 while having the speed thereof changed by the transmission 141. It should be noted that in the present embodiment, the transmission 141 corresponds to a transmission in the invention as claimed in claim 13.

In the power plant 1J constructed as above, when a very large torque is transmitted from the rotor 103 to the drive wheels DW and DW, e.g. during the EV standing start and the ENG-based standing start, the speed position of the transmission 141 is controlled to the first speed (transmission ratio>1.0). With this, the rotating machine torque TMOT is increased by the transmission 141, and is then transmitted to the drive wheels DW and DW via the first ring gear R1 and the first carrier C1. In accordance therewith, electric power supplied to the rotating machine 101 (generated electric power) is controlled such that the rotating machine torque TMOT becomes smaller. Therefore, according to the present embodiment, it is possible to reduce the maximum value of torque required of the rotating machine 101, thereby making it possible to further reduce the size and costs of the rotating machine 101.

Further, when the rotor rotational speed VRO becomes too high, e.g. during the high-vehicle speed operation in which the vehicle speed VP is higher than the engine speed NE, the speed position of the transmission 141 is controlled to the third speed (transmission ratio<1.0). With this, according to the present embodiment, the rotor rotational speed VRO can be reduced with respect to the first ring gear rotational speed VRI1, which is determined by the relationship between the vehicle speed VP and engine speed NE, assumed at the time, and hence it is possible to prevent failure of the rotating machine 101 from being caused by the rotor rotational speed VRO becoming too high.

Furthermore, during traveling of the vehicle including the EV traveling and the ENG traveling, the speed position of the transmission 141 is controlled such that the rotor rotational speed VRO becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-mentioned map according to the engine speed NE and the vehicle speed VP. Further, in these maps, the target values are set to such values that will make it possible to obtain high efficiency of the rotating machine 101 with respect to the vehicle speed VP (and engine speed NE) assumed at the time. Furthermore, in parallel with the above-described control of the transmission 141, the rotor rotational speed VRO is controlled to the above-described target value. With this, according to the present embodiment, during traveling of the vehicle, it is possible to obtain the high efficiency of the rotating machine 101.

Further, during the ENG traveling, and at the same time during the speed-changing operation of the transmission 141, that is, when the rotor 103 and the drive wheels DW and DW are disconnected from each other by the transmission 141, as described in the seventh embodiment, part of the engine torque TENG is transmitted to the drive wheels DW and DW via the A1 rotor 24. Therefore, according to the present embodiment, during the speed-changing operation of the transmission 141, it is possible to suppress a speed-change shock, which can be caused by interruption of transmission of the engine torque TENG to the drive wheels DW and DW. This makes it possible to improve marketability.

Further, by using the first rotating machine 21, the first planetary gear unit PS1 and the rotating machine 101, it is possible to transmit the engine motive power to the drive wheels DW and DW while steplessly changing the speed thereof, so that it is possible to reduce the frequency of the speed-changing operation of the transmission 141. This makes it possible to enhance the driving efficiency of the power plant 1J. In addition to this, according to the present embodiment, it is possible to obtain the same advantageous effects as provided by the seventh embodiment.

Figure 49:
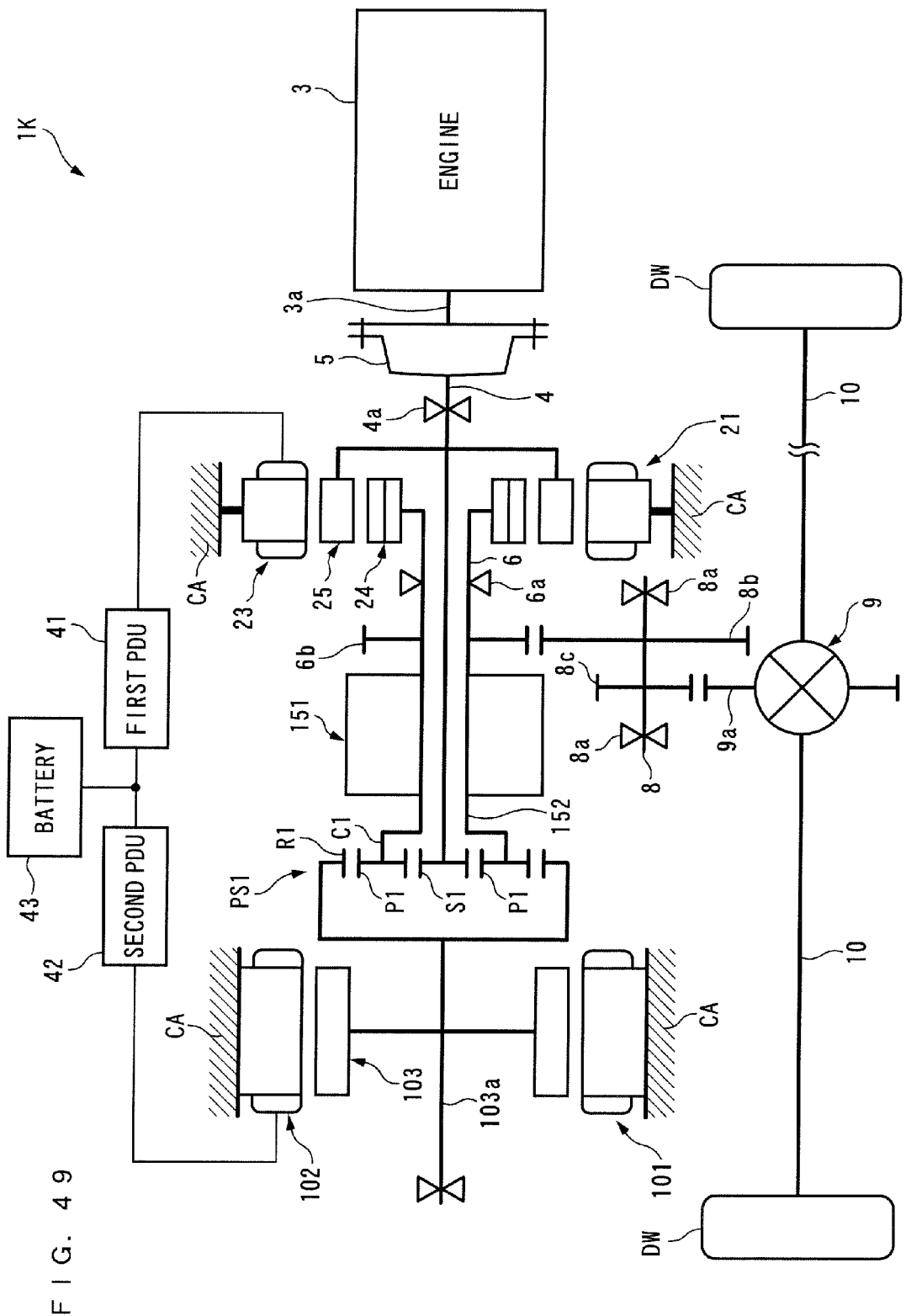
[FIG. 49] A schematic diagram of a power plant according to a twelfth embodiment of the present invention.

In the power plant 1K according to the twelfth embodiment shown in FIG. 49, similarly to the tenth and eleventh embodiments, the second rotating shaft 7 is not provided, and the first gear 8b. is in mesh with the gear 6b. integrally formed with the connection shaft 6. Further, the transmission 151 is a gear-type stepped transmission which is configured similarly to the transmission 131 according to the tenth embodiment and has speed positions of the first to third speeds. The transmission 151 includes an input shaft 152 directly connected to the first carrier C1, and an output shaft (not shown) directly connected to the connection shaft 6, and transmits motive power input to the input shaft 152 to the output shaft while changing the speed of the motive power. Furthermore, the ECU 2a. controls a change between the speed positions of the transmission 151.

As described above, the first carrier C1 is mechanically connected to the drive wheels DW and DW via the transmission 151, the connection shaft 6, the gear 6b, the first gear 8b, and so forth. Further, motive power transmitted to the first carrier C1 is transmitted to the drive wheels DW and DW while having the speed thereof changed by the transmission 151. Furthermore, the A1 rotor 24 is mechanically connected to the drive wheels DW and DW via the connection shaft 6, the gear 6b, the first gear 8b, and so forth without via the transmission 151. Further, similarly to the tenth embodiment, the rotor 103 is directly connected to the first ring gear R1 via the rotating shaft 103a, and is rotatable in unison with the first ring gear R1. It should be noted that in the present embodiment, the transmission 151 corresponds to a transmission in the invention as claimed in claim 14.

In the power plant 1K constructed as above, in cases where a very large torque is transmitted from the first carrier C1 to the drive wheels DW and DW, e.g. during the EV standing start and the ENG-based standing start, the speed position of the transmission 151 is controlled to the first speed (transmission ratio>1.0). With this, the torque transmitted to the first carrier C1 is increased by the transmission 151, and is then transmitted to the drive wheels DW and DW. In accordance therewith, the electric power supplied to the rotating machine 101 (generated electric power) is controlled such that the rotating machine torque TMOT becomes smaller. With this, according to the present embodiment, the maximum value of torque demanded of the rotating machine 101, and the maximum value of torque to be transmitted to the first carrier C1 can be reduced, thereby making it possible to further reduce the sizes and costs of the rotating machine 101 and the first planetary gear unit PS1.

Further, in cases where the rotor rotational speed VRO becomes too high, e.g. during the high-vehicle speed operation in which the vehicle speed VP is higher than the engine speed NE, the speed position of the transmission 151 is controlled to the third speed (transmission ratio<1.0). With this, according to the present embodiment, the first carrier rotational speed VCA1 is reduced with respect to the vehicle speed VP, whereby as is apparent from FIG. 43, it is possible to lower the rotor rotational speed VRO, thereby making it possible to prevent failure of the rotating machine 101 from being caused by the rotor rotational speed VRO becoming too high.

Furthermore, during traveling of the vehicle including the EV traveling and the ENG traveling, the speed position of the transmission 151 is controlled such that the rotor rotational speed VRO becomes equal to a predetermined target value. This target value is calculated by searching a map according to the vehicle speed VP when only the first rotating machine 21 and the rotating machine 101 are used as motive power sources, whereas when the engine 3, the first rotating machine 21 and the rotating machine 101 are used as motive power sources, the target value is calculated by searching a map other than the above-mentioned map according to the engine speed NE and the vehicle speed VP. Further, in these maps, the target value is set to such a value that will make it possible to obtain high efficiency of the rotating machine 101 with respect to the vehicle speed VP (and engine speed NE) assumed at the time. Furthermore, in parallel with the above-described control of the transmission 151, the rotor rotational speed VRO is controlled to the above-described target value. With this, according to the present embodiment, during traveling of the vehicle, it is possible to obtain the high efficiency of the rotating machine 101.

Further, during the ENG traveling, and at the same time during the speed-changing operation of the transmission 151, that is, when the first carrier C1 and the drive wheels DW and DW are disconnected from each other by the transmission 151, as described in the seventh embodiment, part of the engine torque TENG is transmitted to the drive wheels DW and DW via the A1 rotor 24. With this, according to the present embodiment, similarly to the eleventh embodiment, during the speed-changing operation of the transmission 151, it is possible to suppress a speed-change shock, which is caused by interruption of transmission of the engine torque TENG to the drive wheels DW and DW. This makes it possible to improve marketability.

Further, by using the first rotating machine 21, the first planetary gear unit PS1 and the rotating machine 101, it is possible to transmit the engine motive power to the drive wheels DW and DW while steplessly changing the speed thereof, so that it is possible to reduce the frequency of the speed-changing operation of the transmission 151. This makes it possible to enhance the driving efficiency of the power plant 1K. In addition to this, according to the present embodiment, it is possible to obtain the same advantageous effects as provided by the seventh embodiment.

It should be noted that although in the ninth to twelfth embodiments, the transmissions 121 to 151 are each a gear-type stepped transmission, it is to be understood that a belt-type, toroidal-type or hydraulic-type stepless transmission may be employed.

Next, a power plant 1L according to a thirteenth embodiment of the present invention will be described with reference to FIG. 50. This power plant 1L is distinguished from the seventh embodiment mainly in that it further includes a transmission for changing a ratio between the speed difference between the rotor rotational speed VRO and the vehicle speed VP and the speed difference between the vehicle speed VP and the engine speed NE. The following description is mainly given of different points from the seventh embodiment.

Figure 50:
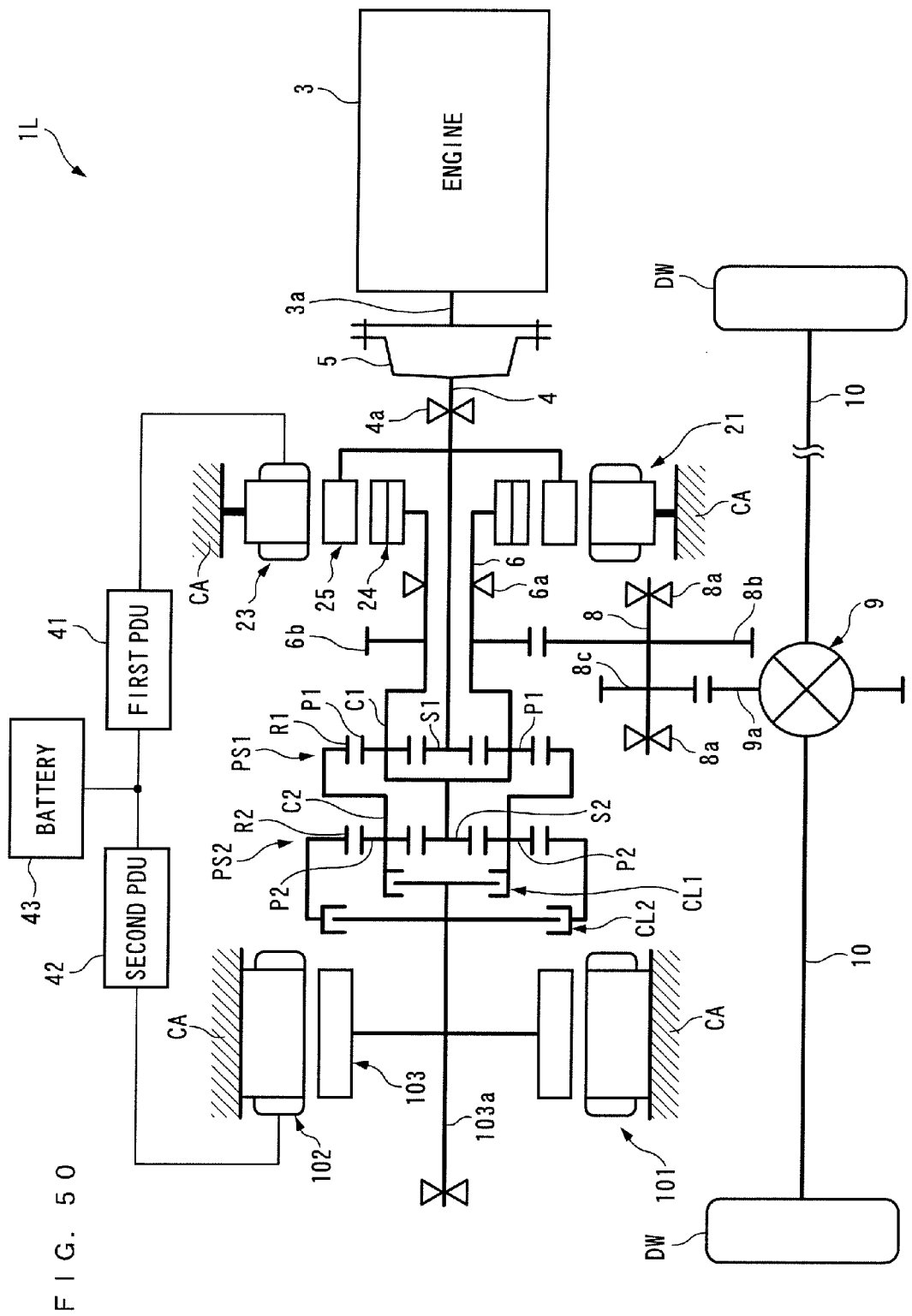
[FIG. 50] A schematic diagram of a power plant according to a thirteenth embodiment of the present invention.

Referring to FIG. 50, in this power plant 1L, similarly to the eleventh embodiment, the second rotating shaft 7 is not provided, and the first gear 8b is in mesh with the gear 6b. integrally formed with the connection shaft 6, whereby the A1 rotor 24 and the first carrier C1 are mechanically connected to the drive wheels DW and DW via the connection shaft 6, the gear 6b, the first gear 8b, the differential gear mechanism 9, and so forth without via the above-mentioned transmission. Further, similarly to the tenth embodiment, the rotor 103 is rotatable in unison with the rotating shaft 103a.

The above-mentioned transmission includes a second planetary gear unit PS2, a first clutch CL1 and a second clutch CL2. The second planetary gear unit PS2 is configured similarly to the first planetary gear unit PS1, and includes a second sun gear S2, a second ring gear R2, and a second carrier C2 rotatably supporting a plurality of (e.g. three) second planetary gears P2 (only two of which are shown) in mesh with the two gears S2 and R2. The second sun gear S2 is mechanically directly connected to the first carrier C1 via a rotating shaft, whereby the second sun gear S2 is rotatable in unison with the first carrier C1. Further, the second carrier C2 is mechanically directly connected to the first ring gear R1 via a hollow shaft and flange, whereby the second carrier C2 is rotatable in unison with the first ring gear R1. Hereinafter, the rotational speeds of the second sun gear S2, the second ring gear R2 and the second carrier C2 are referred to as the "second sun gear rotational speed VSU2, a "second ring gear rotational speed VRI2" and a "second carrier rotational speed VCA2", respectively.

The above-mentioned first clutch CL1 is formed e.g. by a friction multiple disk clutch, and is disposed between the second carrier C2 and the rotating shaft 103a. That is, the second carrier C2 is mechanically directly connected to the rotor 103 via the first clutch CL1. Further, the first clutch CL1 has its degree of engagement controlled by the ECU 2 to thereby connect and disconnect between the second carrier C2 and the rotating shaft 103a, that is, between the second carrier C2 and the rotor 103.

Similarly to the first clutch CL1, the above-mentioned second clutch CL2 is formed by a friction multiple disk clutch, and is disposed between the second ring gear R2 and the rotating shaft 103a. That is, the second ring gear R2 is mechanically directly connected to the rotor 103 via the second clutch CL2. Further, the second clutch CL2 has its degree of engagement controlled by the ECU 2 to thereby connect and disconnect between the second ring gear R2 and the rotating shaft 103a, i.e. between the second ring gear R2 and the rotor 103.

As described above, in the power plant 1L, the rotor 103 of the rotating machine 101 is mechanically connected to the first ring gear R1 via the first clutch CL1 and the second carrier C2, and is mechanically connected to the first ring gear R1 via the second clutch CL2, the second ring gear R2, the second planetary gears P2, and the second carrier C2. It should be noted that in the present embodiment, the second planetary gear unit PS2, the second sun gear S2, the second ring gear R2, the second planetary gears P2, and the second carrier C2 correspond to a planetary gear unit, a sun gear, a ring gear, planetary gears, and a carrier in the invention as claimed in claim 15, respectively.

FIG. 51(a) shows a velocity nomograph illustrating an example of the relationship between the first sun gear rotational speed VSU1, the first carrier rotational speed VCA1 and the first ring gear rotational speed VRI1, depicted together with a velocity nomograph illustrating an example of the relationship between the second sun gear rotational speed VSU2, the second carrier rotational speed VCA2 and the second ring gear rotational speed VRI2. In FIG. 51(a), r2 represents a ratio between the number of the gear teeth of the second sun gear S2 and that of the gear teeth of the second ring gear R2 (the number of the gear teeth of the second sun gear S2/the number of the gear teeth of the second ring gear R2; hereinafter referred to as the "second planetary gear ratio").

As described above, since the first carrier C1 and the second sun gear S2 are directly connected to each other, the first carrier rotational speed VCA1 and the second sun gear rotational speed VSU2 are equal to each other, and since the first ring gear R1 and the second carrier C2 are directly connected to each other, the first ring gear rotational speed VRI1 and the second carrier rotational speed VCA2 are equal to each other. Therefore, the two velocity nomographs concerning the first and second planetary gear units PS1 and PS2 shown in FIG. 51(a) can be represented by a single velocity nomograph as shown in FIG. 51(b). As shown in FIG. 51(b), four rotary elements of which the rotational speeds are in a collinear relationship with each other are formed by connecting the various rotary elements of the first and second planetary gear units PS1 and PS2 described above.

Figure 52:
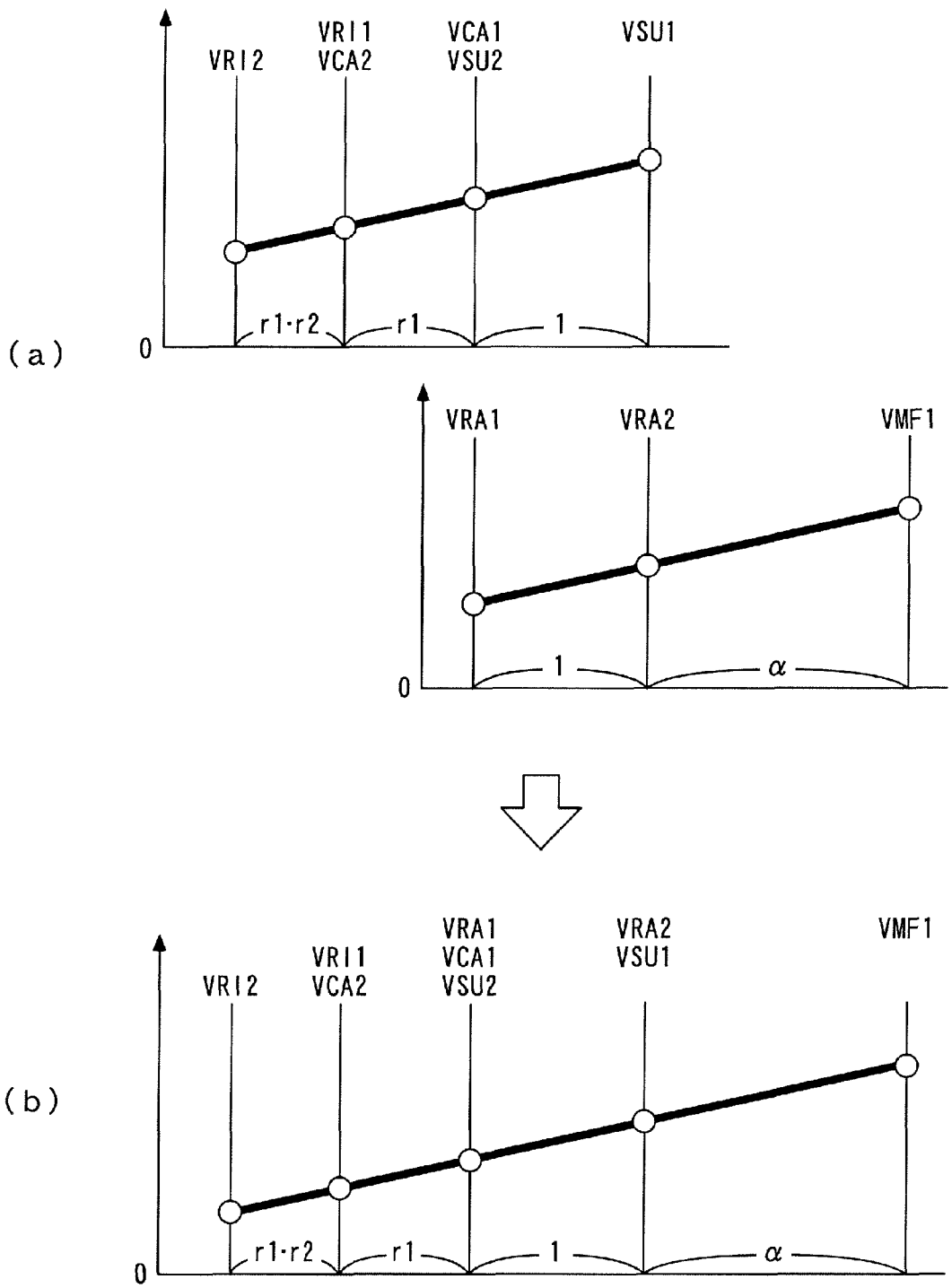
[FIG. 52] (a) A velocity nomograph illustrating an example of the relationship between the rotational speeds of the four rotary elements formed by connecting the first and second planetary gear units of the power plant shown in FIG. 50, depicted together with a velocity nomograph illustrating an example of the relationship between the first magnetic field rotational speed, and the A1 and A2 rotor rotational speeds; and (b) a velocity nomograph illustrating an example of the relationship between the rotational speeds of five rotary elements formed by connecting the second rotating machine, and the first and second planetary gear units of the power plant shown in FIG. 50.

Further, FIG. 52(a) shows a velocity nomograph of an example of the relationship between the rotational speeds of the above-mentioned four rotary elements, depicted together with a velocity nomograph of an example of the relationship between the first magnetic field rotational speed VMF1 and the A1 rotor and A2 rotor rotational speeds VRA1 and VRA2. As described above, since the first carrier C1 and the A1 rotor 24 are directly connected to each other, the second carrier rotational speed VCA2 and the A1 rotor rotational speed VRA1 are equal to each other. Further, since the first sun gear S1 and the A2 rotor 25 are directly connected to each other, the first sun gear rotational speed VSU1 and the A2 rotor rotational speed VRA2 are equal to each other. Therefore, the two velocity nomographs shown in FIG. 52(a) can be represented by a single velocity nomograph as shown in FIG. 52(b).

Further, since the crankshaft 3a, the A2 rotor 25 and the first sun gear S1 are directly connected to each other, the engine speed NE, the A2 rotor rotational speed VRA2 and the first sun gear rotational speed VSU1 are equal to each other. Furthermore, since the drive wheels DW and DW, the A1 rotor 24, the first carrier C1 and the second sun gear S2 are connected to each other, assuming that there is no change in speed by the differential gear mechanism 9 or the like, the vehicle speed VP, the A1 rotor rotational speed VRA1, the first carrier rotational speed VCA1 and the second sun gear rotational speed VSU2 are equal to each other.

Further, the rotor 103 is connected to the second carrier C2 and the second ring gear R2 via the first and second clutches CL1 and CL2, respectively, and hence when the first clutch CL1 is engaged and the second clutch CL2 is disengaged (hereinafter, such an engaged and disengaged state of the clutches is referred to as the "first speed change mode"), the rotor rotational speed VRO and the second carrier rotational speed VCA2 are equal to each other. Furthermore, when the first clutch CL1 is disengaged and the second clutch CL2 is engaged (hereinafter, such an engaged and disengaged state of the clutches is referred to as the "second speed change mode"), the rotor rotational speed VRO and the second ring gear rotational speed VRI2 are equal to each other.

From the above, the first magnetic field rotational speed VMF1, the engine speed NE, the vehicle speed VP, and the rotor rotational speed VRO are in such a collinear relationship as shown e.g. in FIG. 53(a) in the first speed change mode, whereas in the second speed change mode, they are in such a collinear relationship as shown e.g. in FIG. 53(b).

As shown in FIGS. 53(a) and 53(b), the distance between the vertical line representing the vehicle speed VP and the vertical line representing the rotor rotational speed VRO in the velocity nomographs is shorter in the first speed change mode than in the second speed change mode, and therefore a ratio between a rotational difference DN2 between the rotor rotational speed VRO and the vehicle speed VP and a rotational difference DN1 between the vehicle speed VP and the engine speed NE (hereinafter referred to as the "rotational ratio DN2/DN1) is smaller in the first speed change mode.

In the power plant 1L constructed as above, in cases where the rotor rotational speed VRO becomes too high, e.g. during the high-vehicle speed operation in which the vehicle speed VP is higher than the engine speed NE, or when the vehicle speed VP is high during the aforementioned EV traveling, the first speed change mode is used. With this, according to the present embodiment, as is clear from the relationship of the rotational ratio DN2/DN1, the rotor rotational speed VRO can be made lower than when the second speed change mode is used, so that it is possible to prevent failure of the rotating machine 101 from being caused by the rotor rotational speed VRO becoming too high.

Further, the relationship between the rotational speeds and torques of the various rotary elements of the power plant 1L at the start of the rapid acceleration operation during the ENG traveling, that is, when the torque demanded of the rotating machine 101 becomes large, is represented by FIG. 54(a) and FIG. 54(b) for the respective cases of use of the first and second speed change modes. In this case, when the first speed change mode is used, torque demanded of the rotating machine 101, i.e. the rotating machine torque TMOT is expressed by the aforementioned equation (61). On the other hand, when the second speed change mode is used, the rotating machine torque TMOT is expressed by the following equation (62):

$$TMOT = -\{\alpha \cdot TENG + (1-\alpha)TDDW\}/(r1 \cdot r2 + r1 + 1 + \alpha) \quad (62)$$

As is apparent from a comparison between these equations (61) and (62), the rotating machine torque TMOT is smaller in the second speed change mode with respect to the drive wheel-transmitted torque TDDW and the engine torque TENG assuming that the respective magnitudes thereof are unchanged. Therefore, the second speed change mode is used at the time of the rapid acceleration operation during the ENG traveling.

According to the present embodiment, since the second speed change mode is used as described above and the electric power generated by the rotating machine 101 is controlled based on the above-mentioned equation (62), it is possible to reduce the maximum value of torque demanded of the rotating machine 101 to thereby further reduce the size and costs of the rotating machine 101.

Further, during traveling of the vehicle including the EV traveling and the ENG traveling, a speed change mode that will make it possible to obtain higher efficiency of the rotating machine 101 is selected from the first and second speed change modes, according to the vehicle speed VP during stoppage of the engine 3, and according to the vehicle speed VP and the engine speed NE during operation of the engine 3. With this, according to the present embodiment, it is possible to control the rotor rotational speed VRO to an appropriate value, and hence it is possible to obtain a high efficiency of the rotating machine 101.

Furthermore, the switching between the first and second speed change modes is performed when the second carrier rotational speed VCA2 and the second ring gear rotational speed VRI2 are equal to each other. With this, according to the present embodiment, it is possible to smoothly switch between the first and second speed change modes while maintaining the respective rotations of the drive wheels DW and DW and the engine 3, thereby making it possible to ensure excellent drivability.

Further, during the ENG traveling and at the same time during transition between the first and second speed change modes, even when both of the first and second clutches CL1 and CL2 are disengaged, as described in the seventh embodiment, part of the engine torque TENG can be transmitted to the drive wheels DW and DW via the A2 rotor and A1 rotors 25 and 24. This makes it possible to suppress a speed-change shock, such as a sudden decrease in torque, whereby it is possible to improve marketability. In addition to this, according to the present embodiment, it is possible to obtain the same advantageous effects as provided by the seventh embodiment.

Further, although in the present embodiment, the second sun gear S2 is connected to the first carrier C1, and the second ring gear R2 is connected to the rotor 103 via the second clutch CL2, the above connection relationships may be inverted, that is, the second ring gear R2 may be connected to the first carrier C1, and the second sun gear S2 may be connected to the rotor 103 via the second clutch CL2. Further, although in the present embodiment, the first and second clutches CL1 and CL2 are formed by friction multiple disk clutches, they may be formed e.g. by electromagnetic clutches.

Figure 55:
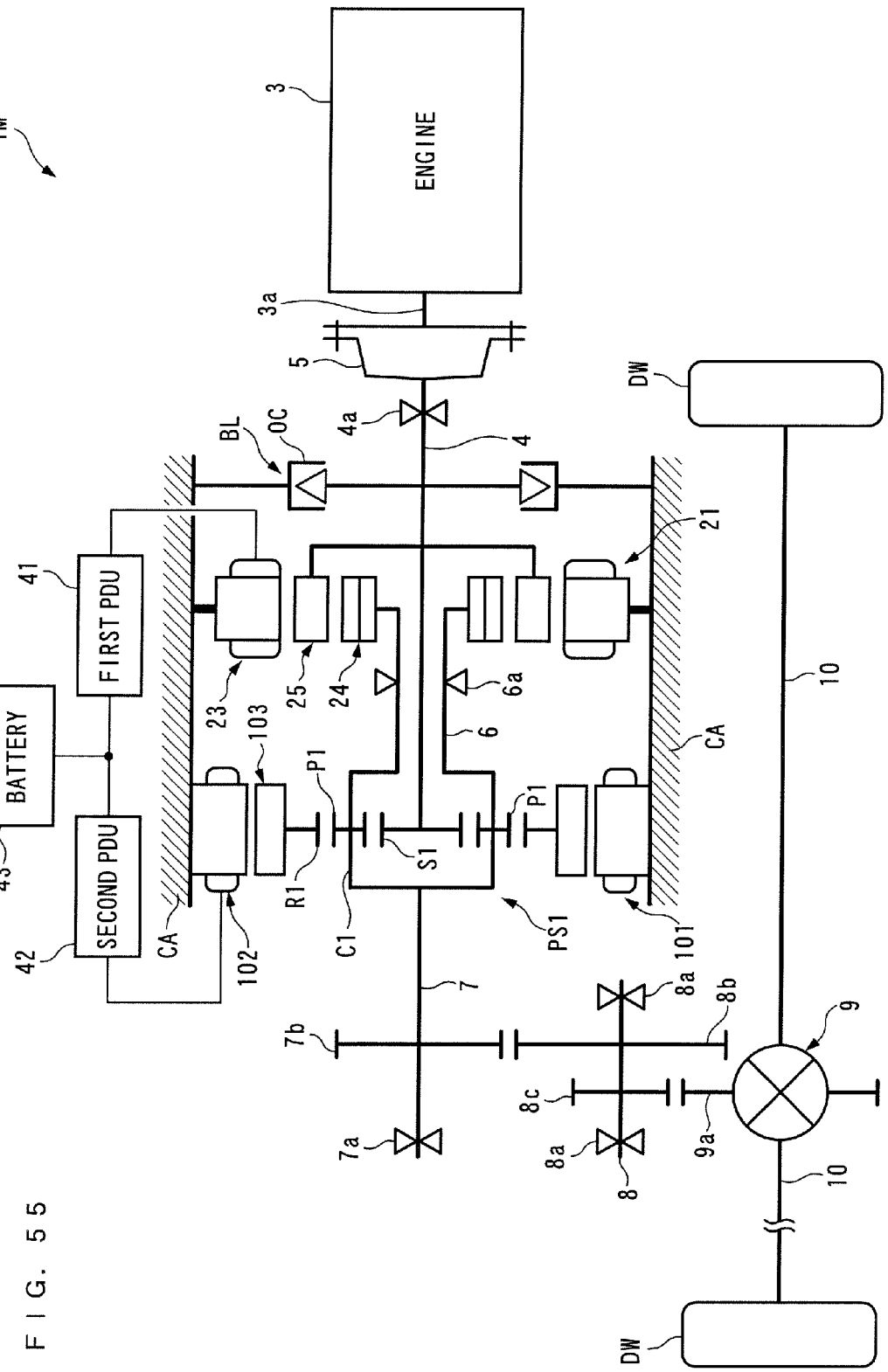
[FIG. 55] A schematic diagram of a power plant according to a fourteenth embodiment of the present invention.

Next, a power plant 1M according to a fourteenth embodiment of the present invention will be described with reference to FIG. 55. This power plant 1M is constructed by adding the brake mechanism BL described in the sixth embodiment to the power plant 1F according to the seventh embodiment. The following description is mainly given of different points from the seventh embodiment.

In the power plant 1M, the brake mechanism BL formed by the one-way clutch OC and the casing CA permits the first rotating shaft 4 to rotate only when it performs normal rotation together with the crankshaft 3a, the A2 rotor 25 and the first sun gear S1, but blocks rotation of the first rotating shaft 4 when it performs reserve rotation together with the crankshaft 3a. and so forth. It should be noted that in the present embodiment, the brake mechanism BL corresponds to a brake mechanism in the invention as claimed in claim 20.

The power plant 1M constructed as above performs the aforementioned EV creep operation and EV standing start in the following manner: The power plant 1M supplies electric power to the stator 23 of the first rotating machine 21 and the stator 102 of the rotating machine 101 and causes the first rotating magnetic field generated by the stator 23 in accordance with the supply of the electric power to perform reverse rotation, and at the same time the rotor 103 to perform normal rotation together with the first ring gear R1. Further, the power plant 1M controls the first magnetic field rotational speed VMF1 and the rotor rotational speed VRO such that $(1+r1) \cdot |VMF1| = \alpha \cdot |VRO|$ holds. Furthermore, the power plant 1M controls the electric power supplied to the stators 23 and 102 such that sufficient torque is transmitted to the drive wheels DW and DW.

Similarly to the aforementioned sixth embodiment, all the electric power supplied to the stator 23 is transmitted to the A1 rotor 24 as motive power, to thereby cause the A1 rotor 24 to perform normal rotation. Further, while the rotor 103 performs normal rotation as described above, the first sun gear S1 is blocked from performing reverse rotation by the brake mechanism BL, and hence all the motive power from the rotating machine 101 is transmitted to the first carrier C1 via the first ring gear R1 and the first planetary gears P1, whereby the first carrier C1 is caused to perform normal rotation. Further, the motive power transmitted to the A1 rotor 24 and the first carrier C1 is transmitted to the drive wheels DW and DW, and as a consequence, the drive wheels DW and DW performs normal rotation.

Further, in this case, on the A2 rotor 25 and the first sun gear S1, which are blocked from performing reverse rotation by the brake mechanism BL, through the above-mentioned control of the first rotating machine 21 and the rotating machine 101, torques act from the stator 23 and the rotor 103 such that the torques cause the A2 rotor 25 and the first sun gear S1 to perform reverse rotation, respectively, whereby the crankshaft 3a, the A2 rotor 25 and the first sun gear S1 are not only blocked from performing reverse rotation but also are held stationary.

As described above, according to the present embodiment, it is possible to drive the drive wheels DW and DW by the first rotating machine 21 and the rotating machine 101 without using the engine motive power. Further, during driving of the drive wheels DW and DW, the crankshaft 3a. is not only blocked from performing reverse rotation but also is held stationary, and hence the crankshaft 3a. is prevented from dragging the engine 3. In addition to this, according to the present embodiment, it is possible to obtain the same advantageous effects as provided by the seventh embodiment.

It should be noted that although in the above-described seventh to fourteenth embodiments, similarly to the first embodiment, the first pole pair number ratio α of the first rotating machine 21 is set to 2.0, if the first pole pair number ratio α is set to less than 1.0, as is apparent from FIGS. 25 and 43, it is possible to prevent the driving efficiency from being lowered by occurrence of loss caused by the first magnetic field rotational speed VMF1 becoming too high. Further, although in the seventh to fourteenth embodiments, the first planetary gear ratio r1 of the first planetary gear unit PS1 is set to a relatively large value, by setting the first planetary gear ratio r1 to a smaller value, it is possible to obtain the following advantageous effects:

As is apparent from FIG. 43, if the first planetary gear ratio r1 is set to a relatively large value, when the vehicle speed VP is higher than the engine speed NE (see the one-dot chain lines in FIG. 43), the rotor rotational speed VRO becomes higher than the vehicle speed VP, and sometimes becomes too high. In contrast, if the first planetary gear ratio r1 is set to a smaller value, as is apparent from a comparison between broken lines and one-dot chain lines in the velocity nomograph in FIG. 43, the rotor rotational speed VRO can be reduced, and hence it is possible to prevent the driving efficiency from being lowered by occurrence of loss caused by the rotor rotational speed VRO becoming too high.

Further, although in the seventh to fourteenth embodiments, the A2 rotor 25 and the first sun gear S1 are directly connected to each other, and the A1 rotor 24 and the first carrier C1 are directly connected to each other, the A2 rotor 25 and the first sun gear S1 are not necessarily required to be directly connected to each other insofar as they are connected to the crankshaft 3a. Further, the A1 rotor 24 and the first carrier C1 are not necessarily required to be directly connected to each other insofar as they are connected to the drive wheels DW and DW. In this case, each of the transmissions 111 and 121 in the eighth and ninth embodiments may be formed by two transmissions, which may be arranged in the following manner: One of the two transmissions forming the transmission 111 may be disposed between the A1 rotor 24 and the drive wheels DW and DW while the other thereof may be disposed between the first carrier C1 and the drive wheels DW and DW. Further, one of the two transmissions forming the transmission 121 may be disposed between the A2 rotor 25 and the crankshaft 3a. while the other thereof may be disposed between the first sun gear S1 and the crankshaft 3a.

Further, although in the seventh to fourteenth embodiments, the first sun gear S1 and the first ring gear R1 are connected to the engine 3 and the rotating machine 101, respectively, the above connection relationships may be inverted, that is, the first ring gear R1 and the first sun gear S1 may be connected to the engine 3 and the rotating machine 101, respectively. In this case, at the time of the rapid acceleration operation during the ENG traveling in which torque demanded of the rotating machine 101 becomes particularly large, the rotating machine torque TMOT is expressed by the following equation (63):

$$TMOT = -\{\alpha \cdot TENG + (1+\alpha)TDDW\}/(r1'+1+\alpha) \quad (63)$$

In this equation (63), r1' represents a ratio between the number of the gear teeth of the first ring gear R1 and that of the gear teeth of the first sun gear S1 (the number of the gear teeth of the first ring gear/the number of the gear teeth of the first sun gear), and is larger than 1.0. As is clear from this configuration, the fact that the first planetary gear ratio r1, which is the number of the gear teeth of the first sun gear S1/the number of the gear teeth of the first ring gear R1, as described above, is smaller than 1.0, and the aforementioned equations (61) and (63), the rotating machine torque TMOT can be reduced, thereby making it possible to further reduce the size and costs of the rotating machine 101.

Next, a power plant 1N according to a fifteenth embodiment of the present invention will be described with reference to FIG. 56. This power plant 1N is distinguished from the power plant 1 according to the first embodiment only in that it includes the first planetary gear unit PS1 and the rotating machine 101, described in the seventh embodiment, in place of the first rotating machine 21. The following description is mainly given of different points from the first embodiment.

Figure 56:
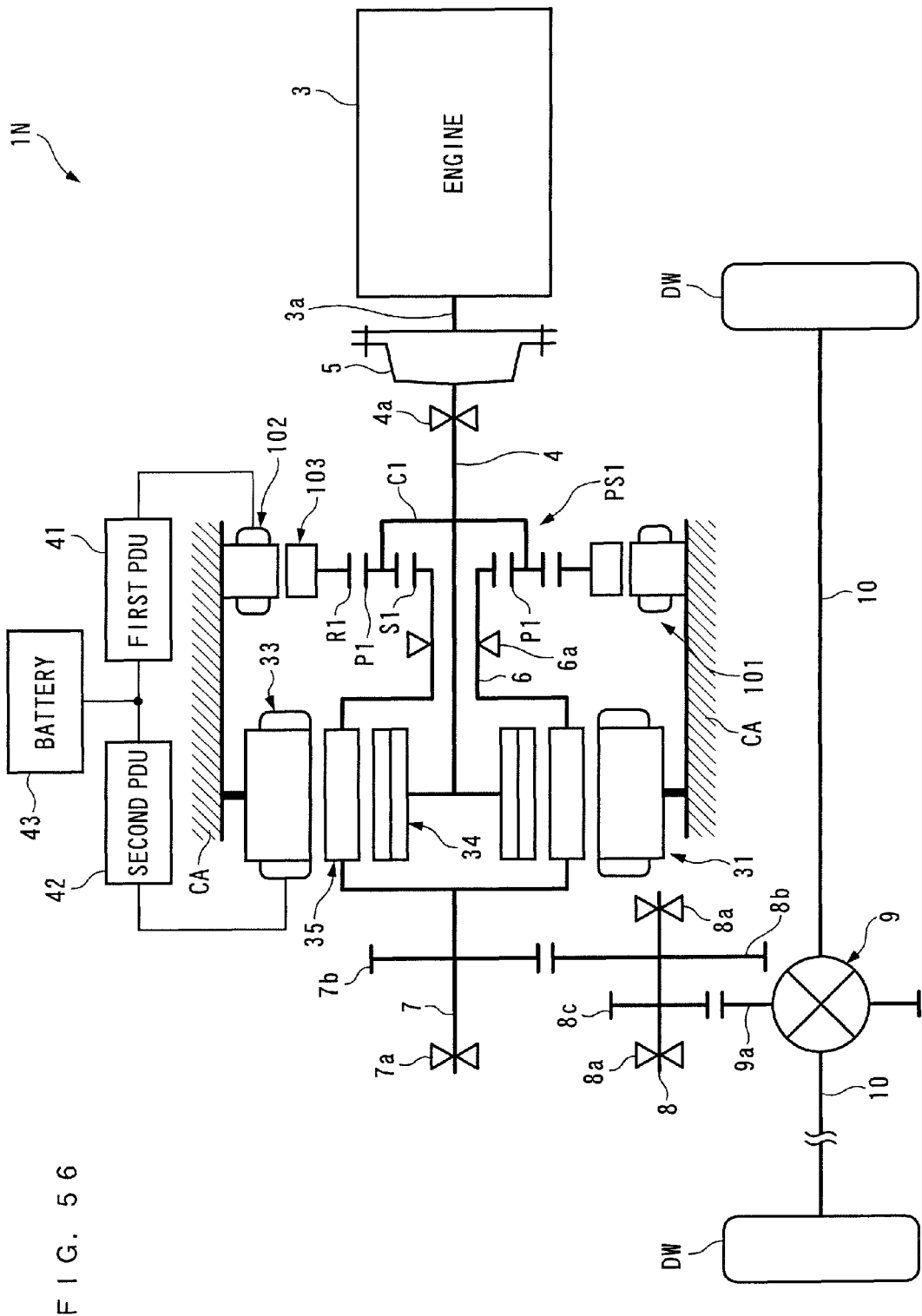
[FIG. 56] A schematic diagram of a power plant according to a fifteenth embodiment of the present invention.

As shown in FIG. 56, the first carrier C1 of the first planetary gear unit PS1 and the B1 rotor 34 of the second rotating machine 31 are mechanically directly connected to each other via the first rotating shaft 4, and are mechanically directly connected to the crankshaft 3a. via the first rotating shaft 4 and the flywheel 5. Further, the B2 rotor 35 of the second rotating machine 31 is mechanically directly connected to the first sun gear S1 of the first planetary gear unit PS1 via the connection shaft 6, and is mechanically connected to the drive wheels DW and DW via the second rotating shaft 7, the gear 7b, the first gear 8b, the idler shaft 8, the second gear 8c, the gear 9a, the differential gear mechanism 9, and so forth. In short, the first sun gear S1 and the B2 rotor 35 are mechanically connected to the drive wheels DW and DW. Further, the stator 102 is electrically connected to the battery 43 via the first PDU 41. More specifically, the stator 102 of the rotating machine 101 and the stator 33 of the second rotating machine 31 are electrically connected to each other via the first and second PDUs 41 and 42.

It should be noted that in the present embodiment, similarly to the seventh embodiment, the crankshaft 3a corresponds to a first output portion in the invention as claimed in claim 8, and the first planetary gear unit PS1, the first sun gear S1, the first carrier C1, and the first ring gear R1 correspond to the differential gear, the first element, the second element, and the third element in the invention as claimed in claim 8, respectively. Further, the second rotating machine 31 corresponds to the first rotating machine in the invention as claimed in claim 8, and the iron core 33a. and the U-phase to W-phase coils 33b correspond to the armatures in the invention as claimed in claim 8. Furthermore, the B1 and B2 rotor 34 and 35 correspond to the first and second rotors in the invention as claimed in claim 8, respectively, and the permanent magnets 34a. and the cores 35a. correspond to the magnetic poles and the soft magnetic material elements in the invention as claimed in claim 8, respectively. Further, the rotating machine 101 and the rotor 103 correspond to the second rotating machine and the second output portion in the invention as claimed in claim 8, respectively; the second PDU 42 and the ECU 2 correspond to the first controller in the invention as claimed in claim 8; and the first PDU 41 and the ECU 2 correspond to the second controller in the invention as claimed in claim 8. Further, the battery 43 corresponds to the electric power storage device in the invention as claimed in claim 9.

The rotational angle position of the rotor 103 of the rotating machine 101 is detected by the aforementioned rotational angle sensor 59, similarly to the seventh embodiment. Further, the ECU 2 calculates the rotor rotational speed VRO based on the detected rotational angle position of the rotor 103, and controls the first PDU 41 to thereby control the electric power supplied to the stator 102 of the rotating machine 101, the electric power generated by the stator 102, and the rotor rotational speed VRO.

As described hereinabove, the power plant 1N according to the present embodiment is distinguished from the power plant 1 according to the first embodiment only in that the first rotating machine 21 is replaced by the first planetary gear unit PS1 and the rotating machine 101, and has quite the same functions as those of the power plant 1. Further, in the power plant 1N, operations in the various operation modes, such as the EV creep, described in the first embodiment, are carried out in the same manner as in the power plant 1. In this case, the operations in these operation modes are performed by replacing the various parameters (e.g. the first magnetic field rotational speed VMF1) concerning the first rotating machine 21 by corresponding various parameters concerning the rotating machine 101. In the following, a brief description is given of the operation modes by focusing on different points from the first embodiment.

EV Creep

Similarly to the first embodiment, during the EV creep, electric power is supplied from the battery 43 to the stator 33 of the second rotating machine 31, and the second rotating magnetic field is caused to perform normal rotation. Further, electric power generation is performed by the stator 102 using motive power transmitted to the rotor 103 of the rotating machine 101, as described hereinafter, and the generated electric power is supplied to the stator 23. In accordance therewith, as described as to the first embodiment, the second driving equivalent torque TSE2 from the stator 33 acts on the B2 rotor 35 to cause the B2 rotor 35 to perform normal rotation, and acts on the B1 rotor 34 to cause the B1 rotor 34 to perform reverse rotation. Further, part of torque transmitted to the B2 rotor 35 is transmitted to the drive wheels DW and DW via the second rotating shaft 7, etc., thereby causing the drive wheels DW and DW to perform normal rotation.

Furthermore, during the EV creep, the remainder of the torque transmitted to the B2 rotor 35 is transmitted to the first sun gear S1 via the connection shaft 6, and then along with the electric power generation by the stator 102 of the rotating machine 101, is transmitted to the stator 102 as electric energy via the first planetary gears P1, the first ring gear R1 and the rotor 103. Further, in this case, since the rotor 103 performs reverse rotation, the rotating machine torque TMOT generated along with the electric power generation by the stator 102 is transmitted to the first carrier C1 via the first ring gear R1 and the first planetary gears P1, thereby acting on the first carrier C1 to cause the first carrier C1 to perform normal rotation. Further, the torque transmitted to the first sun gear S1 such that it is balanced with the rotating machine torque TMOT is further transmitted to the first carrier C1 via the first planetary gears P1, thereby acting on the first carrier C1 to cause the first carrier C1 to perform normal rotation.

In this case, the electric power supplied to the stator 33 and the electric power generated by the stator 102 are controlled such that the above-mentioned torque for causing the B1 rotor 34 to perform reverse rotation and the torques for causing the first carrier C1 to perform normal rotation are balanced with each other, whereby the B1 rotor 34, the first carrier C1 and the crankshaft 3a, which are connected to each other, are held stationary. As a consequence, during the EV creep, the B1 rotor rotational speed VRB1 and the first carrier rotational speed VCA1 become equal to 0, and the engine speed NE as well becomes equal to 0.

Further, during the EV creep, the electric power supplied to the stator 33, the electric power generated by the stator 102, the second magnetic field rotational speed VMF2 and the rotor rotational speed VRO are controlled such that the speed relationships expressed by the aforementioned equations (54) and (59) are maintained and at the same time the B2 rotor rotational speed VRB2 and the first sun gear rotational speed VSU1 become very small. With this, the creep operation with a very low vehicle speed VP is carried out. As described above, it is possible to perform the creep operation using the rotating machine 101 and the second rotating machine 31 in a state where the engine 3 is stopped.

EV Standing Start

At the time of the EV standing start, the electric power supplied to the stator 33 of the second rotating machine 31 and the electric power generated by the stator 102 of the rotating machine 101 are both increased. Further, while maintaining the relationships between the rotational speeds shown in the equations (54) and (59) and at the same time holding the engine speed NE at 0, the rotor rotational speed VRO of the rotor 103 that has been performing reverse rotation during the EV creep and the second magnetic field rotational speed VMF2 of the second rotating magnetic field that has been performing normal rotation during the EV creep are increased in the same rotation directions as they have been. From the above, the vehicle speed VP is increased to cause the vehicle to start.

ENG Start During EV Traveling

At the time of the ENG start during EV traveling, while holding the vehicle speed VP at the value assumed then, the rotor rotational speed VRO of the rotor 103 that has been performing reverse rotation during the EV standing start, as described above, is controlled to 0, and the second magnetic field rotational speed VMF2 of the second rotating magnetic field that has been performing normal rotation during the EV standing start, is controlled such that it is lowered. Then, after the rotor rotational speed VRO becomes equal to 0, electric power is supplied from the battery 43 not only to the stator 33 of the second rotating machine 31 but also to the stator 102 of the rotating machine 101, whereby the rotor 103 is caused to perform normal rotation, and the rotor rotational speed VRO is caused to be increased.

The electric power is supplied to the stator 33 as described above, whereby as described as to the first embodiment, the second driving equivalent torque TSE2 and torque transmitted to the B1 rotor 34, as described hereinafter, are combined, and the combined torque is transmitted to the B2 rotor 35. Further, part of the torque transmitted to the B2 rotor 35 is transmitted to the first sun gear S1 via the connection shaft 6, and the remainder thereof is transmitted to the drive wheels DW and DW via the second rotating shaft 7 etc.

Further, at the time of the ENG start during EV traveling, the electric power is supplied from the battery 43 to the stator 102, whereby as the rotating machine torque TMOT is transmitted to the first carrier C1 via the first ring gear R1 and the first planetary gears P1, the torque transmitted to the first sun gear S1 as described above is transmitted to the first carrier C1 via the first planetary gears P1. Further, part of the torque transmitted to the first carrier C1 is transmitted to the B1 rotor 34 via the first rotating shaft 4, and the remainder thereof is transmitted to the crankshaft 3a. via the first rotating shaft 4 etc., whereby the crankshaft 3a. performs normal rotation. Furthermore, in this case, the electric power supplied to the stators 33 and 102 is controlled such that sufficient motive power is transmitted to the drive wheels DW and DW and the engine 3.

From the above, at the time of the ENG start during EV traveling, the vehicle speed VP is held at the value assumed then, and the engine speed NE is increased. In this state, similarly to the first embodiment, the ignition operation of the fuel injection valves and the spark plugs of the engine 3 is controlled according to the crank angle position, whereby the engine 3 is started. Further, by controlling the rotor rotational speed VRO and the second magnetic field rotational speed VMF2, the engine speed NE is controlled to a relatively small value suitable for starting the engine 3.

Figure 57:
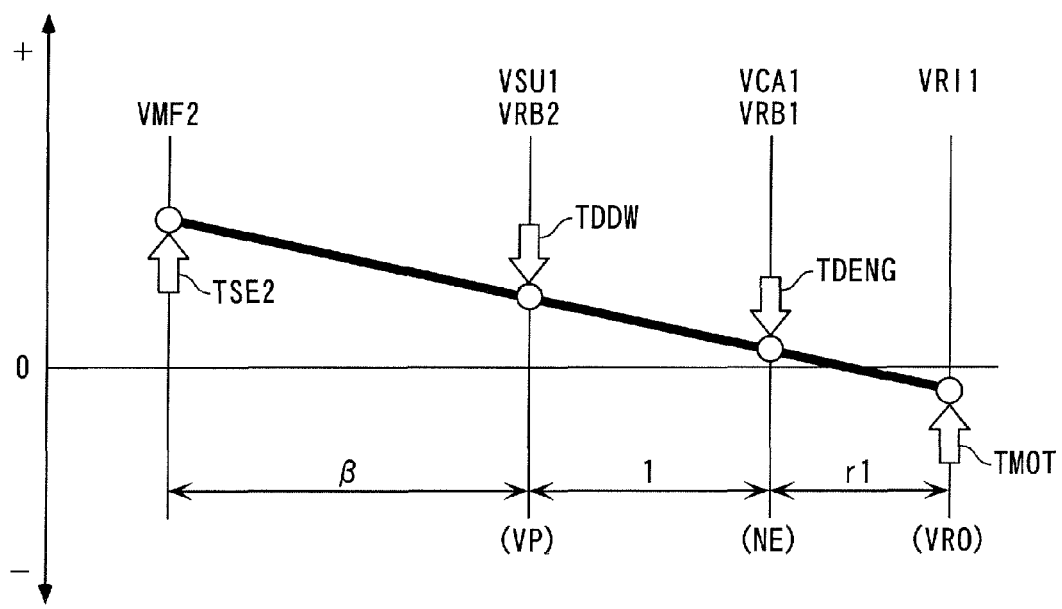
[FIG. 57] A diagram showing an example of the relationship between the rotational speeds and torques of various rotary elements of the power plant shown in FIG. 56 at the start of the ENG start during EV traveling.

FIG. 57 shows an example of the relationship between the rotational speeds and torques of the various rotary elements of the power plant 1N at the start of the ENG start during EV traveling. As is apparent from the above-described connection relationship between the various rotary elements, the first carrier rotational speed VCA1, the B1 rotor rotational speed VRB1 and the engine speed NE are equal to each other; the first sun gear rotational speed VSU1 and the B2 rotor rotational speed VRB2 are equal to each other; and the first ring gear rotational speed VRI1 and the rotor rotational speed VRO are equal to each other. Further, assuming that there is no change in speed by the differential gear mechanism 9 or the like, the vehicle speed VP, the first sun gear rotational speed VSU1 and the B2 rotor rotational speed VRB2 are equal to each other. From this and the equations (54) and (59), the relationship between these rotational speeds VCA1, VRB1, NE, VSU1, VRB2, VP, VRI1 and VRO, and the second magnetic field rotational speed VMF2 is illustrated e.g. as in FIG. 57.

In this case, as is apparent from FIG. 57, the second driving equivalent torque TSE2 is transmitted to both the drive wheels DW and DW and the crankshaft 3a using the rotating machine torque TMOT as a reaction force, so that torque demanded of the rotating machine 101 becomes larger than in the other cases. In this case, the torque demanded of the rotating machine 101, i.e. the rotating machine torque TMOT is expressed by the following equation (64):

$$TMOT=-\{\beta \cdot TDDW+(1+\beta)TDENG\}/(r1+1+\beta) \qquad (64)$$

As is clear from this equation (64), as the first planetary gear ratio r1 is larger, the rotating machine torque TMOT becomes smaller with respect to the drive wheel-transmitted torque TDDW and the engine-transmitted torque TDENG assuming that the respective magnitudes thereof are unchanged. As described hereinabove, since the first planetary gear ratio r1 is set to a relatively large one of values that can be taken by a general planetary gear unit, it is possible to reduce the size and costs of the rotating machine 101.

ENG Traveling

During the ENG traveling, the operations in the battery input/output zero mode, the assist mode, and the drive-time charging mode are executed according to the executing conditions described as to the first embodiment. In the battery input/output zero mode, by using the engine motive power transmitted to the rotor 103, electric power generation is performed by the stator 102 of the rotating machine 101, and the generated electric power is supplied to the stator 33 of the second rotating machine 31 without charging it into the battery 43. In this case, through the electric power generation by the stator 102, part of the engine torque TENG is transmitted to the rotor 103 via the first carrier C1, the first planetary gears P1 and the first ring gear R1, and along with this, part of the engine torque TENG is transmitted also to the first sun gear S1 via the first carrier C1 and the first planetary gears P1. In short, part of the engine torque TENG is distributed to the first sun gear S1 and the first ring gear R1.

Further, the remainder of the engine torque TENG is transmitted to the B1 rotor 34 via the first rotating shaft 4. Furthermore, similarly to the case of the ENG start during EV traveling, the second driving equivalent torque TSE2 and the torque transmitted to the B1 rotor 34 as described above are combined, and the combined torque is transmitted to the B2 rotor 35. Further, the engine torque TENG distributed to the first sun gear S1 as described above is further transmitted to the B2 rotor 35 via the connection shaft 6.

As described above, the combined torque formed by combining the engine torque TENG distributed to the first sun gear S1, the second driving equivalent torque TSE2, and the engine torque TENG transmitted to the B1 rotor 34 is transmitted to the B2 rotor 35. Further, this combined torque is transmitted to the drive wheels DW and DW e.g. via the second rotating shaft 7. As a consequence, in the battery input/output zero mode, assuming that there is no transmission loss caused by the gears, motive power equal in magnitude to the engine motive power is transmitted to the drive wheels DW and DW, similarly to the first embodiment.

Furthermore, in the battery input/output zero mode, the engine motive power is transmitted to the drive wheels DW and DW while having the speed thereof steplessly changed through the control of the rotor rotational speed VRO and the second magnetic field rotational speed VMF2. In short, the first planetary gear unit PS1, the rotating machine 101 and the second rotating machine 31 function as a stepless transmission.

Figure 58:
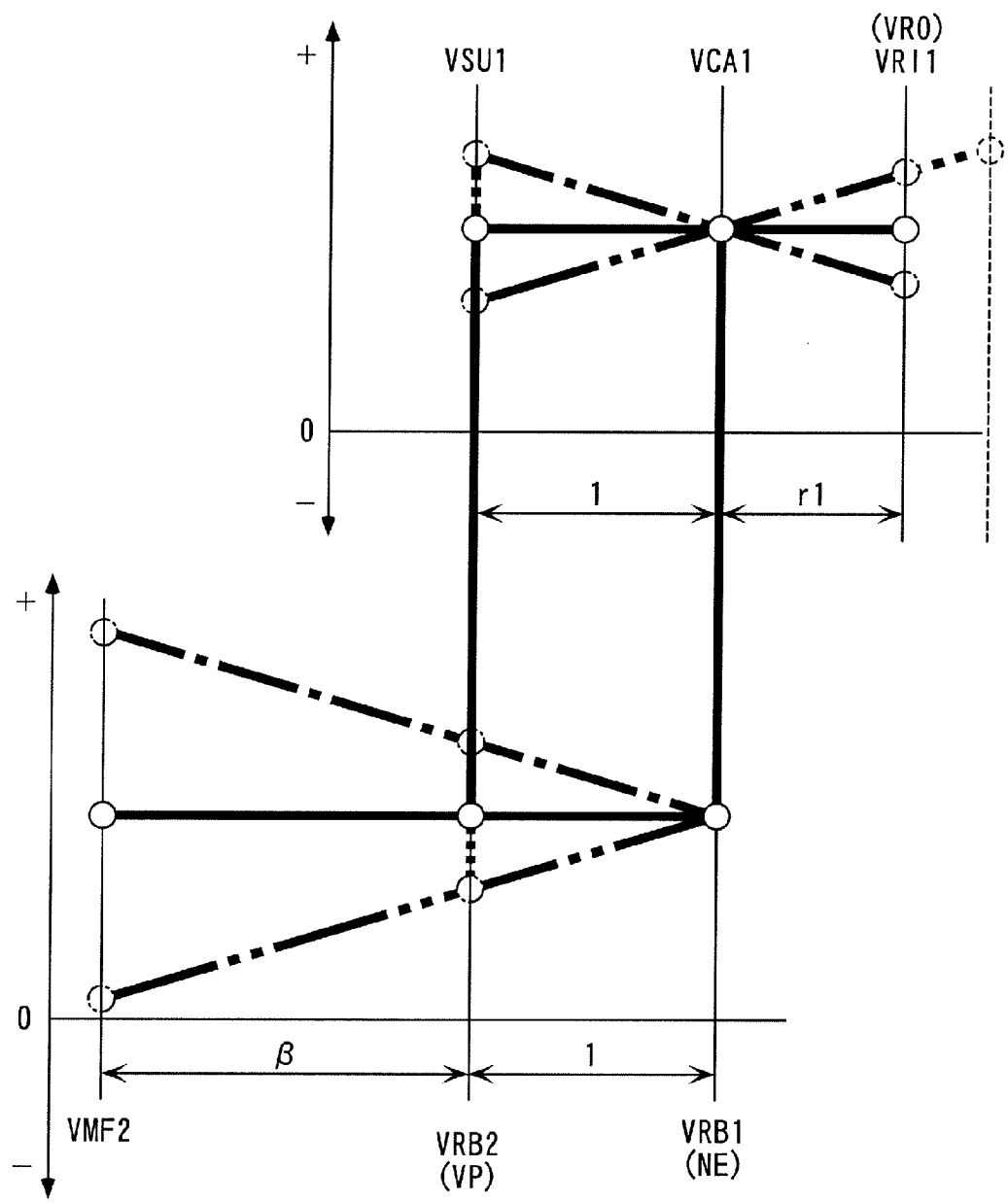
[FIG. 58] A diagram which is useful in explaining speed-changing operations by a rotating machine and a second rotating machine of the power plant shown in FIG. 56.

More specifically, as indicated by two-dot chain lines in FIG. 58, while maintaining the speed relationships expressed by the aforementioned equations (59) and (54), by increasing the rotor rotational speed VRO and decreasing the second magnetic field rotational speed VMF2 with respect to the first carrier rotational speed VCA1 and the B1 rotor rotational speed VRB1, that is, the engine speed NE, it is possible to steplessly reduce the first sun gear rotational speed VSU1 and the B2 rotor rotational speed VRB2, that is, the vehicle speed VP. Inversely, as indicated by one-dot chain lines in FIG. 58, by decreasing the rotor rotational speed VRO and increasing the second magnetic field rotational speed VMF2 with respect to the engine speed NE, it is possible to steplessly increase the vehicle speed VP. Further, in this case, the rotor rotational speed VRO and the second magnetic field rotational speed VMF2 are controlled such that the engine speed NE becomes equal to the target engine speed.

As described hereinabove, in the battery input/output zero mode, after once being divided by the first planetary gear unit PS1, the rotating machine 101 and the second rotating machine 31, the engine motive power is transmitted to the B2 rotor 35 via the following first to third transmission paths, and is then transmitted to the drive wheels DW and DW in a combined state.

First transmission path: first carrier C1→first planetary gears P1→first sun gear S1→connection shaft 6→B2 rotor 35

Second transmission path: B1 rotor 34→magnetic forces caused by magnetic force lines→B2 rotor 35

Third transmission path: first carrier C1→first planetary gears P1→first ring gear R1→rotor 103→stator 102→first PDU 41→second PDU 42→stator 33→magnetic forces caused by magnetic force lines→B2 rotor 35

In the above first and second transmission paths, the engine motive power is transmitted to the drive wheels DW and DW by the magnetic paths and the mechanical paths without being converted to electric power. Further, in the third transmission path, the engine motive power is transmitted to the drive wheels DW and DW by the electrical path.

Further, in the battery input/output zero mode, the electric power generated by the stator 102, the rotor rotational speed VRO and the second magnetic field rotational speed VMF2 are controlled such that the speed relationships expressed by the equations (59) and (54) are maintained.

More specifically, in the assist modes, electric power is generated by the stator 102 of the rotating machine 101, and electric power charged in the battery 43 is supplied to the stator 33 of the second rotating machine 31 in addition to the electric power generated by the stator 102. Therefore, the second driving equivalent torque TSE2 based on the electric power supplied from the stator 102 and the battery 43 to the stator 33 is transmitted to the B2 rotor 35. Further, similarly to the above-described battery input/output zero mode, this second driving equivalent torque TSE2, the engine torque TENG distributed to the first sun gear S1 along with the electric power generation by the stator 102, and the engine torque TENG transmitted to the B1 rotor 34 are combined, and the combined torque is transmitted to the drive wheels DW and DW via the B2 rotor 35. As a result, in the assist mode, assuming that there is no transmission loss caused by the gears or the like, similarly to the first embodiment, the motive power transmitted to the drive wheels DW and DW becomes equal to the sum of the engine motive power and the electric power (energy) supplied from the battery 43.

Further, in the assist mode, the electric power generated by the stator 102, the electric power supplied from the battery 43 to the stator 33, the rotor rotational speed VRO, and the second magnetic field rotational speed VMF2 are controlled such that the speed relationships expressed by the aforementioned equations (59) and (54) are maintained. As a consequence, similarly to the first embodiment, the insufficient amount of the engine motive power with respect to the vehicle demand motive power is made up for by the supply of electric power from the battery 43 to the stator 33 of the second rotating machine 31. It should be noted that when the insufficient amount of the engine motive power with respect to the vehicle demand motive power is relatively large, electric power is supplied from the battery 43 not only to the stator 33 of the second rotating machine 31 but also to the stator 102 of the rotating machine 101.

Further, in the drive-time charging mode, electric power, which has a magnitude obtained by subtracting the electric power charged into the battery 43 from the electric power generated by the stator 102 of the rotating machine 101, is supplied to the stator 33 of the second rotating machine 31, and the second driving equivalent torque TSE2 based on this electric power is transmitted to the B2 rotor 35. Furthermore, similarly to the battery input/output zero mode, this second driving equivalent torque TSE2, the engine torque TENG distributed to the first sun gear S1 along with the electric power generation by the stator 102, and the engine torque TENG transmitted to the B1 rotor 34 are combined, and the combined torque is transmitted to the drive wheels DW and DW via the B2 rotor 35. As a result, in the drive-time charging mode, assuming that there is no transmission loss caused by the gears or the like, similarly to the first embodiment, the motive power transmitted to the drive wheels DW and DW has a magnitude obtained by subtracting the electric power (energy) charged into the battery 43 from the engine motive power.

Furthermore, in the drive-time charging mode, the electric power generated by the stator 102, the electric power charged into the battery 43, the rotor rotational speed VRO, and the second magnetic field rotational speed VMF2 are controlled such that the speed relationships expressed by the equations (59) and (54) are maintained. As a result, similarly to the first embodiment, the surplus amount of the engine motive power with respect to the vehicle demand motive power is converted to electric power by the stator 102 of the rotating machine 101, and is charged into the battery 43.

Further, during the ENG traveling, when the electric power generated by the stator 102 of the rotating machine 101 is controlled such that the rotating machine torque TMOT becomes equal to 1/(1+r1) of the engine torque TENG, it is possible to transmit the motive power from the engine 3 to the drive wheels DW and DW only by the magnetic paths. In this case, torque having a magnitude r1/(1+r1) times as large as that of the engine torque TENG is transmitted to the drive wheels DW and DW.

Figure 59:
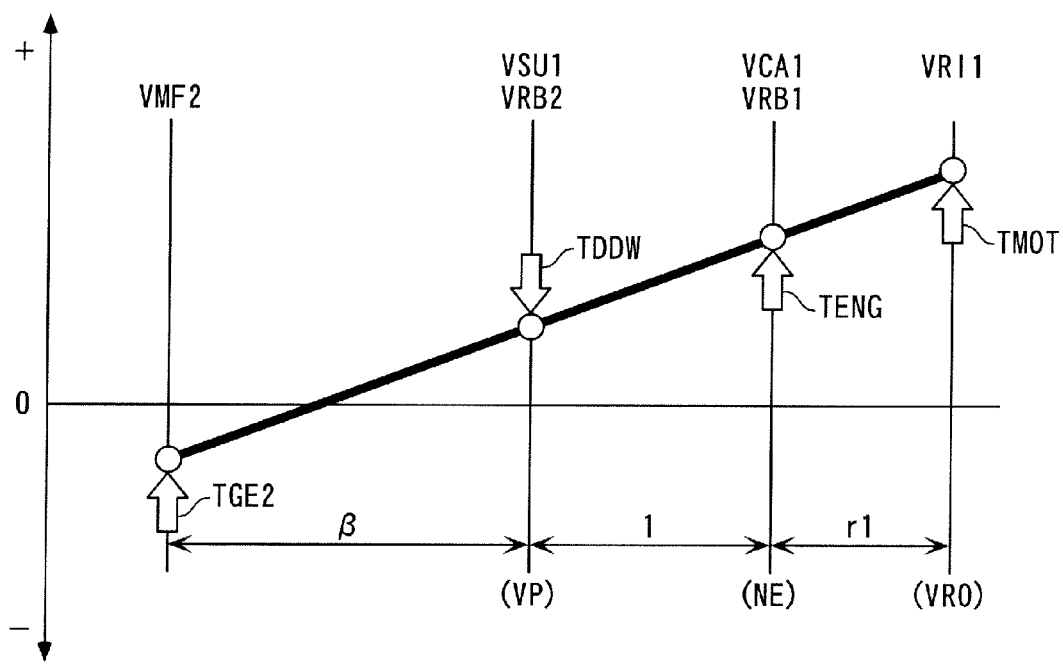
[FIG. 59] A diagram showing an example of the relationship between the rotational speeds and torques of the various rotary elements of the power plant shown in FIG. 56 at the start of rapid acceleration operation during ENG traveling.

Furthermore, at the time of the rapid acceleration operation during the ENG traveling described in the first embodiment, the engine 3, the rotating machine 101 and the second rotating machine 31 are controlled in the following manner: FIG. 59 shows an example of the relationship between the rotational speeds and torques of the various rotary elements at the start of the rapid acceleration operation during ENG traveling. In this case, similarly to the first embodiment, the engine speed NE is increased to such a predetermined engine speed as will make it possible to obtain the maximum torque thereof. Further, as shown in FIG. 59, the vehicle speed VP is not immediately increased, and hence as the engine speed NE becomes higher than the vehicle speed VP, the difference between the engine speed NE and the vehicle speed VP becomes larger, so that the direction of rotation of the second rotating magnetic field determined by the relationship between the two becomes the direction of reverse rotation. In order to cause positive torque from the stator 33 that generates such a second rotating magnetic field to act on the drive wheels DW and DW, the stator 33 performs electric power generation. Further, the electric power generated by the stator 33 is supplied to the stator 102 of the rotating machine 101 to cause the rotor 103 to perform normal rotation.

As described above, the engine torque TENG, the rotating machine torque TMOT, and the second electric power-generating equivalent torque TGE2 are all transmitted to the drive wheels DW and DW as positive torque, which results in a rapid increase in the vehicle speed VP. Further, at the start of the rapid acceleration operation during the ENG traveling, as is apparent from FIG. 59, the engine torque TENG and the rotating machine torque TMOT are transmitted to the drive wheels DW and DW using the second electric power-generating equivalent torque TGE2 as a reaction force, so that torque demanded of the second rotating machine 31 becomes larger than in the other cases. In this case, the torque demanded of the second rotating machine 31, i.e. the second electric power-generating equivalent torque TGE2 is expressed by the following equation (65):

$$TGE2 = -\{r1 \cdot TENG + (1+r1)TDDW\}/(\beta+1+r1) \tag{65}$$

As is apparent from the equation (65), as the second pole pair number ratio β is larger, the rotating machine torque TMOT becomes smaller with respect to the drive wheel-transmitted torque TDDW and the engine torque TENG assuming that the respective magnitudes thereof are unchanged. In the present embodiment, the second pole pair number ratio β is set to 2.0, and hence similarly to the first embodiment, it is possible to reduce the size and costs of the second rotating machine 31.

Deceleration Regeneration

During the deceleration regeneration, when the ratio of the torque of the drive wheels DW and DW transmitted to the engine 3 to the torque of the drive wheels DW and DW (torque by inertia) is small, electric power generation is performed by the stators 102 and 33 using part of the motive power from the drive wheels DW and DW, and the generated electric power is charged into the battery 43. Along with the electric power generation by the stator 33, combined torque formed by combining all the torque of the drive wheels DW and DW and torque distributed to the first sun gear S1, as described hereinafter, is transmitted to the B2 rotor 35. Further, the combined torque transmitted to the B2 rotor 35 is distributed to the stator 33 and the B1 rotor 34.

Further, part of the torque distributed to the B1 rotor 34 is transmitted to the engine 3, and the remainder thereof is, similarly to the case of the aforementioned battery input/output zero mode, transmitted to the first carrier C1 along with the electric power generation by the stator 102, and is then distributed to the stator 102 and the first sun gear S1. Further, the torque distributed to the first sun gear S1 is transmitted to the B2 rotor 35. As a result, during the deceleration regeneration, assuming that there is no transmission loss caused by the gears or the like, similarly to the first embodiment, the sum of the motive power transmitted to the engine 3 and the electric power (energy) charged into the battery 43 becomes equal to the motive power from the drive wheels DW and DW.

ENG Start During Stoppage of the Vehicle

At the time of the ENG start during stoppage of the vehicle, electric power is supplied from the battery 43 to the stator 102 of the rotating machine 101, thereby causing the rotor 103 to perform normal rotation and causing the stator 33 of the second rotating machine 31 to perform electric power generation to further supply the generated electric power to the stator 102. The rotating machine torque TMOT transmitted to the first ring gear R1 in accordance with the supply of the electric power to the stator 102 is transmitted to the first carrier C1 and the first sun gear S1 via the first planetary gears P1, thereby acting on the first carrier C1 to cause the first carrier C1 to perform normal rotation and acting on the first sun gear S1 to cause the first sun gear S1 to perform reverse rotation. Further, part of the torque transmitted to the first carrier C1 is transmitted to the crankshaft 3*a*, whereby the crankshaft 3*a*. performs normal rotation.

Furthermore, at the time of the ENG start during stoppage of the vehicle, the remainder of the torque transmitted to the first carrier C1 is transmitted to the B1 rotor 34, and is then transmitted to the stator 33 as electric energy along with the electric power generation by the stator 33 of the second rotating machine 31. Further, in this case, as described as to the first embodiment, the second rotating magnetic field performs reverse rotation. As a result, the second electric power-generating equivalent torque TGE2 generated along with the electric power generation by the stator 33 acts on the B2 rotor 35 to cause the B2 rotor 35 to perform normal rotation. Further, the torque transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation.

In this case, the electric power supplied to the stator 102 of the rotating machine 101 and the electric power generated by the stator 33 of the second rotating machine 31 are controlled such that the above-mentioned torque for causing the first sun gear S1 to perform reverse rotation and the torques for causing the B2 rotor 35 to perform normal rotation are balanced with each other, whereby the first sun gear S1, the B2 rotor 35 and the drive wheels DW and DW, which are connected to each other, are held stationary. As a consequence, the first sun gear rotational speed VSU1 and the B2 rotor rotational speed VRB2 become equal to 0, and the vehicle speed VP as well become equal to 0.

Further, in this case, the electric power supplied to the stator 102, the electric power generated by the stator 33, the rotor rotational speed VRO, and the second magnetic field rotational speed VMF2 are controlled such that the speed relationships expressed by the equations (59) and (54) are maintained and at the same time the first carrier rotational speed VCA1 and the B1 rotor rotational speed VRB1 take relatively small values. With this, at the time of the ENG start during stoppage of the vehicle, similarly to the first embodiment, while holding the vehicle speed VP at 0, the engine speed NE is controlled to a relatively small value suitable for the start of the engine 3. Further, in this state, the ignition operation of the fuel injection valves and the spark plugs of the engine 3 is controlled according to the crank angle position, whereby the engine 3 is started.

ENG Creep

During the ENG creep, electric power generation is performed by the stators 102 and 33. Further, electric power thus generated by the stators 102 and 33 is charged into the battery 43. Similarly to the case of the aforementioned battery input/output zero mode, along with the above-mentioned electric power generation by the stator 102, part of the engine torque TENG is transmitted to the first carrier C1, and the engine torque TENG transmitted to the first carrier C1 is distributed to the stator 102 and the first sun gear S1. Further, similarly to the first embodiment, the second rotating magnetic field generated by the aforementioned electric power generation by the stator 33 performs reverse rotation. As a result, the second electric power-generating equivalent torque TGE2 generated along with the above-described electric power generation by the stator 33 acts on the B2 rotor 35 to cause the B2 rotor 35 to perform normal rotation. Further, the engine torque TENG transmitted to the B1 rotor 34 such that it is balanced with the second electric power-generating equivalent torque TGE2 is further transmitted to the B2 rotor 35, thereby acting on the B2 rotor 35 to cause the B2 rotor 35 to perform normal rotation. Furthermore, the engine torque TENG distributed to the first sun gear S1 as described above is transmitted to the B2 rotor 35.

As described above, during the ENG creep, combined torque formed by combining the engine torque TENG distributed to the first sun gear S1, the second electric power-generating equivalent torque TGE2, and the engine torque TENG transmitted to the B1 rotor 34 is transmitted to the B2 rotor 35. Further, this combined torque is transmitted to the drive wheels DW and DW, for causing the drive wheels DW and DW to perform normal rotation. Furthermore, the electric power generated by the stators 102 and 33, the rotor rotational speed VRO, and the second magnetic field rotational speed VMF2 are controlled such that the first sun gear rotational speed VSU1 and the B2 rotor rotational speed VRB2, that is, the vehicle speed VP becomes very small, whereby the creep operation is carried out.

Further, during the ENG creep, as described above, the engine torque TENG distributed to the first sun gear S1 along with the electric power generation by the stator 102 and the engine torque TENG transmitted to the B2 rotor 35 via the B1 rotor 34 along with the electric power generation by the stator 33 are transmitted to the drive wheels DW and DW. Thus, similarly to the first embodiment, part of the engine torque TENG can be transmitted to the drive wheels DW and DW, and hence it is possible to perform the creep operation without causing engine stall.

ENG-Based Standing Start

At the time of the ENG-based standing start, the second magnetic field rotational speed VMF2 of the second rotating magnetic field that has been performing reverse rotation during the ENG creep is controlled such that it becomes equal to 0, the rotor rotational speed VRO of the rotor 103 that has been performing normal rotation during the ENG creep is caused to be increased, and the engine motive power is caused to be increased. Then, after the second magnetic field rotational speed VMF2 becomes equal to 0, the operation in the above-mentioned battery input/output zero mode is performed. With this, the vehicle speed VP is increased, causing the vehicle to start.

As described heretofore, according to the present embodiment, the second rotating machine 31 has the same functions as those of an apparatus formed by combining a planetary gear unit and a general one-rotor-type rotating machine, so that differently from the aforementioned conventional power plant, the power plant 1N does not require two planetary gear units for distributing and combining motive power for transmission, respectively, but requires only the first planetary gear unit PS1. This makes it possible to reduce the size of the power plant 1N by the corresponding extent. Further, in the power plant 1N, as already described in the description of the operation in the battery input/output zero mode, differently from the above-described conventional case, the engine motive power is transmitted to the drive wheels DW and DW without being recirculated, so that it is possible to reduce motive power passing through the first planetary gear unit PS1, the rotating machine 101, and the second rotating machine 31. This makes it possible to reduce the sizes and costs of the first planetary gear unit PS1, the rotating machine 101, and the second rotating machine 31, thereby making it possible to attain further reduction of the size and costs of the power plant 1N. Further, the first planetary gear unit PS1, the rotating machine 101, and the second rotating machine 31, each having a torque capacity corresponding to motive power reduced as described above, are used, thereby making it possible to suppress the loss of motive power to improve the driving efficiency of the power plant 1N.

Further, the engine motive power is transmitted to the drive wheels DW and DW in a divided state via a total of three transmission paths: a first transmission path (the first carrier C1, the first planetary gears P1, the first sun gear S1, the connection shaft 6, and the B2 rotor 35), a second transmission path (the B1 rotor 34, the magnetic forces caused by magnetic force lines, and the B2 rotor 35), and a third transmission path (the first carrier C1, the first planetary gears P1, the first ring gear R1, the rotor 103, the stator 102, the first PDU 41, the second PDU 42, the stator 33, the magnetic forces caused by magnetic force lines, and the B2 rotor 35). This makes it possible to reduce electric power (energy) passing through the first and second PDUs 41 and 42 via the third transmission path, so that it is possible to reduce the sizes and costs of the first and second PDUs 41 and 42, thereby making it possible to attain further reduction of the size and costs of the power plant 1N.

Furthermore, as described above with reference to FIG. 58, the engine motive power is transmitted to the drive wheels DW and DW while having the speed thereof steplessly changed through the control of the rotor rotational speed VRO and the second magnetic field rotational speed VMF2. Further, in this case, the rotor rotational speed VRO and the second magnetic field rotational speed VMF2 are controlled such that the engine speed NE becomes equal to the target engine speed set to such a value that will make it possible to obtain the optimum fuel economy of the engine 3, and therefore it is possible to drive the drive wheels DW and DW while controlling the engine motive power such that the optimum fuel economy of the engine 3 can be obtained. This makes it possible to further enhance the driving efficiency of the power plant 1N.

Further, the first planetary gear ratio r1 of the first planetary gear unit PS1 is set to a relatively large one of values that can be taken by a general planetary gear unit. As a consequence, at the time of the ENG start during EV traveling, when the torque demanded of the rotating machine 101 becomes particularly large, as described above with reference to FIG. 57 using the aforementioned equation (64), the rotating machine torque TMOT can be made smaller than when the first planetary gear ratio r1 is set to a small value, and hence it is possible to further reduce the size and costs of the rotating machine 101. Furthermore, the second pole pair number ratio β of the second rotating machine 31 is set to 2.0. As a consequence, at the time of the rapid acceleration operation during the ENG traveling in which the torque demanded of the second rotating machine 31 becomes particularly large, as described above with reference to FIG. 59 using the aforementioned equation (65), the rotating machine torque TMOT can be made smaller than when the second pole pair number ratio β is set to less than 1.0, and hence it is possible to further reduce the size and costs of the second rotating machine 31. In addition, according to the present embodiment, it is possible to obtain the same advantageous effects as provided by the first embodiment.

Next, power plants 1O, 1P, 1Q and 1R according to sixteenth to nineteenth embodiments of the present invention will be described with reference to FIGS. 60 to 63. These power plants 1O to 1R are distinguished from the fifteenth embodiment mainly in that they further include transmissions 161, 171, 181, and 191, respectively. In all of the sixteenth to nineteenth embodiments, the connection relationship between the engine 3, the rotating machine 101, the first planetary gear unit PS1, the second rotating machine 31, and the drive wheels DW and DW is the same as the connection relationship in the fifteenth embodiment. That is, the first carrier C1 and the B1 rotor 34 are mechanically connected to the crankshaft 3a. of the engine 3, and the first sun gear S1 and the B2 rotor 35 are mechanically connected to the drive wheels DW and DW. Further, the rotor 103 of the rotating machine 101 is mechanically connected to the first ring gear R1. Furthermore, in FIGS. 60 to 63, the component elements identical to those of the fifteenth embodiment are denoted by the same reference numerals. This also similarly applies to figures for use in describing the other embodiments described hereinafter. The following description is mainly given of different points of the power plants 1O to 1R from the fifteenth embodiment, in order from the power plant 1O of the sixteenth embodiment.

Figure 60:
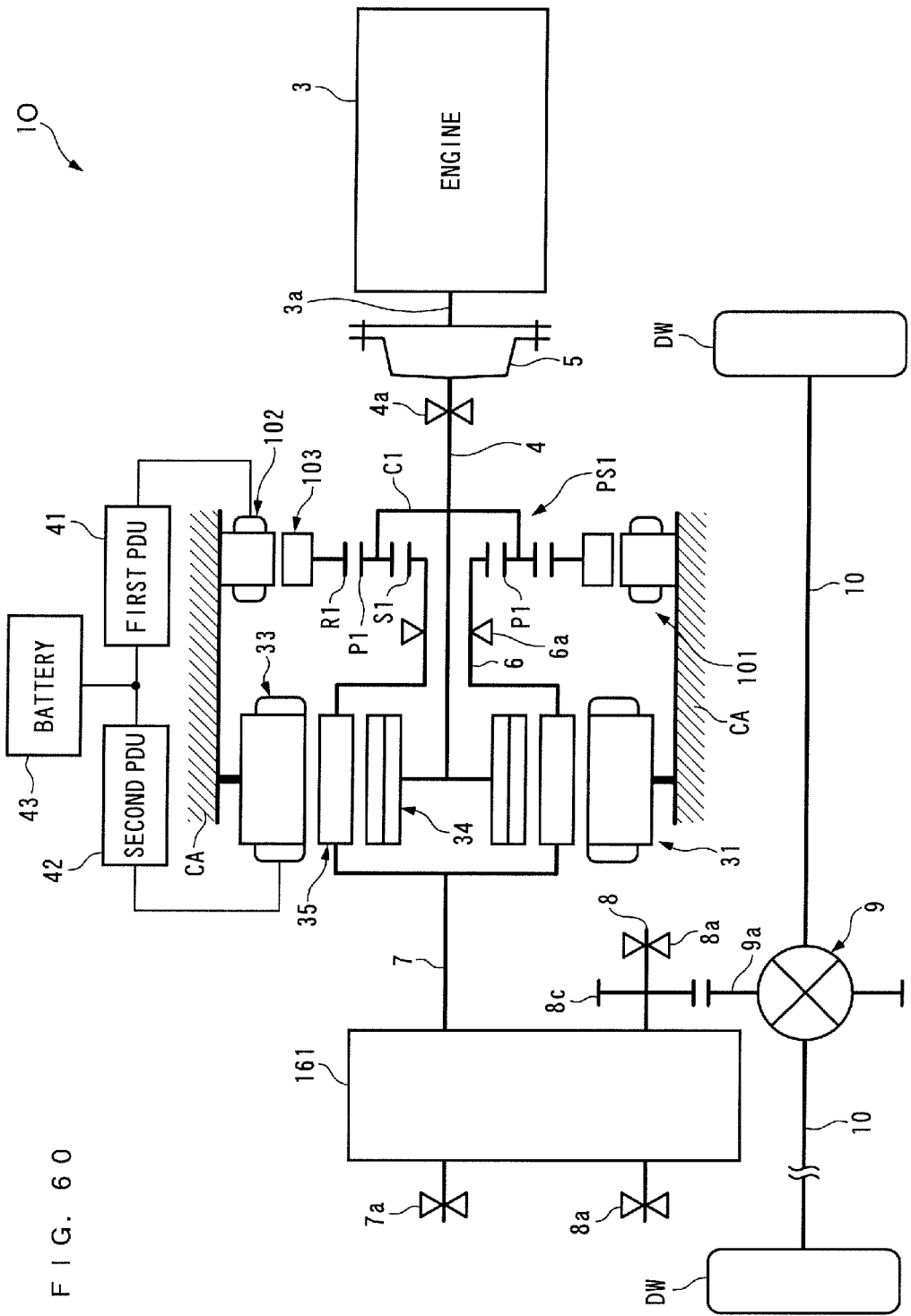
[FIG. 60] A schematic diagram of a power plant according to a sixteenth embodiment of the present invention.

Referring to FIG. 60, in the power plant 1O, the transmission 161 is provided in place of the gear 7b and the first gear 8b, described hereinabove, in mesh with each other. Similarly to the transmission 111 according to the eighth embodiment, this transmission 161 is a belt-type stepless transmission, and includes an input shaft connected to the aforementioned second rotating shaft 7, an output shaft connected to the idler shaft 8, pulleys provided on the input shaft and the output shaft, respectively, and a metal belt wound around the pulleys, none of which are shown. The transmission 161 changes the effective diameters of the pulleys, thereby outputting motive power input to the input shaft to the output shaft while changing the speed thereof. Further, the ECU 2 controls the transmission ratio of the transmission 161 (the rotational speed of the input shaft/the rotational speed of the output shaft).

As described above, the transmission 161 is disposed between the first sun gear S1 and the B2 rotor 35, and the drive wheels DW and DW, and the motive power transmitted to the first sun gear S1 and the B2 rotor 35 is transmitted to the drive wheels DW and DW while having the speed thereof changed by the transmission 161. It should be noted that in the present embodiment, the transmission 161 corresponds to the transmission in the invention as claimed in claim 10.

In the power plant 1O constructed as above, in cases where a very large torque is transmitted from the first sun gear S1 and the B2 rotor 35 to the drive wheels DW and DW, e.g. during the EV standing start and the ENG-based standing start, the transmission ratio of the transmission 161 is controlled to a predetermined lower-speed value larger than 1.0. With this, the torque transmitted to the first sun gear S1 and the B2 rotor 35 is increased by the transmission 161, and is then transmitted to the drive wheels DW and DW. In accordance therewith, the electric power generated by the rotating machine 101 and the electric power supplied to the second rotating machine 31 (generated electric power) are controlled such that the torque transmitted to the first sun gear S1 and the B2 rotor 35 becomes smaller. Therefore, according to the present embodiment, it is possible to reduce the respective maximum values of torque demanded of the rotating machine 101 and the second rotating machine 31, thereby making it possible to further reduce the sizes and costs of the rotating machine 101 and the second rotating machine 31. Further, through the control of the above-mentioned transmission 161 and rotating machine 101, it is possible to reduce the torque distributed to the first sun gear S1 and the first ring gear R1 via the first carrier C1, and reduce the maximum value of the torque transmitted to the first carrier C1, so that it is possible to further reduce the size and costs of the first planetary gear unit PS1.

Furthermore, in cases where the B2 rotor rotational speed VRB2 becomes too high, e.g. during the high-vehicle speed operation in which the vehicle speed VP is very high, the transmission ratio of the transmission 161 is controlled to a predetermined higher-speed value smaller than 1.0. With this, according to the present embodiment, since the B2 rotor rotational speed VRB2 can be reduced with respect to the vehicle speed VP, it is possible to prevent failure of the second rotating machine 31 from being caused by the B2 rotor rotational speed VRB2 becoming too high.

Further, in cases where the rotor rotational speed VRO which is determined by the relationship between the engine speed NE and the vehicle speed VP becomes too high, e.g. during rapid acceleration of the vehicle in which the engine speed NE is higher than the vehicle speed VP, the transmission ratio of the transmission 161 is controlled to a predetermined lower-speed value larger than 1.0. With this, according to the present embodiment, the first sun gear rotational speed VSU1 is increased with respect to the vehicle speed VP, whereby as is apparent from FIG. 58, referred to hereinabove, it is possible to reduce the rotor rotational speed VRO, and hence it is possible to prevent failure of the rotating machine 101 from being caused by the rotor rotational speed VRO becoming too high.

Furthermore, during traveling of the vehicle including the EV traveling and the ENG traveling, the transmission ratio of the transmission 161 is controlled such that the rotor rotational speed VRO and the second magnetic field rotational speed VMF2 become equal to first and second predetermined target values, respectively. The first and second target values are calculated by searching a map according to the vehicle speed VP when only the rotating machine 101 and the second rotating machine 31 are used as motive power sources, whereas when the engine 3, the rotating machine 101, and the second rotating machine 31 are used as motive power sources, the first and second target values are calculated by searching a map other than the above-mentioned map according to the engine speed NE and the vehicle speed VP. Further, in these maps, the first and second target values are set to such values that will make it possible to obtain high efficiencies of the rotating machine 101 and the second rotating machine 31 with respect to the vehicle speed VP (and engine speed NE) assumed at the time. Furthermore, in parallel with the above-described control of the transmission 161, the rotor rotational speed VRO and the second magnetic field rotational speed VMF2 are controlled to the first and second target values, respectively. With this, according to the present embodiment, during traveling of the vehicle, it is possible to obtain the high efficiencies of the rotating machine 101 and the second rotating machine 31.

Further, also in the present embodiment, as described above with reference to FIG. 58, by using the rotating machine 101, the first planetary gear unit PS1 and the second rotating machine 31, it is possible to transmit the engine motive power to the drive wheels DW and DW while steplessly changing the speed thereof, and hence it is possible to reduce the frequency of the speed-changing operation of the transmission 161. This makes it possible to suppress heat losses by the speed-changing operation, thereby making it possible to ensure the high driving efficiency of the power plant 1O. In addition, according to the present embodiment, it is possible to obtain the same advantageous effects as provided by the fifteenth embodiment.

It should be noted that although in the present embodiment, the transmission 161 is a belt-type stepless transmission, it is to be understood that a toroidal-type or a hydraulic-type stepless transmission or a gear-type stepped transmission may be employed.

Figure 61:
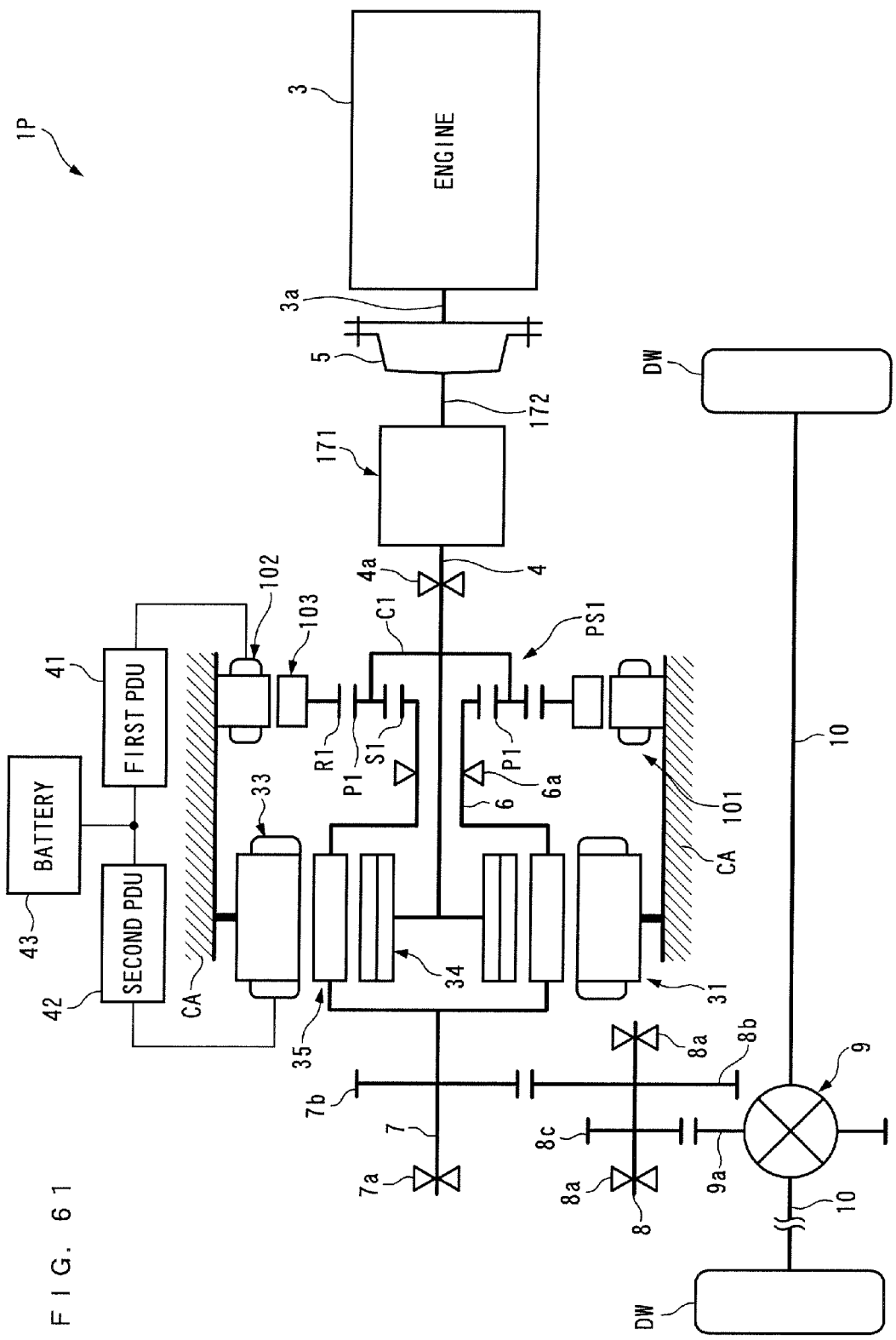
[FIG. 61] A schematic diagram of a power plant according to a seventeenth embodiment of the present invention.

In the power plant 1P according to the seventeenth embodiment shown FIG. 61, the transmission 171 is a gear-type stepped transmission formed by a planetary gear unit etc., similarly to the above-described transmission 121 in the ninth embodiment, and includes an input shaft 172 and an output shaft (not shown). In the transmission 171, a total of two speed positions, i.e. a first speed (transmission ratio=the rotational speed of the input shaft 172/the rotational speed of the output shaft=1.0) and a second speed (transmission ratio<1.0) are set as speed positions. The ECU 2 performs a change between these speed positions. Further, the input shaft 172 of the transmission 171 is directly connected to the crankshaft 3a. via the flywheel 5, and the output shaft (not shown) thereof is directly connected to the first rotating shaft 4. As described above, the transmission 171 is disposed between the crankshaft 3a, and the first carrier C1 and the B1 rotor 34, for transmitting the engine motive power to the first carrier C1 and the B1 rotor 34 while changing the speed of the engine motive power. It should be noted that in the present embodiment, the transmission 171 corresponds to the transmission in the invention as claimed in claim 11.

Furthermore, similarly to the ninth embodiment, the number of the gear teeth of the gear 9a. of the aforementioned differential gear mechanism 9 is larger than that of the gear teeth of the second gear 8c. of the idler shaft 8, whereby the motive power transmitted to the idler shaft 8 is transmitted to the drive wheels DW and DW in a speed-reduced state.

In the power plant 1P constructed as above, in cases where a very large torque is transmitted from the first sun gear S1 and the B2 rotor 35 to the drive wheels DW and DW, e.g. during the ENG-based standing start, the speed position of the transmission 171 is controlled to the second speed (transmission ratio<1.0). This reduces the engine torque TENG input to the first carrier C1 and the B1 rotor 34. In accordance therewith, the electric power generated by the rotating machine 101 and the electric power supplied to the second rotating machine 31 (generated electric power) are controlled such that the engine torque TENG transmitted to the first sun gear S1 and the B2 rotor 35 becomes smaller. Further, the engine torque TENG transmitted to the first sun gear S1 and the B2 rotor 35 is transmitted to the drive wheels DW and DW in a state increased by deceleration by the second gear 8c and the gear 9a. With this, according to the present embodiment, it is possible to reduce the respective maximum values of torque demanded of the rotating machine 101 and the second rotating machine 31, thereby making it possible to reduce the sizes and costs of the rotating machine 101 and the second rotating machine 31. In addition to this, since the respective maximum values of the torque distributed to the first sun gear S1 and the first ring gear R1 via the first carrier C1 can be reduced, it is possible to further reduce the size and costs of the first planetary gear unit PS1.

Further, when the engine speed NE is very high, the speed position of the transmission 171 is controlled to the first speed (transmission ratio=1.0). With this, according to the present embodiment, compared with the case of the speed position being the second speed, the B1 rotor rotational speed VRB1 can be reduced, whereby it is possible to prevent failure of the second rotating machine 31 from being caused by the B1 rotor rotational speed VRB1 becoming too high. This control is particularly effective because the B1 rotor 34 is formed by magnets so that the above-mentioned inconveniences are liable to occur.

Further, in cases where the rotor rotational speed VRO becomes too high, e.g. during rapid acceleration of the vehicle in which the engine speed NE is higher than the vehicle speed VP, the speed position of the transmission 171 is controlled to the first speed. With this, compared with the case of the speed position being the second speed, the first carrier rotational speed VCA1 becomes smaller, and hence according to the present embodiment, as is apparent from FIG. 58, the rotor rotational speed VRO can be lowered, thereby making it possible to prevent failure of the rotating machine 101 from being caused by the rotor rotational speed VRO becoming too high.

Further, during the ENG traveling, the speed position of the transmission 171 is changed according to the engine speed NE and the vehicle speed VP such that the rotor rotational speed VRO and the second magnetic field rotational speed VMF2 take respective values that will make it possible to obtain the high efficiencies of the rotating machine 101 and the second rotating machine 31. Further, in parallel with such a change in the speed position of the transmission 171, the rotor rotational speed VRO and the second magnetic field rotational speed VMF2 are controlled to values determined based on the engine speed NE, the vehicle speed VP, and the speed position of the transmission 171, which are assumed then, and the aforementioned equations (54) and (59). With this, according to the present embodiment, during traveling of the vehicle, it is possible to obtain the high efficiencies of the rotating machine 101 and the second rotating machine 31.

Furthermore, during the ENG traveling and at the same time during the speed-changing operation of the transmission 171, that is, when the engine 3, the first carrier C1 and the B1 rotor 34 are disconnected from each other by the transmission 171, to suppress a speed-change shock, the rotating machine 101 and the second rotating machine 31 are in the following manner. Hereafter, such control of the rotating machine 101 and the second rotating machine 31 is referred to as "the speed-change shock control", similarly to the ninth embodiment.

That is, electric power is supplied to the stator 102 of the rotating machine 101, for causing the rotor 103 to perform normal rotation, and electric power is supplied to the stator 33 of the second rotating machine 31, for causing the second rotating magnetic field, which is generated in accordance with the supply of the electric power, to perform normal rotation. With this, the rotating machine torque TMOT transmitted to the first ring gear R1, and the torque transmitted to the first sun gear Si, as described hereafter, are combined, and the combined torque is transmitted to the first carrier C1. The torque transmitted to the first carrier C1 is transmitted to the B1 rotor 34 without being transmitted to the crankshaft 3a, by the above-mentioned disconnection by the transmission 171. Further, this torque is combined with the second driving equivalent torque TSE2 from the stator 33 and is then transmitted to the B2 rotor 35. Part of the torque transmitted to the B2 rotor 35 is transmitted to the first sun gear Si, and the remainder thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, and therefore it is possible to improve marketability. It should be noted that this speed-change shock control is performed only during the speed-changing operation of the transmission 171. In addition, according to the present embodiment, it is possible to obtain the same advantageous effects as provided by the fifteenth embodiment.

Figure 62:
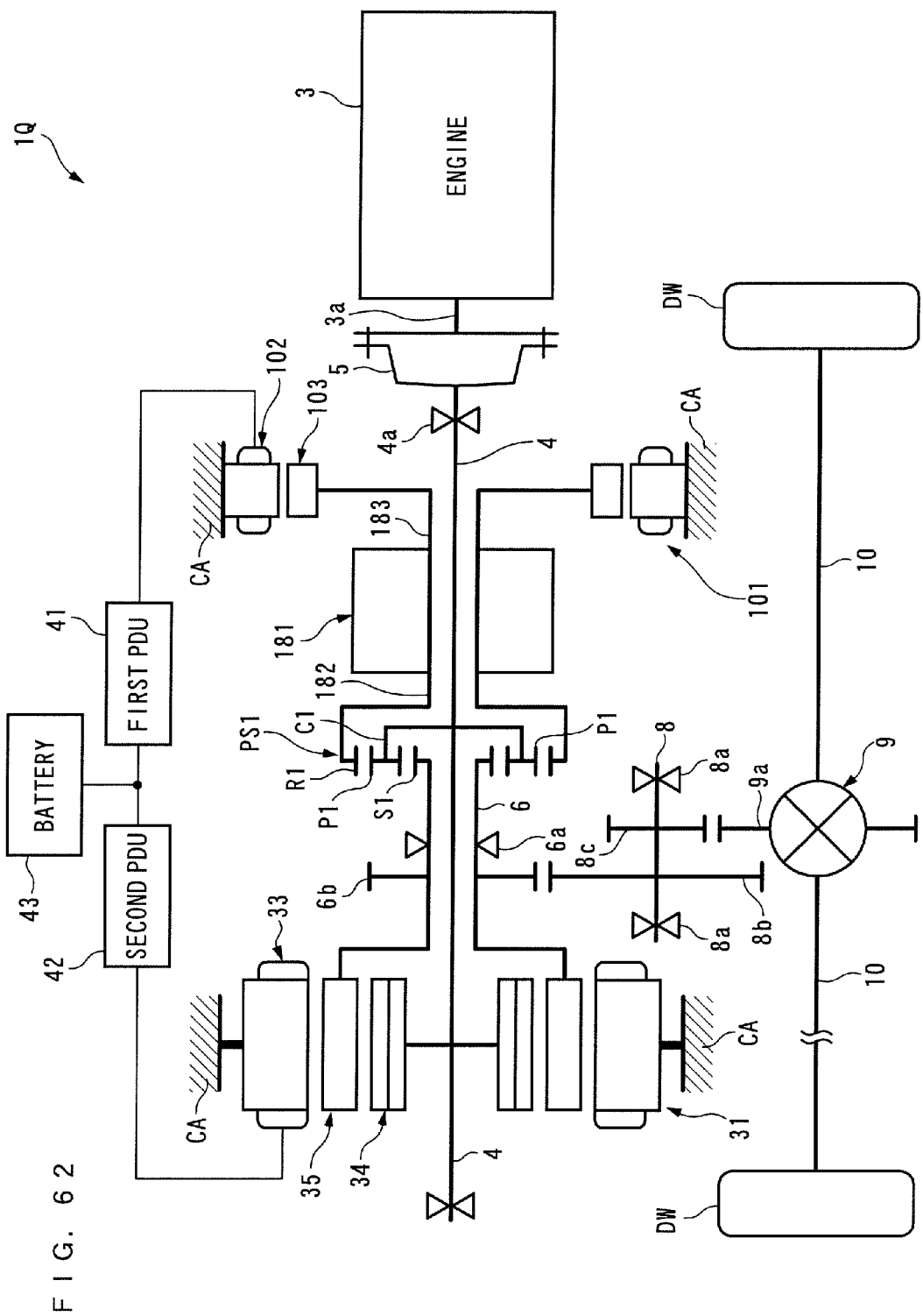
[FIG. 62] A schematic diagram of a power plant according to an eighteenth embodiment of the present invention.

In the power plant 1Q according to the eighteenth embodiment shown in FIG. 62, differently from the fifteenth embodiment, the second rotating shaft 7 is not provided, and the first gear 8b is in mesh with the gear 6b integrally formed with the connection shaft 6, whereby the first sun gear S1 and the B2 rotor 35 are mechanically connected to the drive wheels DW and DW via the connection shaft 6, the gear 6b, the first gear 8b, the idler shaft 8, the second gear 8c, the gear 9a, the differential gear mechanism 9, and so forth, without via the transmission 181.

The transmission 181 is a gear-type stepped transmission which is configured similarly to the transmission 131 according to the tenth embodiment and has speed positions of the first to third speeds. The transmission 181 includes an input shaft 182 directly connected to the first ring gear R1 via a flange, and an output shaft 183 directly connected to the rotor 103 via a flange, and transmits motive power input to the input shaft 182 to the output shaft 183 while changing the speed of the motive power. Furthermore, the ECU 2a controls a change between the speed positions of the transmission 181. As described above, the first ring gear R1 is mechanically connected to the rotor 103 via the transmission 181, and the motive power transmitted to the first ring gear R1 is transmitted to the rotor 103 while having the speed thereof changed by the transmission 181. It should be noted that in the present embodiment, the transmission 181 corresponds to a transmission in the invention as claimed in claim 16.

In the power plant 1Q constructed as above, when a very large torque is transmitted to the rotor 103, e.g. during the EV standing start and the ENG-based standing start, the speed position of the transmission 181 is controlled to the third speed (transmission ratio<1.0). With this, the torque transmitted to the first ring gear R1 is reduced by the transmission 181, and is then transmitted to the rotor 103. In accordance therewith, the electric power generated by the rotating machine 101 is controlled such that the torque transmitted to the rotor 103 becomes smaller. Further, at the time of the above-described ENG start during stoppage of the vehicle, the speed position of the transmission 181 is controlled to the third speed (transmission ratio<1.0). In this case, the input shaft 182 and the output shaft 183 are connected to the first ring gear R1 and the rotor 103, respectively, and hence through the above-described control of the transmission 181, at the time of the above-described ENG start during stoppage of the vehicle, the torque from the rotating machine 101 is increased, and is transmitted to the crankshaft 3a via the first ring gear R1, the first planetary gears P1 and the first carrier C1. In accordance therewith, the electric power supplied to the rotating machine 101 is controlled such that the rotating machine torque TMOT from the rotating machine 101 becomes smaller. With this, according to the present embodiment, it is possible to further reduce the size and costs of the rotating machine 101.

Further, during the EV standing start and the like, even when the speed position of the transmission 181 is controlled as described above, the magnitude itself of the motive power transmitted from the first ring gear R1 to the rotor 103 does not change, and when the electric power generated by the rotating machine 101 is transmitted to the B2 rotor 35 via the stator 33 as motive power, the torque transmitted to the drive wheels DW and DW via the B2 rotor 35 can be controlled to have a desired magnitude. This makes it possible to transmit torque having a sufficient magnitude to the drive wheels DW and DW.

Further, when the rotor rotational speed VRO, which is determined by the relationship between the engine speed NE and the vehicle speed VP, becomes too high, e.g. during rapid acceleration of the vehicle in which the engine speed NE is higher than the vehicle speed VP, the speed position of the transmission 181 is controlled to the first speed (transmission ratio>1.0). This makes it possible to reduce the rotor rotational speed VRO with respect to the first ring gear rotational speed VRI1 which is determined by the relationship between the engine speed NE and vehicle speed VP assumed at the time, and hence it is possible to prevent failure of the rotating machine 101 from being caused by the rotor rotational speed VRO becoming too high.

Furthermore, during traveling of the vehicle including the EV traveling and the ENG traveling, the speed position of the transmission 181 is controlled such that the rotor rotational speed VRO becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-mentioned map according to the engine speed NE and the vehicle speed VP. Further, in these maps, the target value is set to such a value that will make it possible to obtain high efficiency of the rotating machine 101 with respect to the vehicle speed VP (and engine speed NE) assumed at the time. Furthermore, in parallel with the above-described control of the transmission 181, the rotor rotational speed VRO is controlled to the above-described target value. With this, according to the present embodiment, during traveling of the vehicle, it is possible to obtain the high efficiency of the rotating machine 101.

Furthermore, during the ENG traveling, and at the same time during the speed-changing operation of the transmission 181, the gear trains of the transmission 181 and the input shaft 182 and output shaft 183 thereof are disconnected from each other to thereby disconnect between the rotor 103 and the first ring gear R1, whereby the engine torque TENG ceases to act on the rotor 103. Therefore, no electric power is generated by the rotating machine 101, and the stator 33 of the second rotating machine 31 is supplied with electric power from the battery 43.

With this, according to the present embodiment, during the speed-changing operation of the transmission 181, the second driving equivalent torque TSE2 from the stator 33 and the engine torque TENG transmitted to the B1 rotor 34 are combined, and the combined torque is transmitted to the drive wheels DW and DW via the B2 rotor 35. This makes it possible to suppress a speed-change shock, which can be caused by interruption of transmission of the engine torque TENG to the drive wheels DW and DW, and therefore it is possible to improve marketability.

Further, similarly to the fifteenth embodiment, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 181. This makes it possible to enhance the driving efficiency of the power plant 1Q. In addition, according to the present embodiment, it is possible to obtain the same advantageous effects as provided by the fifteenth embodiment.

Figure 63:
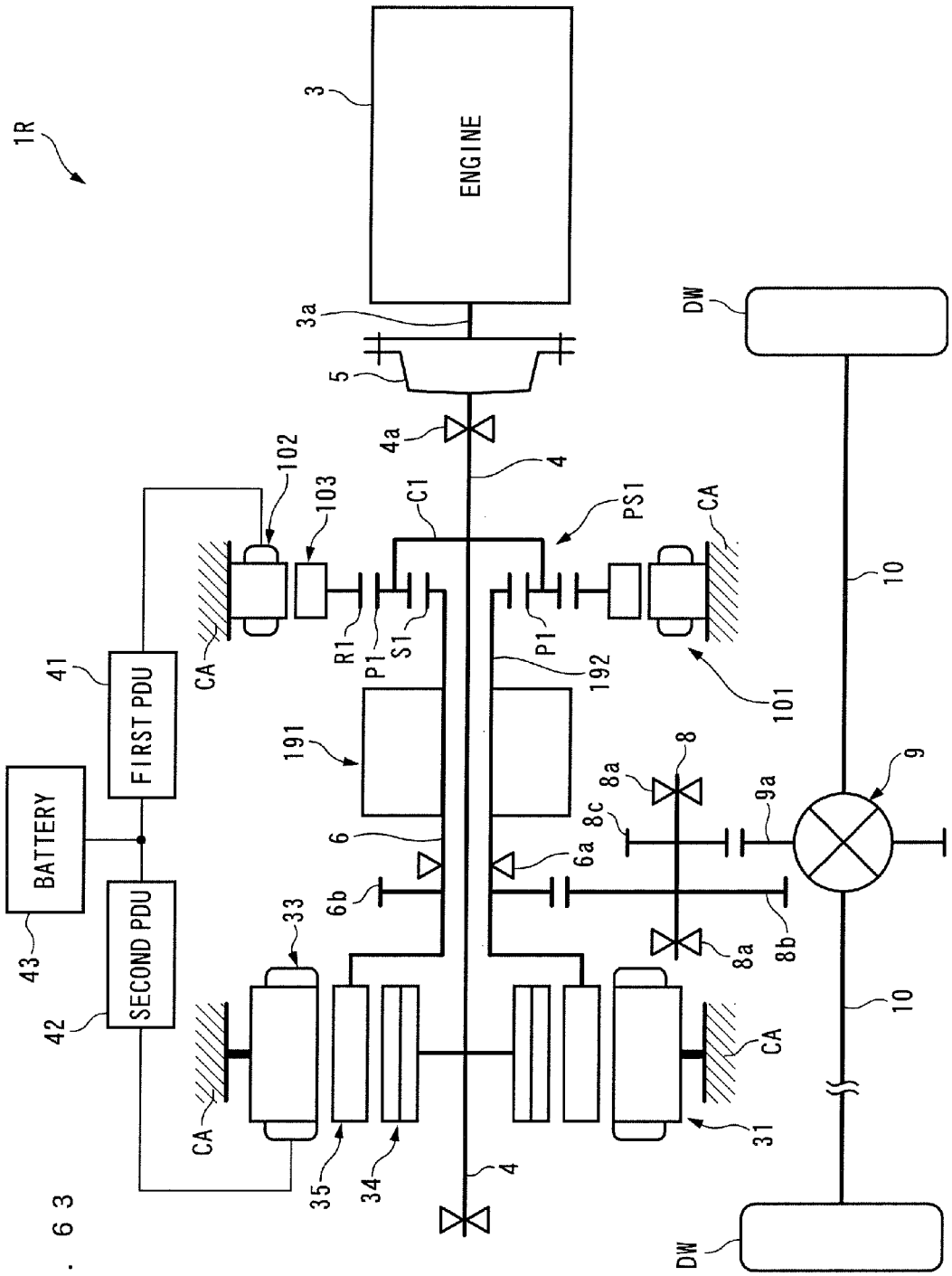
[FIG. 63] A schematic diagram of a power plant according to a nineteenth embodiment of the present invention.

In the power plant 1R according to the nineteenth embodiment shown in FIG. 63, similarly to the eighteenth embodiment, the second rotating shaft 7 is not provided, and the first gear 8b is in mesh with the gear 6b integrally formed with the connection shaft 6. Further, the transmission 191 is a gear-type stepped transmission which is configured similarly to the transmission 131 according to the tenth embodiment and has speed positions of the first to third speeds. The transmission 191 includes an input shaft 192 directly connected to the first sun gear S1 and an output shaft (not shown) directly connected to the connection shaft 6, and transmits motive power input to the input shaft 192 to the output shaft while changing the speed of the motive power. Furthermore, the ECU 2 controls a change between the speed positions of the transmission 191.

As described above, the first sun gear S1 is mechanically connected to the drive wheels DW and DW via the transmission 191, the connection shaft 6, the gear 6b, the first gear 8b, and so forth. Further, the motive power transmitted to the first sun gear S1 is transmitted to the drive wheels DW and DW while having the speed thereof changed by the transmission 191. Furthermore, the B2 rotor 35 is mechanically connected to the drive wheels DW and DW via the connection shaft 6, the gear 6b, the first gear 8b, and so forth, without via the transmission 191. It should be noted that in the present embodiment, the transmission 191 corresponds to a transmission in the invention as claimed in claim 17.

In the power plant 1R constructed as above, in cases where a very large torque is transmitted from the first sun gear S1 to the drive wheels DW and DW, e.g. during the ENG-based standing start, the speed position of the transmission 191 is controlled to the first speed (transmission ratio>1.0). With this, the torque transmitted to the first sun gear S1 is increased by the transmission 191, and is then transmitted to the drive wheels DW and DW. In accordance therewith, the electric power generated by the rotating machine 101 is controlled such that torque distributed to the first sun gear S1 and the first ring gear R1 becomes smaller. With this, according to the present embodiment, the torque distributed to the first sun gear S1 and the first ring gear R1 via the first carrier C1 can be reduced, and hence it is possible to further reduce the size and costs of the first planetary gear unit PS1. In addition to this, since torque transmitted from the first ring gear R1 to the rotor 103 can be reduced, it is possible to further reduce the size and costs of the rotating machine 101.

Further, in cases where the rotor rotational speed VRO becomes too high, e.g. during rapid acceleration of the vehicle in which the engine speed NE is higher than the vehicle speed VP, the speed position of the transmission 191 is controlled to the first speed. With this, according to the present embodiment, the first sun gear rotational speed VSU1 is increased with respect to the vehicle speed VP, whereby as is apparent from FIG. 58, it is possible to reduce the rotor rotational speed VRO, so that it is possible to prevent failure of the rotating machine 101 from being caused by the rotor rotational speed VRO becoming too high.

Furthermore, during traveling of the vehicle including the EV traveling and the ENG traveling, the speed position of the transmission 191 is controlled such that the rotor rotational speed VRO becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-mentioned map according to the engine speed NE and the vehicle speed VP. Further, in these maps, the target value is set to such a value that will make it possible to obtain high efficiency of the rotating machine 101 with respect to the vehicle speed VP (and engine speed NE) assumed at the time. Furthermore, in parallel with the above-described control of the transmission 191, the rotor rotational speed VRO is controlled to the above-mentioned target value.

With this, according to the present embodiment, during traveling of the vehicle, it is possible to obtain the high efficiency of the rotating machine 101.

Furthermore, during the ENG traveling, and at the same time during the speed-changing operation of the transmission 191, the gear trains of the transmission 191 and the input shaft 192 and output shaft thereof are disconnected from each other to thereby disconnect between the first sun gear S1 and the drive wheels DW and DW, whereby the load of the drive wheels DW and DW ceases to act on the first sun gear S1. Therefore, no electric power is generated by the rotating machine 101 during the speed-changing operation of the transmission 191, and the stator 33 of the second rotating machine 31 is supplied with electric power from the battery 43.

With this, according to the present embodiment, during the speed-changing operation of the transmission 191, the second driving equivalent torque TSE2 and the engine torque TENG transmitted to the B1 rotor 34 are combined, and the combined torque is transmitted to the drive wheels DW and DW via the B2 rotor 35. This makes it possible to suppress a speed-change shock, which can be caused by interruption of transmission of the engine torque TENG to the drive wheels DW and DW, thereby making it possible to improve marketability.

Further, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 191. This makes it possible to enhance the driving efficiency of the power plant 1R. In addition to this, according to the present embodiment, it is possible to obtain the same advantageous effects as provided by the fifteenth embodiment.

It should be noted that although in the seventeenth to nineteenth embodiments, the transmissions 171 to 191 are gear-type stepped transmissions, it is to be understood that a belt-type, toroidal-type or hydraulic-type stepless transmission may be employed.

Next, a power plant 1S according to a twentieth embodiment of the present invention will be described with reference to FIG. 64. This power plant 1S is distinguished from the fifteenth embodiment mainly in that it further includes a transmission for changing a ratio between the speed difference between the rotor rotational speed VRO and the vehicle speed VP and the speed difference between the vehicle speed VP and the engine speed NE. The following description is mainly given of different points from the fifteenth embodiment.

Figure 64:
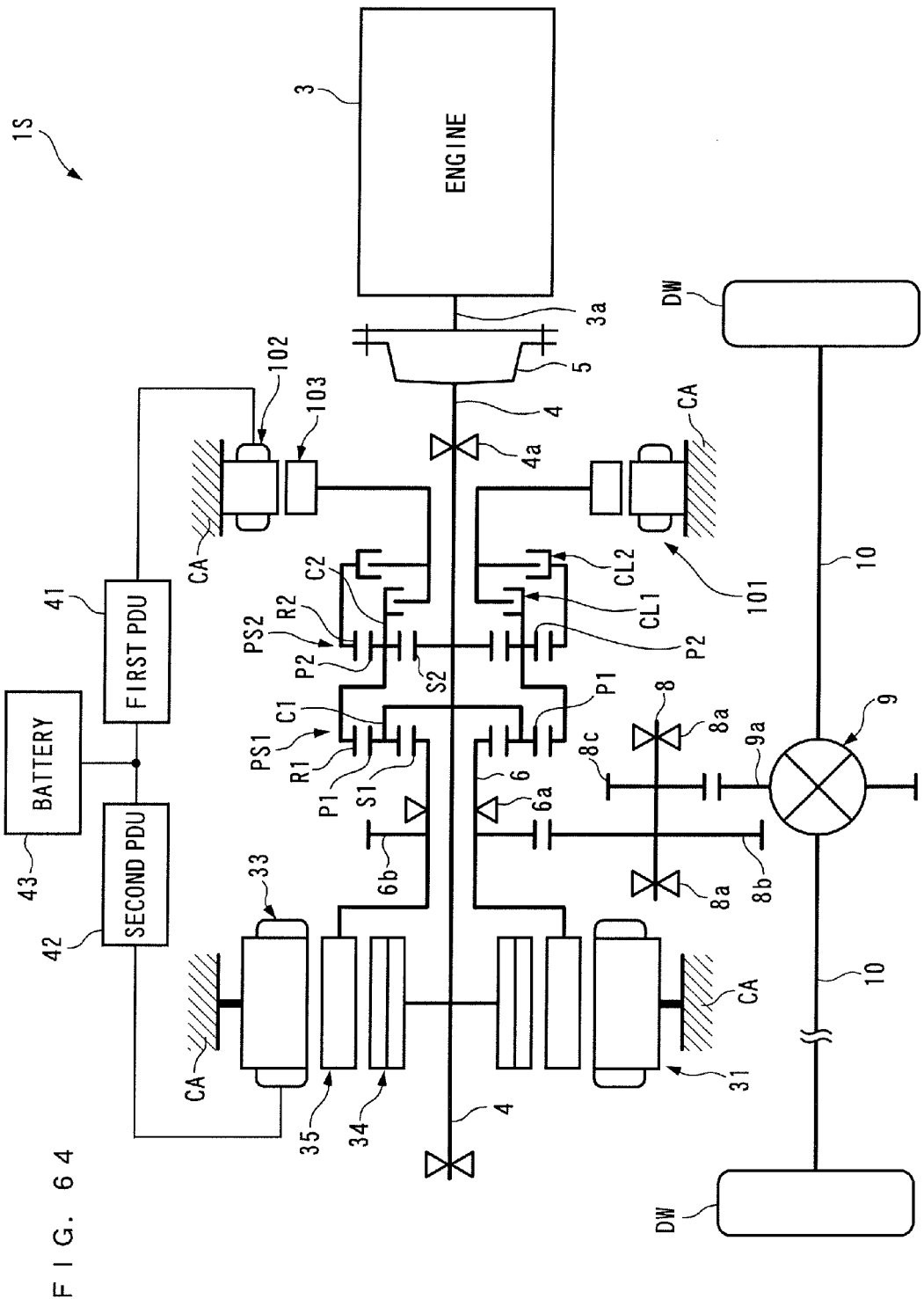
[FIG. 64] A schematic diagram of a power plant according to a twentieth embodiment of the present invention.

As shown in FIG. 64, in this power plant 1S, similarly to the eighteenth embodiment, the second rotating shaft 7 is not provided, and the first gear 8b is in mesh with the gear 6b integrally formed with the connection shaft 6, whereby the first sun gear S1 and the B2 rotor 35 are mechanically connected to the drive wheels DW and DW via the connection shaft 6, the gear 6b, the first gear 8b, the differential gear mechanism 9, and so forth.

Similarly to the transmission described in the thirteenth embodiment, the above-described transmission includes the second planetary gear unit PS2, and the first and second clutches CL1 and CL2. The second sun gear S2 is integrally formed on the first rotating shaft 4, whereby the second sun gear S2 is mechanically directly connected to the first carrier C1, the crankshaft 3a and the B1 rotor 34. Further, the second carrier C2 is mechanically directly connected to the first ring gear R1 via a flange and a hollow shaft, whereby the second carrier C2 is rotatable in unison with the first ring gear R1.

The first clutch CL1 is disposed between the second carrier C2 and the rotor 103. That is, the second carrier C2 is mechanically directly connected to the rotor 103 via the first clutch CL1. Further, the first clutch CL1 has its degree of engagement controlled by the ECU 2 to thereby connect and disconnect between the second carrier C2 and the rotor 103. The second clutch CL2 is disposed between the second ring gear R2 and the rotor 103. That is, the second ring gear R2 is mechanically directly connected to the rotor 103 via the second clutch CL2. Further, the second clutch CL2 has its degree of engagement controlled by the ECU 2 to thereby connect and disconnect between the second ring gear R2 and the rotor 103.

As described above, the rotor 103 of the rotating machine 101 is mechanically connected to the first ring gear R1 via the first clutch CL1 and the second carrier C2, and is mechanically connected to the first ring gear R1 via the second clutch CL2, the second ring gear R2, the second planetary gears P2, and the second carrier C2. It should be noted that in the present embodiment, the second planetary gear unit PS2, the second sun gear S2, the second ring gear R2, the second planetary gears P2, and the second carrier C2 correspond to a planetary gear unit, a sun gear, a ring gear, a planetary gears, and a carrier in the invention as claimed in claim 18, respectively.

Figure 65:
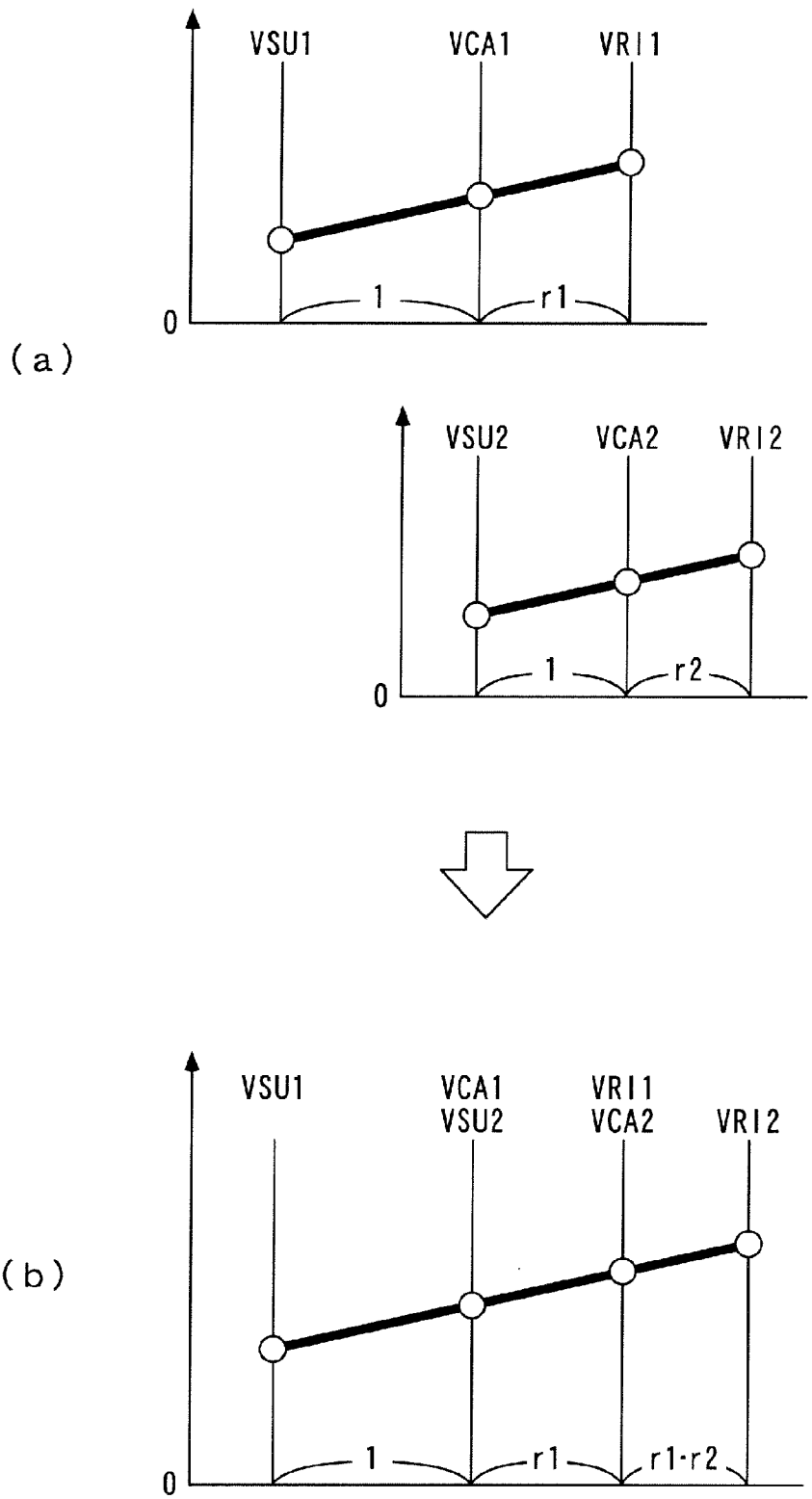
[FIG. 65] (a) A velocity nomograph illustrating an example of the relationship between the first sun gear rotational speed, the first carrier rotational speed and the first ring gear rotational speed, depicted together with a velocity nomograph illustrating an example of the relationship between the second sun gear rotational speed, the second carrier rotational speed and the second ring gear rotational speed; and (b) a velocity nomograph illustrating an example of the relationship between the rotational speeds of four rotary elements formed by connecting first and second planetary gear units of the power plant shown in FIG. 64.

FIG. 65(a) shows a velocity nomograph illustrating an example of the relationship between the first sun gear rotational speed VSU1, the first carrier rotational speed VCA1 and the first ring gear rotational speed VRI1, depicted together with a velocity nomograph illustrating an example of the relationship between the second sun gear rotational speed VSU2, the second carrier rotational speed VCA2 and the second ring gear rotational speed VRI2. As described above, since the first carrier C1 and the second sun gear S2 are directly connected to each other, the first carrier rotational speed VCA1 and the second sun gear rotational speed VSU2 are equal to each other, and since the first ring gear R1 and the second carrier C2 are directly connected to each other, the first ring gear rotational speed VRI1 and the second carrier rotational speed VCA2 are equal to each other. Therefore, the two velocity nomographs concerning the first and second planetary gear units PS1 and PS2 shown in FIG. 65(a) can be represented by a single velocity nomograph as shown in FIG. 65(b). As shown in FIG. 65(b), four rotary elements of which rotational speeds are in a collinear relationship with each other are formed by connecting the various rotary elements of the first and second planetary gear units PS1 and PS2 described above.

Figure 66:
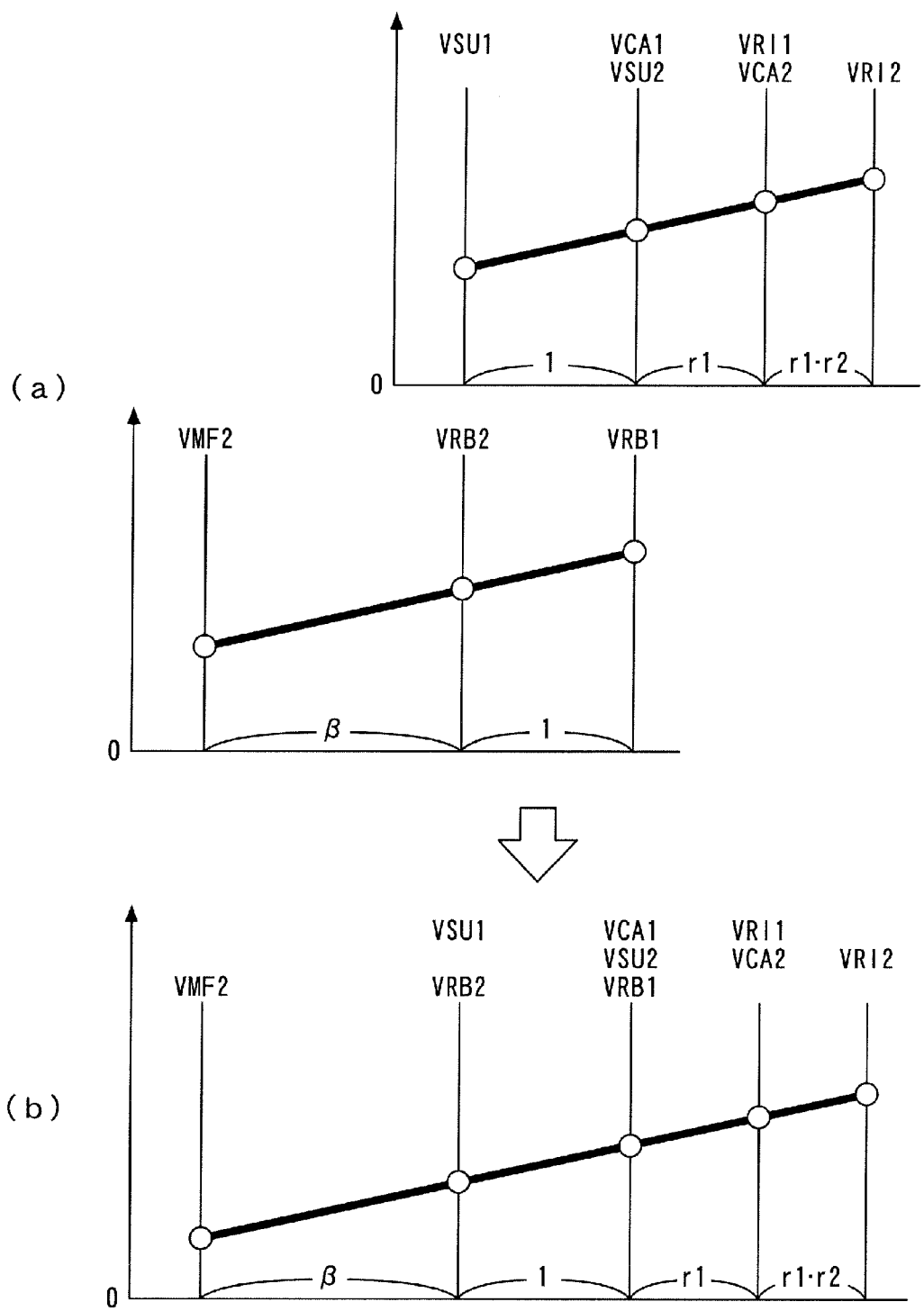
[FIG. 66] (a) A velocity nomograph illustrating an example of the relationship between the rotational speeds of the four rotary elements formed by connecting the first and second planetary gear units of the power plant shown in FIG. 64, depicted together with a velocity nomograph illustrating an example of the relationship between a second magnetic field rotational speed, and B1 and B2 rotor rotational speeds; and (b) a velocity nomograph illustrating an example of the relationship between the rotational speeds of five rotary elements formed by connecting a second rotating machine, and the first and second planetary gear units of the power plant shown in FIG. 64.

Further, FIG. 66(a) shows a velocity nomograph illustrating an example of the relationship between the rotational speeds of the above-mentioned four rotary elements, depicted together with a velocity nomograph illustrating an example of the relationship between the second magnetic field rotational speed VMF2 and the B1 and B2 rotor rotational speeds VRB1 and VRB2. As described above, since the first carrier C1 and the B1 rotor 34 are directly connected to each other, the first carrier rotational speed VCA1 and the B1 rotor rotational speed VRB1 are equal to each other. Further, since the first sun gear S1 and the B2 rotor 35 are directly connected to each other, the first sun gear rotational speed VSU1 and the B2 rotor rotational speed VRB2 are equal to each other. Therefore, the two velocity nomographs shown in FIG. 66(a) can be represented by a single velocity nomograph as shown in FIG. 66(b).

Further, since the crankshaft 3a, the first carrier C1, the B1 rotor 34 and the second sun gear S2 are directly connected to each other, the engine speed NE, the first carrier rotational speed VCA1, the B1 rotor rotational speed VRB1 and the second sun gear rotational speed VSU2 are equal to each other. Furthermore, since the drive wheels DW and DW, the first sun gear S1 and the B2 rotor 35 are connected to each other, assuming that there is no transmission loss caused by the gears or the like, the vehicle speed VP, the first sun gear rotational speed VSU1 and the B2 rotor rotational speed VRB2 are equal to each other.

Further, the rotor 103 is directly connected to the second carrier C2 and the second ring gear R2 via the first and second clutches CL1 and CL2, respectively, and hence when the first clutch CL1 is engaged and the second clutch CL2 is disengaged (hereinafter, such an engaged and disengaged state of the clutches is referred to as the "first speed change mode"), the rotor rotational speed VRO and the second carrier rotational speed VCA2 are equal to each other. Furthermore, when the first clutch CL1 is disengaged and the second clutch CL2 is engaged (hereinafter, such an engaged and disengaged state of the clutches is referred to as the "second speed change mode"), the rotor rotational speed VRO and the second ring gear rotational speed VRI2 are equal to each other.

From the above, the rotor rotational speed VRO, the engine speed NE, the vehicle speed VP, and the second magnetic field rotational speed VMF2 are in a collinear relationship as shown e.g. in FIG. 67(a) in the first speed change mode, whereas in the second speed change mode, they are in a collinear relationship as shown e.g. in FIG. 67(b).

As shown in FIGS. 67(a) and 67(b), the distance between the vertical line representing the vehicle speed VP and the vertical line representing the rotor rotational speed VRO in the velocity nomographs is shorter in the first speed change mode than in the second speed change mode, and therefore a ratio between the rotational difference DN2 between the rotor rotational speed VRO and the vehicle speed VP and the rotational difference DN1 between the engine speed NE and the vehicle speed VP (hereinafter referred to as the "rotational ratio DN2/DN1) is smaller in the first speed change mode.

In the power plant 1S constructed as above, in cases where the rotor rotational speed VRO which is determined by the relationship between the engine speed NE and the vehicle speed VP becomes too high, e.g. during rapid acceleration of the vehicle in which the engine speed NE is higher than the vehicle speed VP, the first speed change mode is used. With this, according to the present embodiment, as is clear from the relationship of the above-mentioned rotational ratio DN2/DN1, the rotor rotational speed VRO can be made lower than when the second speed change mode is used, so that it is possible to prevent failure of the rotating machine 101 from being caused by the rotor rotational speed VRO becoming too high.

Further, the relationship between the rotational speeds and torques of the various rotary elements of the power plant 1S at the time of the ENG start during EV traveling, when the torque demanded of the rotating machine 101 becomes large is represented by FIG. 68(a) and FIG. 68(b) for the respective cases of use of the first and second speed change modes. In this case, when the first speed change mode is used, the torque demanded of the rotating machine 101, i.e. the rotating machine torque TMOT is expressed by the aforementioned equation (64). On the other hand, when the second speed change mode is used, the rotating machine torque TMOT is expressed by the following equation (66):

$$TMOT=-\{\beta \cdot TDDW+(1+\beta)TDENG\}/(r1 \cdot r2+r1+1+\beta) \quad (66)$$

As is apparent from a comparison between the equations (64) and (66), the rotating machine torque TMOT is smaller in the second speed change mode with respect to the drive wheel-transmitted torque TDDW and the engine-transmitted torque TDENG assuming that the respective magnitudes thereof are unchanged. Therefore, the second speed change mode is used at the time of the ENG start during EV traveling.

According to the present embodiment, the second speed change mode is used as described above, and the electric power generated by the rotating machine 101 is controlled based on the above-mentioned equation (66). Therefore, it is possible to reduce the maximum value of torque demanded of the rotating machine 101 to thereby further reduce the size and costs of the rotating machine 101.

Further, during traveling of the vehicle including the EV traveling and the ENG traveling, a speed change mode that will make it possible to obtain higher efficiency of the rotating machine 101 is selected from the first and second speed change modes, according the vehicle speed VP during stoppage of the engine 3, and according to the vehicle speed VP and the engine speed NE during operation of the engine 3. With this, according to the present embodiment, it is possible to control the rotor rotational speed VRO to an appropriate value, and hence it is possible to obtain a high efficiency of the rotating machine 101.

Furthermore, similarly to the thirteenth embodiment, the switching between the first and second speed change modes is performed when the second carrier rotational speed VCA2 and the second ring gear rotational speed VRI2 are equal to each other. With this, according to the present embodiment, it is possible to smoothly switch between the first and second speed change modes while maintaining the respective rotations of the drive wheels DW and DW and the engine 3, thereby making it possible to ensure excellent drivability.

Further, during the ENG traveling and at the same time during transition between the first and second speed change modes, after both of the first and second clutches CL 1 and CL2 are disengaged and until one of the first and second clutches CL1 and CL2 is engaged, the rotor 103 and the crankshaft 3a remain disconnected from each other, whereby the engine torque TENG does not act on the rotor 103. Therefore, no electric power is generated by the stator 102 of the rotating machine 101, and the stator 33 of the second rotating machine 31 is supplied with electric power from the battery 43.

With this, according to the present embodiment, during transition between the first and second speed change modes, even when both of the first and second clutches CL1 and CL2 are disengaged, the second driving equivalent torque TSE2 and the engine torque TENG transmitted to the B1 rotor 34 are combined, and the combined torque is transmitted to the drive wheels DW and DW via the B2 rotor 35. This makes it possible to suppress a speed-change shock, which can be caused by interruption of transmission of the engine torque TENG to the drive wheels DW and DW, thereby making it possible to improve marketability. In addition, according to the present embodiment, it is possible to obtain the same advantageous effects as provided by the fifteenth embodiment.

Further, although in the present embodiment, the second sun gear S2 is connected to the first carrier C1, and the second ring gear R2 is connected to the rotor 103 via the second clutch CL2, the above connection relationships may be inverted, that is, the second ring gear R2 may be connected to the first carrier C1 while the second sun gear S2 may be connected to the rotor 103 via the second clutch CL2. Further, although in the present embodiment, the first and second clutches CL1 and CL2 are formed by friction multiple disk clutches, they may be formed e.g. by electromagnetic clutches.

Next, a power plant 1T according to a twenty-first embodiment of the present invention will be described with reference to FIG. 69. This power plant 11 is distinguished from the fifteenth embodiment mainly in that it further includes a transmission 201. The following description is mainly given of different points from the fifteenth embodiment.

Figure 69:
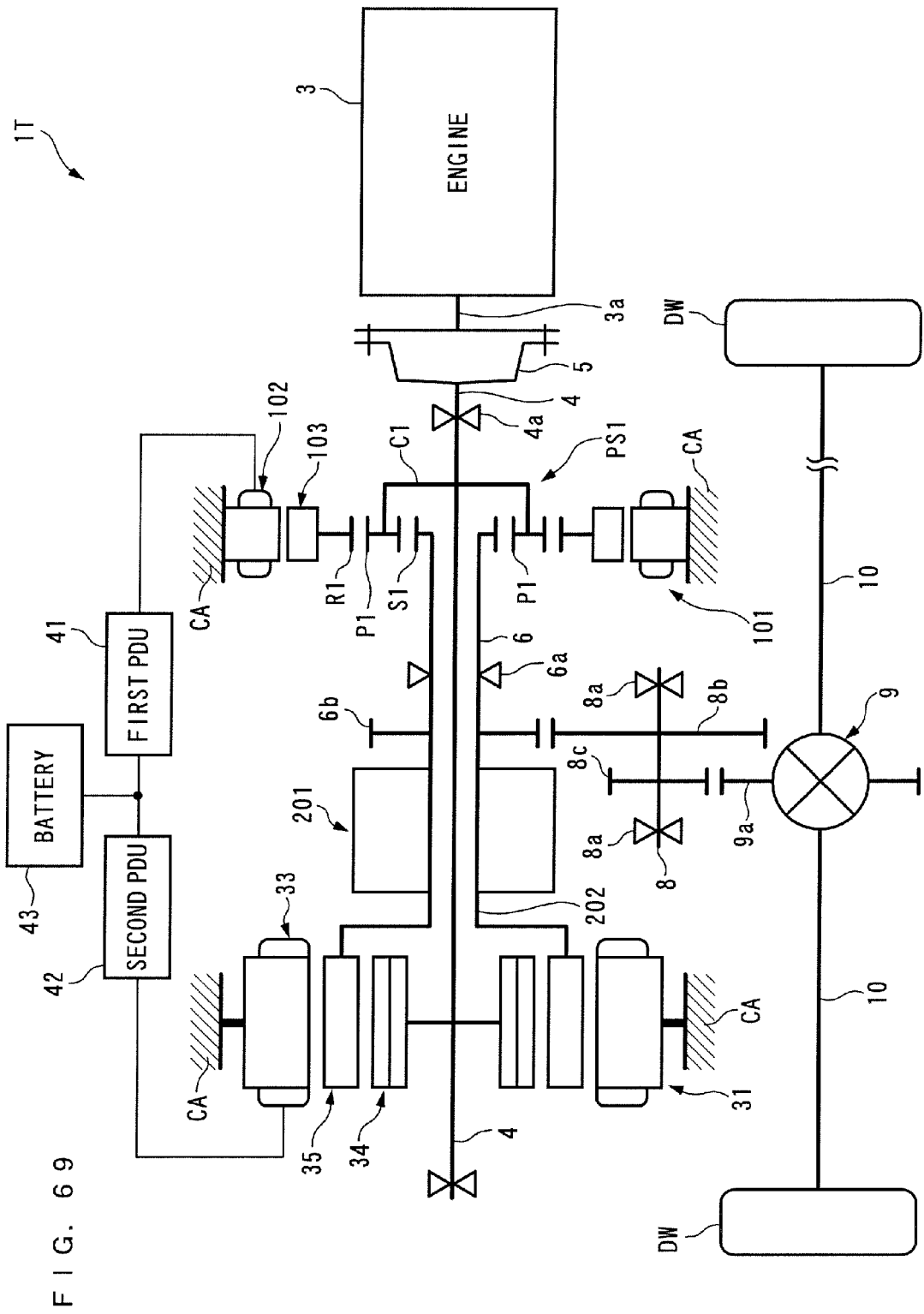
[FIG. 69] A schematic diagram of a power plant according to a twenty-first embodiment of the present invention.

As shown in FIG. 69, similarly to the eighteenth to twentieth embodiments, this power plant 1T is not provided with the second rotating shaft 7, and the first gear 8b is in mesh with the gear 6b integrally formed with the connection shaft 6. With this, the first sun gear S1 is mechanically connected to the drive wheels DW and DW via the connection shaft 6, the gear 6b, the first gear 8b, the differential gear mechanism 9, and so forth, without via the above-described transmission 201.

Further, the transmission 201 is a gear-type stepped transmission which is configured similarly to the transmission 131 according to the tenth embodiment and has speed positions of the first to third speeds. The transmission 201 includes an input shaft 202 directly connected to the B2 rotor 35, and an output shaft (not shown) directly connected to the connection shaft 6, and transmits motive power input to the input shaft 202 to the output shaft while changing the speed of the motive power. Furthermore, the ECU 2 controls a change between the speed positions of the transmission 201.

As described above, the B2 rotor 35 is connected to the drive wheels DW and DW via the transmission 201, the connection shaft 6, the gear 6b, the first gear 8b, and so forth. Motive power transmitted to the B2 rotor 35 is transmitted to the drive wheels DW and DW while having the speed thereof changed by the transmission 201. It should be noted that in the present embodiment, the transmission 201 corresponds to a transmission in the invention as claimed in claim 19.

In the power plant 1T constructed as above, in cases where a very large torque is transmitted from the B2 rotor 35 to the drive wheels DW and DW, e.g. during the EV standing start and the ENG-based standing start, the speed position of the transmission 201 is controlled to the first speed (transmission ratio>1.0). With this, the B2 rotor-transmitted torque TRB2 transmitted to the B2 rotor 35 is increased by the transmission 201, and is then transmitted to the drive wheels DW and DW. In accordance therewith, electric power supplied to the stator 33 of the second rotating machine 31 is controlled such that the B2 rotor-transmitted torque TRB2 becomes smaller. As a consequence, according to the present invention, it is possible to reduce the maximum value of torque required of the second rotating machine 31, thereby making it possible to further reduce the size and costs of the second rotating machine 31.

Further, in cases where the B2 rotor rotational speed VRB2 becomes too high, e.g. during the high-vehicle speed operation in which the vehicle speed VP is very high, the speed position of the transmission 201 is controlled to the third speed (transmission ratio<1.0). With this, according to the present embodiment, since the B2 rotor rotational speed VRB2 can be lowered with respect to the vehicle speed VP, it is possible to prevent failure of the second rotating machine 31 from being caused by the B2 rotor rotational speed VRB2 becoming too high.

Furthermore, during traveling of the vehicle including the EV traveling and the ENG traveling, the speed position of the transmission 201 is controlled such that the second magnetic field rotational speed VMF2 becomes equal to a predetermined target value. This target value is calculated by searching a map according to the vehicle speed VP when only the rotating machine 101 and the second rotating machine 31 are used as motive power sources, whereas when the engine 3, the rotating machine 101 and the second rotating machine 31 are used as motive power sources, the target value is calculated by searching a map other than the above-mentioned map according to the engine speed NE and the vehicle speed VP. Further, in these maps, the target value is set to such a value that will make it possible to obtain high efficiency of the second rotating machine 31 with respect to the vehicle speed VP (and engine speed NE) assumed at the time. Furthermore, in parallel with the above-described control of the transmission 201, the second magnetic field rotational speed VMF2 is controlled to the above-mentioned target value. With this, according to the present embodiment, during traveling of the vehicle, it is possible to obtain the high efficiency of the second rotating machine 31.

Further, during the ENG traveling, and at the same time during the speed-changing operation of the transmission 201 (after the input shaft 202 and output shaft of the transmission 201 are disconnected from a gear train selected before a speed change and until the input shaft 202 and the output shaft are connected to a gear train selected for the speed change), that is, when the B2 rotor 35 and the drive wheels DW and DW are disconnected from each other by the transmission 201, as described as to the fifteenth embodiment, part of the engine torque TENG is transmitted to the drive wheels DW and DW via the first sun gear S1. With this, according to the present embodiment, during the speed-changing operation of the transmission 201, it is possible to suppress a speed-change shock, which can be caused by interruption of transmission of the engine torque TENG to the drive wheels DW and DW. This makes it possible to improve marketability.

Furthermore, similarly to the fifteenth embodiment, by using the rotating machine 101, the first planetary gear unit PS1 and the second rotating machine 31, it is possible to transmit the engine motive power to the drive wheels DW and DW while steplessly changing the speed thereof, so that it is possible to reduce the frequency of the speed-changing operation of the transmission 201. This makes it possible to enhance the driving efficiency of the power plant 1T. In addition, according to the present embodiment, it is possible to obtain the same advantageous effects as provided by the fifteenth embodiment.

It should be noted that although in the present embodiment, the transmission 201 is a gear-type stepped transmission, it is to be understood that a belt-type, toroidal-type or hydraulic-type stepless transmission may be employed.

Figure 70:
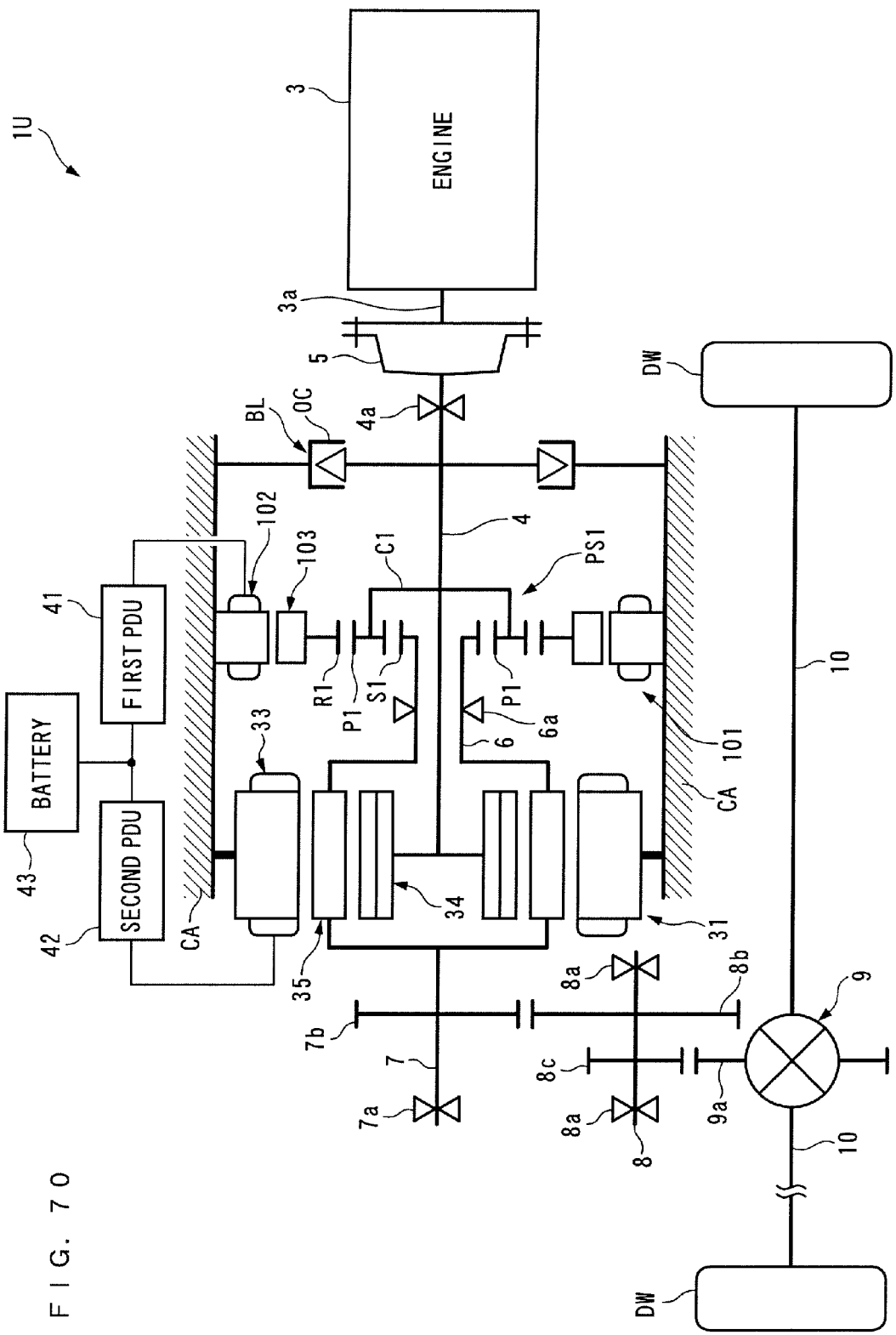
[FIG. 70] A schematic diagram of a power plant according to a twenty-second embodiment of the present invention.
Figure 71:
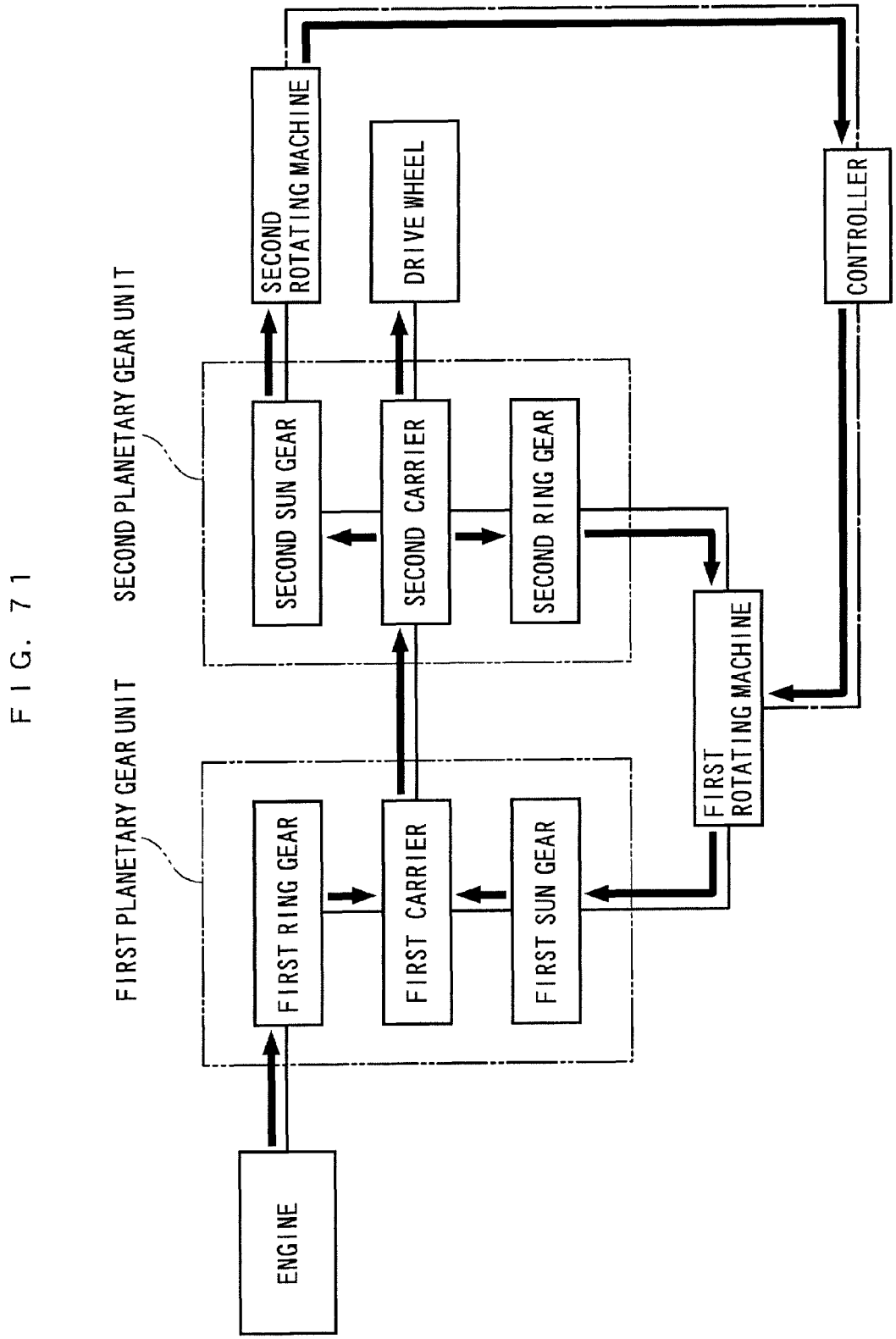
[FIG. 71] A diagram which is useful in explaining an example of the operation of the conventional power plant.
Figure 72:
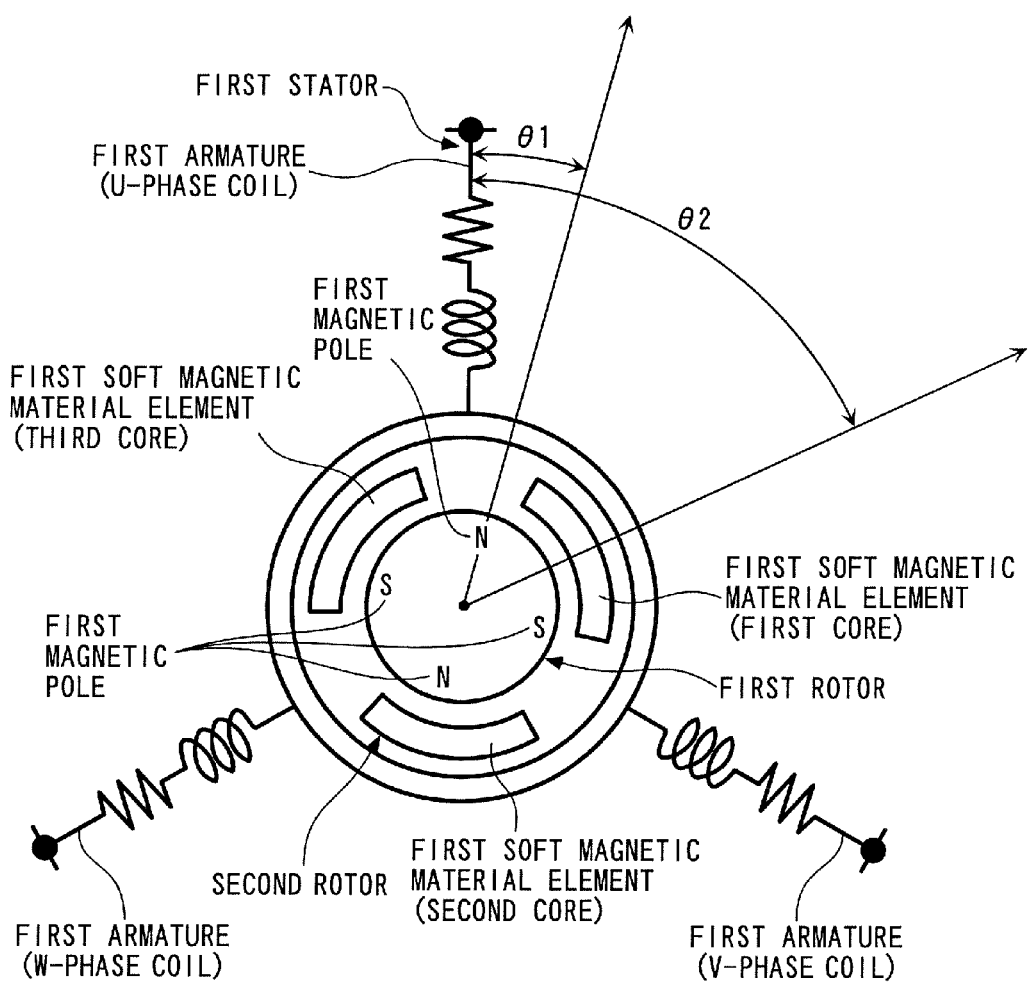
[FIG. 72] A diagram showing an equivalent circuit of the first rotating machine of the present invention.
Figure 74:
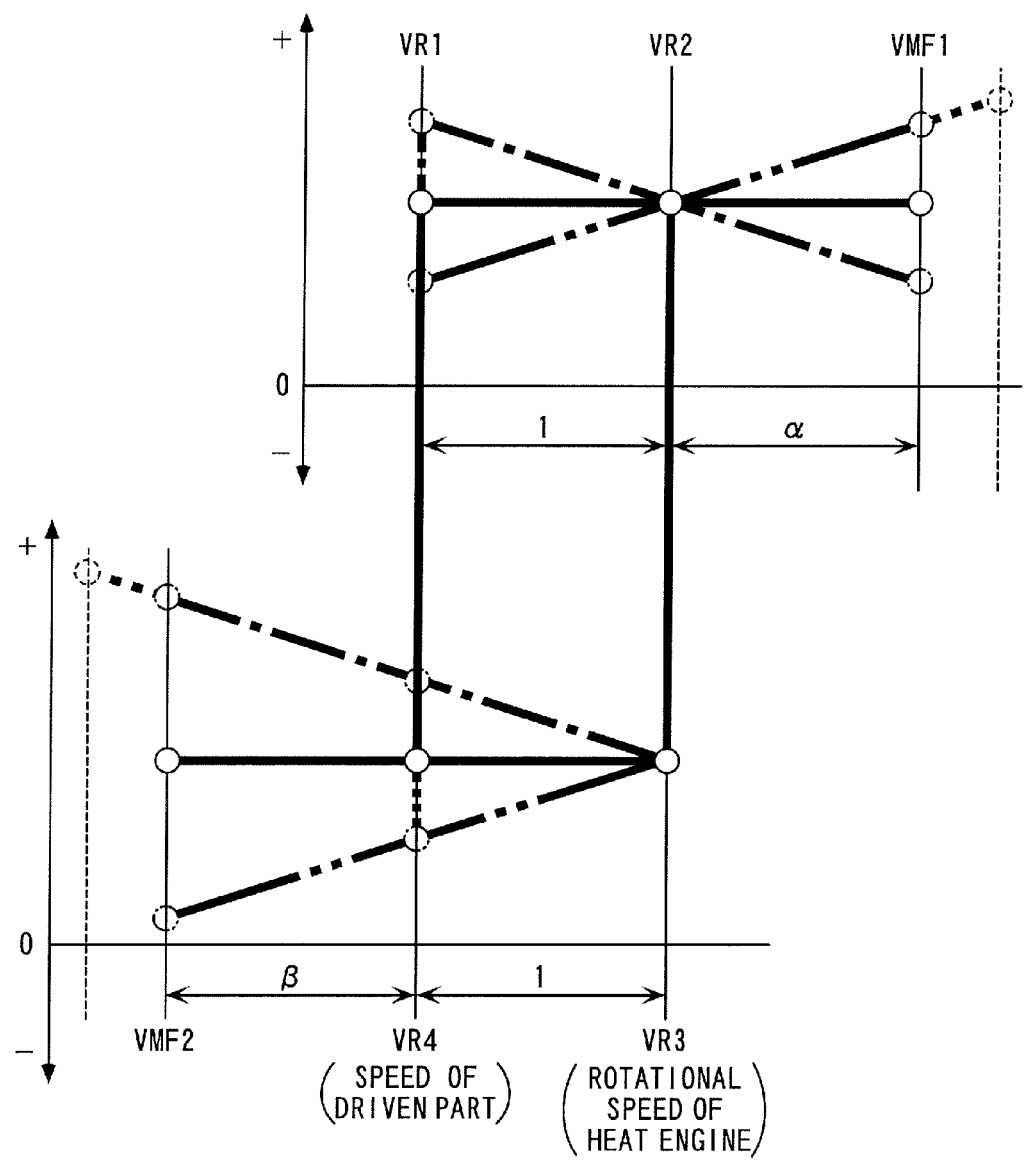
[FIG. 74] A diagram which is useful in explaining a speed-changing operation of the power plant of the invention as claimed in claim 1.
Figure 75:
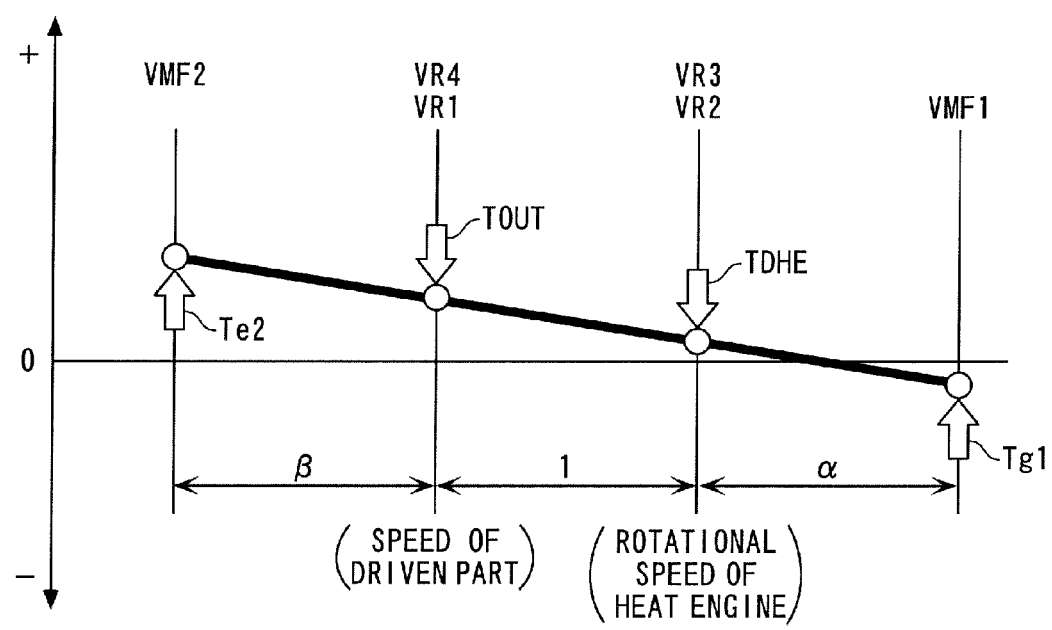
[FIG. 75] A diagram showing an example of the relationship between the rotational speeds and torques of various rotary elements of the power plant of the invention as claimed in claim 1 in a case where a heat engine is started during driving of driven parts by the first and second rotating machines.
Figure 76:
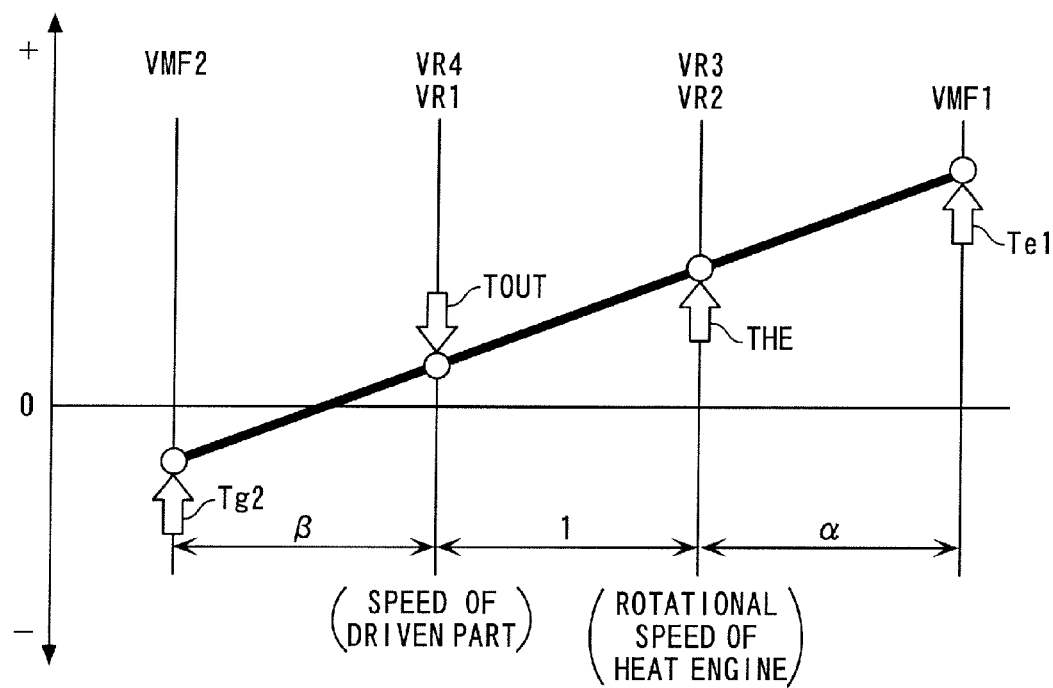
[FIG. 76] A diagram showing an example of the relationship between the rotational speeds and torques of the various rotary elements of the power plant of the invention as claimed in claim 1 in a case where the speed of the driven parts is rapidly increased.
Figure 77:
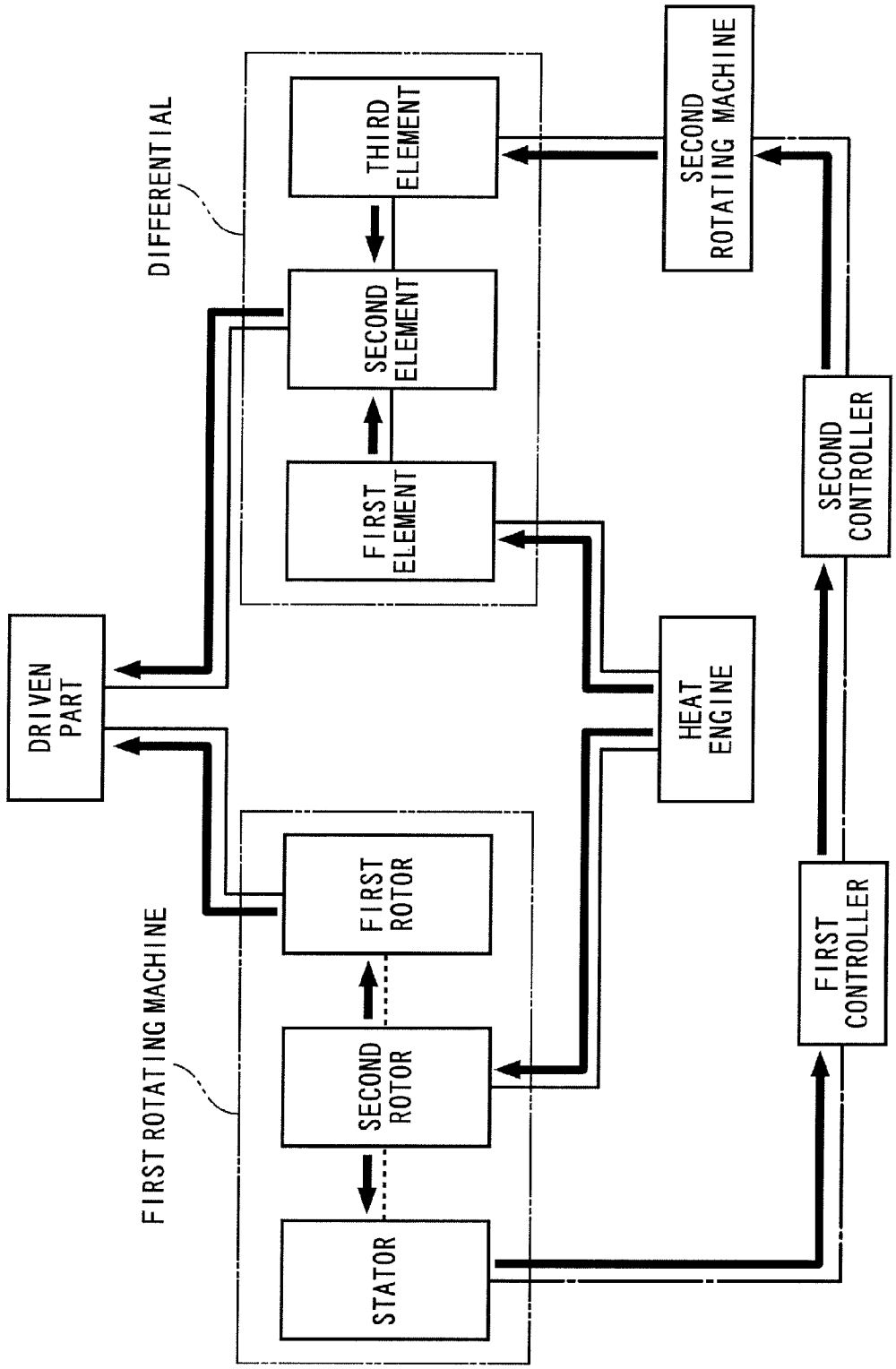
[FIG. 77] A diagram which is useful in explaining an example of the operation of a first power plant of the invention as claimed in claim 8.
Figure 78:
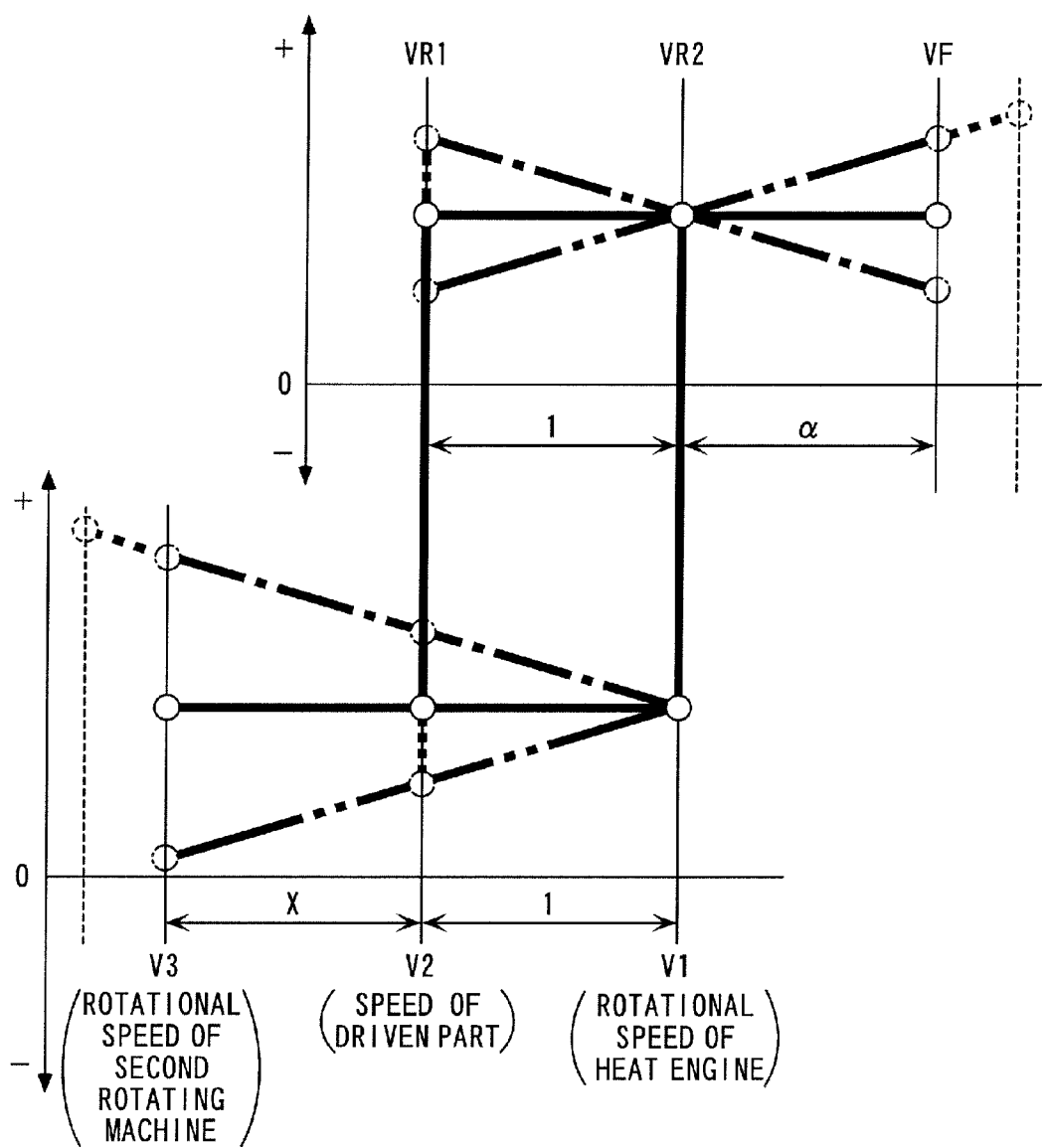
[FIG. 78] A diagram which is useful in explaining a speed-changing operation of the first power plant of the invention as claimed in claim 8.
Figure 79:
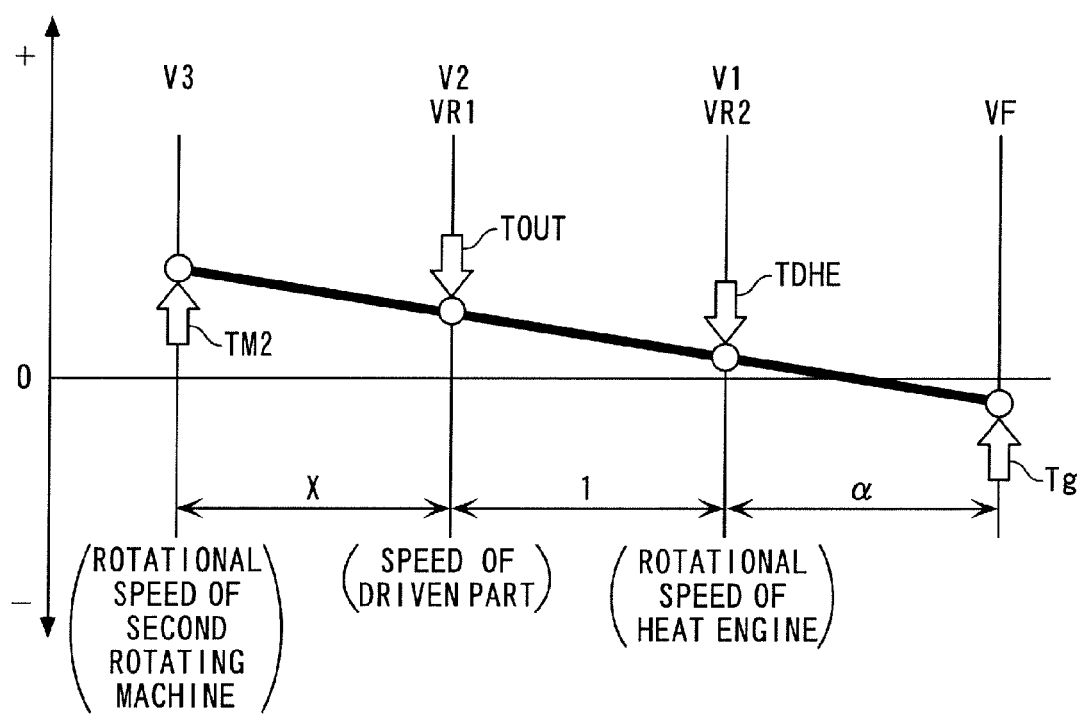
[FIG. 79] A diagram showing an example of the relationship between the rotational speeds and torques of various rotary elements of the first power plant of the invention as claimed in claim 8 in a case where the heat engine is started during driving of the driven parts by the first and second rotating machines.
Figure 80:
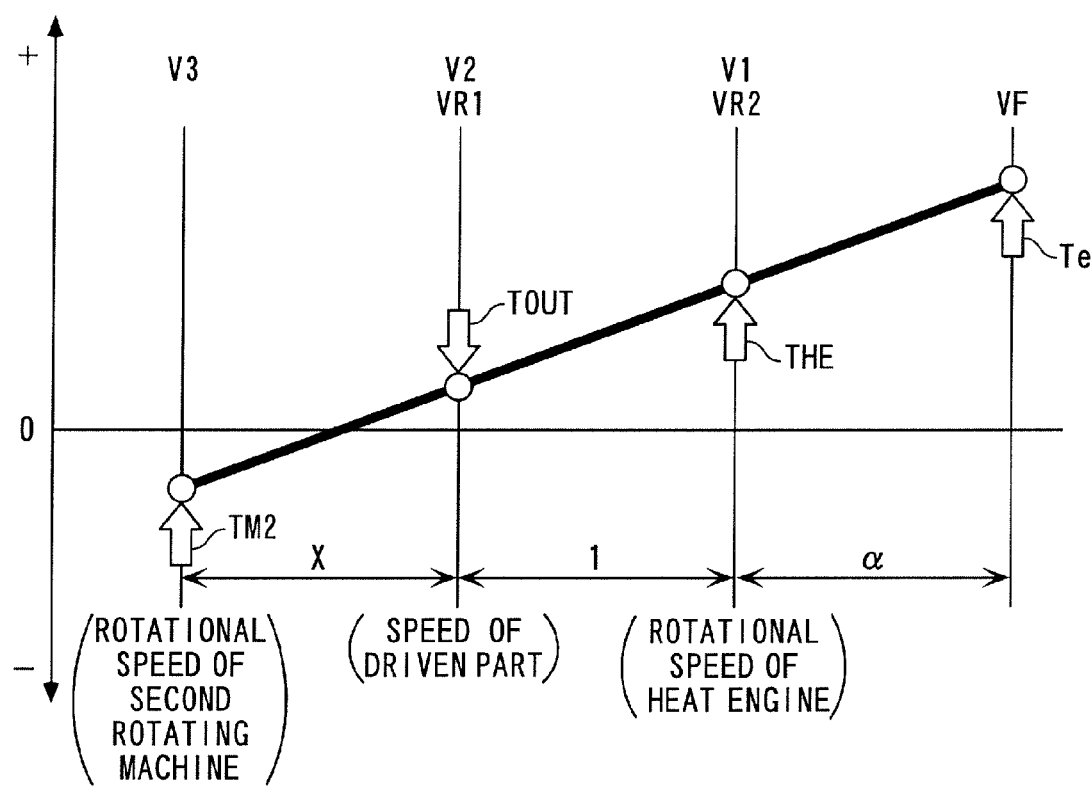
[FIG. 80] A diagram showing an example of the relationship between the rotational speeds and torques of the various rotary elements of the first power plant of the invention as claimed in claim 8 in the case where the speed of the driven parts is rapidly increased.
Figure 81:
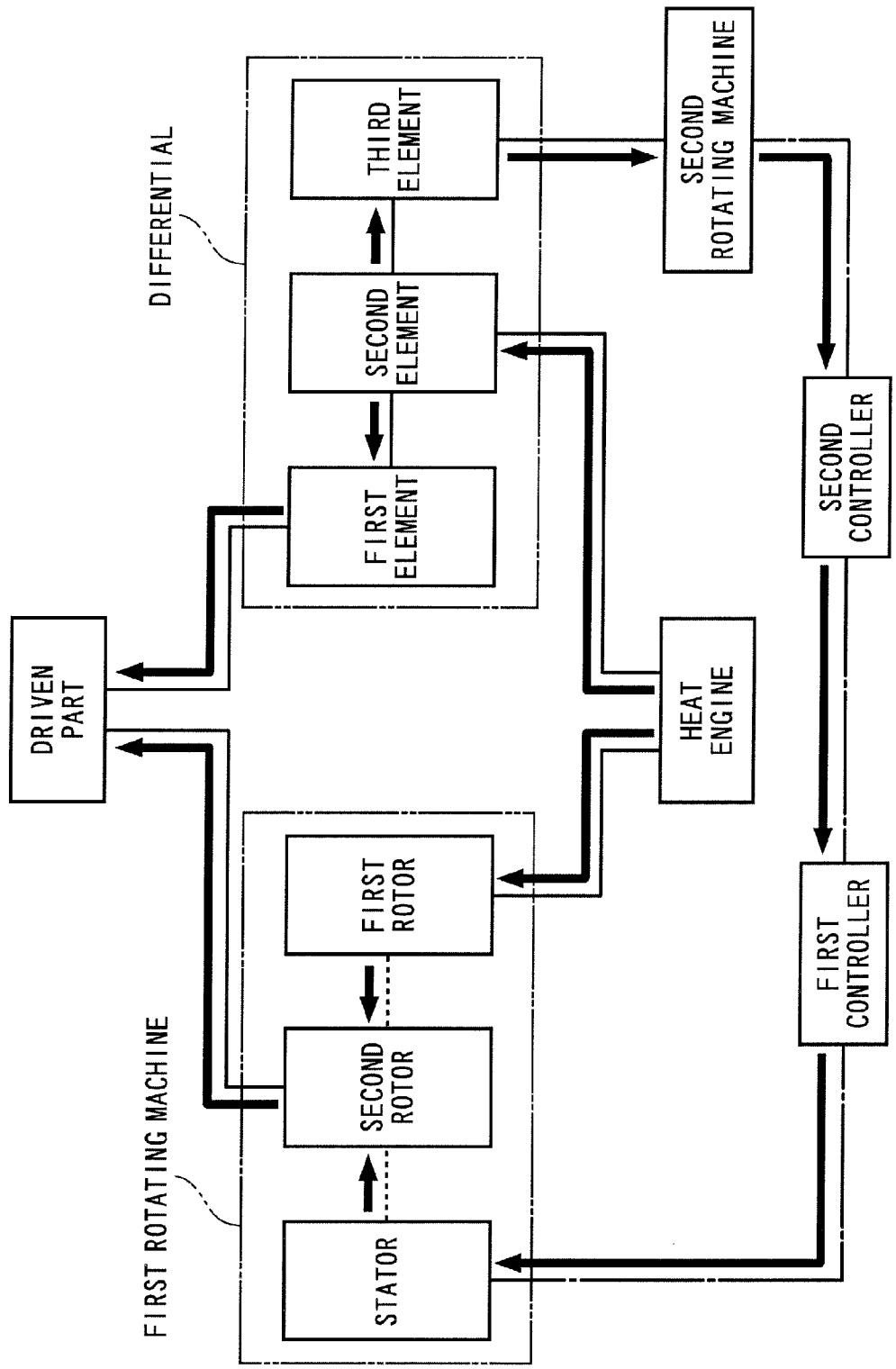
[FIG. 81] A diagram which is useful in explaining an example of the operation of a second power plant of the invention as claimed in claim 8.
Figure 82:
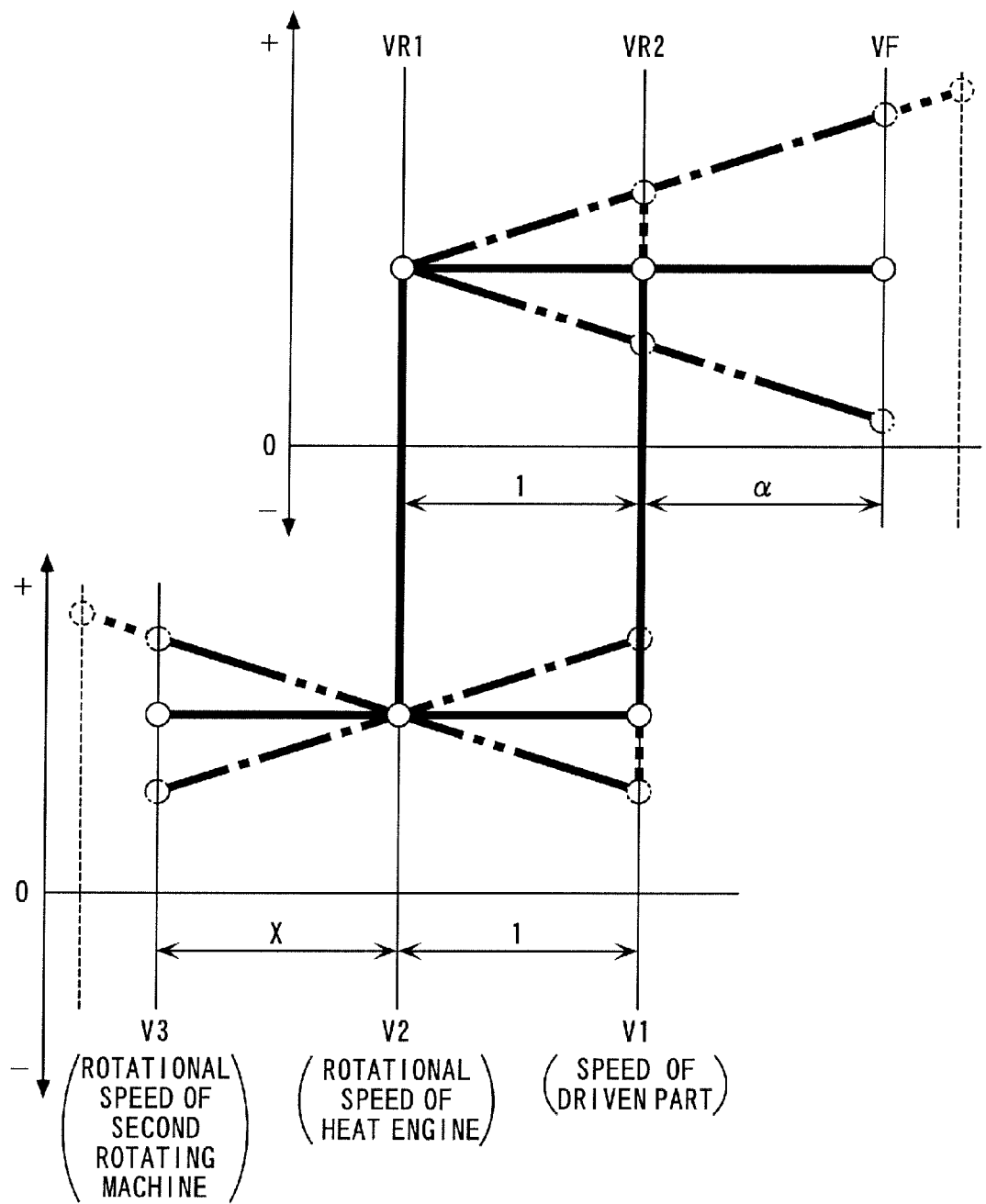
[FIG. 82] A diagram which is useful in explaining a speed-changing operation of the second power plant of the invention as claimed in claim 8.
Figure 83:
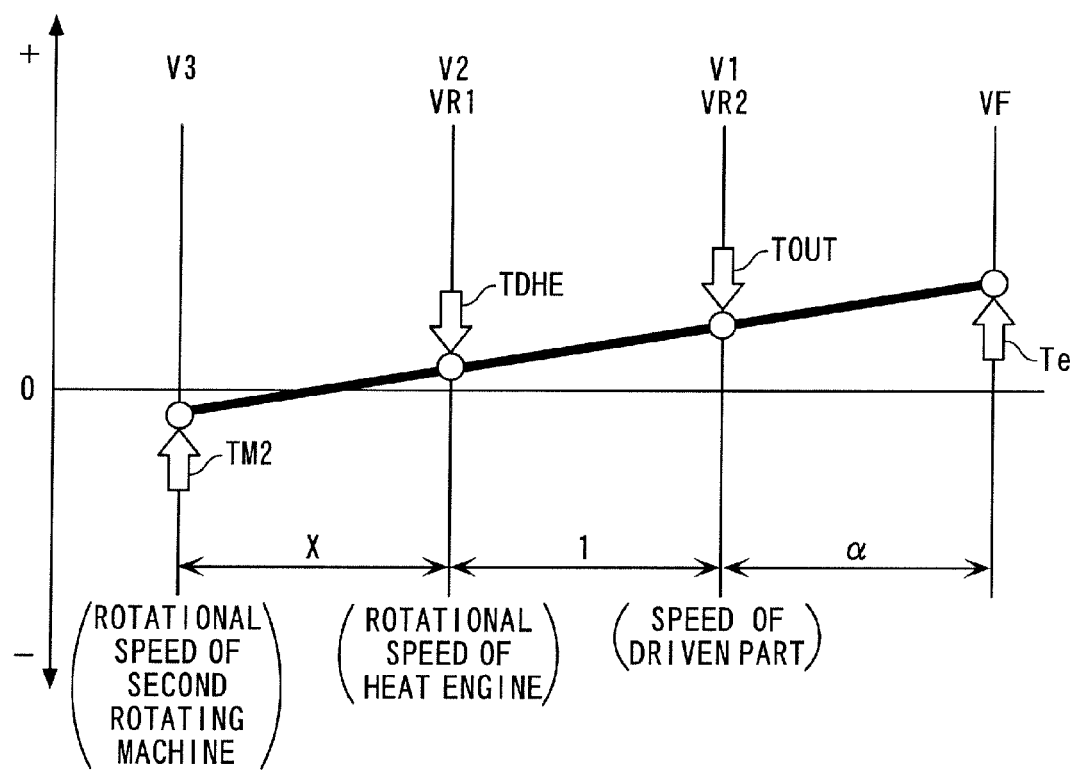
[FIG. 83] A diagram showing an example of the relationship between the rotational speeds and torques of various rotary elements of the second power plant of the invention as claimed in claim 8 in the case where the heat engine is started during driving of the driven parts by the first and second rotating machines.
Figure 84:
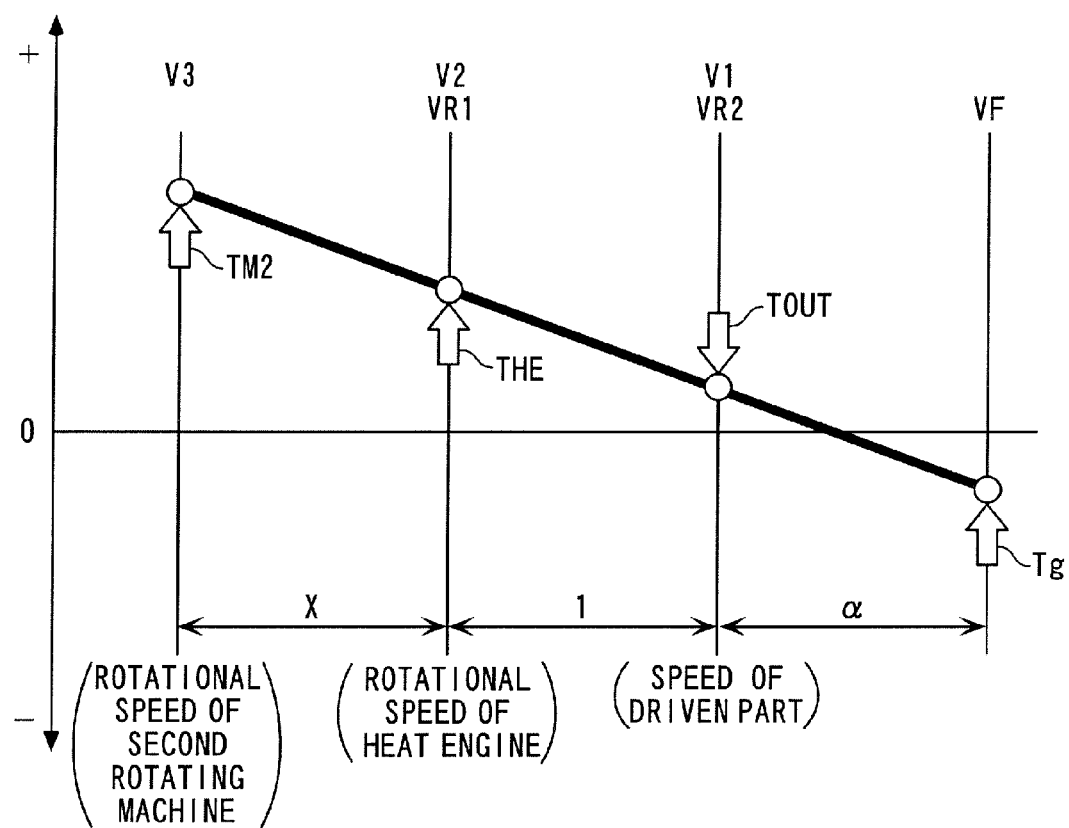
[FIG. 84] A diagram showing an example of the relationship between the rotational speeds of the various rotary elements of the second power plant of the invention as claimed in claim 8 and the relationship between torques thereof in the case where the speed of the driven parts is rapidly increased.
Figure 85:
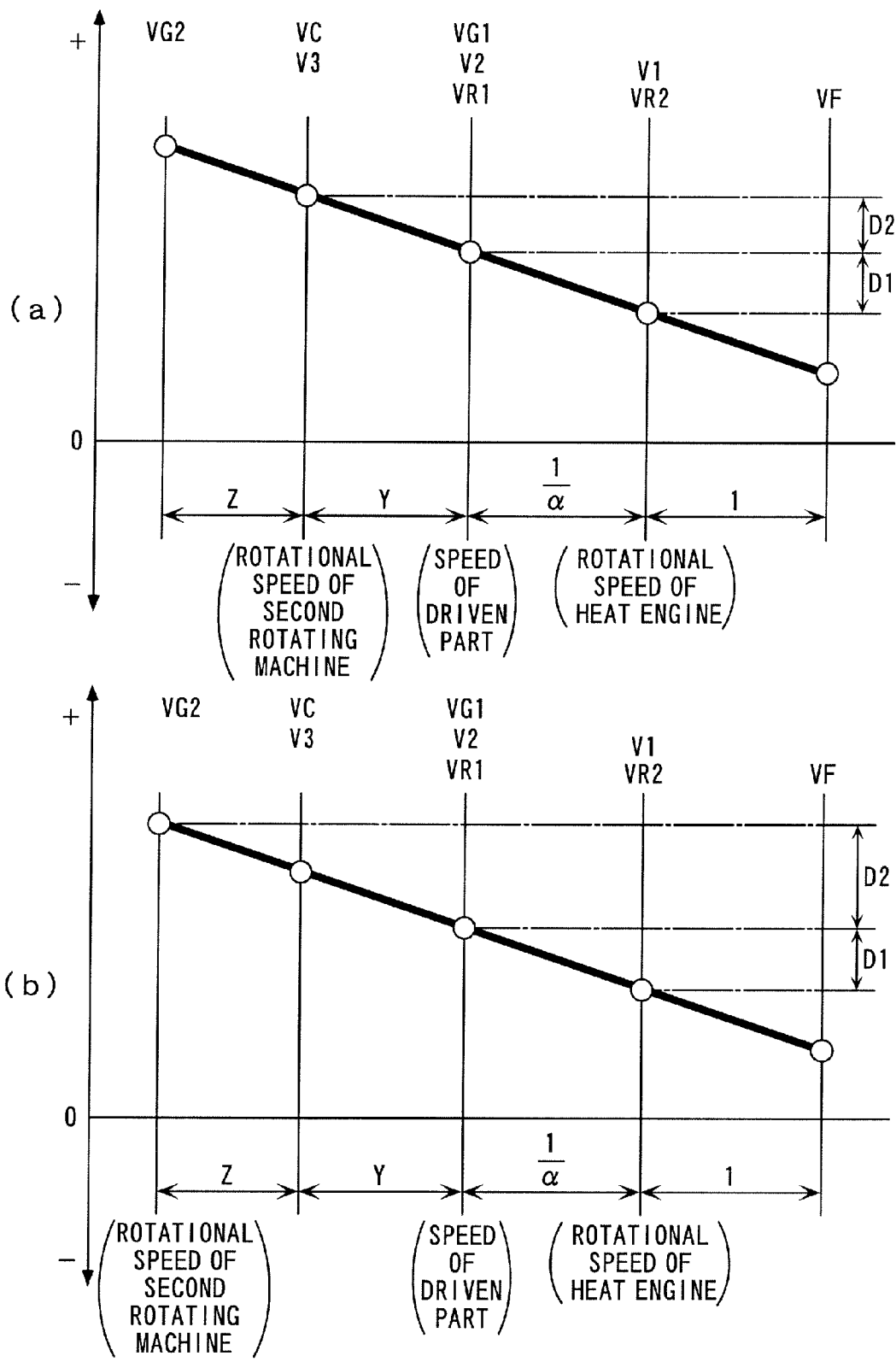
[FIG. 85] Velocity nomographs illustrating examples of the relationship between the rotational speeds of various rotary elements of a power plant of the invention as claimed in claim 15, during (a) the first speed change mode and (b) the second speed change mode, respectively.
Figure 86:
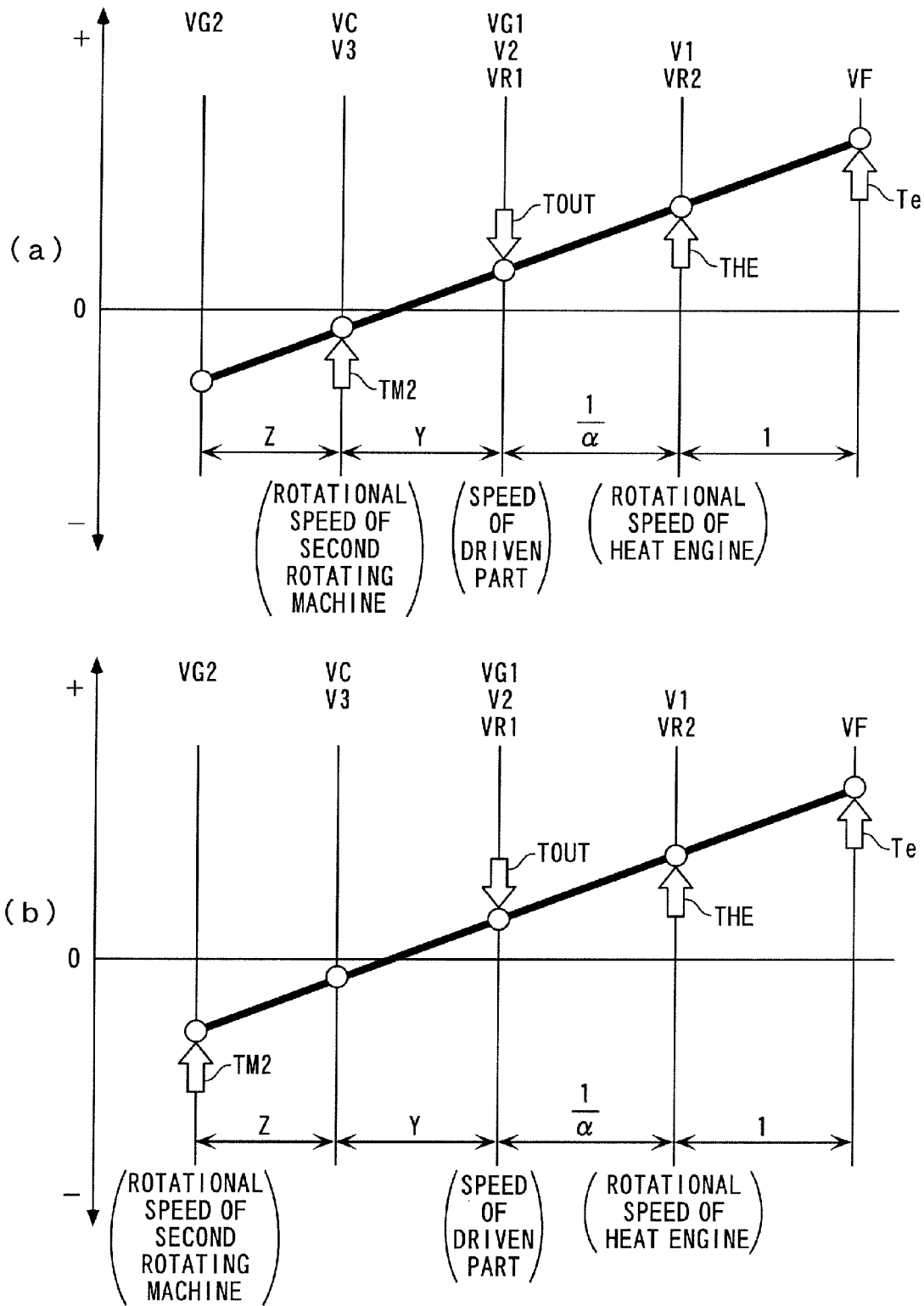
[FIG. 86] Diagrams illustrating examples of the relationship between the rotational speeds and torques of the various rotary elements of the power plant of the invention as claimed in claim 15 when the speed of the driven parts is rapidly increased in the respective cases of (a) the first speed change mode and (b) the second speed change mode.
Figure 87:
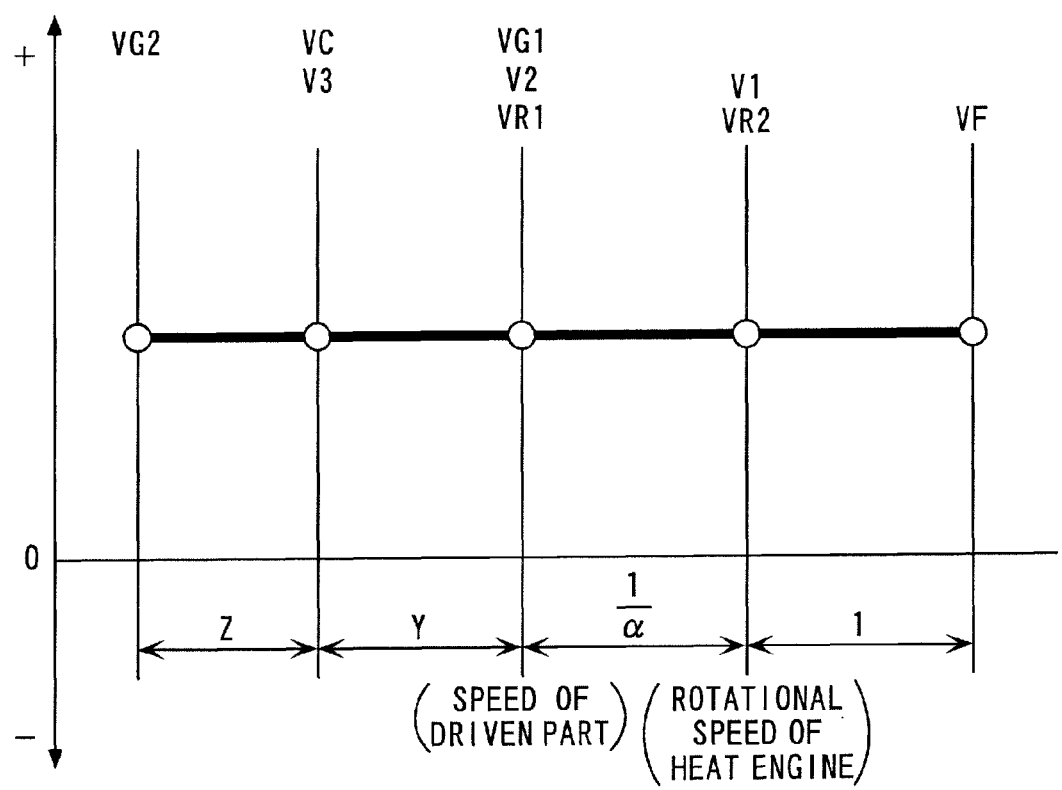
[FIG. 87] A diagram which is useful in explaining the switching between the first and second speed change modes in the power plant of the invention as claimed in claim 15.

Next, a power plant 1U according to a twenty-second embodiment of the present invention will be described with reference to FIG. 70. As shown in the figure, this power plant 1U is constructed by adding the brake mechanism BL described in the sixth embodiment to the power plant 1N according to the fifteenth embodiment. The following description is mainly given of different points from the fifteenth embodiment.

In the power plant 1U, the brake mechanism BL permits the first rotating shaft 4 to rotate only when it performs normal rotation together with the crankshaft 3a, the first carrier C1, and the B1 rotor 34, but blocks rotation of the first rotating shaft 4 when it performs reverse rotation together with the crankshaft 3a and so forth. It should be noted that in the present embodiment, the brake mechanism BL corresponds to a brake mechanism in the invention as claimed in claim 20.

Further, the power plant 1U performs the operations by the aforementioned EV creep and EV standing start in the following manner: The power plant 1U supplies electric power to the stator 102 of the rotating machine 101 to cause the rotor 103 to perform reverse rotation together with the first ring gear R1, and supplies electric power to the stator 33 of the second rotating machine 31 to cause the second rotating magnetic field generated by the stator 33 along with the supply of the electric power to perform normal rotation. Further, the power plant 1U controls the rotor rotational speed VRO and the second magnetic field rotational speed VMF2 such that $(\beta+1) \cdot |VRO| = r1 \cdot |VMF2|$ holds. Furthermore, the electric power supplied to the stators 102 and 33 is controlled such that sufficient torque is transmitted to the drive wheels DW and DW.

While the first ring gear R1 performs reverse rotation together with the rotor 103, as described above, the reverse rotation of the first carrier C1 is blocked by the brake mechanism BL, as described above, so that all the motive power from the rotating machine 101 is transmitted to the first sun gear S1 via the first ring gear R1 and the first planetary gears P1, thereby acting on the first sun gear S1 to cause the first sun gear S1 to perform normal rotation. Further, while the second rotating magnetic field generated by the stator 33 performs normal rotation, as described above, the reverse rotation of the B1 rotor 34 is blocked by the brake mechanism BL, so that all the electric power supplied to the stator 33 is transmitted to the B2 rotor 35 as motive power, thereby acting on the B2 rotor 35 to cause the B2 rotor 35 to perform normal rotation. Furthermore, the motive power transmitted to the first sun gear S1 and the B2 rotor 35 is transmitted to the drive wheels DW and DW, and causes the drive wheels DW and DW to perform normal rotation.

Further, in this case, on the first carrier C1 and the B1 rotor 34, which are blocked from performing reverse rotation by the brake mechanism BL, torques act from the rotor 103 and the stator 33 through the aforementioned control of the rotating machine 101 and the second rotating machine 31 such that the torques cause the first carrier C1 and the B1 rotor 34 to perform reverse rotation, respectively, whereby the crankshaft 3a, the first carrier C1 and the B1 rotor 34 are not only blocked from performing reverse rotation but also held stationary.

As described above, according to the present embodiment, it is possible to drive the drive wheels DW and DW by the rotating machine 101 and the second rotating machine 31 without using the engine motive power. Further, during driving of the drive wheels DW and DW, the crankshaft 3a is not only prevented from reverse rotation but also held stationary, and hence the crankshaft 3a does not drag the engine 3. In addition, it is possible to obtain the same advantageous effects as provided by the fifteenth embodiment.

It should be noted that although in the above-described fifteenth to twenty-second embodiments, similarly to the first embodiment, the second pole pair number ratio β of the second rotating machine 31 is set to 2.0, if the second pole pair number ratio β is set to less than 1.0, as is apparent from FIGS. 25 and 58, it is possible to prevent the driving efficiency from being lowered by occurrence of loss caused by the second magnetic field rotational speed VMF2 becoming too high. Further, although in the fifteenth to twenty-second embodiments, the first planetary gear ratio r1 of the first planetary gear unit PS1 is set to a relatively large value, by setting the first planetary gear ratio r1 to a smaller value, it is possible to obtain the following advantageous effects:

As is apparent from FIG. 58, when the first planetary gear ratio r1 is set to a relatively large value, if the engine speed NE is higher than the vehicle speed VP (see the two-dot chain lines in FIG. 58), the rotor rotational speed VRO becomes higher than the engine speed NE, and sometimes becomes too high. In contrast, if the first planetary gear ratio r1 is set to a smaller value, as is apparent from a comparison between the broken lines and two-dot chain lines in the velocity nomograph in FIG. 58, the rotor rotational speed VRO can be reduced, and hence it is possible to prevent the driving efficiency from being lowered by occurrence of loss caused by the rotor rotational speed VRO becoming too high.

Further, although in the fifteenth to twenty-second embodiments, the first carrier C1 and the B1 rotor 34 are directly connected to each other, and the first sun gear S1 and the B2 rotor 35 are directly connected to each other, the first carrier C1 and the B1 rotor 34 are not necessarily required to be directly connected to each other insofar as they are connected to the crankshaft 3a. Further, the first sun gear S1 and the B2 rotor 35 are not necessarily required to be directly connected to each other insofar as they are connected to the drive wheels DW and DW. In this case, each of the transmissions 161 and 171 of the sixteenth and seventeenth embodiments may be formed by two transmissions, which may be arranged in the following manner: One of the two transmissions forming the transmission 161 may be disposed between the first sun gear S1 and the drive wheels DW and DW while the other thereof may be disposed between the B2 rotor 35 and the drive wheels DW and DW. Further, one of the two transmissions forming the transmission 171 may be disposed between the first carrier C1 and the crankshaft 3a while the other thereof may be disposed between the B1 rotor 34 and the crankshaft 3a.

Further, although in the fifteenth to twenty-second embodiments, the first sun gear S1 and the first ring gear R1 are connected to the drive wheels DW and DW and the rotating machine 101, respectively, the above connection relationship may be inverted, that is, the first ring gear R1 and the first sun gear S1 may be connected to the drive wheels DW and DW and the rotating machine 101, respectively. In this case, at the time of the ENG start during EV traveling in which the torque demanded of the rotating machine 101 becomes particularly large, the rotating machine torque TMOT is expressed by the following equation (67):

$$TMOT = -\{\beta \cdot TDDW + (1\beta)TDENG\}/(r1'+1\beta) \qquad (67)$$

In this equation (67), r1' represents a ratio between the number of the gear teeth of the first ring gear and that of the gear teeth of the first sun gear S1 (the number of the gear teeth of the first ring gear/the number of the gear teeth of the first sun gear S1), as described hereinabove, and is larger than 1.0. As is clear from this configuration, the fact that the first planetary gear ratio r1 represents the number of the gear teeth of the first sun gear S1/the number of the gear teeth of the first ring gear, as described above, and is smaller than 1.0, and the aforementioned equations (64) and (67), the rotating machine torque TMOT can be reduced, thereby making it possible to further reduce the size and costs of the rotating machine 101.

Further, although in the seventh to twenty-second embodiments, the first planetary gear unit PS1 is used as the differential gear in the invention as claimed in claim 8, any other suitable device may be employed insofar as it has the following functions: It has three elements, and has the function of distributing motive power input to one of the three elements to the other two elements, and the function of combining the motive power input to the other two elements, and then outputting the combined motive power to the above one element, the three elements rotating while maintaining a linear speed relationship therebetween during distributing and combining the motive power. For example, such a device may be employed that has a plurality of rollers for transmitting motive power by friction between surfaces in place of the gears of the planetary gear unit, and has the functions equivalent to the planetary gear unit. Furthermore, although detailed description thereof is omitted, such a device as is disclosed in Japanese Patent Application No. 2006-213905, may be employed which is formed by a combination of a plurality of magnets and soft magnetic material elements. Further, a double pinion type planetary gear unit may be used as the differential gear. This also similarly applies to the second planetary gear unit PS2.

Further, although in the seventh to twenty-second embodiments, the rotating machine 101 as the second rotating machine in the invention as claimed in claim 8 is a DC motor, any other suitable device, such as an AC motor, may be employed insofar as it has the function of converting supplied electric power to motive power, and the function of converting input motive power to electric power. Further, it is to be understood that in the seventh to thirteenth embodiments and the fifteenth to twenty-first embodiments, the brake mechanism BL for blocking the reverse rotation of the crankshaft 3a may be provided. Further, although the brake mechanism BL is formed by the one-way clutch OC and the casing CA, the brake mechanism BL may be formed by another suitable mechanism, such as a hand brake, insofar as it is capable of blocking the reverse rotation of the crankshaft 3a.

It should be noted that the present invention is by no means limited to the embodiments described above, but can be practiced in various forms. For example, in the above-described embodiments, the first and second controllers in the present invention are formed by the ECU 2 and the first and second PDUs 41 and 42, the first and second controllers are not limited to these, but any suitable controllers may be used insofar as they are capable of controlling electric power generation by the stators 23, 33, and 102, and electric power supplied thereto. For example, the first and second controllers may be formed by electric circuits or the like having microcomputers installed thereon. Further, although in the above-described embodiments, the electric power storage device in the present invention is the battery 43, this is not limitative, but the electric power storage device may be a capacitor, for example, insofar as it is capable of being charged and discharged. Furthermore, the battery 43 may be omitted, depending on its necessity.

Further, in the above-described embodiments, there are arranged four first armature magnetic poles, eight first magnetic poles, and six cores 25a. That is, in the above-described embodiments, the ratio between the number of the first armature magnetic poles, the number of the first magnetic poles, and the number of the first soft magnetic material elements in the present invention is 1:2:1.5, by way of example. However, respective desired numbers of the first armature magnetic poles, the first magnetic poles and the cores 25a can be employed, insofar as the ratio therebetween satisfies $1:m:(1+m)/2$ $(m \neq 1.0)$. This also similarly applies to the second rotating machine 31. Further, although in the above-described embodiments, the cores 25a and 35a are formed by steel plates, they may be formed by other soft magnetic materials.

Further, although in the above-described embodiments, the stator 23 and the A1 rotor 24 are arranged at an outer location and an inner location in the radial direction, respectively, this is not limitative, but inversely, they may be arranged at an inner location and an outer location in the radial direction, respectively. Further, although in the above-described embodiments, the first rotating machine 21 is constructed as a so-called radial type by arranging the stator 23 and the A1 and A2 rotors 24 and 25 in the radial direction, the first rotating machine 21 may be constructed as a so-called axial type by arranging the stator 23 and the A1 and A2 rotors 24 and 25 in the axial direction. This also similarly applies to the second rotating machine 31.

Further, although in the above-described embodiments, one magnetic pole is formed by a magnetic pole of a single permanent magnet 24a, it may be formed by magnetic poles of a plurality of permanent magnets. For example, if one magnetic pole is formed by arranging two permanent magnets in an inverted-V shape such that the magnetic poles thereof become closer to each other toward the stator 23, it is possible to improve the directivity of the aforementioned magnetic force line ML. Further, electromagnets or armatures that can generate a moving magnetic field may be used in place of the permanent magnets 24a used in the above-described embodiments. Further, although in the above-described embodiments, the U-phase to W-phase coils 23c to 23e are wound in the slots 23b by distributed winding, this is not limitative, but they may be wound by concentrated winding. Further, although in the above-described embodiments, the coils 23c to 23e are formed by three-phase coils of U-phase to W-phase, the number of phases of the coils can be set as desired insofar as the coils can generate the first rotating magnetic field. Further, it is to be understood that a desired number of slots, other than that used in the above-described embodiments may be employed as the number of the slots 23b. Further, although in the above-described embodiments, the slots 23b, the permanent magnets 24a, and the cores 25a are arranged at equally-spaced intervals, they may be arranged at unequally-spaced intervals. The above also similarly applies to the second rotating machine 31.

Further, although in the above-described embodiments, the engine 3 as a heat engine in the present invention is a gasoline engine, any other suitable engine, such as a diesel engine or an external combustion engine, may be used. Furthermore, although in the above-described embodiments, the present invention is applied to a vehicle, by way of example, this is not limitative, but for example, it can be applied to e.g. a boat and an aircraft. It is to be further understood that various changes and modifications may be made without departing from the spirit and scope thereof without departing from the spirit and scope thereof.

Industrial Applicability

The power plant according to the present invention is very useful in attaining reduction of the size and costs of the power plant, and enhancing driving efficiency thereof.

DESCRIPTION OF REFERENCE NUMERALS 1 power plant
1A power plant
1B power plant
1C power plant
1D power plant
1E power plant
1F power plant
1G power plant
1H power plant
1I power plant
1J power plant
1K power plant
1L power plant
1M power plant
1N power plant
1O power plant
1P power plant
1Q power plant
1R power plant
1S power plant
1T power plant
1U power plant DW drive wheels (driven parts)
2 ECU (first controller, second controller)
3a crankshaft (output portion, first output portion)
3 engine (heat engine)
21 first rotating machine
23 stator (first stator)
23a iron core (first armature, armature)
23c U-phase coil (first armature, armature)
23d V-phase coil (first armature, armature)
23e W-phase coil (first armature, armature)
24 A1 rotor (first rotor)
24a permanent magnet (first magnetic pole, magnetic pole)
25 A2 rotor (second rotor)
25a core (first soft magnetic material element, soft magnetic material element)
31 second rotating machine (first rotating machine)
33 stator (second stator)
33a iron core (second armature, armature)
33b U-phase coil (second armature, armature)
33b V-phase coil (second armature, armature)
33b W-phase coil (second armature, armature)
34 B1 rotor (third rotor, first rotor)
34a permanent magnet (second magnetic pole, magnetic pole)
35 B2 rotor (fourth rotor, second rotor)
35a core (second soft magnetic material element, soft magnetic material element)
41 first PDU (first controller, second controller)
42 second PDU (second controller, first controller)
43 battery (electric power storage device)
61 transmission
71 transmission
81 transmission
91 transmission
101 rotating machine (second rotating machine)
103 rotor (second output portion)
111 transmission
121 transmission
131 transmission
141 transmission
151 transmission
161 transmission
171 transmission
181 transmission
191 transmission
201 transmission
PS1 first planetary gear unit (differential gear)
S1 first sun gear (first element, third element)
R1 first ring gear (third element, first element)
C1 first carrier (second element)
BL brake mechanism
PS2 second planetary gear unit (planetary gear unit)
S2 second sun gear (sun gear)
R2 second ring gear (ring gear)
P2 second planetary gear (planetary gear)
C2 second carrier (carrier)
CL1 first clutch
CL2 second clutch

The invention claimed is:

1. A power plant for driving driven parts, comprising:
a heat engine having an output portion for outputting motive power;
a first rotating machine; and
a second rotating machine,
said first rotating machine comprising:
a first rotor having a first magnetic pole row that is formed by a predetermined plurality of first magnetic poles arranged in a first circumferential direction, and has each two adjacent first magnetic poles so disposed as to have polarities different from each other, said first rotor being rotatable in the first circumferential direction;
an unmovable first stator having a first armature row that is formed by a plurality of first armatures arranged in the first circumferential direction, and is disposed in a manner opposed to said first magnetic pole row, for generating a first rotating magnetic field rotating in the first circumferential direction between said first armature row and said first magnetic pole row, by a predetermined plurality of first armature magnetic poles generated at said plurality of first armatures; and
a second rotor having a first soft magnetic material element row that is formed by a predetermined plurality of first soft magnetic material elements arranged in the first circumferential direction in a manner spaced from each other, and is disposed between said first magnetic pole row and said first armature row, said second rotor being rotatable in the first circumferential direction,
wherein a ratio between the number of the first armature magnetic poles, the number of the first magnetic poles, and the number of said first soft magnetic material elements is set to $1:m:(1+m)/2$ $(m \neq 1.0)$,
said second rotating machine comprising:
a third rotor having a second magnetic pole row that is formed by a predetermined plurality of second magnetic poles arranged in a second circumferential direction, and has each two adjacent second magnetic poles so disposed as to have polarities different from each other, said third rotor being rotatable in the second circumferential direction;
an unmovable second stator having a second armature row that is formed by a plurality of second armatures arranged in the second circumferential direction, and is disposed in a manner opposed to said second magnetic pole row, for generating a second rotating magnetic field rotating in the second circumferential direction between said second armature row and said second magnetic pole row, by a predetermined plurality of second armature magnetic poles generated at said plurality of second armatures; and
a fourth rotor having a second soft magnetic material element row that is formed by a predetermined plurality of second soft magnetic material elements arranged in the second circumferential direction in a manner spaced from each other, and is disposed between said second magnetic pole row and said second armature row, said fourth rotor being rotatable in the second circumferential direction,
wherein a ratio between the number of the second armature magnetic poles, the number of the second magnetic poles, and the number of said second soft magnetic material elements is set to $1:n:(1+n)/2$ $(n \neq 1.0)$,
the power plant further comprising:
a first controller electrically connected to said first stator, for controlling electric power generated by said first stator and electric power supplied to said first stator; and
a second controller electrically connected to said second stator, for controlling electric power generated by said second stator and electric power supplied to said second stator,
wherein said first and second stators are electrically connected to each other via said first and second controllers, said first and fourth rotors being mechanically connected to the driven parts, and said second and third rotors being mechanically connected to said output portion of said heat engine.

2. A power plant as claimed in claim 1, further comprising an electric power storage device that is configured to be capable of being charged and discharged and is electrically connected to said first and second stators via said first and second controllers, respectively.

3. A power plant, as claimed in claim 1, further comprising a transmission for changing speed of motive power from said first and fourth rotors and transmitting the motive power to the driven parts.

4. A power plant as claimed in claim 1, further comprising a transmission for changing the speed of motive power from said first rotor and transmitting the motive power to the driven parts.

5. A power plant as claimed in claim 1, further comprising a transmission for changing the speed of motive power from said fourth rotor and transmitting the motive power to the driven parts.

6. A power plant as claimed in claim 1, further comprising a transmission for changing speed of motive power from said output portion of said heat engine and transmitting the motive power to said second and third rotors.

7. A power plant as claimed in claim 1, further comprising a brake mechanism for blocking reverse rotation of said output portion of said heat engine.

8. A power plant for driving driven parts, comprising:
a heat engine having a first output portion for outputting motive power;
a first rotating machine including a first rotor having a magnetic pole row that is formed by a predetermined plurality of magnetic poles arranged in a circumferential direction, and has each two adjacent magnetic poles so disposed as to have polarities different from each other, said first rotor being rotatable in the circumferential direction, an unmovable stator having an armature row that is formed by a plurality of armatures arranged. in the circumferential direction, and is disposed in a manner opposed to said magnetic pole row, for generating a rotating magnetic field rotating in the circumferential direction between said armature row and said magnetic pole row, by a predetermined plurality of armature magnetic poles generated at said plurality of armatures, and a second rotor having a soft magnetic material element row that is formed by a predetermined plurality of soft magnetic material elements arranged in the circumferential direction in a manner spaced from each other, and is disposed between said magnetic pole row and said armature row, said second rotor being rotatable in the circumferential direction, wherein a ratio between the number of the armature magnetic poles, the number of the magnetic poles, and the number of said soft magnetic material elements is set to $1:m:(1+m)/2$ $(m \neq 1.0)$;
a first controller electrically connected to said stator, for controlling electric power generated by said stator and electric power supplied to said stator;
a differential including a first element, a second element and a third element mechanically connected to each other, and having a function of distributing motive power input to said second element to said first and third elements and a function of combining motive power input to said first element and motive power input to said third element and then outputting combined motive power to said second element, said first to third elements rotating while holding a collinear relationship with respect to rotational speed, during distributing and combining the motive power;
a second rotating machine including a second output portion, and having a function of converting supplied electric power to motive power and outputting the motive power to said second output portion and a function of converting motive power input to said second output portion to electric power to thereby generate electric power; and
a second controller electrically connected to said second rotating machine, for controlling electric power generated by said second rotating machine and electric power supplied to said second rotating machine,
wherein one of a pair of said first rotor and said second element and a pair of said second rotor and said first element are mechanically connected to said first output portion of said heat engine, while the other of the pair of said first rotor and said second element and the pair of said second rotor and said first element are mechanically connected to the driven parts, said third element being mechanically connected to said second output portion of said second rotating machine, and said stator and said second rotating machine being electrically connected to each other via said first and second controllers.

9. A power plant as claimed in claim 8, further comprising an electric power storage device that is configured to be capable of being charged and discharged and is electrically connected to said stator and said second rotating machine via said first and second controllers, respectively.

10. A power plant as claimed in claim 8, further comprising a transmission for changing speed of motive power from the other of the pair of said first rotor and said second element and the pair of said second rotor and said first element and transmitting the motive power to the driven parts.

11. A power plant as claimed in claim 8, further comprising a transmission for changing speed of motive power from said first output portion of said heat engine and transmitting the motive power to the one of the pair of said first rotor and said second element and the pair of said second rotor and said first element.

12. A power plant as claimed in claim 8, wherein said second rotor and said first element are mechanically connected to said first output portion of said heat engine, and said first rotor and said second element are mechanically connected to the driven parts,
the power plant further comprising a transmission for changing speed of motive power from said first rotor and transmitting the motive power to the driven parts.

13. A power plant as claimed in claim 8, wherein said second rotor and said first element are mechanically connected to said first output portion of said heat engine, and said first rotor and said second element are mechanically connected to the driven parts,
the power plant further comprising a transmission for changing speed of motive power from said second output portion of said second rotating machine and transmitting the motive power to said third element.

14. A power plant as claimed in claim 8, wherein said second rotor and said first element are mechanically connected to said first output portion of said heat engine, and said first rotor and said second element are mechanically connected to the driven parts,
the power plant further comprising a transmission for changing speed of motive power from said second element and transmitting the motive power to the driven parts.

15. A power plant as claimed in claim 8, wherein said second rotor and said first element are mechanically connected to said first output portion of said heat engine, and said first rotor and said second element are mechanically connected to the driven parts, the power plant further comprising:

a planetary gear unit including a sun gear, a ring gear, and a carrier rotatably supporting planetary gears in mesh with said sun gear and said ring gear;

a first clutch; and a second clutch, wherein one of said sun gear and said ring gear is mechanically connected to said second element, wherein said carrier is mechanically connected to said third element, and is mechanically connected to said second output portion of said second rotating machine via said first clutch, and wherein the other of said sun gear and said ring gear is mechanically connected to said second output portion via said second clutch.

16. A power plant as claimed in claim 8, wherein said first rotor and said second element are mechanically connected to said first output portion of said heat engine, and said second rotor and said first element are mechanically connected to the driven parts, the power plant further comprising a transmission for changing speed of motive power transmitted between said second output portion of said second rotating machine and said third element.

17. A power plant as claimed in claim 8, wherein said first rotor and said second element are mechanically connected to said first output portion of said heat engine, and said second rotor and said first element are mechanically connected to the driven parts, the power plant further comprising a transmission for changing speed of motive power from said first element and transmitting the motive power to the driven parts.

18. A power plant as claimed in claim 8, wherein said first rotor and said second element are mechanically connected to said first output portion of said heat engine, and said second rotor and said first element are mechanically connected to the driven parts, the power plant further comprising:

a planetary gear unit including a sun gear, a ring gear, and a carrier rotatably supporting planetary gears in mesh with said sun gear and said ring gear;

a first clutch; and a second clutch, wherein one of said sun gear and said ring gear is mechanically connected to said second element, wherein said carrier is mechanically connected to said third element, and is mechanically connected to said second output portion of said second rotating machine via said first clutch, and wherein the other of said sun gear and said ring gear is mechanically connected to said second output portion via said second clutch.

19. A power plant as claimed in claim 8, wherein said first rotor and said second element are mechanically connected to said first output portion of said heat engine, and said second rotor and said first element are mechanically connected to the driven parts, the power plant further comprising a transmission for changing speed of motive power from said second rotor and transmitting the motive power to the driven parts.

20. A power plant as claimed in claim 8, further comprising a brake mechanism for blocking reverse rotation of said first output portion of said heat engine.

* * * * *